(12) United States Patent
Vincent et al.

(10) Patent No.: US 12,545,940 B2
(45) Date of Patent: Feb. 10, 2026

(54) METHOD FOR PRODUCING A DEUTERATED OR TRITIATED NAD(P)H

(71) Applicant: Oxford University Innovation Limited, Oxford (GB)

(72) Inventors: Kylie Vincent, Oxford (GB); Holly Reeve, Oxford (GB); Jack Rowbotham, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 1488 days.

(21) Appl. No.: 16/969,007

(22) PCT Filed: Feb. 12, 2019

(86) PCT No.: PCT/EP2019/053447
§ 371 (c)(1),
(2) Date: Aug. 11, 2020

(87) PCT Pub. No.: WO2019/155089
PCT Pub. Date: Aug. 15, 2019

(65) Prior Publication Data
US 2021/0024970 A1    Jan. 28, 2021

(30) Foreign Application Priority Data
Feb. 12, 2018  (EP) ..................... 18156330

(51) Int. Cl.
*C12P 19/36*  (2006.01)
(52) U.S. Cl.
CPC ................... *C12P 19/36* (2013.01)

(58) Field of Classification Search
CPC ....................................................... C12P 19/36
See application file for complete search history.

(56) References Cited

U.S. PATENT DOCUMENTS

2015/0044723 A1* 2/2015 Vincent ............... C12N 9/0051
435/189

FOREIGN PATENT DOCUMENTS

| JP | S63219391 A | 9/1988 |
| JP | H0698013 B2 | 12/1994 |
| WO | 2013/050760 A1 | 4/2013 |

OTHER PUBLICATIONS

Brown, Francis F., Campbell, Iain D. and Kuchel, Philip W.(1977), Human erythrocyte metabolism studies by 1H spin echo NMR, FEBS Letters, 82, doi: 10.1016/0014-5793(77)80875-2 (Year: 1977).*

(Continued)

*Primary Examiner* — Melenie L Gordon
*Assistant Examiner* — John Paul Selwanes
(74) *Attorney, Agent, or Firm* — James S. Keddie; Bozicevic, Field & Francis LLP

(57) ABSTRACT

Described herein is a method of producing a reduced labelled cofactor comprising one or more $^x$H atom, wherein x is 2 or 3. Described herein is also a method of producing a reduced labelled reaction product comprising one or more $^x$H atom, wherein x is 2 or 3, wherein the method comprises producing a reduced labelled cofactor according to the invention. Described herein are also systems for performing such methods.

28 Claims, 31 Drawing Sheets
Specification includes a Sequence Listing.

(56) References Cited

OTHER PUBLICATIONS

Quinto, T. et al. Org. Biomol. Chem., 2015, 13, 357; DOI: 10.1039/C4OB02071E. (Year: 2015).*
Yang Y, Sauve AA. NAD(+) metabolism: Bioenergetics, signaling and manipulation for therapy. Biochim Biophys Acta. Dec. 2016; 1864(12):1787-1800. doi: 10.1016/j.bbapap.2016.06.014. Epub Jun. 29, 2016. PMID: 27374990; PMCID: PMC5521000. (Year: 2016).*
International Search Report and Written Opinion for WO2019/155089 (PCT/EP2019/053447), pp. 1-27.
J. A. Birrell and J. Hirst, Biochemistry, 2013, 52, 4048-4055.
Lauterbach et al, (2011) PLoS ONE; PLoS ONE 6(10), e25939.
Vincent et al (2005) JACS 127, 18179-18189.
Devereux et al (1984) Nucleic Acids Research 12, 387-395.
Altschul S. F. (1993) J. Mol. Evol. 36, 290-300.
Altschul, S.F et al (1990) J Mol Biol 215, 403-410.
Thompson et al. (1994) Nucleic Acids Research 22(22) 4673-4680.
Gotoh (1996) J. Mol. Biol. 264(4) 823-838.
Depiereux and Feytmans (1992), CABIOS 8(5) 501-509.
Lawrence et al. (1993) Science 262(5131) 208-214.
Van Walle et al. (2004) Bioinformatics, 20(9) 1428-1435.
Altschul et al.(1986) Bull. Math. Bio. 48, 603-16.
Henikoff and Henikoff (1992) Proc. Natl. Acad. Sci. USA 89, 10915-10919.
Covington et al., Anal. Chem. (1968) 40 (4), 700-706.
Lauterbach et al (2013) FEBS J. 280, 3058-3068.
Lauterbach and Lenz, J. Am. Chem. Soc., 2013, 135, 17897-905.
Lukey et al, J. Biol. Chem., 2010, 285, 3928-3938.
Brown et al. (1977) Febs Letters 82(1), 12-13.
Reeve et al (2011) Chemical communications 48(10) 1586-1591.
Rowbotham et al. (2019) "Bringing Biocatalysis into the Deuteration Toolbox" (https://chemrxiv.org/articles/preprint/Bringing_Biocatalysis_into_the_Deuteration_Toolbox/7982864/1).
Ryerson and Walsh (1979) Journal of biological Chemistry 254(11), 4349-4351.
Oppenheimer et al. (1971) PNAS 68(12) 3200-3205.
Wong and Whitesides (1983) J. Am. Chem. Soc. 105, 5012-5014.
Edegger et al. (2006) Chem. Commun. 2006 2402-2404.
X. Wang and H. H. P. Yiu, ACS Catal., 2016, 6, 1880-1886.
H. A. Reeve, P. A. Ash, H. Park, A. Huang, M. Posidias, C. Tomlinson, O. Lenz and K. A. Vincent, Biochem. J., 2017, 474, 215-230.
H. A. Reeve, L. Lauterbach, O. Lenz and K. A. Vincent, ChemCatChem, 2015, 7, 3480-3487.
International Preliminary Report on Patentability for WO2019/155089 (PCT/EP2019/053447), dated Aug. 18, 2020, pp. 1-21.
Database Epodoc [Online] European Patent Office, the Hague, Sep. 13, 1988 (Sep. 13, 1988), NL; "Production of Nicotinamide Adenine Dinucleotide Reduced Type".

* cited by examiner

A

B

C

A

B

C

A

B

C

A

B

C

A

B i)

ii)

i)

ii)

i)

ii)

| Substrate | Product | NADH-dependent Enzyme |
|---|---|---|
| | | S-selective alcohol dehydrogenase |
| | | R-selective alcohol dehydrogenase |
| | | L-alanine dehydrogenase* |
| | | Ene reductase |

*Stereochemistry of product not determined, L-alaDH known to selectively produce L-alanine (a)(i) Derivatisation for GC-FID (b)(i) Derivatisation for chiral GC-FID (a)(ii) GC-FID (b)(ii) Chiral GC-FID (c) GC-MS (d) $^1$H NMR spectroscopy (e) Distribution of α-deuterated products

92 %         8 %

(a) GC-FID (b) ¹H NMR spectroscopy (a) GC-FID (b) ¹H NMR spectroscopy

(c) GC-MS

A

B

SEQUENCE LISTING

<160> NUMBER OF SEQ ID NOS: 78

<210> SEQ ID NO 1
<211> LENGTH: 602
<212> TYPE: PRT
<213> ORGANISM: Ralstonia eutropha

<400> SEQUENCE: 1

```
Met Asp Ser Arg Ile Thr Thr Ile Leu Glu Arg Tyr Arg Ser Asp Arg
1               5                   10                  15

Thr Arg Leu Ile Asp Ile Leu Trp Asp Val Gln His Glu Tyr Gly His
            20                  25                  30

Ile Pro Asp Ala Val Leu Pro Gln Leu Gly Ala Gly Leu Lys Leu Ser
        35                  40                  45

Pro Leu Asp Ile Arg Glu Thr Ala Ser Phe Tyr His Phe Phe Leu Asp
    50                  55                  60

Lys Pro Ser Gly Lys Tyr Arg Ile Tyr Leu Cys Asn Ser Val Ile Ala
65                  70                  75                  80

Lys Ile Asn Gly Tyr Gln Ala Val Arg Glu Ala Leu Glu Arg Glu Thr
                85                  90                  95

Gly Ile Arg Phe Gly Glu Thr Asp Pro Asn Gly Met Phe Gly Leu Phe
            100                 105                 110
```

```
Asp Thr Pro Cys Ile Gly Leu Ser Asp Gln Glu Pro Ala Met Leu Ile
            115                 120                 125

Asp Lys Val Val Phe Thr Arg Leu Arg Pro Gly Lys Ile Thr Asp Ile
            130                 135                 140

Ile Ala Gln Leu Lys Gln Gly Arg Ser Pro Ala Glu Ile Ala Asn Pro
145                 150                 155                 160

Ala Gly Leu Pro Ser Gln Asp Ile Ala Tyr Val Asp Ala Met Val Glu
                165                 170                 175

Ser Asn Val Arg Thr Lys Gly Pro Val Phe Phe Arg Gly Arg Thr Asp
                180                 185                 190

Leu Arg Ser Leu Leu Asp Gln Cys Leu Leu Lys Pro Glu Gln Val
            195                 200                 205

Ile Glu Thr Ile Val Asp Ser Arg Leu Arg Gly Arg Gly Ala Gly
            210                 215                 220

Phe Ser Thr Gly Leu Lys Trp Arg Leu Cys Arg Asp Ala Glu Ser Glu
225                 230                 235                 240

Gln Lys Tyr Val Ile Cys Asn Ala Asp Glu Gly Pro Gly Thr Phe
                245                 250                 255

Lys Asp Arg Val Leu Leu Thr Arg Ala Pro Lys Lys Val Phe Val Gly
            260                 265                 270

Met Val Ile Ala Ala Tyr Ala Ile Gly Cys Arg Lys Gly Ile Val Tyr
            275                 280                 285

Leu Arg Gly Glu Tyr Phe Tyr Leu Lys Asp Tyr Leu Glu Arg Gln Leu
            290                 295                 300

Gln Glu Leu Arg Glu Asp Gly Leu Leu Gly Arg Ala Ile Gly Gly Arg
305                 310                 315                 320

Ala Gly Phe Asp Phe Asp Ile Arg Ile Gln Met Gly Ala Gly Ala Tyr
                325                 330                 335

Ile Cys Gly Asp Glu Ser Ala Leu Ile Glu Ser Cys Glu Gly Lys Arg
                340                 345                 350

Gly Thr Pro Arg Val Lys Pro Pro Phe Pro Val Gln Gln Gly Tyr Leu
            355                 360                 365

Gly Lys Pro Thr Ser Val Asn Asn Val Glu Thr Phe Ala Ala Val Ser
            370                 375                 380

Arg Ile Met Glu Glu Gly Ala Asp Trp Phe Arg Ala Met Gly Thr Pro
385                 390                 395                 400

Asp Ser Ala Gly Thr Arg Leu Leu Ser Val Ala Gly Asp Cys Ser Lys
                405                 410                 415

Pro Gly Ile Tyr Glu Val Glu Trp Gly Val Thr Leu Asn Glu Val Leu
                420                 425                 430

Ala Met Val Gly Ala Arg Asp Ala Arg Ala Val Gln Ile Ser Gly Pro
            435                 440                 445

Ser Gly Glu Cys Val Ser Val Ala Lys Asp Gly Glu Arg Lys Leu Ala
450                 455                 460

Tyr Glu Asp Leu Ser Cys Asn Gly Ala Phe Thr Ile Phe Asn Cys Lys
465                 470                 475                 480

Arg Asp Leu Leu Glu Ile Val Arg Asp His Met Gln Phe Phe Val Glu
                485                 490                 495

Glu Ser Cys Gly Ile Cys Val Pro Cys Arg Ala Gly Asn Val Asp Leu
                500                 505                 510

His Arg Lys Val Glu Trp Val Ile Ala Gly Lys Ala Cys Gln Lys Asp
            515                 520                 525
```

```
Leu Asp Asp Met Val Ser Trp Gly Ala Leu Val Arg Arg Thr Ser Arg
    530             535                 540

Cys Gly Leu Gly Ala Thr Ser Pro Lys Pro Ile Leu Thr Thr Leu Glu
545             550                 555                 560

Lys Phe Pro Glu Ile Tyr Gln Asn Lys Leu Val Arg His Gly Pro
                565                 570                 575

Leu Leu Pro Ser Phe Asp Leu Asp Thr Ala Leu Gly Gly Tyr Glu Lys
                580                 585                 590

Ala Leu Lys Asp Leu Glu Glu Val Thr Arg
        595                 600

<210> SEQ ID NO 2
<211> LENGTH: 234
<212> TYPE: PRT
<213> ORGANISM: Ralstonia eutropha

<400> SEQUENCE: 2

Met Ser Ile Gln Ile Thr Ile Asp Gly Lys Thr Leu Thr Thr Glu Glu
1               5                   10                  15

Gly Arg Thr Leu Val Asp Val Ala Ala Glu Asn Gly Val Tyr Ile Pro
            20                  25                  30

Thr Leu Cys Tyr Leu Lys Asp Lys Pro Cys Leu Gly Thr Cys Arg Val
        35                  40                  45

Cys Ser Val Lys Val Asn Gly Asn Val Ala Ala Cys Thr Val Arg
50                  55                  60

Val Ser Lys Gly Leu Asn Val Glu Val Asn Asp Pro Glu Leu Val Asp
65                  70                  75                  80

Met Arg Lys Ala Leu Val Glu Phe Leu Phe Ala Glu Gly Asn His Asn
                85                  90                  95

Cys Pro Ser Cys Glu Lys Ser Gly Arg Cys Gln Leu Gln Ala Val Gly
            100                 105                 110

Tyr Glu Val Asp Met Met Val Ser Arg Phe Pro Tyr Arg Phe Pro Val
        115                 120                 125

Arg Val Val Asp His Ala Ser Glu Lys Ile Trp Leu Glu Arg Asp Arg
    130                 135                 140

Cys Ile Phe Cys Gln Arg Cys Val Glu Phe Ile Arg Asp Lys Ala Ser
145                 150                 155                 160

Gly Arg Lys Ile Phe Ser Ile Ser His Arg Gly Pro Glu Ser Arg Ile
                165                 170                 175

Glu Ile Asp Ala Glu Leu Ala Asn Ala Met Pro Pro Glu Gln Val Lys
            180                 185                 190

Glu Ala Val Ala Ile Cys Pro Val Gly Thr Ile Leu Glu Lys Arg Val
        195                 200                 205

Gly Tyr Asp Asp Pro Ile Gly Arg Arg Lys Tyr Glu Ile Gln Ser Val
    210                 215                 220

Arg Ala Arg Ala Leu Glu Gly Glu Asp Lys
225                 230

<210> SEQ ID NO 3
<211> LENGTH: 167
<212> TYPE: PRT
<213> ORGANISM: Ralstonia eutropha

<400> SEQUENCE: 3

Met Lys Glu Gln Glu Ile Asp Arg Ile Ala Thr Met Ile Tyr Glu Ala
1               5                   10                  15
```

```
Pro Leu Gly Glu Tyr Ile Gly Arg Asp Gly Ala Ala Ile Leu Ala Glu
            20                  25                  30

His Ala Ala Glu Ala Arg Leu Leu Lys Gly Asp Glu Phe Leu Tyr Arg
        35                  40                  45

Arg Gly Asp Val Thr Ser Ser Phe Tyr Ile Val Thr Asp Gly Arg Leu
    50                  55                  60

Ala Leu Val Arg Glu Lys Thr Asn Glu Arg Thr Ala Pro Ile Val His
65                  70                  75                  80

Val Leu Glu Lys Gly Asp Leu Val Gly Glu Leu Gly Phe Ile Asp Gln
                85                  90                  95

Thr Pro His Ser Leu Ser Val Arg Ala Leu Gly Asp Ala Ala Val Leu
            100                 105                 110

Ser Phe Ser Ala Glu Ser Ile Lys Pro Leu Ile Thr Glu His Pro Glu
        115                 120                 125

Leu Ile Phe Asn Phe Met Arg Ala Val Ile Lys Arg Val His His Val
    130                 135                 140

Val Val Thr Val Gly Glu His Glu Arg Glu Leu Gln Glu Tyr Ile Ser
145                 150                 155                 160

Thr Gly Gly Arg Gly Arg Gly
                165

<210> SEQ ID NO 4
<211> LENGTH: 464
<212> TYPE: PRT
<213> ORGANISM: Bos taurus

<400> SEQUENCE: 4

Met Leu Ala Ala Arg Arg Leu Leu Gly Gly Ser Leu Pro Ala Arg Val
1               5                   10                  15

Ser Val Arg Phe Ser Gly Asp Thr Thr Ala Pro Lys Lys Thr Ser Phe
            20                  25                  30

Gly Ser Leu Lys Asp Glu Asp Arg Ile Phe Thr Asn Leu Tyr Gly Arg
        35                  40                  45

His Asp Trp Arg Leu Lys Gly Ala Gln Ser Arg Gly Asp Trp Tyr Lys
    50                  55                  60

Thr Lys Glu Ile Leu Leu Lys Gly Pro Asp Trp Ile Leu Gly Glu Val
65                  70                  75                  80

Lys Thr Ser Gly Leu Arg Gly Arg Gly Gly Ala Gly Phe Pro Thr Gly
                85                  90                  95

Leu Lys Trp Ser Phe Met Asn Lys Pro Ser Asp Gly Arg Pro Lys Tyr
            100                 105                 110

Leu Val Val Asn Ala Asp Glu Gly Glu Pro Gly Thr Cys Lys Asp Arg
        115                 120                 125

Glu Ile Ile Arg His Asp Pro His Lys Leu Val Glu Gly Cys Leu Val
    130                 135                 140

Gly Gly Arg Ala Met Gly Ala Arg Ala Ala Tyr Ile Tyr Ile Arg Gly
145                 150                 155                 160

Glu Phe Tyr Asn Glu Ala Ser Asn Leu Gln Val Ala Ile Arg Glu Ala
                165                 170                 175

Tyr Glu Ala Gly Leu Ile Gly Lys Asn Ala Cys Gly Ser Gly Tyr Asp
            180                 185                 190

Phe Asp Val Phe Val Val Arg Gly Ala Gly Ala Tyr Ile Cys Gly Glu
        195                 200                 205

Glu Thr Ala Leu Ile Glu Ser Ile Glu Gly Lys Gln Gly Lys Pro Arg
    210                 215                 220
```

Leu Lys Pro Pro Phe Pro Ala Asp Val Gly Val Phe Gly Cys Pro Thr
225                 230                 235                 240

Thr Val Ala Asn Val Glu Thr Val Ala Val Ser Pro Thr Ile Cys Arg
            245                 250                 255

Arg Gly Gly Ala Trp Phe Ala Ser Phe Gly Arg Glu Arg Asn Ser Gly
        260                 265                 270

Thr Lys Leu Phe Asn Ile Ser Gly His Val Asn Asn Pro Cys Thr Val
    275                 280                 285

Glu Glu Glu Met Ser Val Pro Leu Lys Glu Leu Ile Glu Lys His Ala
290                 295                 300

Gly Gly Val Thr Gly Gly Trp Asp Asn Leu Leu Ala Val Ile Pro Gly
305                 310                 315                 320

Gly Ser Ser Thr Pro Leu Ile Pro Lys Ser Val Cys Glu Thr Val Leu
            325                 330                 335

Met Asp Phe Asp Ala Leu Ile Gln Ala Gln Thr Gly Leu Gly Thr Ala
        340                 345                 350

Ala Val Ile Val Met Asp Arg Ser Thr Asp Ile Val Lys Ala Ile Ala
    355                 360                 365

Arg Leu Ile Glu Phe Tyr Lys His Glu Ser Cys Gly Gln Cys Thr Pro
370                 375                 380

Cys Arg Glu Gly Val Asp Trp Met Asn Lys Val Met Ala Arg Phe Val
385                 390                 395                 400

Arg Gly Asp Ala Arg Pro Ala Glu Ile Asp Ser Leu Cys Glu Ile Ser
            405                 410                 415

Lys Gln Ile Glu Gly His Thr Ile Cys Ala Leu Gly Asp Gly Ala Ala
        420                 425                 430

Trp Pro Val Gln Gly Leu Ile Arg His Phe Arg Pro Glu Leu Glu Glu
    435                 440                 445

Arg Met Gln Gln Phe Ala Gln Gln His Gln Ala Arg Gln Ala Ala Phe
450                 455                 460

<210> SEQ ID NO 5
<211> LENGTH: 249
<212> TYPE: PRT
<213> ORGANISM: Bos taurus

<400> SEQUENCE: 5

Met Phe Leu Ser Ala Ala Leu Arg Ala Arg Ala Ala Gly Leu Ala Ala
1               5                   10                  15

His Trp Gly Lys His Ile Arg Asn Leu His Lys Thr Ala Val Gln Asn
            20                  25                  30

Gly Ala Gly Gly Ala Leu Phe Val His Arg Asp Thr Pro Glu Asn Asn
        35                  40                  45

Pro Glu Thr Pro Phe Asp Phe Thr Pro Glu Asn Tyr Lys Arg Ile Glu
    50                  55                  60

Ala Ile Val Lys Asn Tyr Pro Glu Gly His Lys Ala Ala Ala Val Leu
65                  70                  75                  80

Pro Val Leu Asp Leu Ala Gln Arg Gln Asn Gly Trp Leu Pro Ile Ser
            85                  90                  95

Ala Met Asn Lys Val Ala Glu Ile Leu Gln Val Pro Pro Met Arg Val
        100                 105                 110

Tyr Glu Val Ala Thr Phe Tyr Thr Met Tyr Asn Arg Lys Pro Val Gly
    115                 120                 125

Lys Tyr His Ile Gln Val Cys Thr Thr Thr Pro Cys Met Leu Arg Asn

```
            130                 135                 140
Ser Asp Ser Ile Leu Glu Ala Ile Gln Lys Lys Leu Gly Ile Lys Val
145                 150                 155                 160

Gly Glu Thr Thr Pro Asp Lys Leu Phe Thr Leu Ile Glu Val Glu Cys
                165                 170                 175

Leu Gly Ala Cys Val Asn Ala Pro Met Val Gln Ile Asn Asp Asn Tyr
                180                 185                 190

Tyr Glu Asp Leu Thr Pro Lys Asp Ile Glu Glu Ile Ile Asp Glu Leu
            195                 200                 205

Lys Ala Gly Lys Ile Pro Lys Pro Gly Pro Arg Ser Gly Arg Phe Ser
210                 215                 220

Cys Glu Pro Ala Gly Gly Leu Thr Ser Leu Thr Glu Pro Pro Lys Gly
225                 230                 235                 240

Pro Gly Phe Gly Val Gln Ala Gly Leu
                245

<210> SEQ ID NO 6
<211> LENGTH: 520
<212> TYPE: PRT
<213> ORGANISM: Ralstonia eutropha

<400> SEQUENCE: 6

Met Ile Thr Ile Thr Thr Ile Phe Val Pro Arg Asp Ser Thr Ala Leu
1               5                   10                  15

Ala Leu Gly Ala Asp Asp Val Ala Arg Ala Ile Ala Arg Glu Ala Ala
                20                  25                  30

Ala Arg Asn Glu His Val Arg Ile Val Arg Asn Gly Ser Arg Gly Met
            35                  40                  45

Phe Trp Leu Glu Pro Leu Val Glu Val Gln Thr Gly Ala Gly Arg Val
50                  55                  60

Ala Tyr Gly Pro Val Ser Ala Ala Asp Val Pro Gly Leu Phe Asp Ala
65                  70                  75                  80

Gly Leu Leu Gln Gly Gly Glu His Ala Leu Ser Gln Gly Val Thr Glu
                85                  90                  95

Glu Ile Pro Phe Leu Lys Gln Gln Glu Arg Leu Thr Phe Ala Arg Val
                100                 105                 110

Gly Ile Thr Asp Pro Leu Ser Leu Asp Asp Tyr Arg Ala His Glu Gly
            115                 120                 125

Phe Ala Gly Leu Glu Arg Ala Leu Ala Met Gln Pro Ala Glu Ile Val
            130                 135                 140

Gln Glu Val Thr Asp Ser Gly Leu Arg Gly Arg Gly Gly Ala Ala Phe
145                 150                 155                 160

Pro Thr Gly Ile Lys Trp Lys Thr Val Leu Gly Ala Gln Ser Ala Val
                165                 170                 175

Lys Tyr Ile Val Cys Asn Ala Asp Glu Gly Asp Ser Gly Thr Phe Ser
                180                 185                 190

Asp Arg Met Val Met Glu Asp Asp Pro Phe Met Leu Ile Glu Gly Met
            195                 200                 205

Thr Ile Ala Ala Leu Ala Val Gly Ala Glu Gln Gly Tyr Ile Tyr Cys
210                 215                 220

Arg Ser Glu Tyr Pro His Ala Ile Ala Val Leu Glu Ser Ala Ile Gly
225                 230                 235                 240

Ile Ala Asn Ala Ala Gly Trp Leu Gly Asp Asp Ile Arg Gly Ser Gly
                245                 250                 255
```

```
Lys Arg Phe His Leu Glu Val Arg Lys Gly Ala Gly Ala Tyr Val Cys
                260                 265                 270

Gly Glu Glu Thr Ala Leu Leu Glu Ser Leu Gly Arg Arg Gly Val
            275                 280                 285

Val Arg Ala Lys Pro Pro Leu Pro Ala Leu Gln Gly Leu Phe Gly Lys
        290                 295                 300

Pro Thr Val Ile Asn Asn Val Ile Ser Leu Ala Thr Val Ala Gly Glu
305                 310                 315                 320

Ser Trp Arg Ala Ala Glu Tyr Tyr Arg Asp Tyr Gly Met Gly Arg Ser
                325                 330                 335

Arg Gly Thr Leu Pro Phe Gln Leu Ala Gly Asn Ile Lys Gln Gly Gly
            340                 345                 350

Leu Val Glu Lys Ala Phe Gly Val Thr Leu Arg Glu Leu Leu Val Asp
        355                 360                 365

Tyr Gly Gly Gly Thr Arg Ser Gly Arg Ala Ile Arg Ala Val Gln Val
    370                 375                 380

Gly Gly Pro Leu Gly Ala Tyr Leu Pro Glu Ser Arg Phe Asp Val Pro
385                 390                 395                 400

Leu Asp Tyr Glu Ala Tyr Ala Ala Phe Gly Gly Val Val Gly His Gly
                405                 410                 415

Gly Ile Val Val Phe Asp Glu Thr Val Asp Met Ala Lys Ala Gly Pro
            420                 425                 430

Tyr Ala Met Glu Phe Cys Ala Ile Glu Ser Cys Gly Lys Cys Thr Pro
        435                 440                 445

Cys Arg Ile Gly Ser Thr Arg Gly Val Glu Val Met Asp Arg Ile Ile
    450                 455                 460

Ala Gly Glu Gln Pro Val Lys His Val Ala Leu Val Arg Asp Leu Cys
465                 470                 475                 480

Asp Thr Met Leu Asn Gly Ser Leu Cys Ala Met Gly Gly Met Thr Pro
                485                 490                 495

Tyr Pro Val Leu Ser Ala Leu Asn Glu Phe Pro Glu Asp Phe Gly Leu
            500                 505                 510

Ala Ser Asn Pro Ala Lys Ala Ala
        515                 520

<210> SEQ ID NO 7
<211> LENGTH: 176
<212> TYPE: PRT
<213> ORGANISM: Ralstonia eutropha

<400> SEQUENCE: 7

Met Pro Glu Ile Ser Pro His Ala Pro Ala Ser Ala Asp Ala Thr Arg
1               5                   10                  15

Ile Ala Ala Ile Val Ala Ala Arg Gln Asp Ile Pro Gly Ala Leu Leu
            20                  25                  30

Pro Ile Leu His Glu Ile Gln Asp Thr Gln Gly Tyr Ile Pro Asp Ala
        35                  40                  45

Ala Val Pro Val Ile Ala Arg Ala Leu Asn Leu Ser Arg Ala Asp Val
    50                  55                  60

His Gly Val Ile Thr Phe Tyr His His Phe Arg Gln Gln Pro Ala Gly
65                  70                  75                  80

Arg His Val Val Gln Val Cys Arg Ala Glu Ala Cys Gln Ser Val Gly
                85                  90                  95

Ala Glu Ala Leu Ala Glu His Ala Gln Arg Ala Leu Gly Cys Gly Phe
            100                 105                 110
```

His Glu Thr Thr Ala Asp Gly Gln Val Thr Leu Glu Pro Val Tyr Cys
    115                 120                 125

Leu Gly Gln Cys Ala Cys Gly Pro Ala Val Met Val Gly Glu Gln Leu
130                 135                 140

His Gly Tyr Val Asp Ala Arg Arg Phe Asp Ala Leu Val Arg Ser Leu
145                 150                 155                 160

Arg Glu Ser Ser Ala Glu Lys Thr Thr Glu Ala Ala Glu Ala Gln Ala
            165                 170                 175

<210> SEQ ID NO 8
<211> LENGTH: 500
<212> TYPE: PRT
<213> ORGANISM: Rhodobacter capsulatus

<400> SEQUENCE: 8

Met Lys Ile Trp Leu Pro Cys Asp Ala Ala Lys Ala Cys Gly Ala
1               5                   10                  15

Glu Ala Val Leu Ala Ala Leu Arg Leu Glu Ala Glu Lys Arg Gly Gly
                20                  25                  30

Ala Leu Asp Ile Ala Arg Asn Gly Ser Arg Gly Met Ile Trp Leu Glu
            35                  40                  45

Pro Leu Leu Glu Val Glu Thr Pro Ala Gly Arg Ile Gly Phe Gly Pro
    50                  55                  60

Met Thr Pro Ala Asp Val Pro Ala Leu Phe Asp Ala Leu Glu Ser His
65                  70                  75                  80

Pro Lys Ala Leu Gly Leu Val Glu Glu Ile Pro Phe Phe Lys Arg Gln
                85                  90                  95

Thr Arg Leu Thr Phe Ala Arg Cys Gly Arg Ile Glu Pro Leu Ser Leu
            100                 105                 110

Ala Gln Phe Ala Ala Thr Glu Gly Trp Ala Gly Leu Arg Lys Ala Leu
    115                 120                 125

Lys Met Thr Pro Ala Glu Val Val Glu Glu Val Phe Ala Ser Gly Leu
130                 135                 140

Arg Gly Arg Gly Gly Ala Gly Phe Pro Thr Gly Ile Lys Trp Arg Thr
145                 150                 155                 160

Val Ala Ala Ala Gln Ala Asp Gln Lys Tyr Ile Val Cys Asn Val Asp
                165                 170                 175

Glu Gly Asp Ser Gly Ser Phe Ala Asp Arg Met Leu Ile Glu Gly Asp
            180                 185                 190

Pro Phe Cys Leu Val Glu Gly Met Ala Ile Ala Gly His Ala Val Gly
    195                 200                 205

Ala Thr Arg Gly Tyr Val Tyr Ile Arg Ser Glu Tyr Pro Asp Ala Ile
210                 215                 220

Ala Val Met Arg Ala Ala Ile Ala Met Ala Lys Pro Phe Leu Ala Glu
225                 230                 235                 240

Ala Gly Phe Glu Met Glu Val Arg Val Gly Ala Gly Ala Tyr Val Cys
                245                 250                 255

Gly Glu Glu Thr Ser Leu Leu Asn Ser Leu Glu Gly Lys Arg Gly Thr
            260                 265                 270

Val Arg Ala Lys Pro Pro Leu Pro Ala Leu Lys Gly Leu Phe Gly Lys
    275                 280                 285

Pro Thr Val Val Asn Asn Leu Leu Ser Leu Ala Ala Val Pro Trp Ile
290                 295                 300

Ile Ala His Gly Ala Lys Ala Tyr Glu Ser Phe Gly Met Asp Arg Ser

```
            305                 310                 315                 320
Arg Gly Thr Ile Pro Leu Gln Ile Gly Gly Asn Val Lys Arg Gly Gly
                    325                 330                 335

Leu Phe Glu Thr Gly Phe Gly Ile Thr Leu Gly Glu Leu Val Glu Asp
                340                 345                 350

Ile Cys Gly Gly Thr Ala Ser Gly Arg Pro Val Lys Ala Val Gln Val
                355                 360                 365

Gly Gly Pro Leu Gly Ala Tyr His Pro Val Ser Asp Tyr His Leu Pro
            370                 375                 380

Phe Cys Tyr Glu Gln Phe Ala Gly Gln Gly Gly Leu Val Gly His Ala
385                 390                 395                 400

Gly Leu Val Val His Asp Asp Arg Ala Asp Met Leu Lys Leu Ala Arg
                    405                 410                 415

Phe Ala Met Glu Phe Cys Ala Ile Glu Ser Cys Gly Thr Cys Thr Pro
                420                 425                 430

Cys Arg Ile Gly Ala Val Arg Gly Val Glu Val Ile Asp Arg Ile Ala
                435                 440                 445

Ala Gly Asp Ala Ser Ala Met Pro Leu Leu Asp Asp Leu Cys Gln Thr
            450                 455                 460

Met Lys Leu Gly Ser Leu Cys Ala Leu Gly Gly Phe Thr Pro Tyr Pro
465                 470                 475                 480

Val Gln Ser Ala Ile Arg His Phe Pro Ala Asp Phe Pro Cys Ala Arg
                    485                 490                 495

Glu Ala Ala Glu
            500

<210> SEQ ID NO 9
<211> LENGTH: 150
<212> TYPE: PRT
<213> ORGANISM: Rhodobacter capsulatus

<400> SEQUENCE: 9

Met Thr Asp Thr Ala Arg Leu Arg Ala Ile Leu Ala Ala His Arg Gly
1               5                   10                  15

Arg Glu Gly Ala Leu Leu Pro Ile Leu His Asp Val Gln Ala Ala Phe
            20                  25                  30

Gly Phe Ile Pro Glu Asp Ala Tyr Ala Pro Ile Ala Ala Asp Leu Gly
        35                  40                  45

Leu Thr Arg Ala Glu Val Ala Gly Val Val Gly Phe Tyr His Asp Phe
    50                  55                  60

Arg Lys Ala Pro Ala Gly Arg His Val Ile Lys Leu Cys Arg Ala Glu
65                  70                  75                  80

Ala Cys Gln Ala Met Gly Met Asp Ala Val Gln Ala Arg Leu Glu Ser
                85                  90                  95

Ala Leu Gly Leu Arg Leu Gly Asp Ser Ser Glu Ala Val Thr Leu Glu
            100                 105                 110

Ala Val Tyr Cys Leu Gly Leu Cys Ala Cys Ala Pro Ala Ala Met Val
        115                 120                 125

Asp Asp Arg Leu Val Gly Arg Leu Asp Ala Ala Val Ala Gly Ile
    130                 135                 140

Val Ala Glu Leu Gly Ala
145                 150

<210> SEQ ID NO 10
<211> LENGTH: 292
```

```
<212> TYPE: PRT
<213> ORGANISM: Pyrococcus furiosus

<400> SEQUENCE: 10

Met Met Leu Pro Lys Glu Ile Met Pro Asn Asp Asn Pro Tyr Ala
1               5                   10                  15

Leu His Arg Val Lys Val Leu Lys Val Tyr Ser Leu Thr Glu Thr
                20                  25                  30

Lys Leu Phe Leu Phe Arg Phe Glu Asp Pro Glu Leu Ala Glu Lys Trp
            35                  40                  45

Thr Phe Lys Pro Gly Gln Phe Val Gln Leu Thr Ile Pro Gly Val Gly
            50                  55                  60

Glu Val Pro Ile Ser Ile Cys Ser Ser Pro Met Arg Lys Gly Phe Phe
65                  70                  75                  80

Glu Leu Cys Ile Arg Lys Ala Gly Arg Val Thr Thr Val His Arg
                85                  90                  95

Leu Lys Pro Gly Asp Thr Val Leu Val Arg Gly Pro Tyr Gly Asn Gly
                100                 105                 110

Phe Pro Val Asp Glu Trp Glu Gly Met Asp Leu Leu Ile Ala Ala
                115                 120                 125

Gly Leu Gly Thr Ala Pro Leu Arg Ser Val Phe Leu Tyr Ala Met Asp
        130                 135                 140

Asn Arg Trp Lys Tyr Gly Asn Ile Thr Phe Ile Asn Thr Ala Arg Tyr
145                 150                 155                 160

Gly Lys Asp Leu Leu Phe Tyr Lys Glu Leu Glu Ala Met Lys Asp Leu
                165                 170                 175

Ala Glu Ala Glu Asn Val Lys Ile Ile Gln Ser Val Thr Arg Asp Pro
                180                 185                 190

Asn Trp Pro Gly Leu Lys Gly Arg Pro Gln Gln Phe Ile Val Glu Ala
                195                 200                 205

Asn Thr Asn Pro Lys Asn Thr Ala Val Ala Ile Cys Gly Pro Pro Arg
        210                 215                 220

Met Tyr Lys Ser Val Phe Glu Ala Leu Ile Asn Tyr Gly Tyr Arg Pro
225                 230                 235                 240

Glu Asn Ile Phe Val Thr Leu Glu Arg Arg Met Lys Cys Gly Ile Gly
                245                 250                 255

Lys Cys Gly His Cys Asn Val Gly Thr Ser Thr Ser Trp Lys Tyr Ile
                260                 265                 270

Cys Lys Asp Gly Pro Val Phe Thr Tyr Phe Asp Ile Val Ser Thr Pro
        275                 280                 285

Gly Leu Leu Asp
        290

<210> SEQ ID NO 11
<211> LENGTH: 367
<212> TYPE: PRT
<213> ORGANISM: Pyrococcus furiosus

<400> SEQUENCE: 11

Met Arg Tyr Val Lys Leu Pro Lys Glu Asn Thr Tyr Glu Phe Leu Glu
1               5                   10                  15

Arg Leu Lys Asp Trp Gly Lys Leu Tyr Ala Pro Val Lys Ile Ser Asp
                20                  25                  30

Lys Phe Tyr Asp Phe Arg Glu Ile Asp Asp Val Arg Lys Ile Glu Phe
            35                  40                  45
```

-continued

```
His Tyr Asn Arg Thr Ile Met Pro Lys Lys Phe Phe Lys Pro
 50                  55                  60

Arg Glu Lys Leu Phe Glu Phe Asp Ile Ser Lys Pro Glu Tyr Arg Glu
 65                  70                  75                  80

Val Ile Glu Glu Val Glu Pro Phe Ile Ile Phe Gly Val His Ala Cys
                 85                  90                  95

Asp Ile Tyr Gly Leu Lys Ile Leu Asp Thr Val Tyr Leu Asp Glu Phe
            100                 105                 110

Pro Asp Lys Tyr Tyr Lys Val Arg Arg Glu Lys Gly Ile Ile Ile Gly
            115                 120                 125

Ile Ser Cys Met Pro Asp Glu Tyr Cys Phe Cys Asn Leu Arg Glu Thr
130                 135                 140

Asp Phe Ala Asp Asp Gly Phe Asp Leu Phe Phe His Glu Leu Pro Asp
145                 150                 155                 160

Gly Trp Leu Val Arg Val Gly Thr Pro Thr Gly His Arg Leu Val Asp
                165                 170                 175

Lys Asn Ile Lys Leu Phe Glu Glu Val Thr Asp Lys Asp Ile Cys Ala
            180                 185                 190

Phe Arg Asp Phe Glu Lys Arg Arg Gln Gln Ala Phe Lys Tyr His Glu
            195                 200                 205

Asp Trp Gly Asn Leu Arg Tyr Leu Leu Glu Leu Glu Met Glu His Pro
210                 215                 220

Met Trp Asp Glu Glu Ala Asp Lys Cys Leu Ala Cys Gly Ile Cys Asn
225                 230                 235                 240

Thr Thr Cys Pro Thr Cys Arg Cys Tyr Glu Val Gln Asp Ile Val Asn
                245                 250                 255

Leu Asp Gly Val Thr Gly Tyr Arg Glu Arg Arg Trp Asp Ser Cys Gln
            260                 265                 270

Phe Arg Ser His Gly Leu Val Ala Gly Gly His Asn Phe Arg Pro Thr
            275                 280                 285

Lys Lys Asp Arg Phe Arg Asn Arg Tyr Leu Cys Lys Asn Ala Tyr Asn
290                 295                 300

Glu Lys Leu Gly Leu Ser Tyr Cys Val Gly Cys Gly Arg Cys Thr Ala
305                 310                 315                 320

Phe Cys Pro Ala Asn Ile Ser Phe Val Gly Asn Leu Arg Arg Ile Leu
                325                 330                 335

Gly Leu Glu Glu Asn Lys Cys Pro Pro Thr Val Ser Glu Glu Ile Pro
            340                 345                 350

Lys Arg Gly Phe Ala Tyr Ser Ser Asn Ile Arg Gly Asp Gly Val
            355                 360                 365
```

<210> SEQ ID NO 12
<211> LENGTH: 288
<212> TYPE: PRT
<213> ORGANISM: Pyrococcus furiosus

<400> SEQUENCE: 12

```
Met Asn Pro Tyr Arg Ser Tyr Asp Ala Arg Ile Ile Glu Val Lys Glu
 1                   5                  10                  15

Leu Thr Ser Arg Glu Lys Leu Phe Ser Leu Lys Phe Leu Asp Asn Glu
                 20                  25                  30

Ile Glu Glu Asn Phe Thr Phe Lys Pro Gly Gln Phe Val Ile Val Asp
            35                  40                  45

Ile Arg Gly Phe Gly Glu Phe Pro Ile Ser Leu Cys Ser Ser Pro Thr
 50                  55                  60
```

```
Arg Arg Pro Ile Gln Leu Cys Ile Arg Arg Val Gly Arg Met Thr Lys
 65                  70                  75                  80

Phe Ile His Lys Met Asn Glu Gly Asp Ile Gly Ile Arg Gly Pro
                 85                  90                  95

Tyr Gly Asn Gly Phe Pro Met Asp Leu Met Glu Gly Ser Asn Leu Ile
            100                 105                 110

Leu Ile Ala Gly Gly Leu Gly Met Ala Pro Leu Arg Ser Val Leu Trp
            115                 120                 125

Tyr Ala Ile Asp Ser Gly Lys Tyr Glu Lys Ile Tyr Leu Phe Tyr Gly
            130                 135                 140

Thr Lys Ser Tyr Glu Asp Ile Leu Phe Arg Asp Glu Ile Ile His Leu
145                 150                 155                 160

Leu Lys His Gly Glu Lys Leu Asn Cys His Val Lys Leu Ala Tyr Glu
                165                 170                 175

Val Glu Thr Pro Ser Cys Ile Tyr Leu Glu Arg Gly Phe Ser Glu Lys
            180                 185                 190

Val Cys Lys Gly Val Val Thr Asp Leu Phe Arg Gly Glu Glu Phe Asp
            195                 200                 205

Val Glu Asn Ser Tyr Ala Leu Ile Cys Gly Pro Pro Val Met Tyr Lys
            210                 215                 220

Tyr Val Ile Arg Glu Leu Leu Asp Arg Gly Leu Ser Pro Gly Arg Ile
225                 230                 235                 240

Tyr Met Thr Leu Glu Arg Arg Met Arg Cys Gly Val Gly Lys Cys Gly
                245                 250                 255

His Cys Ile Val Gly Thr Ser Val Ser Ile Lys Tyr Ile Cys Lys Asp
            260                 265                 270

Gly Pro Val Phe Thr Tyr Trp Asp Ala Leu Ser Thr Arg Gly Leu Ile
            275                 280                 285

<210> SEQ ID NO 13
<211> LENGTH: 334
<212> TYPE: PRT
<213> ORGANISM: Pyrococcus furiosus

<400> SEQUENCE: 13

Met Arg Tyr Val Lys Leu His Ser Glu Tyr Phe Pro Glu Phe Phe Asn
  1               5                  10                  15

Arg Leu Lys Glu Val Gly Arg Val Tyr Gly Pro Val Arg His Asn Ser
                 20                  25                  30

Thr Tyr Arg Phe Glu Glu Val Asn Ser Ile Asp Glu Leu Ser Leu Asp
             35                  40                  45

Tyr Thr Arg Thr Ile Leu Pro Pro Lys Lys Phe Phe Ile Arg Pro Arg
         50                  55                  60

Asp Ala Met Phe Lys Ile Gln Lys Asn Glu Val Thr Glu Val Asp Gly
 65                  70                  75                  80

Asp Gly Lys Phe Val Leu Phe Gly Val His Ser Cys Asp Ile His Gly
                 85                  90                  95

Ile Lys Ile Leu Asp Lys Val Tyr Leu Ser Asn Pro Asp Pro Tyr
            100                 105                 110

Tyr Glu Arg Arg Arg Lys Asn Ala Phe Ile Val Gly Ile Ser Cys Met
            115                 120                 125

Pro Asp Glu Tyr Cys Phe Cys Lys Ser Leu Gly Thr Asp Phe Ala Met
            130                 135                 140

Asp Gly Phe Asp Ile Phe Leu His Glu Leu Pro Asp Gly Trp Leu Val
```

-continued

```
            145                 150                 155                 160
        Arg Val Gly Ser Val Lys Gly His Glu Phe Val Trp Glu Asn Gln Asp
                        165                 170                 175

Ile Phe Asp Asp Val Thr Glu Glu Asp Leu Arg Asn Phe Lys Glu Phe
                        180                 185                 190

Glu Glu Lys Arg Ala Lys Ala Phe Lys Lys Ser Leu Asn Lys Glu Gly
                        195                 200                 205

Leu Ala Asp Ile Leu Asp Leu Ala Phe Thr Ser Lys Val Trp Lys Lys
                        210                 215                 220

Tyr Ala Glu Lys Cys Leu Gly Cys Gly Asn Cys Thr Ile Val Cys Pro
        225                 230                 235                 240

Thr Cys Arg Cys Tyr Glu Val Cys Asp Thr Trp Val Arg Ala Tyr Glu
                        245                 250                 255

Ala Leu Arg Met Arg Arg Tyr Asp Ser Cys Phe Met Pro Thr His Gly
                        260                 265                 270

Leu Val Ala Gly Gly His Asn Phe Arg Pro Thr Arg Leu Asp Arg Phe
                        275                 280                 285

Arg His Arg Tyr Tyr Cys Lys Asn Tyr Phe Asp Pro Glu Ala Gly Phe
                        290                 295                 300

Asn Cys Val Gly Cys Gly Arg Cys Asp Glu Phe Cys Pro Ala Arg Ile
        305                 310                 315                 320

Glu His Val Lys Val Leu Asp Glu Val Arg Glu Gly Leu Ile
                        325                 330

<210> SEQ ID NO 14
<211> LENGTH: 604
<212> TYPE: PRT
<213> ORGANISM: Rhodococcus opacus

<400> SEQUENCE: 14

Met Ser Gly Asp Ile Lys Ala Ile Leu Glu Arg Asn Gly Ser Glu Arg
        1               5                   10                  15

Thr Arg Leu Ile Asp Ile Leu Trp Asp Val Gln His Leu Tyr Gly His
                        20                  25                  30

Ile Pro Asp Glu Val Leu Pro Gln Leu Ala Asp Glu Leu Asn Leu Ser
                        35                  40                  45

Pro Leu Asp Ile Leu Glu Thr Ala Ser Phe Tyr His Phe Phe His Arg
        50                  55                  60

Lys Pro Ser Gly Lys Tyr Arg Ile Tyr Leu Ser Asp Thr Val Ile Ala
        65                  70                  75                  80

Lys Met Asn Gly Tyr Gln Ala Val His Asp Ser Leu Glu Arg Glu Thr
                        85                  90                  95

Gly Ala Arg Phe Gly Gly Thr Lys Thr Gly Met Phe Gly Leu Phe
                        100                 105                 110

Glu Thr Pro Cys Ile Gly Leu Ser Asp Gln Glu Pro Ala Met Leu Ile
                        115                 120                 125

Asp Asn Val Val Phe Thr Arg Leu Arg Pro Gly Thr Ile Val Asp Ile
                        130                 135                 140

Ile Thr Gln Leu Arg Gln Gly Arg Ser Pro Glu Asp Ile Ala Asn Pro
        145                 150                 155                 160

Ala Gly Leu Pro Ser Asp Asp Val Ala Tyr Val Asp Gly Val Val Glu
                        165                 170                 175

Ser Asn Val Arg Thr Lys Gly Pro Val Phe Arg Gly Leu Thr Asp
                        180                 185                 190
```

```
Tyr Gly Arg Leu Leu Glu Leu Cys Leu Ala Leu Arg Pro Glu Gln Ile
            195                 200                 205

Ile Asp Arg Ile Ile Glu Ser Lys Leu Arg Gly Arg Gly Gly Ala Gly
210                 215                 220

Phe Ser Thr Gly Leu Lys Trp Gln Leu Cys Arg Thr Ala Val Ser Asp
225                 230                 235                 240

Asp Lys Tyr Ile Ile Cys Asn Ala Asp Glu Gly Glu Pro Gly Thr Phe
                245                 250                 255

Lys Asp Arg Val Leu Leu Thr Arg Ser Pro Lys Lys Val Phe Met Gly
            260                 265                 270

Met Ile Ile Ala Ala Arg Ala Ile Gly Ser Arg Asn Gly Ile Leu Tyr
        275                 280                 285

Leu Arg Trp Glu Tyr Ile Tyr Leu Lys Asp Tyr Leu Glu Arg Gln Leu
    290                 295                 300

Gln Glu Leu Arg Asp Glu Gly Leu Leu Gly Ala Arg Ile Gly Gly Gln
305                 310                 315                 320

Ser Gly Phe Asp Phe Asp Ile Arg Ile Gln Met Gly Ala Gly Ala Tyr
                325                 330                 335

Ile Cys Gly Asp Glu Ser Ala Leu Ile Glu Ser Cys Glu Gly Lys Arg
            340                 345                 350

Gly Thr Pro Arg Val Lys Pro Pro Phe Pro Val Gln Glu Gly Tyr Leu
        355                 360                 365

Gly Lys Pro Thr Cys Val Asn Asn Val Glu Thr Phe Ala Ala Ala Ala
    370                 375                 380

Arg Ile Met Glu Glu Gly Pro Asn Trp Phe Arg Ala Leu Gly Thr Pro
385                 390                 395                 400

Glu Ser Thr Gly Thr Arg Leu Leu Ser Val Ala Gly Asp Cys Ser Arg
                405                 410                 415

Pro Gly Ile Tyr Glu Val Glu Trp Gly Val Thr Leu Asn Glu Val Leu
            420                 425                 430

Thr Thr Val Gly Ala Arg Asp Ala Arg Ala Val Gln Ile Ser Gly Pro
        435                 440                 445

Ser Gly Gln Cys Val Ser Val Ala Glu Asp Gly Glu Arg Arg Met Ala
450                 455                 460

Tyr Glu Asp Ile Ser Cys Asn Gly Ala Phe Thr Ile Phe Asn Thr Glu
465                 470                 475                 480

Arg Asp Leu Leu Glu Ile Val Lys Asp Phe Met Gln Phe Phe Val Asp
                485                 490                 495

Glu Ser Cys Gly Ile Cys Val Pro Cys Arg Val Gly Asn Ile Asp Leu
            500                 505                 510

His Lys Lys Val Glu Leu Val Ile Ala Gly Lys Ala Cys Gln Lys Asp
        515                 520                 525

Leu Asp Asp Val Val Ser Trp Gly Ala Leu Val Lys Lys Thr Ser Arg
    530                 535                 540

Cys Gly Leu Gly Ala Thr Ser Pro Asn Pro Ile Leu Thr Thr Leu Asp
545                 550                 555                 560

Lys Phe Pro Glu Ile Tyr Thr Lys Arg Leu Arg Lys Gln Lys Lys Glu
                565                 570                 575

Ala Leu Leu Leu Ser Phe Asp Leu Asp Ala Ala Leu Gly Gly Tyr Glu
            580                 585                 590

Lys Ala Leu Glu Gly Leu Ala Lys Glu Glu Ile Lys
        595                 600
```

<210> SEQ ID NO 15
<211> LENGTH: 234
<212> TYPE: PRT
<213> ORGANISM: Rhodococcus opacus

<400> SEQUENCE: 15

Met Ser Ile Glu Ile Glu Ile Asp Gly Val Thr Val Thr Thr Glu Glu
1               5                   10                  15

Ser Arg Thr Leu Val Asp Val Ala Ala Glu Ala Gly Val Tyr Ile Pro
            20                  25                  30

Thr Leu Cys Tyr Leu Lys Gly Lys Pro Ser Leu Gly Thr Cys Arg Val
        35                  40                  45

Cys Ser Val Lys Leu Asn Gly Thr Val Ala Ala Cys Thr Ile Arg
    50                  55                  60

Val Ala Asn Gly Met Lys Ile Glu Val Asp Glu Pro Glu Val Val Asp
65                  70                  75                  80

Met Arg Lys Ala Asn Val Glu Leu Leu Phe Ala Glu Gly Asn His Asn
                85                  90                  95

Cys Pro Ser Cys Glu Lys Ser Gly Arg Cys Lys Leu Gln Ala Val Gly
            100                 105                 110

Tyr Glu Val Asp Met Met Val Ser Arg Phe Gln Tyr Arg Phe Pro Glu
        115                 120                 125

Arg Val Gln Asp His Ala Ser Glu Thr Ile Trp Leu Glu Arg Asp Arg
130                 135                 140

Cys Ile Phe Cys Gln Arg Cys Val Glu Phe Val Arg Asp Lys Ala Thr
145                 150                 155                 160

Gly Lys Lys Ile Phe Ser Ile Ser Asn Arg Gly Gly Asp Ser Arg Ile
                165                 170                 175

Glu Ile Asp Ala Asp Leu Ala Asn Ala Met Pro Pro Glu Gln Val Arg
            180                 185                 190

Glu Ala Val Ala Ile Cys Pro Val Gly Thr Ile Ile Glu Lys Arg Val
        195                 200                 205

Gly Tyr Asp Asp Pro Ile Gly Arg Arg Lys Tyr Glu Ile Glu Thr Val
210                 215                 220

Arg Ala Arg Ala Leu Gly Gly Glu Glu Glu
225                 230

<210> SEQ ID NO 16
<211> LENGTH: 538
<212> TYPE: PRT
<213> ORGANISM: Allochromatium vinosum

<400> SEQUENCE: 16

Met His Leu Glu Asp Leu Ala Glu Gln Ala Gln Tyr Arg Asn Glu
1               5                   10                  15

Asp Ala His Ile Glu Arg Glu Val Arg Val Cys Val Ala Ala Ser Cys
            20                  25                  30

Gln Ser Ala Ala Ala Val Pro Val Leu Glu Ala Leu Lys Ser Ala Cys
        35                  40                  45

Asp Thr Gln Gly Ala Gly Ser Cys Lys Val Lys Gly Val Gly Cys Met
    50                  55                  60

Gly Leu Cys Ser Ala Gly Pro Leu Val Ala Val Ala Asp Lys Asp Cys
65                  70                  75                  80

Ala Leu Asn Glu Ser Ala Leu Tyr Arg Asp Val Thr Pro Asp Asp Ala
                85                  90                  95

Pro Asp Ile Met Ala Ser Val Cys Ser Thr Pro Val Glu Arg Leu Arg

```
            100                 105                 110
Cys Pro Thr Asp Gln Pro Phe Phe Ser Arg Gln Gln Arg Ile Val Leu
            115                 120                 125

Glu His Ser Gly Leu Ile Asp Pro Asp Ser Leu Arg Gly Tyr Ile Ala
            130                 135                 140

Val Gly Gly Tyr Ala Ala Leu Val Arg Ala Leu Thr Glu Met Thr Pro
145                 150                 155                 160

Ala Asp Val Leu Arg Glu Val Thr Thr Ser Gly Leu Arg Gly Arg Gly
                165                 170                 175

Gly Gly Gly Tyr Pro Thr Gly Leu Lys Trp Ser Thr Ile Ala Lys Met
                180                 185                 190

Pro Pro Gly Gln Lys Tyr Val Cys Asn Ala Asp Glu Gly Asp Pro
            195                 200                 205

Gly Ala Phe Met Asp Arg Ala Val Leu Glu Ser Asp Pro His Arg Val
            210                 215                 220

Leu Glu Gly Met Ala Ile Ala Ala Tyr Ala Val Gly Ala Ser Lys Gly
225                 230                 235                 240

Tyr Val Tyr Val Arg Ala Glu Tyr Pro Leu Ala Val Glu Arg Leu Glu
                245                 250                 255

Thr Ala Ile Arg Lys Ala Lys Arg Ala Gly Phe Leu Gly Ala Lys Val
                260                 265                 270

Ala Asp Thr Gln Phe Ala Phe Glu Val Glu Ile Arg Leu Gly Ala Gly
            275                 280                 285

Ala Phe Val Cys Gly Glu Glu Thr Ala Leu Met Ala Ser Ile Glu Gly
            290                 295                 300

Leu Arg Gly Gln Pro Arg Pro Arg Pro Tyr Pro Ala Glu Ser Gly
305                 310                 315                 320

Leu Trp Gly Cys Pro Thr Leu Ile Asn Asn Val Glu Thr Phe Ala Asn
                325                 330                 335

Ile Ala Pro Ile Ile Arg Glu Gly Gly Asp Trp Phe Ala Ala Ile Gly
            340                 345                 350

Thr Glu Gly Ser Lys Gly Thr Lys Val Phe Ala Leu Ala Gly Lys Ile
            355                 360                 365

Lys Asn Thr Gly Leu Ile Glu Val Pro Met Gly Thr Ser Leu Arg Asp
370                 375                 380

Ile Ile Glu Val Ile Gly Gly Gly Ile Pro Asp Gly Arg Ala Phe Lys
385                 390                 395                 400

Ala Val Gln Thr Gly Gly Pro Ser Gly Gly Cys Ile Pro Arg Arg His
                405                 410                 415

Leu Asp Ile Pro Val Asp Tyr Asp Ser Leu Lys Thr Leu Gly Thr Ile
            420                 425                 430

Met Gly Ser Gly Gly Leu Ile Val Met Asp Glu Thr Ser Cys Met Val
            435                 440                 445

Asp Val Ala Arg Phe Met Glu Phe Cys Met Ser Glu Ser Cys Gly Lys
            450                 455                 460

Cys Ile Pro Cys Arg Ala Gly Thr Trp Gln Met His Ala Leu Leu Asp
465                 470                 475                 480

Thr Leu Thr Lys Ala Glu Gly Thr Arg Ala Asp Leu Ala Leu Leu Glu
                485                 490                 495

Asp Leu Cys Asp Val Val Arg Ala Thr Ser Leu Cys Gly Leu Gly Gln
            500                 505                 510

Thr Ala Pro Asn Pro Val Leu Ser Thr Leu Arg Tyr Phe Arg Asp Glu
            515                 520                 525
```

Tyr Glu Ala Lys Leu Gly Trp Glu Thr Ala
            530                 535

<210> SEQ ID NO 17
<211> LENGTH: 243
<212> TYPE: PRT
<213> ORGANISM: Allochromatium vinosum

<400> SEQUENCE: 17

Met Pro Leu Pro Thr Pro Gln Pro Asn Val Arg Val Thr Leu Arg
1               5                   10                  15

Ile Asp Asp Arg Asp Leu Ser Ala Arg Glu Asp Glu Thr Leu Ile Glu
            20                  25                  30

Val Cys Arg Glu Asn Arg Ile Pro Ile Pro Ser Leu Cys His Leu Asp
            35                  40                  45

Gly Leu Ser Val Trp Gly Gly Cys Arg Leu Cys Met Val Glu Ile Ala
        50                  55                  60

Gly Gln Gly Arg Leu Val Ala Ala Cys Ser Thr Arg Val Ala Glu Gly
65                  70                  75                  80

Met Thr Val Gln Thr Asp Thr Glu Arg Leu Arg His Tyr Arg Arg Thr
            85                  90                  95

Ile Val Glu Leu Leu Phe Ala Glu Arg Asn His Val Cys Ser Val Cys
            100                 105                 110

Val Ser Asn Gly His Cys Glu Leu Gln Ser Leu Ala Gln Arg Cys Gly
            115                 120                 125

Val Asp His Val Arg Leu Pro Tyr Arg Gln Ala Pro Tyr Pro Val Asp
            130                 135                 140

Ser Ser His Glu Met Phe Arg Leu Asp His Asn Arg Cys Ile Leu Cys
145                 150                 155                 160

Thr Arg Cys Val Arg Val Cys Asp Glu Ile Glu Gly Ala His Thr Trp
                165                 170                 175

Asp Val Met Gly Arg Gly Ser Asp Cys Arg Val Ile Thr Asp Met Ala
            180                 185                 190

Arg Pro Trp Gly Glu Ser Glu Thr Cys Thr Ser Cys Gly Lys Cys Val
            195                 200                 205

Gln Val Cys Pro Thr Gly Ala Leu Val Lys Gln Gly Thr Ser Ala Gly
            210                 215                 220

Glu Met Val Lys Asp Gln His Phe Leu Pro Ile Leu Ala Arg Arg Arg
225                 230                 235                 240

His Ala Arg

<210> SEQ ID NO 18
<211> LENGTH: 536
<212> TYPE: PRT
<213> ORGANISM: Thiocapsa roseopersicina

<400> SEQUENCE: 18

Met Asn Leu Asp Asp Leu Thr Asp Leu Ala Glu Lys Tyr Arg Glu Ala
1               5                   10                  15

Glu Ala Gly Val Asp Arg Glu Val Arg Val Cys Leu Ala Ala Ser Cys
            20                  25                  30

Gln Ser Ser Gly Ala Val Pro Val Phe Asp Ala Leu Val Ala Glu Leu
            35                  40                  45

Gly Asp Thr Lys Pro Ser Cys Lys Val Lys Gly Val Gly Cys Met Gly
        50                  55                  60

-continued

Leu Cys Ser Ala Gly Pro Leu Val Ala Val Ala Asp Arg Glu Ala Asp
 65                  70                  75                  80

Leu Gln Gly Ser Val Leu Tyr Arg Asp Val Thr Ala Asp Asp Ala Glu
                 85                  90                  95

Asp Ile Val Ala Ser Ile Asp Gly Pro Pro Val Glu Arg Leu Arg Cys
                100                 105                 110

Pro Thr Asn Gln Pro Phe Phe Ala Arg Gln Gln Lys Ile Val Leu Glu
                115                 120                 125

Asn Ala Gly Ile Ile Asp Pro Asp Ser Phe Lys Gly Tyr Val Ala Val
            130                 135                 140

Gly Gly Tyr Ser Ala Leu Ile Arg Ala Leu Ser Glu Met Thr Pro Ala
145                 150                 155                 160

Asp Val Leu Arg Glu Val Thr Asp Ser Gly Leu Arg Gly Arg Gly Gly
                165                 170                 175

Gly Gly Tyr Pro Thr Gly Leu Lys Trp Ser Thr Val Ala Lys Met Pro
                180                 185                 190

Ala Thr Gln Lys Tyr Val Ile Cys Asn Ala Asp Glu Gly Asp Pro Gly
                195                 200                 205

Ala Phe Met Asp Arg Ala Ile Leu Glu Ser Asp Pro His Arg Val Leu
            210                 215                 220

Glu Gly Met Ala Ile Ala Ala Tyr Ala Ile Gly Ala Asn Lys Ala Tyr
225                 230                 235                 240

Val Tyr Val Arg Ala Glu Tyr Pro Leu Ala Val Glu Arg Leu Gln Thr
                245                 250                 255

Ala Ile Arg Lys Ala Lys Arg Ser Gly Leu Leu Gly Asn Lys Ile Gly
                260                 265                 270

Asp Thr Gln Phe Ser Leu Glu Val Glu Ile Arg Leu Gly Ala Gly Ala
            275                 280                 285

Phe Val Cys Gly Glu Glu Thr Ala Leu Met Ala Ser Ile Glu Gly Leu
            290                 295                 300

Arg Gly Gln Pro Arg Pro Arg Pro Tyr Pro Ala Glu Ala Gly Leu
305                 310                 315                 320

Trp Gly Tyr Pro Thr Leu Ile Asn Asn Val Glu Thr Phe Ala Asn Ile
                325                 330                 335

Ala Pro Ile Val Arg Glu Gly Gly Asp Trp Phe Ala Ser Ile Gly Thr
                340                 345                 350

Glu Arg Ser Lys Gly Thr Lys Val Phe Ala Leu Ala Gly Thr Ile Thr
            355                 360                 365

Asn Thr Gly Leu Ile Glu Val Pro Met Gly Thr Ser Leu Arg Asp Ile
            370                 375                 380

Ile Glu Val Ile Gly Gly Gly Ile Pro Gly Gly Lys Ala Phe Lys Ala
385                 390                 395                 400

Val Gln Thr Gly Gly Pro Ser Gly Gly Cys Ile Pro Ala Gln His Leu
                405                 410                 415

Asp Ile Ala Val Asp Tyr Asp Ser Leu Lys Thr Leu Gly Thr Met Met
            420                 425                 430

Gly Ser Gly Gly Met Ile Val Met Asp Glu Thr Ser Ser Met Val Asp
            435                 440                 445

Val Ala Arg Tyr Phe Met Glu Phe Cys Met Thr Glu Ser Cys Gly Lys
            450                 455                 460

Cys Ile Pro Cys Arg Thr Gly Thr Gln Gln Met His Ser Ile Leu Asp
465                 470                 475                 480

Arg Leu Ala Lys Ser Gln Ala Thr Arg Ala Glu Leu Thr Leu Leu Glu

```
                    485                 490                 495
Glu Leu Cys Glu Val Val Gln Ala Thr Ser Leu Cys Gly Leu Gly Gln
                500                 505                 510

Thr Ala Pro Asn Pro Val Leu Ser Thr Met Arg Tyr Phe Arg Asp Glu
            515                 520                 525

Tyr Glu Ala Lys Leu Gly Glu Val
        530                 535

<210> SEQ ID NO 19
<211> LENGTH: 243
<212> TYPE: PRT
<213> ORGANISM: Thiocapsa roseopersicina

<400> SEQUENCE: 19

Met Pro Leu Pro Ala Lys Gln Pro Asn Val Arg Val Val Thr Leu Asn
1               5                   10                  15

Ile Asp Gly Arg Asp Leu Ser Ala Arg Glu Asp Glu Thr Ile Ile Glu
            20                  25                  30

Val Cys Arg Glu Asn Gln Ile Pro Ile Pro Ser Leu Cys Tyr Leu Glu
        35                  40                  45

Gly Leu Ser Val Trp Gly Ala Cys Arg Leu Cys Leu Val Glu Leu Ser
    50                  55                  60

Gly Gln Gly Arg Leu Leu Ala Ala Cys Ser Thr Arg Val Thr Glu Gly
65                  70                  75                  80

Met Gln Ile Gln Thr Asn Thr Glu Lys Leu Gln Arg Tyr Arg Arg Thr
                85                  90                  95

Ile Val Glu Leu Leu Phe Ala Glu Arg Asn His Val Cys Ser Val Cys
            100                 105                 110

Val Ser Asn Gly His Cys Glu Leu Gln His Met Ala Gln Lys Cys Gly
        115                 120                 125

Val Asp His Val Arg Val Pro Tyr Arg Gln Ala Ser Tyr Pro Val Asp
    130                 135                 140

Ser Ser His Glu Met Phe Arg Leu Asp His Asp Arg Cys Ile Leu Cys
145                 150                 155                 160

Thr Arg Cys Val Arg Val Cys Asp Glu Ile Glu Gly Ala His Thr Trp
                165                 170                 175

Asp Val Met Gly Arg Gly Ser Asp Cys Arg Val Ile Thr Asp Met Ala
            180                 185                 190

Gln Pro Trp Gly Glu Ser Asp Thr Cys Thr Ser Cys Gly Lys Cys Val
        195                 200                 205

Gln Val Cys Pro Thr Gly Ala Leu Val Lys Gln Gly Thr Ser Val Gly
    210                 215                 220

Glu Met Val Lys Asp Gln His Phe Leu Pro Ile Leu Ala Arg Arg Arg
225                 230                 235                 240

His Ser Gln

<210> SEQ ID NO 20
<211> LENGTH: 610
<212> TYPE: PRT
<213> ORGANISM: Thiocapsa roseopersicina

<400> SEQUENCE: 20

Met Asn Ala Ser Ala Thr Val Thr Val Glu Gly Phe Val Ala Glu Ser
1               5                   10                  15

Leu Ala Thr His Gly Arg Asp Pro Arg His Leu Leu Gln His Leu Ile
            20                  25                  30
```

```
Arg Val Gln Gln Arg Phe Ser Tyr Val Pro Asp Ala Ala Val Glu Ala
            35                  40                  45

Leu Ser Val Ala Leu Asp Val Thr Arg Thr Gln Val Arg Ala Ala Ile
        50                  55                  60

Ala Phe Tyr Ala Phe Leu His Asp Arg Pro Arg Gly Ala Phe Glu Ile
65                  70                  75                  80

Arg Phe Ser Asp Asn Ile Thr Asp Arg Met Leu Gly Ser Arg Arg Leu
                85                  90                  95

Ile Arg Leu Leu Ile Glu Arg Leu Gly Leu Thr Gly Leu Pro Ala Trp
            100                 105                 110

Gly Arg Asp Leu Val Arg Pro Asp Gly Arg Ala Ser Val Gly Leu Ala
            115                 120                 125

Ser Cys Thr Gly Met Cys Asp Gln Gly Pro Ala Leu Leu Val Asn Gly
            130                 135                 140

Gln Ala Val Thr Asn Leu Asp Ala Gln Arg Val Asp Arg Ile Ala Asp
145                 150                 155                 160

Leu Val Gln Glu Gly Ile Pro Leu Glu Arg Trp Pro Gly Glu Phe Phe
                165                 170                 175

Arg Val Glu Asn Asn Ile Arg Arg Gly Leu Leu Leu Gly Asn Pro
            180                 185                 190

Ala Thr Asp Gly Ala Ala Val Arg Arg Leu Leu Asp Ala Gly Ala Glu
            195                 200                 205

Ala Ala Leu Ala Glu Val Glu Arg Ser Gly Leu Arg Gly Arg Gly Gly
            210                 215                 220

Ala Gly Phe Thr Thr Ala Leu Lys Trp Arg Phe Cys Arg Glu Ala Pro
225                 230                 235                 240

Gly Thr Asp Arg Tyr Val Val Cys Asn Ala Asp Glu Gly Glu Pro Gly
                245                 250                 255

Thr Phe Lys Asp Arg Val Leu Leu Thr Asp Tyr Thr Asp Leu Val Ile
                260                 265                 270

Glu Gly Met Thr Val Cys Ala Gly Val Ile Gly Ala Arg Arg Gly Phe
            275                 280                 285

Leu Tyr Leu Arg Gly Glu Tyr Arg Tyr Leu Leu Pro His Leu Glu Ser
            290                 295                 300

Val Leu Gln Arg Arg Arg Ala Glu Gly Leu Leu Gly Thr Arg Ile Leu
305                 310                 315                 320

Gly Ala Asp Gly Phe Asp Phe Asp Ile Glu Ile His Leu Gly Ala Gly
                325                 330                 335

Ala Tyr Ile Cys Gly Glu Glu Ser Ala Leu Ile Glu Ser Leu Glu Gly
                340                 345                 350

Lys Arg Gly Val Thr Arg Lys Arg Pro Pro Phe Pro Val Thr Ser Gly
            355                 360                 365

Phe Asp Asp Gln Pro Thr Val Val Asn Asn Val Glu Thr Phe Leu Ala
            370                 375                 380

Ala Ala Arg Val Val Gln Trp Gly Gly Tyr Trp Leu Arg Gly Glu Gly
385                 390                 395                 400

Thr Asp Gln Ser Ala Gly Ser Lys Ile Leu Ser Val Ser Gly Asp Cys
                405                 410                 415

Ala Arg Pro Gly Ile Tyr Glu Tyr Pro Phe Gly Thr Pro Val His Gln
            420                 425                 430

Val Leu Ser Asp Cys Gly Ala Glu Asn Thr Gln Ala Val Gln Ile Ser
            435                 440                 445
```

```
Gly Ala Ala Gly Ala Thr Leu Ser Pro Ala Asp Phe Asp Arg Ile Ile
            450                 455                 460

Ala Phe Glu Asp Leu Pro Thr Ala Gly Ser Phe Met Ile Phe Asp His
465                 470                 475                 480

Ser Arg Asp Leu Leu Asp Met Val Arg Asn Phe Ala Ala Phe Ala
                485                 490                 495

His Glu Ser Cys Gly Phe Cys Thr Pro Cys Arg Val Gly Gly Ala Leu
                500                 505                 510

Leu Arg Asn Leu Val Glu Lys Val Ala Ala Gly Gln Gly Ser Glu Tyr
                515                 520                 525

Asp Leu Ser Glu Met Arg Arg Ile Gly Thr Val Met Arg Arg Ala Ser
530                 535                 540

Tyr Cys Gly Leu Gly His Thr Ala Pro Asn His Val Val Asn Thr Leu
545                 550                 555                 560

Asp Lys Phe Pro Leu Ile Tyr Gly Arg Arg Leu Ala Arg Ala Ser His
                565                 570                 575

Thr Pro Ser Phe Asp Leu Asp Ala Ala Leu Ser Gln Ala Arg Ala Leu
                580                 585                 590

Thr Gly Arg Asp Asp Ile Gly Ala His Ile Gly Asp Gly Ser Glu Val
                595                 600                 605

Ser Ala
    610

<210> SEQ ID NO 21
<211> LENGTH: 239
<212> TYPE: PRT
<213> ORGANISM: Thiocapsa roseopersicina

<400> SEQUENCE: 21

Met Ser Lys Thr Phe Lys Leu Asp Gly Arg Glu Ile Pro Phe Glu Thr
1               5                   10                  15

Gly Gln Thr Ile Met Asp Ala Ala Leu Ala Ala Gly Val Tyr Ile Pro
                20                  25                  30

His Leu Cys His Asn Pro Glu Phe Ala Pro His Gly Ser Cys Arg Val
                35                  40                  45

Cys Val Val Asp Ile Gly Gly Arg Gln Val Ser Ala Cys Thr Ala Ala
            50                  55                  60

Ala Ser Glu Gly Leu Glu Val Asp Asn Ser Ser Glu Ala Ile Gln Glu
65                  70                  75                  80

Thr Arg Arg Ala Ile Leu Gln Met Leu Phe Val Glu Gly Asn His Val
                85                  90                  95

Cys Pro Ala Cys Glu Lys Ser Gly Ala Cys Gln Leu Gln Ala Val Ala
                100                 105                 110

Tyr Tyr Thr Gly Met Leu Ala Pro His Phe Thr His Phe Phe Pro Arg
                115                 120                 125

Arg Ser Val Asp Ala Ser His Pro Asp Val Val Ile Asp Phe Asn Arg
                130                 135                 140

Cys Ile Leu Cys Glu Leu Cys Val Arg Ala Ser Arg Asp His Asp Gly
145                 150                 155                 160

Lys Arg Val Phe Ala Ile Ser Gly Arg Gly Leu Glu Ser His Leu Val
                165                 170                 175

Ile Asp Ser His Ser Gly Leu Leu Gly Asp Ser Ser Phe Ala Ala Thr
                180                 185                 190

Asp Lys Ala Ala His Val Cys Pro Thr Gly Ala Ile Leu Pro Lys Gly
                195                 200                 205
```

```
Arg Gly Tyr Glu Thr Pro Ile Gly Glu Arg Leu Tyr Asp Arg Glu Pro
            210                 215                 220

Ile Ser Ile Val Gly Asp Val Arg Ala His Glu Glu Val Val
225                 230                 235

<210> SEQ ID NO 22
<211> LENGTH: 533
<212> TYPE: PRT
<213> ORGANISM: Synechocystis PCC6803

<400> SEQUENCE: 22

Met Asp Ile Lys Glu Leu Lys Glu Ile Ala Thr Lys Ser Arg Glu Lys
1               5                   10                  15

Gln Thr Lys Ile Arg Ile Arg Cys Cys Ser Ala Ala Gly Cys Leu Ser
            20                  25                  30

Ser Glu Gly Glu Thr Val Lys Lys Asn Leu Thr Thr Ala Ile Ala Ala
        35                  40                  45

Ala Gly Leu Glu Glu Lys Val Glu Val Cys Gly Val Gly Cys Met Lys
50                  55                  60

Phe Cys Gly Arg Gly Pro Leu Val Ala Val Asp Asp Arg Asn Gln Leu
65                  70                  75                  80

Tyr Glu Phe Val Thr Pro Asp Gln Val Gly Asp Ile Val Lys Lys Leu
                85                  90                  95

Gln Lys Pro Asp Ala Val Ala Glu Thr Gly Leu Ile Ser Gly Asp Pro
            100                 105                 110

His His Pro Phe Tyr Ala Leu Gln Arg Asn Ile Ala Leu Glu Asn Ser
        115                 120                 125

Gly Arg Ile Asp Pro Glu Ser Ile Asp Glu Tyr Ile Ala Leu Gly Gly
130                 135                 140

Tyr Glu Gln Leu His Lys Val Val Tyr Glu Met Thr Pro Glu Glu Val
145                 150                 155                 160

Ile Val Glu Met Asn Lys Ser Gly Leu Arg Gly Arg Gly Gly Gly
                165                 170                 175

Tyr Pro Thr Gly Leu Lys Trp Ala Thr Val Ala Lys Met Pro Gly Gln
            180                 185                 190

Gln Lys Tyr Val Ile Cys Asn Ala Asp Glu Gly Asp Pro Gly Ala Phe
        195                 200                 205

Met Asp Arg Ser Val Leu Glu Ser Asp Pro His Arg Ile Leu Glu Gly
210                 215                 220

Met Ala Ile Ala Ala Tyr Ala Val Gly Ala Asn His Gly Tyr Ile Tyr
225                 230                 235                 240

Val Arg Ala Glu Tyr Pro Leu Ala Ile Gln Arg Leu Gln Lys Ala Ile
                245                 250                 255

Gln Gln Ala Lys Arg Tyr Gly Leu Met Gly Thr Gln Ile Phe Asp Ser
            260                 265                 270

Pro Ile Asp Phe Lys Ile Asp Ile Arg Val Gly Ala Gly Ala Phe Val
        275                 280                 285

Cys Gly Glu Glu Thr Ala Leu Ile Ala Ser Val Glu Gly Lys Arg Gly
290                 295                 300

Thr Pro Arg Pro Arg Pro Pro Tyr Pro Ala Gln Ser Gly Leu Trp Gln
305                 310                 315                 320

Ser Pro Thr Leu Ile Asn Asn Val Glu Thr Tyr Ala Asn Val Val Pro
                325                 330                 335

Ile Ile Arg Glu Gly Gly Asp Trp Tyr Gly Ser Ile Gly Thr Glu Lys
```

-continued

```
                340                 345                 350
Ser Lys Gly Thr Lys Val Phe Ala Leu Thr Gly Lys Val Glu Asn Ala
            355                 360                 365

Gly Leu Ile Glu Val Pro Met Gly Thr Thr Val Arg Gln Val Val Glu
        370                 375                 380

Glu Met Gly Gly Val Pro Asn Gly Gly Gln Val Lys Ala Val Gln
385                 390                 395                 400

Thr Gly Gly Pro Ser Gly Gly Cys Ile Pro Ala Asp Lys Leu Asp Thr
                405                 410                 415

Pro Ile Glu Tyr Asp Thr Leu Leu Ala Leu Gly Thr Met Met Gly Ser
            420                 425                 430

Gly Gly Met Ile Val Met Asp Glu Ser Thr Asn Met Val Asp Val Ala
        435                 440                 445

Gln Phe Tyr Met Asp Phe Cys Lys Ser Glu Ser Cys Gly Lys Cys Ile
    450                 455                 460

Pro Cys Arg Ala Gly Thr Val Gln Leu Tyr Asp Leu Leu Thr Arg Phe
465                 470                 475                 480

Leu Glu Gly Glu Ala Thr Gln Glu Asp Leu Ile Lys Leu Glu Asn Leu
                485                 490                 495

Cys His Met Val Lys Glu Thr Ser Leu Cys Gly Leu Gly Met Ser Ala
            500                 505                 510

Pro Asn Pro Val Ile Ser Thr Leu Arg Tyr Phe Arg His Glu Tyr Glu
        515                 520                 525

Glu Leu Leu Lys Val
    530

<210> SEQ ID NO 23
<211> LENGTH: 238
<212> TYPE: PRT
<213> ORGANISM: Synechocystis PCC6803

<400> SEQUENCE: 23

Met Ser Val Val Thr Leu Thr Ile Asp Asp Lys Ala Ile Ala Ile Glu
1               5                   10                  15

Glu Gly Ala Ser Ile Leu Gln Ala Ala Lys Glu Ala Gly Val Pro Ile
            20                  25                  30

Pro Thr Leu Cys His Leu Glu Gly Ile Ser Glu Ala Ala Ala Cys Arg
        35                  40                  45

Leu Cys Met Val Glu Val Glu Gly Thr Asn Lys Leu Met Pro Ala Cys
    50                  55                  60

Val Thr Ala Val Ser Glu Gly Met Val Val His Thr Asn Thr Glu Lys
65                  70                  75                  80

Leu Gln Asn Tyr Arg Arg Met Thr Val Glu Leu Leu Phe Ser Glu Gly
                85                  90                  95

Asn His Val Cys Ala Ile Cys Val Ala Asn Gly Asn Cys Glu Leu Gln
            100                 105                 110

Asp Met Ala Ile Thr Val Gly Met Asp His Ser Arg Phe Lys Tyr Gln
        115                 120                 125

Phe Pro Lys Arg Glu Val Asp Leu Ser His Pro Met Phe Gly Ile Asp
    130                 135                 140

His Asn Arg Cys Ile Leu Cys Thr Arg Cys Val Arg Val Cys Asp Glu
145                 150                 155                 160

Ile Glu Gly Ala His Val Trp Asp Val Ala Tyr Arg Gly Ala Glu Cys
                165                 170                 175
```

```
Lys Ile Val Ser Gly Leu Asn Gln Pro Trp Gly Thr Val Asp Ala Cys
            180                 185                 190

Thr Ser Cys Gly Lys Cys Val Asp Ala Cys Pro Thr Gly Ser Ile Phe
        195                 200                 205

His Lys Gly Glu Thr Thr Ala Glu Lys Ile Gly Asp Arg Arg Lys Val
    210                 215                 220

Glu Phe Leu Ala Thr Ala Arg Lys Glu Lys Glu Trp Val Arg
225                 230                 235

<210> SEQ ID NO 24
<211> LENGTH: 534
<212> TYPE: PRT
<213> ORGANISM: Synechococcus elongatus

<400> SEQUENCE: 24

Met Asp Trp Glu Asp Leu Gly Arg Leu Ala Asn Glu Glu Leu Thr Cys
1               5                   10                  15

Gln Lys Pro Ile Arg Leu Arg Cys Cys Thr Ala Thr Gly Cys Arg Ala
            20                  25                  30

Asn Gly Ala Glu Ala Val Phe Lys Ala Val Gln Gln Thr Ile Ala Asp
        35                  40                  45

Gln Asn Leu Gly Asp Arg Cys Glu Ala Val Ser Val Gly Cys Leu Gly
    50                  55                  60

Leu Cys Gly Ala Gly Pro Leu Val Gln Cys Asp Pro Ser Asp Arg Leu
65                  70                  75                  80

Tyr Ser Asp Ile Arg Pro Asp Gln Ala Ala Asp Leu Val Ala Ala Ala
                85                  90                  95

Gln Gly Ala Ala Met Asp Leu Pro Glu Val Asp Gln Ala Gln Pro Phe
            100                 105                 110

Phe Ser Gln Gln Leu Lys Ile Val Asn Arg His Ser Gly Leu Ile Asn
        115                 120                 125

Pro Asp Arg Leu Glu Ser Tyr Leu Ala Ala Gly Gly Tyr Arg Ala Leu
    130                 135                 140

Met His Thr Ile Phe Asp Leu Thr Pro Thr Glu Val Val Glu Ile Ile
145                 150                 155                 160

Arg Leu Ser Gly Leu Arg Gly Arg Gly Gly Gly Tyr Pro Thr Gly
                165                 170                 175

Leu Lys Trp Ala Thr Val Ala Lys Met Pro Ser Asp Arg Lys Phe Val
            180                 185                 190

Val Cys Asn Gly Asp Glu Gly Asp Pro Gly Ala Phe Met Asp Arg Ser
        195                 200                 205

Val Leu Glu Ser Asp Pro His Gln Val Ile Glu Gly Met Ala Ile Ala
    210                 215                 220

Ala Tyr Ala Val Gly Ala Asn Phe Gly Tyr Leu Tyr Val Arg Ala Glu
225                 230                 235                 240

Tyr Pro Leu Ala Ile Ala Arg Leu Asn Gln Ala Ile Arg Gln Ala Arg
                245                 250                 255

Arg Arg Gly Leu Leu Gly Asn Ser Val Leu Asp Ser Arg Phe Ser Phe
            260                 265                 270

Asp Leu Glu Val Arg Ile Gly Ala Gly Ala Phe Val Cys Gly Glu Glu
        275                 280                 285

Thr Ala Leu Ile His Ser Ile Gln Gly Glu Arg Gly Val Pro Arg Val
    290                 295                 300

Arg Pro Pro Tyr Pro Ala Glu Ser Gly Leu Trp Gly His Pro Thr Leu
305                 310                 315                 320
```

```
Ile Asn Asn Val Glu Thr Phe Ala Asn Ile Ala Pro Ile Val Glu Gln
                325                 330                 335

Gly Ala Asp Trp Phe Ala Ala Ile Gly Thr Pro Thr Ser Lys Gly Thr
            340                 345                 350

Lys Val Phe Ala Leu Thr Gly Lys Leu Arg Asn Asn Gly Leu Ile Glu
        355                 360                 365

Val Pro Met Gly Ile Pro Leu Arg Ser Ile Val Asp Gly Met Gly Ile
    370                 375                 380

Pro Glu Ser Pro Val Lys Ala Val Gln Thr Gly Gly Pro Ser Gly Gly
385                 390                 395                 400

Cys Ile Pro Leu Ala Gln Leu Asp Thr Pro Val Asp Tyr Asp Ser Leu
                405                 410                 415

Ile Gln Leu Gly Ser Met Met Gly Ser Gly Gly Met Val Val Met Asp
            420                 425                 430

Glu Asn Thr Asp Met Val Ala Ile Ala Arg Phe Tyr Met Glu Phe Cys
        435                 440                 445

Arg Ser Glu Ser Cys Gly Lys Cys Ile Pro Cys Arg Ala Gly Thr Val
    450                 455                 460

Gln Leu His Glu Leu Leu Gly Lys Leu Ser Ser Gly Gln Gly Thr Ala
465                 470                 475                 480

Ile Asp Leu Gln Gln Leu Glu Asp Leu Cys Tyr Leu Val Lys Asp Thr
                485                 490                 495

Ser Leu Cys Gly Leu Gly Met Ser Ala Pro Asn Pro Ile Leu Ser Thr
            500                 505                 510

Leu Arg Trp Phe Arg Gln Glu Tyr Glu Ser Arg Leu Ile Pro Glu Arg
        515                 520                 525

Ala Ile Ala Leu Thr His
    530

<210> SEQ ID NO 25
<211> LENGTH: 238
<212> TYPE: PRT
<213> ORGANISM: Synechococcus elongatus

<400> SEQUENCE: 25

Met Ser Val Val Thr Leu Gln Ile Asp Asp Gln Glu Leu Ala Ala Asn
1               5                   10                  15

Val Gly Gln Thr Val Leu Gln Val Ala Arg Glu Ala Ser Ile Pro Ile
            20                  25                  30

Pro Thr Leu Cys His Leu Gln Gly Val Ser Asp Val Gly Ala Cys Arg
        35                  40                  45

Leu Cys Val Val Glu Val Ala Gly Ser Pro Lys Leu Gln Pro Ala Cys
    50                  55                  60

Leu Leu Thr Val Ser Glu Gly Leu Val Val Gln Thr Arg Ser Pro Arg
65                  70                  75                  80

Leu Glu Arg Tyr Arg Arg Gln Ile Val Glu Leu Phe Phe Ala Glu Gly
                85                  90                  95

Asn His Val Cys Ala Ile Cys Val Ala Asn Gly Asn Cys Glu Leu Gln
            100                 105                 110

Asp Ala Ala Ile Ala Val Gly Met Asp His Ser Arg Tyr Pro Tyr Arg
        115                 120                 125

Phe Pro Lys Arg Asp Val Asp Leu Ser His Arg Phe Phe Gly Leu Asp
    130                 135                 140

His Asn Arg Cys Ile Leu Cys Thr Arg Cys Val Arg Val Cys Asp Glu
```

```
                145                 150                 155                 160
        Ile Glu Gly Ala His Val Trp Asp Val Ala Met Arg Gly Glu His Cys
                        165                 170                 175

Arg Ile Val Ala Gly Met Asp Gln Pro Trp Gly Ala Val Asp Ala Cys
                        180                 185                 190

Thr Asn Cys Gly Lys Cys Ile Asp Ala Cys Pro Thr Gly Ala Leu Phe
                        195                 200                 205

His Lys Gly Glu Thr Thr Gly Glu Ile Glu Arg Asp Arg Asp Lys Leu
                        210                 215                 220

Ala Phe Leu Ala Glu Ala Arg Gly Gln Arg Arg Trp Thr Arg
        225                 230                 235

<210> SEQ ID NO 26
<211> LENGTH: 591
<212> TYPE: PRT
<213> ORGANISM: Hydrogenophilus thermoluteolus

<400> SEQUENCE: 26

Met Thr Thr Glu Arg Gln Arg Thr Ala Pro Gly Leu Leu Ala Ala Leu
1               5                   10                  15

His Gln Ala Arg Ser Arg Phe Gly Arg Pro Leu Asp Ala Gln Ala Leu
                20                  25                  30

Ala Glu Leu Ser Thr Ala Phe Ser Leu Pro Pro Gly Glu Ile Ala Ala
            35                  40                  45

Thr Ala Ser Phe Tyr His Phe Phe Gln Thr Pro Pro Ala Arg Tyr Gln
        50                  55                  60

Ile His Phe Val Asp His Val Val Asp His His Ala Gly Val Ala Ala
65                  70                  75                  80

Leu Cys Asn His Leu Cys Ala Ala Phe Ala Ile Gln Pro Gly Gln Arg
                85                  90                  95

Thr Ala Asp Ala Arg Leu Phe Val Gly Trp Thr Ala Cys Ala Gly Leu
                100                 105                 110

Ser Asp Gln Ala Pro Ala Ala Leu Ile Asn Gly Arg Pro Met Pro Arg
            115                 120                 125

Leu Asp Ala Ala Arg Ile Asp Ala Leu Ile Glu Lys Ile Gln Ala Gln
        130                 135                 140

Ile Pro Met Asp Gln Trp Pro Thr Glu Trp Phe Ala Val Thr Asn Ala
145                 150                 155                 160

Ile His Arg His Gly Pro Leu Leu Thr Trp Leu Asp Thr Thr Pro Ala
                165                 170                 175

Glu Ala Val Phe Glu His Pro Thr Ala His Asp Pro Asp Ala Ile Leu
                180                 185                 190

Gln Ala Val Thr Asp Ala Gly Leu Arg Gly Arg Gly Ala Gly Phe
            195                 200                 205

Pro Thr Ala Thr Lys Trp Arg Phe Cys Arg Glu Asn Ala Asp Pro Glu
        210                 215                 220

Arg Phe Leu Ile Cys Asn Ala Asp Glu Gly Glu Pro Gly Thr Phe Lys
225                 230                 235                 240

Asp Arg Val Leu Leu Thr Arg Tyr Pro Glu His Leu Phe Ala Gly Met
                245                 250                 255

Ile Leu Ala Ala Arg Ala Ile Gly Ala Asp Lys Ala Ile Leu Tyr Leu
                260                 265                 270

Arg Tyr Glu Tyr Gln Tyr Leu Leu Pro Gln Leu Glu Ala Ala Arg Glu
        275                 280                 285
```

```
Arg Ile Ala Ser Ala Gln Ala Thr Val Pro Gln Ala Glu Arg Val Thr
    290                 295                 300

Leu Glu Ile Ala Leu Gly Ala Gly Ala Tyr Val Cys Gly Glu Ser
305                 310                 315                 320

Ala Leu Ile Glu Ser Leu Glu Gly Lys Pro Gly Arg Pro Arg Val Arg
                325                 330                 335

Pro Pro Tyr Pro Val Thr Gln Gly Tyr Leu Gly His Pro Thr Val Val
            340                 345                 350

Asn Asn Val Glu Thr Leu Val Ala Val Ala Ala Ile Val Gly Asn Gly
        355                 360                 365

Ala Ala Trp Trp Arg Ala Leu Gly Thr Pro Asp Ser Ser Gly Pro Lys
370                 375                 380

Leu Phe Cys Val Ser Gly Asp Val Ala Gln Pro Gly Leu Tyr Glu Phe
385                 390                 395                 400

Pro Tyr Gly Val Ala Leu Gly Asp Val Thr Ala Ala Arg Pro Leu
            405                 410                 415

Gly Thr Arg Tyr Ala Val Gln Val Ser Gly Pro Ser Gly Thr Leu Leu
                420                 425                 430

Pro Ala Thr Pro Glu Gln Leu Ala Arg Pro Leu Ala Phe Glu Ala Leu
            435                 440                 445

Pro Cys Asn Gly Thr Val Met Val Phe Asp Val Arg Arg Asp Pro Val
450                 455                 460

Ala Ile Val His His Phe Ala Arg Phe Phe Ala His Glu Ser Cys Gly
465                 470                 475                 480

Phe Cys Thr Pro Cys Arg Val Gly Thr Gln Leu Ile Ala Lys Thr Phe
                485                 490                 495

Glu Lys Ile Ala Ala Gly Tyr Ala Thr Arg Phe Asp Leu Glu Arg Leu
                500                 505                 510

Ala Pro Ala Leu Glu Ala Met Arg Leu Ala Ser Asn Cys Gly Phe Gly
            515                 520                 525

Leu Ser Ala Gly Asn Pro Val Arg Asp Leu Ile Ala His Phe Arg Gln
530                 535                 540

Gln Leu Glu Ala Gln Leu Gln Pro His Asp Phe Ile Pro Ala Phe Ser
545                 550                 555                 560

Leu Asp Ala Glu Leu Ala Ala Thr Arg Arg Leu Thr Gly Arg Asp Asp
                565                 570                 575

Pro His Ala His Leu Ala Gln Phe Glu Gln Pro Glu Val Thr Arg
            580                 585                 590

<210> SEQ ID NO 27
<211> LENGTH: 242
<212> TYPE: PRT
<213> ORGANISM: Hydrogenophilus thermoluteolus

<400> SEQUENCE: 27

Met Arg Pro Thr Thr Pro Pro Phe Ala Ser Glu Thr Phe Thr Leu Asp
1               5                   10                  15

Glu Glu Ser Ile Pro Phe Val Pro Gly Gln Thr Val Leu Glu Ala Ala
                20                  25                  30

Leu Ala Ala Gly Arg Tyr Ile Pro His Leu Cys Trp His Pro Glu Met
            35                  40                  45

Gly Asn His Gly Ser Cys Arg Leu Cys Val Val Glu Ala Asn Gly Arg
        50                  55                  60

Ile Gln Ala Ser Cys Ala Leu Pro Ala Gln Pro Gly Leu Gln Val Val
65                  70                  75                  80
```

```
Ser Lys Ser Glu Thr Leu Thr Arg Val Arg Arg Thr Leu Leu Glu Met
                85                  90                  95

Leu Phe Ala Glu Gly Asn His Phe Cys Pro Gly Cys Glu Lys Ser Gly
            100                 105                 110

Asp Cys Leu Leu Gln Ala Leu Ala Tyr Ala His Gly Met Thr Ala Ser
        115                 120                 125

His Phe Asp Pro Phe Tyr Pro Gln Arg Arg Ile Asp Ala Ser His Pro
    130                 135                 140

Asp Leu Trp Leu Asp Pro Asn Arg Cys Ile Leu Cys Gly Leu Cys Val
145                 150                 155                 160

Arg Ala Ser Leu Ala Glu Gly Lys Glu Ala Leu Val Ile Gly Gly Arg
                165                 170                 175

Gly Ile Ala Ser Arg Leu Leu Ala Thr Ser Ala Ser Gly Arg Leu Gly
            180                 185                 190

Asp Thr Ala Leu Ala Ala Thr Asp Arg Ala Ala Arg Ile Cys Pro Val
        195                 200                 205

Gly Ala Leu Asn Phe Lys Ala Ala Gly Phe Thr Thr Pro Ile Gly Lys
    210                 215                 220

Arg Arg Phe Asp His Arg Pro Pro Glu Ala Met Ser Asp Lys Glu Arg
225                 230                 235                 240

Tyr Thr

<210> SEQ ID NO 28
<211> LENGTH: 320
<212> TYPE: PRT
<213> ORGANISM: Chlamydomonas reinhardtii

<400> SEQUENCE: 28

Ala Thr Lys Ala Ser Thr Ala Val Thr Thr Asp Met Ser Lys Arg Thr
1               5                   10                  15

Val Pro Thr Lys Leu Glu Glu Gly Met Pro Leu Asn Thr Tyr Ser
                20                  25                  30

Asn Lys Ala Pro Phe Lys Ala Lys Val Arg Ser Val Glu Lys Ile Thr
            35                  40                  45

Gly Pro Lys Ala Thr Gly Glu Thr Cys His Ile Ile Ile Glu Thr Glu
        50                  55                  60

Gly Lys Ile Pro Phe Trp Glu Gly Gln Ser Tyr Gly Val Ile Pro Pro
65                  70                  75                  80

Gly Thr Lys Ile Asn Ser Lys Gly Lys Glu Val Pro His Gly Thr Arg
                85                  90                  95

Leu Tyr Ser Ile Ala Ser Ser Arg Tyr Gly Asp Asp Phe Asp Gly Gln
            100                 105                 110

Thr Ala Ser Leu Cys Val Arg Arg Ala Val Tyr Val Asp Pro Glu Thr
        115                 120                 125

Gly Lys Glu Asp Pro Ala Lys Lys Gly Leu Cys Ser Asn Phe Leu Cys
    130                 135                 140

Asp Ala Thr Pro Gly Thr Glu Ile Ser Met Thr Gly Pro Thr Gly Lys
145                 150                 155                 160

Val Leu Leu Leu Pro Ala Asp Ala Asn Ala Pro Leu Ile Cys Val Ala
                165                 170                 175

Thr Gly Thr Gly Ile Ala Pro Phe Arg Ser Phe Trp Arg Arg Cys Phe
            180                 185                 190

Ile Glu Asn Val Pro Ser Tyr Lys Phe Thr Gly Leu Phe Trp Leu Phe
        195                 200                 205
```

```
Met Gly Val Ala Asn Ser Asp Ala Lys Leu Tyr Asp Glu Glu Leu Gln
            210                 215                 220

Ala Ile Ala Lys Ala Tyr Pro Gly Gln Phe Arg Leu Asp Tyr Ala Leu
225                 230                 235                 240

Ser Arg Glu Gln Asn Asn Arg Lys Gly Gly Lys Met Tyr Ile Gln Asp
                    245                 250                 255

Lys Val Glu Glu Tyr Ala Asp Glu Ile Phe Asp Leu Leu Asp Asn Gly
                260                 265                 270

Ala His Met Tyr Phe Cys Gly Leu Lys Gly Met Met Pro Gly Ile Gln
            275                 280                 285

Asp Met Leu Glu Arg Val Ala Lys Glu Lys Gly Leu Asn Tyr Glu Glu
            290                 295                 300

Trp Val Glu Gly Leu Lys His Lys Asn Gln Trp His Val Glu Val Tyr
305                 310                 315                 320

<210> SEQ ID NO 29
<211> LENGTH: 303
<212> TYPE: PRT
<213> ORGANISM: Anabaena

<400> SEQUENCE: 29

Thr Gln Ala Lys Ala Lys His Ala Asp Val Pro Val Asn Leu Tyr Arg
1               5                   10                  15

Pro Asn Ala Pro Phe Ile Gly Lys Val Ile Ser Asn Glu Pro Leu Val
                20                  25                  30

Lys Glu Gly Gly Ile Gly Ile Val Gln His Ile Lys Phe Asp Leu Thr
            35                  40                  45

Gly Gly Asn Leu Lys Tyr Ile Glu Gly Gln Ser Ile Gly Ile Ile Pro
50                  55                  60

Pro Gly Val Asp Lys Asn Gly Lys Pro Glu Lys Leu Arg Leu Tyr Ser
65                  70                  75                  80

Ile Ala Ser Thr Arg His Gly Asp Asp Val Asp Asp Lys Thr Ile Ser
                    85                  90                  95

Leu Cys Val Arg Gln Leu Glu Tyr Lys His Pro Glu Ser Gly Glu Thr
                100                 105                 110

Val Tyr Gly Val Cys Ser Thr Tyr Leu Thr His Ile Glu Pro Gly Ser
            115                 120                 125

Glu Val Lys Ile Thr Gly Pro Val Gly Lys Glu Met Leu Leu Pro Asp
        130                 135                 140

Asp Pro Glu Ala Asn Val Ile Met Leu Ala Thr Gly Thr Gly Ile Ala
145                 150                 155                 160

Pro Met Arg Thr Tyr Leu Trp Arg Met Phe Lys Asp Ala Glu Arg Ala
                165                 170                 175

Ala Asn Pro Glu Tyr Gln Phe Lys Gly Phe Ser Trp Leu Val Phe Gly
                180                 185                 190

Val Pro Thr Thr Pro Asn Ile Leu Tyr Lys Glu Glu Leu Glu Glu Ile
            195                 200                 205

Gln Gln Lys Tyr Pro Asp Asn Phe Arg Leu Thr Tyr Ala Ile Ser Arg
        210                 215                 220

Glu Gln Lys Asn Pro Gln Gly Gly Arg Met Tyr Ile Gln Asp Arg Val
225                 230                 235                 240

Ala Glu His Ala Asp Gln Leu Trp Gln Leu Ile Lys Asn Gln Lys Thr
                245                 250                 255

His Thr Tyr Ile Cys Gly Leu Arg Gly Met Glu Glu Gly Ile Asp Ala
```

```
                260                 265                 270
Ala Leu Ser Ala Ala Ala Lys Glu Gly Val Thr Trp Ser Asp Tyr
            275                 280                 285

Gln Lys Asp Leu Lys Lys Ala Gly Arg Trp His Val Glu Thr Tyr
            290                 295                 300

<210> SEQ ID NO 30
<211> LENGTH: 488
<212> TYPE: PRT
<213> ORGANISM: Ralstonia eutropha

<400> SEQUENCE: 30

Met Ser Arg Lys Leu Val Ile Asp Pro Val Thr Arg Ile Glu Gly His
1               5                   10                  15

Gly Lys Val Val Val His Leu Asp Asp Asp Asn Lys Val Val Asp Ala
                20                  25                  30

Lys Leu His Val Val Glu Phe Arg Gly Phe Glu Lys Phe Val Gln Gly
            35                  40                  45

His Pro Phe Trp Glu Ala Pro Met Phe Leu Gln Arg Ile Cys Gly Ile
        50                  55                  60

Cys Phe Val Ser His His Leu Cys Gly Ala Lys Ala Leu Asp Asp Met
65                  70                  75                  80

Val Gly Val Gly Leu Lys Ser Gly Ile His Val Thr Pro Thr Ala Glu
                85                  90                  95

Lys Met Arg Arg Leu Gly His Tyr Ala Gln Met Leu Gln Ser His Thr
            100                 105                 110

Thr Ala Tyr Phe Tyr Leu Ile Val Pro Glu Met Leu Phe Gly Met Asp
        115                 120                 125

Ala Pro Pro Ala Gln Arg Asn Val Leu Gly Leu Ile Glu Ala Asn Pro
130                 135                 140

Asp Leu Val Lys Arg Val Val Met Leu Arg Lys Trp Gly Gln Glu Val
145                 150                 155                 160

Ile Lys Ala Val Phe Gly Lys Lys Met His Gly Ile Asn Ser Val Pro
                165                 170                 175

Gly Gly Val Asn Asn Asn Leu Ser Ile Ala Glu Arg Asp Arg Phe Leu
            180                 185                 190

Asn Gly Glu Glu Gly Leu Leu Ser Val Asp Gln Val Ile Asp Tyr Ala
        195                 200                 205

Gln Asp Gly Leu Arg Leu Phe Tyr Asp Phe His Gln Lys His Arg Ala
    210                 215                 220

Gln Val Asp Ser Phe Ala Asp Val Pro Ala Leu Ser Met Cys Leu Val
225                 230                 235                 240

Gly Asp Asp Asp Asn Val Asp Tyr Tyr His Gly Arg Leu Arg Ile Ile
                245                 250                 255

Asp Asp Asp Lys His Ile Val Arg Glu Phe Asp Tyr His Asp Tyr Leu
            260                 265                 270

Asp His Phe Ser Glu Ala Val Glu Glu Trp Ser Tyr Met Lys Phe Pro
        275                 280                 285

Tyr Leu Lys Glu Leu Gly Arg Glu Gln Gly Ser Val Arg Val Gly Pro
    290                 295                 300

Leu Gly Arg Met Asn Val Thr Lys Ser Leu Pro Thr Pro Leu Ala Gln
305                 310                 315                 320

Glu Ala Leu Glu Arg Phe His Ala Tyr Thr Lys Gly Arg Thr Asn Asn
                325                 330                 335
```

```
Met Thr Leu His Thr Asn Trp Ala Arg Ala Ile Glu Ile Leu His Ala
                340                 345                 350

Ala Glu Val Val Lys Glu Leu Leu His Asp Pro Asp Leu Gln Lys Asp
            355                 360                 365

Gln Leu Val Leu Thr Pro Pro Asn Ala Trp Thr Gly Glu Gly Val
        370                 375                 380

Gly Val Val Glu Ala Pro Arg Gly Thr Leu Leu His His Tyr Arg Ala
385                 390                 395                 400

Asp Glu Arg Gly Asn Ile Thr Phe Ala Asn Leu Val Val Ala Thr Thr
                405                 410                 415

Gln Asn Asn Gln Val Met Asn Arg Thr Val Arg Ser Val Ala Glu Asp
            420                 425                 430

Tyr Leu Gly Gly His Gly Glu Ile Thr Glu Gly Met Met Asn Ala Ile
        435                 440                 445

Glu Val Gly Ile Arg Ala Tyr Asp Pro Cys Leu Ser Cys Ala Thr His
    450                 455                 460

Ala Leu Gly Gln Met Pro Leu Val Val Ser Val Phe Asp Ala Ala Gly
465                 470                 475                 480

Arg Leu Ile Asp Glu Arg Ala Arg
                485

<210> SEQ ID NO 31
<211> LENGTH: 209
<212> TYPE: PRT
<213> ORGANISM: Ralstonia eutropha

<400> SEQUENCE: 31

Met Arg Ala Pro His Lys Asp Glu Ile Ala Ser His Glu Leu Pro Ala
1               5                   10                  15

Thr Pro Met Asp Pro Ala Leu Ala Ala Asn Arg Glu Gly Lys Ile Lys
            20                  25                  30

Val Ala Thr Ile Gly Leu Cys Gly Cys Trp Gly Cys Thr Leu Ser Phe
        35                  40                  45

Leu Asp Met Asp Glu Arg Leu Leu Pro Leu Leu Glu Lys Val Thr Leu
    50                  55                  60

Leu Arg Ser Ser Leu Thr Asp Ile Lys Arg Ile Pro Glu Arg Cys Ala
65                  70                  75                  80

Ile Gly Phe Val Glu Gly Gly Val Ser Ser Glu Glu Asn Ile Glu Thr
                85                  90                  95

Leu Glu His Phe Arg Glu Asn Cys Asp Ile Leu Ile Ser Val Gly Ala
            100                 105                 110

Cys Ala Val Trp Gly Gly Val Pro Ala Met Arg Asn Val Phe Glu Leu
        115                 120                 125

Lys Asp Cys Leu Ala Glu Ala Tyr Val Asn Ser Ala Thr Ala Val Pro
    130                 135                 140

Gly Ala Lys Ala Val Val Pro Phe His Pro Asp Ile Pro Arg Ile Thr
145                 150                 155                 160

Thr Lys Val Tyr Pro Cys His Glu Val Val Lys Met Asp Tyr Phe Ile
                165                 170                 175

Pro Gly Cys Pro Pro Asp Gly Asp Ala Ile Phe Lys Val Leu Asp Asp
            180                 185                 190

Leu Val Asn Gly Arg Pro Phe Asp Leu Pro Ser Ser Ile Asn Arg Tyr
        195                 200                 205

Asp
```

<210> SEQ ID NO 32
<211> LENGTH: 618
<212> TYPE: PRT
<213> ORGANISM: Ralstonia eutropha

<400> SEQUENCE: 32

```
Met Ser Ala Tyr Ala Thr Gln Gly Phe Asn Leu Asp Asp Arg Gly Arg
1               5                   10                  15

Arg Ile Val Val Asp Pro Val Thr Arg Ile Glu Gly His Met Arg Cys
            20                  25                  30

Glu Val Asn Val Asp Ala Asn Asn Val Ile Arg Asn Ala Val Ser Thr
        35                  40                  45

Gly Thr Met Trp Arg Gly Leu Glu Val Ile Leu Lys Gly Arg Asp Pro
    50                  55                  60

Arg Asp Ala Trp Ala Phe Val Glu Arg Ile Cys Gly Val Cys Thr Gly
65                  70                  75                  80

Cys His Ala Leu Ala Ser Val Arg Ala Val Glu Asn Ala Leu Asp Ile
                85                  90                  95

Arg Ile Pro Lys Asn Ala His Leu Ile Arg Glu Ile Met Ala Lys Thr
            100                 105                 110

Leu Gln Val His Asp His Ala Val His Phe Tyr His Leu His Ala Leu
        115                 120                 125

Asp Trp Val Asp Val Met Ser Ala Leu Lys Ala Asp Pro Lys Arg Thr
    130                 135                 140

Ser Glu Leu Gln Gln Leu Val Ser Pro Ala His Pro Leu Ser Ser Ala
145                 150                 155                 160

Gly Tyr Phe Arg Asp Ile Gln Asn Arg Leu Lys Arg Phe Val Glu Ser
                165                 170                 175

Gly Gln Leu Gly Pro Phe Met Asn Gly Tyr Trp Gly Ser Lys Ala Tyr
            180                 185                 190

Val Leu Pro Pro Glu Ala Asn Leu Met Ala Val Thr His Tyr Leu Glu
        195                 200                 205

Ala Leu Asp Leu Gln Lys Glu Trp Val Lys Ile His Thr Ile Phe Gly
    210                 215                 220

Gly Lys Asn Pro His Pro Asn Tyr Leu Val Gly Gly Val Pro Cys Ala
225                 230                 235                 240

Ile Asn Leu Asp Gly Ile Gly Ala Ala Ser Ala Pro Val Asn Met Glu
                245                 250                 255

Arg Leu Ser Phe Val Lys Ala Arg Ile Asp Glu Ile Ile Glu Phe Asn
            260                 265                 270

Lys Asn Val Tyr Val Pro Asp Val Leu Ala Ile Gly Thr Leu Tyr Lys
        275                 280                 285

Gln Ala Gly Trp Leu Tyr Gly Gly Leu Ala Thr Asn Val Leu
    290                 295                 300

Asp Tyr Gly Glu Tyr Pro Asn Val Ala Tyr Asn Lys Ser Thr Asp Gln
305                 310                 315                 320

Leu Pro Gly Gly Ala Ile Leu Asn Gly Asn Trp Asp Glu Val Phe Pro
                325                 330                 335

Val Asp Pro Arg Asp Ser Gln Gln Val Gln Glu Phe Val Ser His Ser
            340                 345                 350

Trp Tyr Lys Tyr Ala Asp Glu Ser Val Gly Leu His Pro Trp Asp Gly
        355                 360                 365

Val Thr Glu Pro Asn Tyr Val Leu Gly Ala Asn Thr Lys Gly Thr Arg
    370                 375                 380
```

```
Thr Arg Ile Glu Gln Ile Asp Glu Ser Ala Lys Tyr Ser Trp Ile Lys
385                 390                 395                 400

Ser Pro Arg Trp Arg Gly His Ala Met Glu Val Gly Pro Leu Ser Arg
            405                 410                 415

Tyr Ile Leu Ala Tyr Ala His Ala Arg Ser Gly Asn Lys Tyr Ala Glu
            420                 425                 430

Arg Pro Lys Glu Gln Leu Glu Tyr Ser Ala Gln Met Ile Asn Ser Ala
            435                 440                 445

Ile Pro Lys Ala Leu Gly Leu Pro Glu Thr Gln Tyr Thr Leu Lys Gln
            450                 455                 460

Leu Leu Pro Ser Thr Ile Gly Arg Thr Leu Ala Arg Ala Leu Glu Ser
465                 470                 475                 480

Gln Tyr Cys Gly Glu Met Met His Ser Asp Trp His Asp Leu Val Ala
            485                 490                 495

Asn Ile Arg Ala Gly Asp Thr Ala Thr Ala Asn Val Asp Lys Trp Asp
            500                 505                 510

Pro Ala Thr Trp Pro Leu Gln Ala Lys Gly Val Gly Thr Val Ala Ala
            515                 520                 525

Pro Arg Gly Ala Leu Gly His Trp Ile Arg Ile Lys Asp Gly Arg Ile
            530                 535                 540

Glu Asn Tyr Gln Cys Val Val Pro Thr Thr Trp Asn Gly Ser Pro Arg
545                 550                 555                 560

Asp Tyr Lys Gly Gln Ile Gly Ala Phe Glu Ala Ser Leu Met Asn Thr
            565                 570                 575

Pro Met Val Asn Pro Glu Gln Pro Val Glu Ile Leu Arg Thr Leu His
            580                 585                 590

Ser Phe Asp Pro Cys Leu Ala Cys Ser Thr His Val Met Ser Ala Glu
            595                 600                 605

Gly Gln Glu Leu Thr Thr Val Lys Val Arg
    610                 615

<210> SEQ ID NO 33
<211> LENGTH: 360
<212> TYPE: PRT
<213> ORGANISM: Ralstonia eutropha

<400> SEQUENCE: 33

Met Val Glu Thr Phe Tyr Glu Val Met Arg Arg Gln Gly Ile Ser Arg
1               5                   10                  15

Arg Ser Phe Leu Lys Tyr Cys Ser Leu Thr Ala Thr Ser Leu Gly Leu
            20                  25                  30

Gly Pro Ser Phe Leu Pro Gln Ile Ala His Ala Met Glu Thr Lys Pro
        35                  40                  45

Arg Thr Pro Val Leu Trp Leu His Gly Leu Glu Cys Thr Cys Cys Ser
    50                  55                  60

Glu Ser Phe Ile Arg Ser Ala His Pro Leu Ala Lys Asp Val Val Leu
65                  70                  75                  80

Ser Met Ile Ser Leu Asp Tyr Asp Asp Thr Leu Met Ala Ala Ala Gly
                85                  90                  95

His Gln Ala Glu Ala Ile Leu Glu Glu Ile Met Thr Lys Tyr Lys Gly
            100                 105                 110

Asn Tyr Ile Leu Ala Val Glu Gly Asn Pro Pro Leu Asn Gln Asp Gly
            115                 120                 125

Met Ser Cys Ile Ile Gly Gly Arg Pro Phe Ile Glu Gln Leu Lys Tyr
```

```
            130                 135                 140
Val Ala Lys Asp Ala Lys Ala Ile Ile Ser Trp Gly Ser Cys Ala Ser
145                 150                 155                 160

Trp Gly Cys Val Gln Ala Ala Lys Pro Asn Pro Thr Gln Ala Thr Pro
                165                 170                 175

Val His Lys Val Ile Thr Asp Lys Pro Ile Ile Lys Val Pro Gly Cys
                180                 185                 190

Pro Pro Ile Ala Glu Val Met Thr Gly Val Ile Thr Tyr Met Leu Thr
                195                 200                 205

Phe Asp Arg Ile Pro Glu Leu Asp Arg Gln Gly Arg Pro Lys Met Phe
            210                 215                 220

Tyr Ser Gln Arg Ile His Asp Lys Cys Tyr Arg Arg Pro His Phe Asp
225                 230                 235                 240

Ala Gly Gln Phe Val Glu Glu Trp Asp Asp Glu Ser Ala Arg Lys Gly
                245                 250                 255

Phe Cys Leu Tyr Lys Met Gly Cys Lys Gly Pro Thr Thr Tyr Asn Ala
                260                 265                 270

Cys Ser Thr Thr Arg Trp Asn Glu Gly Thr Ser Phe Pro Ile Gln Ser
            275                 280                 285

Gly His Gly Cys Ile Gly Cys Ser Glu Asp Gly Phe Trp Asp Lys Gly
            290                 295                 300

Ser Phe Tyr Asp Arg Leu Thr Gly Ile Ser Gln Phe Gly Val Glu Ala
305                 310                 315                 320

Asn Ala Asp Lys Ile Gly Gly Thr Ala Ser Val Val Gly Ala Ala
                325                 330                 335

Val Thr Ala His Ala Ala Ala Ser Ala Ile Lys Arg Ala Ser Lys Lys
                340                 345                 350

Asn Glu Thr Ser Gly Ser Glu His
            355                 360

<210> SEQ ID NO 34
<211> LENGTH: 244
<212> TYPE: PRT
<213> ORGANISM: Ralstonia eutropha

<400> SEQUENCE: 34

Met Ser Thr Lys Met Gln Ala Asp Arg Ile Ala Asp Ala Thr Gly Thr
1               5                   10                  15

Asp Glu Gly Ala Val Ala Ser Gly Lys Ser Ile Lys Ala Thr Tyr Val
                20                  25                  30

Tyr Glu Ala Pro Val Arg Leu Trp His Trp Val Asn Ala Leu Ala Ile
            35                  40                  45

Val Val Leu Ala Val Thr Gly Phe Phe Ile Gly Ser Pro Pro Ala Thr
        50                  55                  60

Arg Pro Gly Glu Ala Ser Ala Asn Phe Leu Met Gly Tyr Ile Arg Phe
65                  70                  75                  80

Ala His Phe Val Ala Ala Tyr Ile Phe Ala Ile Gly Met Leu Gly Arg
                85                  90                  95

Ile Tyr Trp Ala Thr Ala Gly Asn His His Ser Arg Glu Leu Phe Ser
                100                 105                 110

Val Pro Val Phe Thr Arg Ala Tyr Trp Gln Glu Val Ile Ser Met Leu
            115                 120                 125

Arg Trp Tyr Ala Phe Leu Ser Ala Arg Pro Ser Arg Tyr Val Gly His
        130                 135                 140
```

```
Asn Pro Leu Ala Arg Phe Ala Met Phe Phe Ile Phe Phe Leu Ser Ser
145                 150                 155                 160

Val Phe Met Ile Leu Thr Gly Phe Ala Met Tyr Gly Glu Gly Ala Gln
                165                 170                 175

Met Gly Ser Trp Gln Glu Arg Met Phe Gly Trp Val Ile Pro Leu Leu
            180                 185                 190

Gly Gln Ser Gln Asp Val His Thr Trp His His Leu Gly Met Trp Phe
        195                 200                 205

Ile Val Val Phe Val Ile Val His Val Tyr Ala Ala Ile Arg Glu Asp
            210                 215                 220

Ile Met Gly Arg Gln Ser Val Val Ser Thr Met Val Ser Gly Tyr Arg
225                 230                 235                 240

Thr Phe Lys Asp

<210> SEQ ID NO 35
<211> LENGTH: 347
<212> TYPE: PRT
<213> ORGANISM: Ralstonia eutropha

<400> SEQUENCE: 35

Met Asn Ala Pro Val Cys Thr Gly Leu Ala Ser Ala Lys Pro Gly Val
1               5                   10                  15

Leu Asn Val Leu Trp Ile Gln Ser Gly Gly Cys Gly Gly Cys Ser Met
            20                  25                  30

Ser Leu Leu Cys Ala Asp Thr Thr Asp Phe Thr Gly Met Leu Lys Ser
            35                  40                  45

Ala Gly Ile His Met Leu Trp His Pro Ser Leu Ser Leu Glu Ser Gly
        50                  55                  60

Val Glu Gln Leu Gln Ile Leu Glu Asp Cys Leu Gln Gly Arg Val Ala
65                  70                  75                  80

Leu His Ala Leu Cys Val Glu Gly Ala Met Leu Arg Gly Pro His Gly
                85                  90                  95

Thr Gly Arg Phe His Leu Leu Ala Gly Thr Gly Val Pro Met Ile Glu
            100                 105                 110

Trp Val Ser Arg Leu Ala Ala Val Ala Asp Tyr Thr Leu Ala Val Gly
            115                 120                 125

Thr Cys Ala Ala Tyr Gly Gly Ile Thr Ala Gly Gly Asn Pro Thr
        130                 135                 140

Asp Ala Cys Gly Leu Gln Tyr Glu Gly Asp Gln Pro Gly Gly Leu Leu
145                 150                 155                 160

Gly Leu Asn Tyr Arg Ser Arg Ala Gly Leu Pro Val Ile Asn Val Ala
                165                 170                 175

Gly Cys Pro Thr His Pro Gly Trp Val Thr Asp Ala Leu Ala Leu Leu
            180                 185                 190

Ser Ala Arg Leu Leu Thr Ala Ser Asp Leu Asp Thr Leu Gly Arg Pro
        195                 200                 205

Arg Phe Tyr Ala Asp Gln Leu Val His His Gly Cys Thr Arg Asn Glu
210                 215                 220

Tyr Tyr Glu Phe Lys Ala Ser Ala Glu Lys Pro Ser Asp Leu Gly Cys
225                 230                 235                 240

Met Met Glu Asn Met Gly Cys Lys Gly Thr Gln Ala His Ala Asp Cys
                245                 250                 255

Asn Thr Arg Leu Trp Asn Gly Glu Gly Ser Cys Thr Arg Gly Gly Tyr
            260                 265                 270
```

```
Ala Cys Ile Ser Cys Thr Glu Pro Gly Phe Glu Pro Gly His Pro
            275                 280                 285

Phe His Gln Thr Pro Lys Val Ala Gly Ile Pro Ile Gly Leu Pro Thr
    290                 295                 300

Asp Met Pro Lys Ala Trp Phe Val Ala Leu Ala Ser Leu Ser Lys Ser
305                 310                 315                 320

Ala Thr Pro Lys Arg Val Lys Leu Asn Ala Thr Ala Asp His Pro Leu
                325                 330                 335

Ile Ala Pro Ala Ile Arg Lys Thr Arg Leu Lys
            340                 345

<210> SEQ ID NO 36
<211> LENGTH: 485
<212> TYPE: PRT
<213> ORGANISM: Ralstonia eutropha

<400> SEQUENCE: 36

Met Glu Arg Leu Val Val Gly Pro Phe Asn Arg Val Glu Gly Asp Leu
1               5                   10                  15

Glu Val Asn Leu Glu Val Ala Ser Gly Arg Val Cys Ser Ala Arg Val
            20                  25                  30

Asn Ala Thr Met Tyr Arg Gly Leu Glu Gln Ile Leu His Arg His
        35                  40                  45

Pro Leu Asp Ala Leu Val Tyr Ala Pro Arg Val Cys Gly Ile Cys Ser
    50                  55                  60

Val Ser Gln Ser Val Ala Ala Ser Arg Ala Leu Ala Asp Leu Ala Gly
65                  70                  75                  80

Val Thr Val Pro Ala Asn Gly Met Leu Ala Met Asn Leu Met Leu Ala
                85                  90                  95

Thr Glu Asn Leu Ala Asp His Leu Thr His Phe Tyr Leu Phe Phe Met
            100                 105                 110

Pro Asp Phe Thr Arg Glu Ile Tyr Ala Gly Arg Pro Trp His Thr Asp
        115                 120                 125

Ala Thr Ala Arg Phe Ser Pro Thr His Gly Lys His His Arg Leu Ala
    130                 135                 140

Ile Ala Ala Arg Gln Arg Trp Phe Thr Leu Met Gly Thr Leu Gly Gly
145                 150                 155                 160

Lys Trp Pro His Thr Glu Ser Val Gln Pro Gly Gly Ser Ser Arg Ala
                165                 170                 175

Ile Asp Ala Ala Glu Arg Val Arg Leu Leu Gly Arg Val Arg Glu Phe
            180                 185                 190

Arg Cys Phe Leu Glu Gln Thr Leu Tyr Ala Ala Pro Leu Glu Asp Val
        195                 200                 205

Val Ala Leu Asp Ser Glu Val Ala Leu Trp Arg Trp His Ala Gln Ala
    210                 215                 220

Pro Gln Ala Gly Asp Leu Arg Cys Phe Leu Thr Ile Ala Gln Asp Ala
225                 230                 235                 240

Ala Leu Asp Gln Met Gly Pro Gly Pro Gly Thr Tyr Leu Ser Tyr Gly
                245                 250                 255

Ala Tyr Pro Gln Pro Glu Gly Gly Phe Cys Phe Ala Gln Gly Val Trp
            260                 265                 270

Arg Ser Ala Gln Gly Arg Leu Asp Ala Leu Asp Leu Ala Ala Ile Ser
        275                 280                 285

Glu Asp Ala Thr Ser Ala Trp Leu Val Asp Gln Gly Gly Ala Arg His
    290                 295                 300
```

```
Pro Ala Asn Gly Leu Thr Ala Pro Ala Pro Asp Lys Val Gly Ala Tyr
305                 310                 315                 320

Thr Trp Asn Lys Ala Pro Arg Leu Ala Gly Ala Val Leu Glu Thr Gly
                325                 330                 335

Ala Ile Ala Arg Gln Leu Ala Gly Ala Gln Pro Leu Val Arg Asp Ala
            340                 345                 350

Val Ala Arg Cys Gly Ala Thr Val Tyr Thr Arg Val Leu Ala Arg Leu
        355                 360                 365

Val Glu Leu Ala Arg Val Val Pro Leu Met Glu Asp Trp Leu Gln Ser
370                 375                 380

Leu Glu Ile Gly Ala Pro Tyr Trp Ala Ser Ala His Leu Pro Asp Gln
385                 390                 395                 400

Gly Ala Gly Val Gly Leu Thr Glu Ala Ala Arg Gly Ser Leu Gly His
                405                 410                 415

Trp Val Ser Val Arg Asp Gly Arg Ile Asp Asn Tyr Gln Ile Val Ala
            420                 425                 430

Pro Thr Ser Trp Asn Phe Ser Pro Arg Asp Ile Ala Gly Gln Pro Gly
        435                 440                 445

Ala Val Glu Lys Ala Leu Glu Gly Ala Pro Val Leu Gln Gly Glu Thr
    450                 455                 460

Thr Pro Val Ala Val Gln His Ile Val Arg Ser Phe Asp Pro Cys Met
465                 470                 475                 480

Val Cys Thr Val His
                485

<210> SEQ ID NO 37
<211> LENGTH: 597
<212> TYPE: PRT
<213> ORGANISM: Escherichia coli

<400> SEQUENCE: 37

Met Ser Thr Gln Tyr Glu Thr Gln Gly Tyr Thr Ile Asn Asn Ala Gly
1               5                   10                  15

Arg Arg Leu Val Val Asp Pro Ile Thr Arg Ile Glu Gly His Met Arg
                20                  25                  30

Cys Glu Val Asn Ile Asn Asp Gln Asn Val Ile Thr Asn Ala Val Ser
            35                  40                  45

Cys Gly Thr Met Phe Arg Gly Leu Glu Ile Ile Leu Gln Gly Arg Asp
        50                  55                  60

Pro Arg Asp Ala Trp Ala Phe Val Glu Arg Ile Cys Gly Val Cys Thr
65                  70                  75                  80

Gly Val His Ala Leu Ala Ser Val Tyr Ala Ile Glu Asp Ala Ile Gly
                85                  90                  95

Ile Lys Val Pro Asp Asn Ala Asn Ile Ile Arg Asn Ile Met Leu Ala
                100                 105                 110

Thr Leu Trp Cys His Asp His Leu Val His Phe Tyr Gln Leu Ala Gly
            115                 120                 125

Met Asp Trp Ile Asp Val Leu Asp Ala Leu Lys Ala Asp Pro Arg Lys
        130                 135                 140

Thr Ser Glu Leu Ala Gln Ser Leu Ser Ser Trp Pro Lys Ser Ser Pro
145                 150                 155                 160

Gly Tyr Phe Phe Asp Val Gln Asn Arg Leu Lys Lys Phe Val Glu Gly
                165                 170                 175

Gly Gln Leu Gly Ile Phe Arg Asn Gly Tyr Trp Gly His Pro Gln Tyr
```

-continued

```
            180                 185                 190
Lys Leu Pro Pro Glu Ala Asn Leu Met Gly Phe Ala His Tyr Leu Glu
            195                 200                 205
Ala Leu Asp Phe Gln Arg Glu Ile Val Lys Ile His Ala Val Phe Gly
            210                 215                 220
Gly Lys Asn Pro His Pro Asn Trp Ile Val Gly Met Pro Cys Ala
225                 230                 235                 240
Ile Asn Ile Asp Glu Ser Gly Ala Val Gly Ala Val Asn Met Glu Arg
                    245                 250                 255
Leu Asn Leu Val Gln Ser Ile Ile Thr Arg Thr Ala Asp Phe Ile Asn
                    260                 265                 270
Asn Val Met Ile Pro Asp Ala Leu Ala Ile Gly Gln Phe Asn Lys Pro
                    275                 280                 285
Trp Ser Glu Ile Gly Thr Gly Leu Ser Asp Lys Cys Val Leu Ser Tyr
                    290                 295                 300
Gly Ala Phe Pro Asp Ile Ala Asn Asp Phe Gly Glu Lys Ser Leu Leu
305                 310                 315                 320
Met Pro Gly Gly Ala Val Ile Asn Gly Asp Phe Asn Asn Val Leu Pro
                    325                 330                 335
Val Asp Leu Val Asp Pro Gln Gln Val Gln Glu Phe Val Asp His Ala
                    340                 345                 350
Trp Tyr Arg Tyr Pro Asn Asp Gln Val Gly Arg His Pro Phe Asp Gly
                    355                 360                 365
Ile Thr Asp Pro Trp Tyr Asn Pro Gly Asp Val Lys Gly Ser Asp Thr
                    370                 375                 380
Asn Ile Gln Gln Leu Asn Glu Gln Glu Arg Tyr Ser Trp Ile Lys Ala
385                 390                 395                 400
Pro Arg Trp Arg Gly Asn Ala Met Glu Val Gly Pro Leu Ala Arg Thr
                    405                 410                 415
Leu Ile Ala Tyr His Lys Gly Asp Ala Ala Thr Val Glu Ser Val Asp
                    420                 425                 430
Arg Met Met Ser Ala Leu Asn Leu Pro Leu Ser Gly Ile Gln Ser Thr
                    435                 440                 445
Leu Gly Arg Ile Leu Cys Arg Ala His Glu Ala Gln Trp Ala Ala Gly
                    450                 455                 460
Lys Leu Gln Tyr Phe Phe Asn Lys Leu Met Thr Asn Leu Lys Asn Gly
465                 470                 475                 480
Asn Leu Ala Thr Ala Ser Thr Glu Lys Trp Glu Pro Thr Thr Trp Pro
                    485                 490                 495
Thr Glu Cys Arg Gly Val Gly Phe Thr Glu Ala Pro Arg Gly Ala Leu
                    500                 505                 510
Gly His Trp Ala Ala Ile Arg Asp Gly Lys Ile Asp Leu Tyr Gln Cys
                    515                 520                 525
Val Val Pro Thr Thr Trp Asn Ala Ser Pro Arg Asp Pro Lys Gly Gln
                    530                 535                 540
Ile Gly Ala Tyr Glu Ala Ala Leu Met Asn Thr Lys Met Ala Ile Pro
545                 550                 555                 560
Glu Gln Pro Leu Glu Ile Leu Arg Thr Leu His Ser Phe Asp Pro Cys
                    565                 570                 575
Leu Ala Cys Ser Thr His Val Leu Gly Asp Asp Gly Ser Glu Leu Ile
                    580                 585                 590
Ser Val Gln Val Arg
                    595
```

```
<210> SEQ ID NO 38
<211> LENGTH: 372
<212> TYPE: PRT
<213> ORGANISM: Escherichia coli

<400> SEQUENCE: 38

Met Asn Asn Glu Glu Thr Phe Tyr Gln Ala Met Arg Arg Gln Gly Val
1               5                   10                  15

Thr Arg Arg Ser Phe Leu Lys Tyr Cys Ser Leu Ala Ala Thr Ser Leu
            20                  25                  30

Gly Leu Gly Ala Gly Met Ala Pro Lys Ile Ala Trp Ala Leu Glu Asn
        35                  40                  45

Lys Pro Arg Ile Pro Val Val Trp Ile His Gly Leu Glu Cys Thr Cys
50                  55                  60

Cys Thr Glu Ser Phe Ile Arg Ser Ala His Pro Leu Ala Lys Asp Val
65                  70                  75                  80

Ile Leu Ser Leu Ile Ser Leu Asp Tyr Asp Asp Thr Leu Met Ala Ala
                85                  90                  95

Ala Gly Thr Gln Ala Glu Glu Val Phe Glu Asp Ile Ile Thr Gln Tyr
            100                 105                 110

Asn Gly Lys Tyr Ile Leu Ala Val Glu Gly Asn Pro Pro Leu Gly Glu
        115                 120                 125

Gln Gly Met Phe Cys Ile Ser Ser Gly Arg Pro Phe Ile Glu Lys Leu
130                 135                 140

Lys Arg Ala Ala Ala Gly Ala Ser Ala Ile Ile Ala Trp Gly Thr Cys
145                 150                 155                 160

Ala Ser Trp Gly Cys Val Gln Ala Ala Arg Pro Asn Pro Thr Gln Ala
                165                 170                 175

Thr Ser Ile Asp Lys Val Ile Thr Asp Lys Pro Ile Ile Lys Val Pro
            180                 185                 190

Gly Cys Pro Pro Ile Pro Asp Val Met Ser Ala Ile Ile Thr Tyr Met
        195                 200                 205

Val Thr Phe Asp Arg Leu Pro Asp Val Asp Arg Met Gly Arg Pro Leu
210                 215                 220

Met Phe Tyr Gly Gln Arg Ile His Asp Lys Cys Tyr Arg Arg Ala His
225                 230                 235                 240

Phe Asp Ala Gly Glu Phe Val Gln Ser Trp Asp Asp Ala Ala Arg
                245                 250                 255

Lys Gly Tyr Cys Leu Tyr Lys Met Gly Cys Lys Gly Pro Thr Thr Tyr
            260                 265                 270

Asn Ala Cys Ser Ser Thr Arg Trp Asn Asp Gly Val Ser Phe Pro Ile
        275                 280                 285

Gln Ser Gly His Gly Cys Leu Gly Cys Ala Glu Asn Gly Phe Trp Asp
290                 295                 300

Arg Gly Ser Phe Tyr Ser Arg Val Val Asp Ile Pro Gln Met Gly Thr
305                 310                 315                 320

His Ser Thr Ala Asp Thr Val Gly Leu Thr Ala Leu Gly Val Val Ala
                325                 330                 335

Ala Ala Val Gly Val His Ala Val Ala Ser Ala Val Asp Gln Arg Arg
            340                 345                 350

Arg His Asn Gln Gln Pro Thr Glu Thr Glu His Gln Pro Gly Asn Glu
        355                 360                 365

Asp Lys Gln Ala
```

370

<210> SEQ ID NO 39
<211> LENGTH: 567
<212> TYPE: PRT
<213> ORGANISM: Escherichia coli

<400> SEQUENCE: 39

Met Ser Gln Arg Ile Thr Ile Asp Pro Val Thr Arg Ile Glu Gly His
1               5                   10                  15

Leu Arg Ile Asp Cys Glu Ile Glu Asn Gly Val Val Ser Lys Ala Trp
            20                  25                  30

Ala Ser Gly Thr Met Trp Arg Gly Met Glu Glu Ile Val Lys Asn Arg
        35                  40                  45

Asp Pro Arg Asp Ala Trp Met Ile Val Gln Arg Ile Cys Gly Val Cys
    50                  55                  60

Thr Thr Thr His Ala Leu Ser Ser Val Arg Ala Ala Glu Ser Ala Leu
65                  70                  75                  80

Asn Ile Asp Val Pro Val Asn Ala Gln Tyr Ile Arg Asn Ile Ile Leu
                85                  90                  95

Ala Ala His Thr His Asp His Ile Val His Phe Tyr Gln Leu Ser
            100                 105                 110

Ala Leu Asp Trp Val Asp Ile Thr Ser Ala Leu Gln Ala Asp Pro Thr
        115                 120                 125

Lys Ala Ser Glu Met Leu Lys Gly Val Ser Thr Trp His Leu Asn Ser
    130                 135                 140

Pro Glu Glu Phe Thr Lys Val Gln Asn Lys Ile Lys Asp Leu Val Ala
145                 150                 155                 160

Ser Gly Gln Leu Gly Ile Phe Ala Asn Gly Tyr Trp Gly His Pro Ala
                165                 170                 175

Met Lys Leu Pro Pro Glu Val Asn Leu Ile Ala Val Ala His Tyr Leu
            180                 185                 190

Gln Ala Leu Glu Cys Gln Arg Asp Ala Asn Arg Val Val Ala Leu Leu
        195                 200                 205

Gly Gly Lys Thr Pro His Ile Gln Asn Leu Ala Val Gly Gly Val Ala
    210                 215                 220

Asn Pro Ile Asn Leu Asp Gly Leu Gly Val Leu Asn Leu Glu Arg Leu
225                 230                 235                 240

Met Tyr Ile Lys Ser Phe Ile Asp Lys Leu Ser Asp Phe Val Glu Gln
                245                 250                 255

Val Tyr Lys Val Asp Thr Ala Val Ile Ala Ala Phe Tyr Pro Glu Trp
            260                 265                 270

Leu Thr Arg Gly Lys Gly Ala Val Asn Tyr Leu Ser Val Pro Glu Phe
        275                 280                 285

Pro Thr Asp Ser Lys Asn Gly Ser Phe Leu Phe Pro Gly Gly Tyr Ile
    290                 295                 300

Glu Asn Ala Asp Leu Ser Ser Tyr Arg Pro Ile Thr Ser His Ser Asp
305                 310                 315                 320

Glu Tyr Leu Ile Lys Gly Ile Gln Glu Ser Ala Lys His Ser Trp Tyr
                325                 330                 335

Lys Asp Glu Ala Pro Gln Ala Pro Trp Glu Gly Thr Thr Ile Pro Ala
            340                 345                 350

Tyr Asp Gly Trp Ser Asp Gly Lys Tyr Ser Trp Val Lys Ser Pro
        355                 360                 365

-continued

```
Thr Phe Tyr Gly Lys Thr Val Glu Val Gly Pro Leu Ala Asn Met Leu
    370                 375                 380

Val Lys Leu Ala Ala Gly Arg Glu Ser Thr Gln Asn Lys Leu Asn Glu
385                 390                 395                 400

Ile Val Ala Ile Tyr Gln Lys Leu Thr Gly Asn Thr Leu Glu Val Ala
                405                 410                 415

Gln Leu His Ser Thr Leu Gly Arg Ile Ile Gly Arg Thr Val His Cys
            420                 425                 430

Cys Glu Leu Gln Asp Ile Leu Gln Asn Gln Tyr Ser Ala Leu Ile Thr
        435                 440                 445

Asn Ile Gly Lys Gly Asp His Thr Thr Phe Val Lys Pro Asn Ile Pro
450                 455                 460

Ala Thr Gly Glu Phe Lys Gly Val Gly Phe Leu Glu Ala Pro Arg Gly
465                 470                 475                 480

Met Leu Ser His Trp Met Val Ile Lys Asp Gly Ile Ile Ser Asn Tyr
                485                 490                 495

Gln Ala Val Val Pro Ser Thr Trp Asn Ser Gly Pro Arg Asn Phe Asn
            500                 505                 510

Asp Asp Val Gly Pro Tyr Glu Gln Ser Leu Val Gly Thr Pro Val Ala
        515                 520                 525

Asp Pro Asn Lys Pro Leu Glu Val Val Arg Thr Ile His Ser Phe Asp
530                 535                 540

Pro Cys Met Ala Cys Ala Val His Val Val Asp Ala Asp Gly Asn Glu
545                 550                 555                 560

Val Val Ser Val Lys Val Leu
                565
```

<210> SEQ ID NO 40
<211> LENGTH: 328
<212> TYPE: PRT
<213> ORGANISM: Escherichia coli

<400> SEQUENCE: 40

```
Met Asn Arg Arg Asn Phe Ile Lys Ala Ala Ser Cys Gly Ala Leu Leu
1               5                   10                  15

Thr Gly Ala Leu Pro Ser Val Ser His Ala Ala Glu Asn Arg Pro
            20                  25                  30

Pro Ile Pro Gly Ser Leu Gly Met Leu Tyr Asp Ser Thr Leu Cys Val
        35                  40                  45

Gly Cys Gln Ala Cys Val Thr Lys Cys Gln Asp Ile Asn Phe Pro Glu
    50                  55                  60

Arg Asn Pro Gln Gly Glu Gln Thr Trp Ser Asn Asn Asp Lys Leu Ser
65                  70                  75                  80

Pro Tyr Thr Asn Asn Ile Ile Gln Val Trp Thr Ser Gly Thr Gly Val
                85                  90                  95

Asn Lys Asp Gln Glu Glu Asn Gly Tyr Ala Tyr Ile Lys Lys Gln Cys
            100                 105                 110

Met His Cys Val Asp Pro Asn Cys Val Ser Val Cys Pro Val Ser Ala
        115                 120                 125

Leu Lys Lys Asp Pro Lys Thr Gly Ile Val His Tyr Asp Lys Asp Val
    130                 135                 140

Cys Thr Gly Cys Arg Tyr Cys Met Val Ala Cys Pro Tyr Asn Val Pro
145                 150                 155                 160

Lys Tyr Asp Tyr Asn Asn Pro Phe Gly Ala Leu His Lys Cys Glu Leu
                165                 170                 175
```

-continued

```
Cys Asn Gln Lys Gly Val Glu Arg Leu Asp Lys Gly Leu Pro Gly
                180                 185                 190

Cys Val Glu Val Cys Pro Ala Gly Ala Val Ile Phe Gly Thr Arg Glu
            195                 200                 205

Glu Leu Met Ala Glu Ala Lys Lys Arg Leu Ala Leu Lys Pro Gly Ser
210                 215                 220

Glu Tyr His Tyr Pro Arg Gln Thr Leu Lys Ser Gly Asp Thr Tyr Leu
225                 230                 235                 240

His Thr Val Pro Lys Tyr Tyr Pro His Leu Tyr Gly Glu Lys Glu Gly
                245                 250                 255

Gly Gly Thr Gln Val Leu Val Leu Thr Gly Val Pro Tyr Glu Asn Leu
            260                 265                 270

Asp Leu Pro Lys Leu Asp Leu Ser Thr Gly Ala Arg Ser Glu Asn
        275                 280                 285

Ile Gln His Thr Leu Tyr Lys Gly Met Met Leu Pro Leu Ala Val Leu
    290                 295                 300

Ala Gly Leu Thr Val Leu Val Arg Arg Asn Thr Lys Asn Asp His His
305                 310                 315                 320

Asp Gly Gly Asp Asp His Glu Ser
                325

<210> SEQ ID NO 41
<211> LENGTH: 633
<212> TYPE: PRT
<213> ORGANISM: Aquifex aeolicus

<400> SEQUENCE: 41

Met Lys Arg Val Val Val Asp Pro Val Thr Arg Ile Glu Gly His Leu
1               5                   10                  15

Arg Ile Glu Ile Met Val Asp Glu Glu Thr Gly Gln Val Lys Asp Ala
                20                  25                  30

Leu Ser Ala Gly Thr Met Trp Arg Gly Ile Glu Leu Ile Val Arg Asn
            35                  40                  45

Arg Asp Pro Arg Asp Val Trp Ala Phe Thr Gln Arg Ile Cys Gly Val
        50                  55                  60

Cys Thr Ser Ile His Ala Leu Ala Ser Leu Arg Ala Val Glu Asp Ala
65                  70                  75                  80

Leu Glu Ile Thr Ile Pro Lys Asn Ala Asn Tyr Ile Arg Asn Ile Met
                85                  90                  95

Tyr Gly Ser Leu Gln Val His Asp His Val His Phe Tyr His Leu
            100                 105                 110

His Ala Leu Asp Trp Val Ser Pro Val Glu Ala Leu Lys Ala Asp Pro
        115                 120                 125

Val Ala Thr Ala Ala Leu Ala Asn Lys Ile Leu Glu Lys Tyr Gly Val
    130                 135                 140

Leu Asn Glu Phe Met Pro Asp Phe Leu Gly His Arg Ala Tyr Pro Lys
145                 150                 155                 160

Lys Phe Pro Lys Ala Thr Pro Gly Tyr Phe Arg Glu Phe Gln Lys Lys
                165                 170                 175

Ile Lys Lys Leu Val Glu Ser Gly Gln Leu Gly Ile Phe Ala Ala His
            180                 185                 190

Trp Trp Asp His Pro Asp Tyr Gln Met Leu Pro Pro Glu Val His Leu
        195                 200                 205

Ile Gly Ile Ala His Tyr Leu Asn Met Leu Asp Val Gln Arg Glu Leu
```

```
            210                 215                 220
Phe Ile Pro Gln Val Val Phe Gly Gly Lys Asn Pro His Pro His Tyr
225                 230                 235                 240

Ile Val Gly Gly Val Asn Cys Ser Ile Ser Met Asp Asp Met Asn Ala
                245                 250                 255

Pro Val Asn Ala Glu Arg Leu Ala Val Val Glu Asp Ala Ile Tyr Thr
                260                 265                 270

Gln Val Glu Ser Thr Asp Phe Phe Tyr Ile Pro Asp Ile Leu Ala Ile
            275                 280                 285

Ala Asp Ile Tyr Leu Asn Gln His Asn Trp Phe Tyr Gly Gly Gly Leu
        290                 295                 300

Ser Lys Lys Arg Val Ile Gly Tyr Gly Asp Tyr Pro Asp Glu Pro Tyr
305                 310                 315                 320

Thr Gly Ile Lys Asn Gly Asp Tyr His Lys Ile Leu Trp His Ser
                325                 330                 335

Asn Gly Val Val Glu Asp Phe Tyr Lys Gly Val Glu Lys Ala Lys Phe
                340                 345                 350

Tyr Asn Leu Glu Gly Lys Asp Phe Thr Asp Pro Glu Gln Ile Gln Glu
            355                 360                 365

Phe Val Thr His Ser Trp Tyr Lys Tyr Pro Asp Glu Thr Lys Gly Leu
        370                 375                 380

His Pro Trp Asp Gly Ile Thr Glu Pro Asn Tyr Thr Gly Pro Lys Glu
385                 390                 395                 400

Gly Thr Lys Thr His Trp Lys Tyr Leu Asp Glu Asn Gly Lys Tyr Ser
                405                 410                 415

Trp Ile Lys Ala Pro Arg Trp Arg Gly Lys Ala Cys Glu Val Gly Pro
                420                 425                 430

Leu Ala Arg Tyr Ile Ile Val Tyr Thr Lys Val Lys Gln Gly His Ile
            435                 440                 445

Lys Pro Thr Trp Val Asp Glu Leu Ile Val Asn Gln Ile Asp Thr Val
        450                 455                 460

Ser Lys Ile Leu Asn Leu Pro Pro Glu Lys Trp Leu Pro Thr Thr Val
465                 470                 475                 480

Gly Arg Thr Ile Ala Arg Ala Leu Glu Ala Gln Met Ser Ala His Thr
                485                 490                 495

Asn Leu Tyr Trp Met Lys Lys Leu Tyr Asp Asn Ile Lys Ala Gly Asp
            500                 505                 510

Thr Ser Val Ala Asn Met Glu Lys Trp Asp Pro Ser Thr Trp Pro Lys
        515                 520                 525

Glu Ala Lys Gly Val Gly Leu Thr Glu Ala Pro Arg Gly Ala Leu Gly
530                 535                 540

His Trp Val Ile Ile Lys Asp Gly Lys Val Ala Asn Tyr Gln Cys Val
545                 550                 555                 560

Val Pro Thr Thr Trp Asn Gly Ser Pro Lys Asp Pro Lys Gly Gln His
                565                 570                 575

Gly Ala Phe Glu Glu Ser Met Ile Asp Thr Lys Val Lys Val Pro Glu
            580                 585                 590

Lys Pro Leu Glu Val Leu Arg Gly Ile His Ser Phe Asp Pro Cys Leu
        595                 600                 605

Ala Cys Ser Thr His Leu Tyr Asn Glu Lys Gly Glu Glu Ile Ala Ser
        610                 615                 620

Val Arg Val Gln Gly Val Val His Val
625                 630
```

```
<210> SEQ ID NO 42
<211> LENGTH: 353
<212> TYPE: PRT
<213> ORGANISM: Aquifex aeolicus

<400> SEQUENCE: 42

Met Glu Thr Phe Trp Glu Val Phe Lys Arg His Gly Val Ser Arg Arg
1               5                   10                  15

Asp Phe Leu Lys Phe Ala Thr Thr Ile Thr Gly Leu Met Gly Leu Ala
                20                  25                  30

Pro Ser Met Val Pro Glu Val Val Arg Ala Met Glu Thr Lys Pro Arg
            35                  40                  45

Val Pro Val Leu Trp Ile His Gly Leu Glu Cys Thr Cys Cys Ser Glu
        50                  55                  60

Ser Phe Ile Arg Ser Ala Thr Pro Leu Ala Ser Asp Val Val Leu Ser
65                  70                  75                  80

Met Ile Ser Leu Glu Tyr Asp Asp Thr Leu Ser Ala Ala Ala Gly Glu
                85                  90                  95

Ala Val Glu Lys His Arg Glu Arg Ile Ile Lys Glu Tyr Trp Gly Asn
            100                 105                 110

Tyr Ile Leu Ala Val Glu Gly Asn Pro Pro Leu Gly Glu Asp Gly Met
        115                 120                 125

Tyr Cys Ile Ile Gly Gly Arg Pro Phe Val Glu Ile Leu Lys Glu Ser
    130                 135                 140

Ala Glu Gly Ala Lys Ala Val Ile Ala Trp Gly Ser Cys Ala Ser Trp
145                 150                 155                 160

Gly Cys Val Gln Ala Ala Lys Pro Asn Pro Thr Thr Ala Val Pro Ile
                165                 170                 175

Asp Lys Val Ile Lys Asp Lys Pro Ile Ile Lys Val Pro Gly Cys Pro
            180                 185                 190

Pro Ile Ala Glu Val Met Thr Gly Val Ile Met Tyr Met Val Leu Phe
        195                 200                 205

Asp Arg Ile Pro Pro Leu Asp Ser Gln Gly Arg Pro Lys Met Phe Tyr
    210                 215                 220

Gly Asn Arg Ile His Asp Thr Cys Tyr Arg Arg Ser Phe Phe Asn Ala
225                 230                 235                 240

Gly Gln Phe Val Glu Gln Phe Asp Asp Glu Gly Ala Lys Lys Gly Trp
                245                 250                 255

Cys Leu Tyr Lys Val Gly Cys Arg Gly Pro Thr Thr Tyr Asn Ser Cys
            260                 265                 270

Gly Asn Met Arg Trp Tyr Asn Gly Leu Ser Tyr Pro Ile Gln Ser Gly
        275                 280                 285

His Gly Cys Ile Gly Cys Ala Glu Asn Asn Phe Trp Asp Asn Gly Pro
    290                 295                 300

Phe Tyr Glu Arg Ile Gly Gly Ile Pro Val Pro Gly Ile Glu Ser Lys
305                 310                 315                 320

Ala Asp Lys Val Gly Ala Ile Ala Ala Ala Ala Gly Gly Ala
                325                 330                 335

Ile Ile His Gly Ile Ala Ser Lys Ile Arg Lys Ser Gly Glu Lys Glu
            340                 345                 350

Glu

<210> SEQ ID NO 43
```

<211> LENGTH: 611
<212> TYPE: PRT
<213> ORGANISM: Hydrogenovibrio marinus

<400> SEQUENCE: 43

```
Met Ser Val Leu Asn Thr Pro Asn His Tyr Lys Met Asp Asn Ser Gly
1               5                   10                  15

Arg Arg Val Val Ile Asp Pro Val Thr Arg Ile Glu Gly His Met Arg
            20                  25                  30

Cys Glu Val Asn Val Asp Glu Asn Val Ile Gln Asn Ala Val Ser
        35                  40                  45

Thr Gly Thr Met Trp Arg Gly Leu Glu Val Ile Leu Arg Gly Arg Asp
    50                  55                  60

Pro Arg Asp Ala Trp Ala Phe Val Glu Arg Ile Cys Gly Val Cys Thr
65                  70                  75                  80

Gly Cys His Ala Leu Ala Ser Val Arg Ala Val Glu Asp Ala Leu Asp
                85                  90                  95

Ile Lys Ile Pro His Asn Ala Thr Leu Ile Arg Glu Ile Met Ala Lys
            100                 105                 110

Thr Leu Gln Ile His Asp His Ile Val His Phe Tyr His Leu His Ala
        115                 120                 125

Leu Asp Trp Val Asn Pro Val Asn Ala Leu Lys Ala Asp Pro Gln Ala
    130                 135                 140

Thr Ser Glu Leu Gln Lys Leu Val Ser Pro His Pro Met Ser Ser
145                 150                 155                 160

Pro Gly Tyr Phe Lys Asp Ile Gln Ile Arg Ile Gln Lys Phe Val Asp
                165                 170                 175

Ser Gly Gln Leu Gly Ile Phe Lys Asn Gly Tyr Trp Ser Asn Pro Ala
            180                 185                 190

Tyr Lys Leu Ser Pro Glu Ala Asp Leu Met Ala Val Thr His Tyr Leu
        195                 200                 205

Glu Ala Leu Asp Phe Gln Lys Glu Ile Val Lys Ile His Ala Ile Phe
    210                 215                 220

Gly Gly Lys Asn Pro His Pro Asn Tyr Met Val Gly Gly Val Pro Cys
225                 230                 235                 240

Ala Ile Asn Ile Asp Gly Asp Met Ala Ala Gly Ala Pro Ile Asn Met
                245                 250                 255

Glu Arg Leu Asn Phe Val Lys Ser Leu Ile Glu Gln Gly Arg Thr Phe
            260                 265                 270

Asn Thr Asn Val Tyr Val Pro Asp Val Ile Ala Ile Ala Ala Phe Tyr
        275                 280                 285

Arg Asp Trp Leu Tyr Gly Gly Leu Ser Ala Thr Asn Val Met Asp
    290                 295                 300

Tyr Gly Ala Tyr Pro Lys Thr Pro Tyr Asp Lys Ser Thr Asp Gln Leu
305                 310                 315                 320

Pro Gly Gly Ala Ile Ile Asn Gly Asp Trp Lys Ile His Pro Val
                325                 330                 335

Asp Pro Arg Asp Pro Glu Gln Val Gln Glu Phe Val Thr His Ser Trp
            340                 345                 350

Tyr Lys Tyr Pro Asp Glu Thr Lys Gly Leu His Pro Trp Asp Gly Ile
        355                 360                 365

Thr Glu Pro Asn Tyr Glu Leu Gly Ser Lys Thr Lys Gly Ser Arg Thr
    370                 375                 380

Asn Ile Ile Glu Ile Asp Glu Ser Ala Lys Tyr Ser Trp Ile Lys Ser
```

```
                385                 390                 395                 400
Pro Arg Trp Arg Gly His Ala Val Glu Val Gly Pro Leu Ala Arg Tyr
                    405                 410                 415

Ile Leu Ala Tyr Ala Gln Gly Val Glu Tyr Val Lys Thr Gln Val His
                420                 425                 430

Thr Ser Leu Asn Arg Phe Asn Ala Val Cys Arg Leu Leu Asp Pro Asn
            435                 440                 445

His Lys Asp Ile Thr Asp Leu Lys Ala Phe Leu Gly Ser Thr Ile Gly
        450                 455                 460

Arg Thr Leu Ala Arg Ala Leu Glu Ser Glu Tyr Cys Gly Asp Met Met
465                 470                 475                 480

Leu Asp Asp Phe Asn Gln Leu Ile Ser Asn Ile Lys Asn Gly Asp Ser
                485                 490                 495

Ser Thr Ala Asn Thr Asp Lys Trp Asp Pro Ser Ser Trp Pro Glu His
                500                 505                 510

Ala Lys Gly Val Gly Thr Val Ala Ala Pro Arg Gly Ala Leu Ala His
            515                 520                 525

Trp Ile Val Ile Glu Lys Gly Lys Ile Lys Asn Tyr Gln Cys Val Val
    530                 535                 540

Pro Thr Thr Trp Asn Gly Ser Pro Arg Asp Pro Lys Gly Asn Ile Gly
545                 550                 555                 560

Ala Phe Glu Ala Ser Leu Met Gly Thr Pro Met Glu Arg Pro Asp Glu
                565                 570                 575

Pro Val Glu Val Leu Arg Thr Leu His Ser Phe Asp Pro Cys Leu Ala
                580                 585                 590

Cys Ser Thr His Val Met Ser Glu Glu Gly Glu Met Ala Thr Val
            595                 600                 605

Lys Val Arg
    610

<210> SEQ ID NO 44
<211> LENGTH: 361
<212> TYPE: PRT
<213> ORGANISM: Hydrogenovibrio marinus

<400> SEQUENCE: 44

Met Ser Ser Gln Val Glu Thr Phe Tyr Glu Val Met Arg Arg Gln Gly
1               5                   10                  15

Ile Thr Arg Arg Ser Phe Leu Lys Tyr Cys Ser Leu Thr Ala Ala Ala
                20                  25                  30

Leu Gly Leu Ser Pro Ala Tyr Ala Asn Lys Ile Ala His Ala Met Glu
            35                  40                  45

Thr Lys Pro Arg Thr Pro Val Ile Trp Leu His Gly Leu Glu Cys Thr
        50                  55                  60

Cys Cys Ser Glu Ser Phe Ile Arg Ser Ala His Pro Leu Ala Lys Asp
65                  70                  75                  80

Val Val Leu Ser Met Ile Ser Leu Asp Tyr Asp Asp Thr Leu Met Ala
                85                  90                  95

Ala Ser Gly His Ala Ala Glu Ala Ile Leu Asp Glu Ile Lys Glu Lys
            100                 105                 110

Tyr Lys Gly Asn Tyr Ile Leu Ala Val Glu Gly Asn Pro Pro Leu Asn
        115                 120                 125

Gln Asp Gly Met Ser Cys Ile Ile Gly Gly Arg Pro Phe Ser Glu Gln
    130                 135                 140
```

```
Leu Lys Arg Met Ala Asp Asp Ala Lys Ala Ile Ile Ser Trp Gly Ser
145                 150                 155                 160

Cys Ala Ser Trp Gly Cys Val Gln Ala Ala Lys Pro Asn Pro Thr Gln
            165                 170                 175

Ala Thr Pro Val His Lys Phe Leu Gly Gly Tyr Asp Lys Pro Ile
        180                 185                 190

Ile Lys Val Pro Gly Cys Pro Pro Ile Ala Glu Val Met Thr Gly Val
        195                 200                 205

Ile Thr Tyr Met Leu Thr Phe Asp Arg Ile Pro Glu Leu Asp Arg Gln
        210                 215                 220

Gly Arg Pro Lys Met Phe Tyr Ser Gln Arg Ile His Asp Lys Cys Tyr
225                 230                 235                 240

Arg Arg Pro His Phe Asp Ala Gly Gln Phe Val Glu Glu Trp Asp Asp
            245                 250                 255

Glu Gly Ala Arg Lys Gly Tyr Cys Leu Tyr Lys Val Gly Cys Lys Gly
            260                 265                 270

Pro Thr Thr Tyr Asn Ala Cys Ser Thr Val Arg Trp Asn Gly Gly Thr
            275                 280                 285

Ser Phe Pro Ile Gln Ser Gly His Gly Cys Ile Gly Cys Ser Glu Asp
290                 295                 300

Gly Phe Trp Asp Lys Gly Ser Phe Tyr Ser Arg Asp Thr Glu Met Asn
305                 310                 315                 320

Ala Phe Gly Ile Glu Ala Thr Ala Asp Asp Ile Gly Lys Thr Ala Ile
                325                 330                 335

Gly Val Val Gly Ala Ala Val Val Ala His Ala Ala Ile Ser Ala Val
            340                 345                 350

Lys Ala Ala Gln Lys Lys Gly Asp Lys
            355                 360

<210> SEQ ID NO 45
<211> LENGTH: 596
<212> TYPE: PRT
<213> ORGANISM: Thiocapsa roseopersicina

<400> SEQUENCE: 45

Met Ser Val Thr Thr Ala Asn Gly Phe Glu Leu Asp Thr Ala Gly Arg
1               5                   10                  15

Arg Leu Val Val Asp Pro Val Thr Arg Ile Glu Gly His Leu Arg Cys
            20                  25                  30

Glu Val Asn Leu Asp Glu Asn Val Ile Arg Asn Ala Val Ser Thr
            35                  40                  45

Gly Thr Met Trp Arg Gly Leu Glu Val Ile Leu Arg Gly Arg Asp Pro
50                  55                  60

Arg Asp Ala Trp Ala Phe Thr Glu Arg Ile Cys Gly Val Cys Thr Gly
65                  70                  75                  80

Thr His Ala Leu Thr Ser Val Arg Ala Val Glu Asp Ala Leu Gly Ile
                85                  90                  95

Pro Ile Pro Glu Asn Ala Asn Ser Ile Arg Asn Ile Met His Val Thr
            100                 105                 110

Leu Gln Ala His Asp His Leu Val His Phe Tyr His Leu His Ala Leu
            115                 120                 125

Asp Trp Val Asp Val Val Ser Ala Leu Gly Ala Asp Pro Lys Ala Thr
        130                 135                 140

Ser Ala Leu Ala Gln Ser Ile Ser Asp Trp Pro Lys Ser Pro Gly
145                 150                 155                 160
```

```
Tyr Phe Arg Asp Val Gln Asn Arg Leu Lys Arg Phe Val Glu Ser Gly
                165                 170                 175

Gln Leu Gly Pro Phe Met Asn Gly Tyr Trp Gly Ser Pro Ala Tyr Lys
            180                 185                 190

Leu Pro Pro Glu Ala Asn Leu Met Ala Val Thr His Tyr Leu Glu Ala
        195                 200                 205

Leu Asp Phe Gln Lys Glu Ile Val Lys Ile His Thr Val Tyr Gly Gly
    210                 215                 220

Lys Asn Pro His Pro Asn Trp Leu Val Gly Met Pro Cys Ala Ile
225                 230                 235                 240

Asn Val Asp Gly Thr Gly Ala Val Gly Ala Ile Asn Met Glu Arg Leu
                245                 250                 255

Asn Leu Val Ser Ser Ile Ile Asp Gln Thr Ile Ala Phe Ile Asp Lys
            260                 265                 270

Val Tyr Ile Pro Asp Leu Ile Ala Ile Ala Ser Phe Tyr Lys Asp Trp
        275                 280                 285

Thr Tyr Gly Gly Gly Leu Ser Ser Gln Ala Val Met Ser Tyr Gly Asp
    290                 295                 300

Ile Pro Asp His Ala Asn Asp Met Ser Ser Lys Asn Leu Leu Leu Pro
305                 310                 315                 320

Arg Gly Ala Ile Ile Asn Gly Asn Leu Asn Glu Ile His Glu Ile Asp
                325                 330                 335

Leu Arg Asn Pro Glu Glu Ile Gln Glu Phe Val Asp His Ser Trp Phe
            340                 345                 350

Ser Tyr Lys Asp Glu Thr Arg Gly Leu His Pro Trp Asp Gly Val Thr
        355                 360                 365

Glu Pro Asn Phe Val Leu Gly Pro Asn Ala Val Gly Ser Arg Thr Arg
    370                 375                 380

Ile Glu Ala Leu Asp Glu Gln Ala Lys Tyr Ser Trp Ile Lys Ala Pro
385                 390                 395                 400

Arg Trp Arg Gly His Ala Met Glu Val Gly Pro Leu Ala Arg Tyr Val
                405                 410                 415

Ile Gly Tyr Ala Lys Gly Ile Pro Glu Phe Lys Glu Pro Val Asp Lys
            420                 425                 430

Val Leu Thr Asp Leu Gly Gln Pro Leu Glu Ala Ile Phe Ser Thr Leu
        435                 440                 445

Gly Arg Thr Ala Ala Arg Gly Leu Glu Ala Ser Trp Ala Ala His Lys
    450                 455                 460

Met Arg Tyr Phe Gln Asp Lys Leu Val Ala Asn Ile Arg Ala Gly Asp
465                 470                 475                 480

Thr Ala Thr Ala Asn Val Asp Asn Trp Asp Pro Lys Thr Trp Pro Lys
                485                 490                 495

Glu Ala Arg Gly Val Gly Thr Thr Glu Ala Pro Arg Gly Ala Leu Gly
            500                 505                 510

His Trp Ile Val Ile Lys Asp Gly Lys Ile Asp Asn Tyr Gln Ala Val
        515                 520                 525

Val Pro Thr Thr Trp Asn Gly Ser Pro Arg Asp Pro Ala Gly Asn Ile
    530                 535                 540

Gly Ala Phe Glu Ala Ser Leu Leu Asn Thr Pro Leu Ala Lys Ala Asp
545                 550                 555                 560

Glu Pro Leu Glu Ile Leu Arg Thr Leu His Ser Phe Asp Pro Cys Leu
                565                 570                 575
```

```
Ala Cys Ala Thr His Ile Met Gly Pro Asp Gly Glu Glu Leu Thr Arg
            580                 585                 590

Ile Lys Val Arg
        595

<210> SEQ ID NO 46
<211> LENGTH: 360
<212> TYPE: PRT
<213> ORGANISM: Thiocapsa roseopersicina

<400> SEQUENCE: 46

Met Pro Thr Thr Glu Thr Tyr Tyr Glu Val Met Arg Arg Gln Gly Ile
1               5                   10                  15

Thr Arg Arg Ser Phe Leu Lys Phe Cys Ser Leu Thr Ala Thr Ala Leu
            20                  25                  30

Gly Leu Ser Pro Thr Phe Ala Gly Lys Ile Ala His Ala Met Glu Thr
        35                  40                  45

Lys Pro Arg Ile Pro Val Val Trp Leu His Gly Leu Glu Cys Thr Cys
50                  55                  60

Cys Ser Glu Ser Phe Ile Arg Ser Ala His Pro Leu Val Ser Asp Val
65                  70                  75                  80

Ile Leu Ser Met Ile Ser Leu Asp Tyr Thr Ile Leu Ile Met Ala Ala
                85                  90                  95

Ala Gly His Gln Ala Glu Ala Ile Leu Glu Glu Val Arg His Lys His
            100                 105                 110

Ala Gly Asn Tyr Ile Leu Ala Val Glu Gly Asn Pro Pro Leu Asn Gln
        115                 120                 125

Asp Gly Met Ser Cys Ile Ile Gly Gly Arg Pro Phe Leu Glu Gln Leu
130                 135                 140

Leu Glu Met Ala Asp Ser Cys Lys Ala Val Ile Ser Trp Gly Ser Cys
145                 150                 155                 160

Ala Ser Trp Gly Cys Val Gln Ala Ala Arg Pro Asn Pro Thr Arg Ala
                165                 170                 175

Thr Pro Val His Glu Val Ile Arg Asp Lys Pro Val Ile Lys Val Pro
            180                 185                 190

Gly Cys Pro Pro Ile Ala Glu Val Met Thr Gly Val Leu Thr Tyr Ile
        195                 200                 205

Leu Thr Phe Asp Arg Leu Pro Glu Leu Asp Arg Gln Gly Arg Pro Leu
210                 215                 220

Met Phe Tyr Gly Gln Arg Ile His Asp Lys Cys Tyr Arg Arg Pro His
225                 230                 235                 240

Phe Asp Ala Gly Gln Phe Val Glu Ser Trp Asp Asp Glu Gly Ala Arg
                245                 250                 255

Arg Gly Tyr Cys Leu Tyr Lys Val Gly Cys Lys Gly Pro Thr Thr Tyr
            260                 265                 270

Asn Ala Cys Ser Thr Ile Arg Trp Asn Gly Gly Val Ser Phe Pro Ile
        275                 280                 285

Gln Ser Gly His Gly Cys Ile Gly Cys Ser Glu Asp Gly Phe Trp Asp
290                 295                 300

Lys Gly Ser Phe Tyr Gln His Val Thr Asp Thr His Ala Phe Gly Ile
305                 310                 315                 320

Glu Ala Asn Ala Asp Arg Thr Gly Ile Ala Val Ala Thr Arg Arg Gly
                325                 330                 335

Ala Ala His Arg Ala His Ala Ala Val Ser Val Val Lys Arg Val Gln
            340                 345                 350
```

```
Gln Lys Lys Glu Glu Asp Gln Ser
        355                 360

<210> SEQ ID NO 47
<211> LENGTH: 332
<212> TYPE: PRT
<213> ORGANISM: Alteromonas macleodii

<400> SEQUENCE: 47

Met Ala Leu Pro Thr Leu Asn Lys Gln Leu Gln Ala Ser Gly Ile Ser
1               5                   10                  15

Arg Arg Thr Phe Leu Lys Phe Cys Ala Thr Thr Ala Ser Leu Leu Ala
            20                  25                  30

Leu Pro Gln Ser Ala Val Ala Asp Leu Ala Thr Ala Leu Gly Asn Ala
        35                  40                  45

Arg Arg Pro Ser Val Ile Trp Leu Pro Phe Gln Glu Cys Thr Gly Cys
    50                  55                  60

Thr Glu Ala Ile Leu Arg Ser His Ala Pro Thr Leu Glu Ser Leu Ile
65                  70                  75                  80

Phe Asp His Ile Ser Leu Asp Tyr Gln His Thr Ile Met Ala Ala Ala
                85                  90                  95

Gly Glu Gln Ala Glu Asp Ala Arg Arg Ala Ala Met Asn Ala His Lys
            100                 105                 110

Gly Gln Tyr Leu Leu Leu Val Asp Gly Ser Val Pro Val Gly Asn Pro
        115                 120                 125

Gly Tyr Ser Thr Ile Ser Gly Met Ser Asn Val Asp Met Leu Arg Glu
    130                 135                 140

Ser Ala Lys Asp Ala Ala Gly Ile Ile Ala Ile Gly Thr Cys Ala Ser
145                 150                 155                 160

Phe Gly Gly Ile Pro Lys Ala Asn Pro Asn Pro Thr Gly Ala Val Ala
                165                 170                 175

Val Ser Asp Ile Ile Thr Asp Lys Pro Ile Val Asn Ile Ser Gly Cys
            180                 185                 190

Pro Pro Leu Pro Ile Ala Ile Thr Ala Val Leu Val His Tyr Leu Thr
        195                 200                 205

Phe Lys Arg Phe Pro Asp Leu Asp Glu Leu Gln Arg Pro Leu Ala Phe
    210                 215                 220

Phe Gly Glu Ser Ile His Asp Arg Cys Tyr Arg Arg Pro Phe Phe Glu
225                 230                 235                 240

Gln Arg Lys Phe Ala Lys Ser Phe Asp Asp Glu Gly Ala Lys Asn Gly
                245                 250                 255

Trp Cys Leu Phe Glu Leu Gly Cys Lys Gly Pro Glu Thr Phe Asn Ala
            260                 265                 270

Cys Ala Thr Val Lys Trp Asn Gln Gly Thr Ser Phe Pro Ile Glu Ser
        275                 280                 285

Gly His Pro Cys Leu Gly Cys Ser Glu Pro Asp Phe Trp Asp Lys Ser
    290                 295                 300

Ser Phe Tyr Gln Ala Leu Gly Pro Trp Glu Trp Tyr Lys Ser Lys Pro
305                 310                 315                 320

Gly Lys Gly Ala Gln Lys His Ala Gly Lys Asn Ser
                325                 330

<210> SEQ ID NO 48
<211> LENGTH: 625
<212> TYPE: PRT
```

-continued

<213> ORGANISM: Alteromonas macleodii

<400> SEQUENCE: 48

```
Met Glu Asn Thr Ala Ser Asn Asn Arg Leu Val Val Asp Pro Ile Thr
1               5                  10                  15

Arg Ile Glu Gly His Leu Arg Ile Glu Ala Glu Met Asp Gly Asn Thr
            20                  25                  30

Ile Lys Gln Ala Phe Ser Ser Gly Thr Ser Val Arg Gly Ile Glu Leu
        35                  40                  45

Ile Leu Gln Gly Arg Asp Pro Arg Asp Ala Trp Ala Phe Ala Gln Arg
    50                  55                  60

Ile Cys Gly Val Cys Thr Leu Val His Gly Met Ala Ser Val Arg Ala
65                  70                  75                  80

Val Glu Asp Ala Ile Arg Lys Ala Trp Arg Ser Asn Ala Lys Leu Gly
                85                  90                  95

Val Ala Ile Gly Lys Pro Ser Met Thr Ser Met Pro Lys Gly Pro Met
            100                 105                 110

Gln His Gly Lys Lys Gly His Arg Gln Ser Arg Thr Ser Ile Gly Val
        115                 120                 125

Leu Ser Glu Ala Glu Met Ala Ile Pro Gln Asn Ala Gln Leu Ile Arg
130                 135                 140

Asn Ile Met Ile Ala Thr Gln Tyr Val His Asp His Val Met His Phe
145                 150                 155                 160

Tyr His Leu His Ala Leu Asp Trp Val Asp Val Ser Ala Leu Asp
                165                 170                 175

Ala Asp Pro Thr Arg Thr Ala Thr Leu Ala Gly Gln Leu Ser Asp Tyr
            180                 185                 190

Pro Arg Ser Ser Pro Gly Tyr Phe Lys Asp Val Lys Gln Lys Val Lys
        195                 200                 205

Thr Leu Val Glu Ser Gly Gln Leu Gly Ile Phe Ser Asn Ala Tyr Trp
    210                 215                 220

Gly His Pro Gly Tyr Lys Leu Pro Pro Glu Val Asn Leu Met Ala Leu
225                 230                 235                 240

Ala His Tyr Leu Asp Ala Leu Thr Trp Gln Arg Glu Val Val Lys Val
                245                 250                 255

His Thr Ile Phe Gly Gly Lys Asn Pro His Pro Asn Phe Val Val Gly
            260                 265                 270

Gly Val Pro Ser Pro Ile Asn Leu Asn Ala Ser Thr Gly Ile Asn Thr
        275                 280                 285

Ser Arg Leu Val Gln Leu Gln Asp Ala Ile Thr Gln Met Lys Ser Phe
    290                 295                 300

Val Asp Gln Val Tyr Tyr Pro Asp Ile Val Ala Ile Ala Gly Tyr Tyr
305                 310                 315                 320

Lys Glu Trp Gly Thr Arg Gly Glu Gly Leu Gly Asn Phe Leu Thr Tyr
                325                 330                 335

Gly Asp Leu Pro Met Thr Ser Met Asp Asp Pro Asp Ser Phe Leu Phe
            340                 345                 350

Pro Arg Gly Ala Ile Leu Gly Arg Asp Leu Ser Lys Val His Asp Leu
        355                 360                 365

Asp Leu Asp Asp Pro Ser Glu Ile Gln Glu Phe Val Ser Ser Ser Trp
    370                 375                 380

Tyr Arg Tyr Ser Gly Gly Asn Ala Ser Gly Leu His Pro Phe Asn Gly
385                 390                 395                 400
```

```
Gln Thr Thr Leu Glu Tyr Thr Gly Pro Lys Pro Tyr Lys His Leu
                405                 410                 415

Asn Val Gly Ala Glu Tyr Ser Trp Leu Lys Ser Pro Arg Trp Lys Gly
                420                 425                 430

His Ala Met Glu Val Gly Pro Leu Ala Arg Val Leu Met Met Tyr Ala
                435                 440                 445

Lys Lys Asp Ala Ala Gln Asp Ile Val Asn Arg Ser Leu Ser Ile
                450                 455                 460

Leu Asp Leu Glu Thr Ser Ala Leu Phe Ser Thr Leu Gly Arg Thr Leu
465                 470                 475                 480

Ala Arg Ala Val Glu Thr Lys Ile Val Val Asn Gln Leu Gln Ser Trp
                485                 490                 495

Tyr Asp Gln Leu Leu Asp Asn Ile Ala Lys Gly Asp Thr Asp Thr Phe
                500                 505                 510

Asn Pro Leu Tyr Phe Asp Pro Thr Asn Trp Pro Ile Lys Gly Gln Gly
                515                 520                 525

Val Gly Val Met Glu Ala Pro Arg Gly Ala Leu Gly His Trp Leu Val
                530                 535                 540

Met Gln Asn Gly Lys Ile Glu Asn Tyr Gln Cys Val Val Pro Thr Thr
545                 550                 555                 560

Trp Asn Ala Gly Pro Arg Asp Pro Asn Ser Gln Ala Gly Ala Tyr Glu
                565                 570                 575

Ala Ala Leu Gln Asp Lys His Thr Leu His Asp Pro Asp Gln Pro Leu
                580                 585                 590

Glu Ile Leu Arg Thr Leu His Ser Phe Asp Pro Cys Leu Ala Cys Ala
                595                 600                 605

Val His Val Met Asp Glu Thr Gly Glu Glu Arg Leu Arg Leu Lys Val
                610                 615                 620

Arg
625

<210> SEQ ID NO 49
<211> LENGTH: 488
<212> TYPE: PRT
<213> ORGANISM: Rhodococcus opacus

<400> SEQUENCE: 49

Met Ser Thr Lys Leu Val Ile Asp Pro Val Thr Arg Ile Glu Gly His
1               5                   10                  15

Gly Lys Val Thr Val His Leu Asp Asp Asn Asn Val Val Asp Ala
                20                  25                  30

His Leu His Val Val Glu Phe Arg Gly Phe Glu Lys Leu Val Gln Gly
                35                  40                  45

His Pro Phe Trp Glu Ala Pro Met Leu Met Gln Arg Ile Cys Gly Ile
                50                  55                  60

Cys Phe Val Ser His His Leu Cys Gly Ala Lys Ala Leu Asp Asp Met
65                  70                  75                  80

Val Gly Val Gly Leu Lys Ser Gly Ile Asp Val Thr Pro Thr Ala Glu
                85                  90                  95

Lys Ile Arg Arg Leu Gly His Tyr Ala Gln Met Leu Gln Ser His Ala
                100                 105                 110

Thr Ala Tyr Phe Tyr Leu Ile Val Pro Glu Met Leu Phe Gly Met Asp
                115                 120                 125

Ala Ala Pro Glu Gln Arg Asn Val Leu Gly Leu Ile Glu Ala Asn Pro
                130                 135                 140
```

Glu Leu Val Lys Arg Val Val Met Leu Arg Lys Trp Gly Gln Glu Val
145                 150                 155                 160

Ile Lys Ala Val Phe Gly Arg Arg Met His Gly Ile Ser Ser Val Pro
                165                 170                 175

Gly Gly Val Asn Lys Asn Leu Ser Val Ala Glu Cys Gln Arg Phe Leu
            180                 185                 190

Lys Gly Glu Glu Gly Leu Pro Ser Val Asp Glu Val Ile Glu Tyr Ala
        195                 200                 205

Gln Glu Gly Val Gln Leu Phe Tyr Asp Phe His Glu Gln Asn Arg Val
    210                 215                 220

Gln Val Asp Ser Phe Ala Asn Val Ser Ala Leu Ser Met Ser Leu Val
225                 230                 235                 240

Asp Ala Asp Gly Asn Val Asp Tyr Tyr His Gly Lys Leu Arg Ile Ile
                245                 250                 255

Asp Asp Asp Lys Asn Val Val Gln Glu Phe Asp Tyr His Asp Tyr Leu
            260                 265                 270

Asp His Phe Ser Glu Ala Val Glu Glu Trp Ser Tyr Met Lys Phe Pro
        275                 280                 285

Phe Leu Lys Ala Leu Gly Arg Glu Arg Gly Ser Val Arg Val Gly Pro
    290                 295                 300

Leu Gly Arg Leu Asn Val Thr Asn Ser Leu Ser Thr Pro Leu Ala Gln
305                 310                 315                 320

Glu Ala Leu Glu Arg Phe His Ala Tyr Thr Asn Gly Lys Ala Asn Asn
                325                 330                 335

Met Thr Leu His Thr Asn Trp Ala Arg Ala Ile Glu Ile Leu His Ala
            340                 345                 350

Ala Glu Leu Ile Lys Glu Leu Leu Asn Asp Pro Asp Leu Gln Lys Glu
        355                 360                 365

Gln Leu Leu Leu Thr Pro Ala Asp Asn Ala Trp Thr Gly Glu Gly Val
    370                 375                 380

Gly Val Val Glu Ala Pro Arg Gly Thr Leu Leu His His Tyr Arg Ala
385                 390                 395                 400

Asp Gln Glu Gly Asp Ile Thr Phe Ala Asn Leu Val Val Ala Thr Thr
                405                 410                 415

Gln Asn Asn Gln Val Met Asn Arg Thr Val Arg Ser Val Ala Glu Asp
            420                 425                 430

Tyr Leu Gly Gly Gln Gly Glu Val Thr Glu Gly Met Met Asn Ala Ile
        435                 440                 445

Glu Val Gly Ile Arg Ala Tyr Asp Pro Cys Leu Ser Cys Ala Thr His
    450                 455                 460

Ala Leu Gly Gln Met Pro Leu Ile Val Ser Val His Asp Thr Glu Gly
465                 470                 475                 480

His Val Ile Asn Glu Arg Val Arg
                485

<210> SEQ ID NO 50
<211> LENGTH: 209
<212> TYPE: PRT
<213> ORGANISM: Rhodococcus opacus

<400> SEQUENCE: 50

Met Lys His Ser Glu Lys Asn Glu Ile Ala Ser His Glu Leu Pro Thr
1               5                   10                  15

Thr Pro Leu Asp Pro Val Leu Ala Ala Gly Arg Glu Ser Lys Ile Lys

```
                20                  25                  30
Val Ala Met Ile Gly Leu Cys Gly Cys Trp Gly Cys Thr Leu Ser Phe
            35                  40                  45

Leu Asp Met Asp Glu Arg Leu Leu Val Leu Leu Asp Lys Val Thr Leu
        50                  55                  60

His Arg Ser Ser Leu Ser Asp Ile Lys Arg Ile Thr Glu Arg Cys Ala
65                  70                  75                  80

Ile Gly Phe Ile Glu Gly Gly Val Ala Asn Glu Glu Asn Ile Glu Thr
                85                  90                  95

Leu Glu His Tyr Arg Glu Asn Cys Asp Val Leu Ile Ser Val Gly Ala
            100                 105                 110

Cys Ala Val Trp Gly Gly Val Pro Ala Met Arg Asn Val Phe Glu Leu
        115                 120                 125

Lys Asp Cys Leu Ser Glu Val Tyr Ile Asp Ser Ala Thr Ser Val Pro
    130                 135                 140

Gly Ala Lys Pro Val Val Pro Phe His Pro Asp Ile Pro Arg Ile Thr
145                 150                 155                 160

Asp Lys Val Tyr Pro Cys His Glu Val Val Lys Met Asp Tyr Phe Ile
                165                 170                 175

Pro Gly Cys Pro Pro Asp Ala Asp Ala Ile Phe Lys Val Leu Asp Asp
            180                 185                 190

Leu Val Asn Gly Arg Pro Phe Asp Leu Pro Ser Ser Ile Asn Gln Tyr
        195                 200                 205

Asp

<210> SEQ ID NO 51
<211> LENGTH: 576
<212> TYPE: PRT
<213> ORGANISM: Allochromatium vinosum

<400> SEQUENCE: 51

Met Ser Glu Arg Ile Val Val Asp Pro Val Thr Arg Ile Glu Gly His
1               5                   10                  15

Leu Arg Ile Glu Ala Gln Met Asp Gly Glu Asn Ile Ala Gln Ala Tyr
            20                  25                  30

Ser Ser Gly Thr Ser Val Arg Gly Leu Glu Thr Ile Leu Lys Gly Arg
        35                  40                  45

Asp Pro Arg Asp Ala Trp Ala Phe Ala Gln Arg Ile Cys Gly Val Cys
    50                  55                  60

Thr Leu Val His Gly Ile Ala Ser Val Arg Ser Val Glu Asp Ala Leu
65                  70                  75                  80

Lys Ile Glu Leu Pro Pro Asn Ala Gln Leu Ile Arg Asn Leu Met Ile
                85                  90                  95

Ser Ser Gln Phe Val His Asp His Val Met His Phe Tyr His Leu His
            100                 105                 110

Ala Leu Asp Trp Val Asp Val Val Ser Ala Leu Ser Ala Asp Pro Lys
        115                 120                 125

Ala Thr Ser Asp Leu Ala Gln Ser Ile Ser Ser Trp Pro Lys Ser Ser
    130                 135                 140

Pro Gly Tyr Phe Ala Asp Thr Gln Lys Arg Ile Lys Thr Phe Val Glu
145                 150                 155                 160

Ser Gly Gln Leu Gly Ile Phe Ala Asn Gly Tyr Trp Gly His Pro Ala
                165                 170                 175

Tyr Lys Leu Pro Pro Glu Ala Asn Leu Met Ala Val Ala His Tyr Leu
```

```
            180                 185                 190
Glu Ala Leu Ala Trp Gln Arg Asp Val Ala Arg Leu His Ala Ile Phe
            195                 200                 205
Gly Gly Lys Asn Pro His Pro Asn Phe Val Val Gly Val Pro Ser
            210                 215                 220
Pro Ile Asp Ile Asp Ser Asp Ser Ala Ile Asn Ala Lys Arg Leu Ala
225                 230                 235                 240
Glu Val Gln Gln Ile Leu Gln Ser Met Gln Thr Phe Val Asp Gln Val
            245                 250                 255
Tyr Val Pro Asp Thr Leu Ala Ile Ala Ser Phe Tyr Lys Asp Trp Gly
            260                 265                 270
Glu Arg Gly Glu Gly Leu Gly Asn Phe Met Ser Tyr Gly Asp Leu Pro
            275                 280                 285
Ala Thr Gly Thr Met Asp Pro Ala Gln Phe Leu Phe Pro Arg Gly Val
            290                 295                 300
Ile Leu Asn Arg Asp Leu Ser Thr Ile His Glu Ile Asp Leu His Asp
305                 310                 315                 320
Ala Gly Gln Ile Gln Glu Tyr Val Ala His Ser Trp Tyr Glu Tyr Ser
            325                 330                 335
Gly Gly Asn Asp Gln Gly Leu His Pro Tyr Asp Gly Glu Thr Asn Leu
            340                 345                 350
Glu Tyr Asp Ala Arg Gly Gly Val Lys Pro Pro Tyr Thr Gln Leu Asp
            355                 360                 365
Val Asn Asp Gly Tyr Ser Trp Met Lys Ala Pro Arg Trp Lys Gly His
            370                 375                 380
Ala Met Glu Val Gly Pro Leu Ala Arg Val Leu Leu Leu Tyr Ala Ser
385                 390                 395                 400
Gly His Glu Gln Thr Lys Glu Leu Val Glu Met Thr Leu Thr Thr Leu
            405                 410                 415
Asp Leu Pro Val Arg Ala Leu Tyr Ser Thr Leu Gly Arg Thr Ala Ala
            420                 425                 430
Arg Thr Leu Glu Thr Lys Ile Leu Thr Asp Thr Ala Gln Asp Trp Tyr
            435                 440                 445
Asn Gln Leu Ile Ala Asn Ile Lys Ala Gly Asp Ser Arg Thr Phe Asn
            450                 455                 460
Glu Thr Leu Trp Glu Pro Ser Ser Trp Pro Ala Glu Ala Arg Gly Ala
465                 470                 475                 480
Gly Tyr Met Glu Ala Pro Arg Gly Ala Leu Gly His Trp Ile Val Ile
            485                 490                 495
Lys Asp Arg Lys Ile Ala Asn Tyr Gln Ala Val Val Pro Ser Thr Trp
            500                 505                 510
Asn Ala Gly Pro Arg Asp Pro Ser Asp Gln Pro Gly Ala Tyr Glu Ala
            515                 520                 525
Ala Leu Gln Asp Asn His Gln Leu Val Asp Val Lys Gln Pro Ile Glu
            530                 535                 540
Ile Leu Arg Thr Ile His Ser Phe Asp Pro Cys Ile Ala Cys Ala Val
545                 550                 555                 560
His Leu Thr Asp Pro Glu Thr Gly Glu Gln Met Glu Ile Lys Ile Thr
            565                 570                 575

<210> SEQ ID NO 52
<211> LENGTH: 314
<212> TYPE: PRT
<213> ORGANISM: Allochromatium vinosum
```

-continued

<400> SEQUENCE: 52

Pro Ser Val Val Trp Leu Ser Phe Gln Glu Cys Thr Gly Cys Thr Glu
1               5                   10                  15

Ser Leu Thr Arg Ala His Ala Pro Thr Leu Glu Asp Leu Ile Leu Asp
            20                  25                  30

Phe Ile Ser Leu Asp Tyr His His Thr Leu Gln Ala Ala Ser Gly Glu
        35                  40                  45

Ala Ala Glu Ala Ala Arg Leu Gln Ala Met Asp Glu Asn Arg Gly Gln
    50                  55                  60

Tyr Leu Val Ile Val Asp Gly Ser Ile Pro Gly Pro Asp Ala Asn Pro
65                  70                  75                  80

Gly Phe Ser Thr Val Ala Gly His Ser Asn Tyr Ser Ile Leu Met Glu
                85                  90                  95

Thr Val Glu His Ala Ala Ala Val Ile Ala Val Gly Thr Cys Ala Ala
            100                 105                 110

Phe Gly Gly Leu Pro Gln Ala Arg Pro Asn Pro Thr Gly Ala Met Ser
        115                 120                 125

Val Met Asp Leu Val Arg Asp Lys Pro Val Ile Asn Val Pro Gly Cys
    130                 135                 140

Pro Pro Ile Pro Met Val Ile Thr Gly Val Ile Ala His Tyr Leu Val
145                 150                 155                 160

Phe Gly Arg Leu Pro Glu Val Asp Gly Tyr Gly Arg Pro Leu Ala Phe
                165                 170                 175

Tyr Gly Gln Ser Ile His Asp Arg Cys Tyr Arg Arg Pro Phe Tyr Asp
            180                 185                 190

Lys Gly Leu Phe Ala Glu Ser Phe Asp Asp Glu Gly Ala Lys Gln Gly
        195                 200                 205

Trp Cys Leu Tyr Arg Leu Gly Cys Lys Gly Pro Thr Thr Tyr Asn Ala
    210                 215                 220

Cys Ala Thr Met Lys Trp Asn Asp Gly Thr Ser Trp Pro Val Glu Ala
225                 230                 235                 240

Gly His Pro Cys Leu Gly Cys Ser Glu Pro Gln Phe Trp Asp Ala Gly
                245                 250                 255

Gly Phe Tyr Glu Pro Val Ser Val Pro Leu Thr Leu Gly Pro Ala Thr
            260                 265                 270

Leu Leu Gly Ala Gly Ala Ala Gly Ala Val Val Gly Gly Gly Leu Ala
        275                 280                 285

Ala Leu Ser Arg Lys Lys Gly Arg Asp Ala Ala Ala Thr Arg Gln Pro
    290                 295                 300

Val Thr Val Asp Glu Leu Glu Gln Lys Leu
305                 310

<210> SEQ ID NO 53
<211> LENGTH: 564
<212> TYPE: PRT
<213> ORGANISM: Desulfovibrio fructosovorans

<400> SEQUENCE: 53

Met Ala Glu Ser Lys Pro Thr Pro Gln Ser Thr Phe Thr Gly Pro Ile
1               5                   10                  15

Val Val Asp Pro Ile Thr Arg Ile Glu Gly His Leu Arg Ile Met Val
            20                  25                  30

Glu Val Glu Asn Gly Lys Val Lys Asp Ala Trp Ser Ser Ser Gln Leu
        35                  40                  45

```
Phe Arg Gly Leu Glu Ile Ile Leu Lys Gly Arg Asp Pro Arg Asp Ala
    50                  55                  60

Gln His Phe Thr Gln Arg Ala Cys Gly Val Cys Thr Tyr Val His Ala
65                  70                  75                  80

Leu Ala Ser Ser Arg Cys Val Asp Asp Ala Val Lys Val Ser Ile Pro
                85                  90                  95

Ala Asn Ala Arg Met Met Arg Asn Leu Val Met Ala Ser Gln Tyr Leu
            100                 105                 110

His Asp His Leu Val His Phe Tyr His Leu His Ala Leu Asp Trp Val
            115                 120                 125

Asp Val Thr Ala Ala Leu Lys Ala Asp Pro Asn Lys Ala Ala Lys Leu
        130                 135                 140

Ala Ala Ser Ile Asp Thr Ala Arg Thr Gly Asn Ser Glu Lys Ala Leu
145                 150                 155                 160

Lys Ala Val Gln Asp Lys Leu Lys Ala Phe Val Glu Ser Gly Gln Leu
                165                 170                 175

Gly Ile Phe Thr Asn Ala Tyr Phe Leu Gly Gly His Lys Ala Tyr Tyr
            180                 185                 190

Leu Pro Pro Glu Val Asn Leu Ile Ala Thr Ala His Tyr Leu Glu Ala
        195                 200                 205

Leu His Met Gln Val Lys Ala Ala Ser Ala Met Ala Ile Leu Gly Gly
    210                 215                 220

Lys Asn Pro His Thr Gln Phe Thr Val Val Gly Gly Cys Ser Asn Tyr
225                 230                 235                 240

Gln Gly Leu Thr Lys Asp Pro Leu Ala Asn Tyr Leu Ala Leu Ser Lys
                245                 250                 255

Glu Val Cys Gln Phe Val Asn Glu Cys Tyr Ile Pro Asp Leu Leu Ala
            260                 265                 270

Val Ala Gly Phe Tyr Lys Asp Trp Gly Gly Ile Gly Gly Thr Ser Asn
        275                 280                 285

Tyr Leu Ala Phe Gly Glu Phe Ala Thr Asp Ser Ser Pro Glu Lys
    290                 295                 300

His Leu Ala Thr Ser Gln Phe Pro Ser Gly Val Ile Thr Gly Arg Asp
305                 310                 315                 320

Leu Gly Lys Val Asp Asn Val Asp Leu Gly Ala Ile Tyr Glu Asp Val
                325                 330                 335

Lys Tyr Ser Trp Tyr Ala Pro Gly Gly Asp Gly Lys His Pro Tyr Asp
            340                 345                 350

Gly Val Thr Asp Pro Lys Tyr Thr Lys Leu Asp Asp Lys Asp His Tyr
        355                 360                 365

Ser Trp Met Lys Ala Pro Arg Tyr Lys Gly Lys Ala Met Glu Val Gly
    370                 375                 380

Pro Leu Ala Arg Thr Phe Ile Ala Tyr Ala Lys Gly Gln Pro Asp Phe
385                 390                 395                 400

Lys Lys Val Val Asp Met Val Leu Gly Lys Leu Ser Val Pro Ala Thr
                405                 410                 415

Ala Leu His Ser Thr Leu Gly Arg Thr Ala Ala Arg Gly Ile Glu Thr
            420                 425                 430

Ala Ile Val Cys Ala Asn Met Glu Lys Trp Ile Lys Glu Met Ala Asp
        435                 440                 445

Ser Gly Ala Lys Asp Asn Thr Leu Cys Ala Lys Trp Glu Met Pro Glu
    450                 455                 460
```

```
Glu Ser Lys Gly Val Gly Leu Ala Asp Ala Pro Arg Gly Ser Leu Ser
465                 470                 475                 480

His Trp Ile Arg Ile Lys Gly Lys Ile Asp Asn Phe Gln Leu Val
                485                 490                 495

Val Pro Ser Thr Trp Asn Leu Gly Pro Arg Gly Pro Gln Gly Asp Lys
            500                 505                 510

Ser Pro Val Glu Glu Ala Leu Ile Gly Thr Pro Ile Ala Asp Pro Lys
            515                 520                 525

Arg Pro Val Glu Ile Leu Arg Thr Val His Ala Phe Asp Pro Cys Ile
            530                 535                 540

Ala Cys Gly Val His Val Ile Glu Pro Glu Thr Asn Glu Ile Leu Lys
545                 550                 555                 560

Phe Lys Val Cys

<210> SEQ ID NO 54
<211> LENGTH: 264
<212> TYPE: PRT
<213> ORGANISM: Desulfovibrio fructosovorans

<400> SEQUENCE: 54

Leu Thr Ala Lys His Arg Pro Ser Val Val Trp Leu His Asn Ala Glu
1               5                   10                  15

Cys Thr Gly Cys Thr Glu Ala Ala Ile Arg Thr Ile Lys Pro Tyr Ile
                20                  25                  30

Asp Ala Leu Ile Leu Asp Thr Ile Ser Leu Asp Tyr Gln Glu Thr Ile
                35                  40                  45

Met Ala Ala Gly Glu Thr Ser Glu Ala Ala Leu His Glu Ala Leu
50                  55                  60

Glu Gly Lys Asp Gly Tyr Tyr Leu Val Val Glu Gly Gly Leu Pro Thr
65                  70                  75                  80

Ile Asp Gly Gly Gln Trp Gly Met Val Ala Gly His Pro Met Ile Glu
                85                  90                  95

Thr Cys Lys Lys Ala Ala Lys Ala Lys Gly Ile Ile Cys Ile Gly
                100                 105                 110

Thr Cys Ser Pro Tyr Gly Gly Val Gln Lys Ala Lys Pro Asn Pro Ser
                115                 120                 125

Gln Ala Lys Gly Val Ser Glu Ala Leu Gly Val Lys Thr Ile Asn Ile
130                 135                 140

Pro Gly Cys Pro Pro Asn Pro Ile Asn Phe Val Gly Ala Val Val His
145                 150                 155                 160

Val Leu Thr Lys Gly Ile Pro Asp Leu Asp Glu Asn Gly Arg Pro Lys
                165                 170                 175

Leu Phe Tyr Gly Glu Leu Val His Asp Asn Cys Pro Arg Leu Pro His
                180                 185                 190

Phe Glu Ala Ser Glu Phe Ala Pro Ser Phe Asp Ser Glu Glu Ala Lys
                195                 200                 205

Lys Gly Phe Cys Leu Tyr Glu Leu Gly Cys Lys Gly Pro Val Thr Tyr
                210                 215                 220

Asn Asn Cys Pro Lys Val Leu Phe Asn Gln Val Asn Trp Pro Val Gln
225                 230                 235                 240

Ala Gly His Pro Cys Leu Gly Cys Ser Glu Pro Asp Phe Trp Asp Thr
                245                 250                 255

Met Thr Pro Phe Tyr Glu Gln Gly
                260
```

-continued

```
<210> SEQ ID NO 55
<211> LENGTH: 574
<212> TYPE: PRT
<213> ORGANISM: Clostridium pasteurianum

<400> SEQUENCE: 55

Met Lys Thr Ile Ile Asn Gly Val Gln Phe Asn Thr Asp Glu Asp
1               5                   10                  15

Thr Thr Ile Leu Lys Phe Ala Arg Asp Asn Asn Ile Asp Ile Ser Ala
            20                  25                  30

Leu Cys Phe Leu Asn Asn Cys Asn Asn Asp Ile Asn Lys Cys Glu Ile
                35                  40                  45

Cys Thr Val Glu Val Glu Gly Thr Gly Leu Val Thr Ala Cys Asp Thr
        50                  55                  60

Leu Ile Glu Asp Gly Met Ile Ile Asn Thr Asn Ser Asp Ala Val Asn
65                  70                  75                  80

Glu Lys Ile Lys Ser Arg Ile Ser Gln Leu Leu Asp Ile His Glu Phe
                85                  90                  95

Lys Cys Gly Pro Cys Asn Arg Arg Glu Asn Cys Glu Phe Leu Lys Leu
            100                 105                 110

Val Ile Lys Tyr Lys Ala Arg Ala Ser Lys Pro Phe Leu Pro Lys Asp
            115                 120                 125

Lys Thr Glu Tyr Val Asp Glu Arg Ser Lys Ser Leu Thr Val Asp Arg
        130                 135                 140

Thr Lys Cys Leu Leu Cys Gly Arg Cys Val Asn Ala Cys Gly Lys Asn
145                 150                 155                 160

Thr Glu Thr Tyr Ala Met Lys Phe Leu Asn Lys Asn Gly Lys Thr Ile
                165                 170                 175

Ile Gly Ala Glu Asp Glu Lys Cys Phe Asp Asp Thr Asn Cys Leu Leu
            180                 185                 190

Cys Gly Gln Cys Ile Ile Ala Cys Pro Val Ala Ala Leu Ser Glu Lys
        195                 200                 205

Ser His Met Asp Arg Val Lys Asn Ala Leu Asn Ala Pro Glu Lys His
    210                 215                 220

Val Ile Val Ala Met Ala Pro Ser Val Arg Ala Ser Ile Gly Glu Leu
225                 230                 235                 240

Phe Asn Met Gly Phe Gly Val Asp Val Thr Gly Lys Ile Tyr Thr Ala
                245                 250                 255

Leu Arg Gln Leu Gly Phe Asp Lys Ile Phe Asp Ile Asn Phe Gly Ala
            260                 265                 270

Asp Met Thr Ile Met Glu Glu Ala Thr Glu Leu Val Gln Arg Ile Glu
        275                 280                 285

Asn Asn Gly Pro Phe Pro Met Phe Thr Ser Cys Cys Pro Gly Trp Val
    290                 295                 300

Arg Gln Ala Glu Asn Tyr Tyr Pro Glu Leu Leu Asn Asn Leu Ser Ser
305                 310                 315                 320

Ala Lys Ser Pro Gln Gln Ile Phe Gly Thr Ala Ser Lys Thr Tyr Tyr
                325                 330                 335

Pro Ser Ile Ser Gly Leu Asp Pro Lys Asn Val Phe Thr Val Thr Val
            340                 345                 350

Met Pro Cys Thr Ser Lys Lys Phe Glu Ala Asp Arg Pro Gln Met Glu
        355                 360                 365

Lys Asp Gly Leu Arg Asp Ile Asp Ala Val Ile Thr Thr Arg Glu Leu
    370                 375                 380
```

```
Ala Lys Met Ile Lys Asp Ala Lys Ile Pro Phe Ala Lys Leu Glu Asp
385                 390                 395                 400

Ser Glu Ala Asp Pro Ala Met Gly Glu Tyr Ser Gly Ala Gly Ala Ile
            405                 410                 415

Phe Gly Ala Thr Gly Gly Val Met Glu Ala Ala Leu Arg Ser Ala Lys
            420                 425                 430

Asp Phe Ala Glu Asn Ala Glu Leu Glu Asp Ile Glu Tyr Lys Gln Val
        435                 440                 445

Arg Gly Leu Asn Gly Ile Lys Glu Ala Glu Val Glu Ile Asn Asn Asn
        450                 455                 460

Lys Tyr Asn Val Ala Val Ile Asn Gly Ala Ser Asn Leu Phe Lys Phe
465                 470                 475                 480

Met Lys Ser Gly Met Ile Asn Glu Lys Gln Tyr His Phe Ile Glu Val
                485                 490                 495

Met Ala Cys His Gly Gly Cys Val Asn Gly Gly Gln Pro His Val
            500                 505                 510

Asn Pro Lys Asp Leu Glu Lys Val Asp Ile Lys Lys Val Arg Ala Ser
        515                 520                 525

Val Leu Tyr Asn Gln Asp Glu His Leu Ser Lys Arg Lys Ser His Glu
        530                 535                 540

Asn Thr Ala Leu Val Lys Met Tyr Gln Asn Tyr Phe Gly Lys Pro Gly
545                 550                 555                 560

Glu Gly Arg Ala His Glu Ile Leu His Phe Lys Tyr Lys Lys
                565                 570

<210> SEQ ID NO 56
<211> LENGTH: 582
<212> TYPE: PRT
<213> ORGANISM: Clostridium pasteurianum

<400> SEQUENCE: 56

Met Lys Thr Ile Ile Leu Asn Gly Asn Glu Val His Thr Asp Lys Asp
1               5                   10                  15

Ile Thr Ile Leu Glu Leu Ala Arg Glu Asn Asn Val Asp Ile Pro Thr
            20                  25                  30

Leu Cys Phe Leu Lys Asp Cys Gly Asn Phe Gly Lys Cys Gly Val Cys
        35                  40                  45

Met Val Glu Val Glu Gly Lys Gly Phe Arg Ala Ala Cys Val Ala Lys
    50                  55                  60

Val Glu Asp Gly Met Val Ile Asn Thr Glu Ser Asp Glu Val Lys Glu
65                  70                  75                  80

Arg Ile Lys Lys Arg Val Ser Met Leu Leu Asp Lys His Glu Phe Lys
                85                  90                  95

Cys Gly Gln Cys Ser Arg Arg Glu Asn Cys Glu Phe Leu Lys Leu Val
            100                 105                 110

Ile Lys Thr Lys Ala Lys Ala Ser Lys Pro Phe Leu Pro Glu Asp Lys
        115                 120                 125

Asp Ala Leu Val Asp Asn Arg Ser Lys Ala Ile Val Ile Asp Arg Ser
    130                 135                 140

Lys Cys Val Leu Cys Gly Arg Cys Val Ala Ala Cys Lys Gln His Thr
145                 150                 155                 160

Ser Thr Cys Ser Ile Gln Phe Ile Lys Lys Asp Gly Gln Arg Ala Val
                165                 170                 175

Gly Thr Val Asp Asp Val Cys Leu Asp Asp Ser Thr Cys Leu Leu Cys
```

```
            180                 185                 190
Gly Gln Cys Val Ile Ala Cys Pro Val Ala Ala Leu Lys Glu Lys Ser
            195                 200                 205

His Ile Glu Lys Val Gln Glu Ala Leu Asn Asp Pro Lys Lys His Val
            210                 215                 220

Ile Val Ala Met Ala Pro Ser Val Arg Thr Ala Met Gly Glu Leu Phe
225                 230                 235                 240

Lys Met Gly Tyr Gly Lys Asp Val Thr Gly Lys Leu Tyr Thr Ala Leu
                    245                 250                 255

Arg Met Leu Gly Phe Asp Lys Val Phe Asp Ile Asn Phe Gly Ala Asp
                260                 265                 270

Met Thr Ile Met Glu Glu Ala Thr Glu Leu Leu Gly Arg Val Lys Asn
            275                 280                 285

Asn Gly Pro Phe Pro Met Phe Thr Ser Cys Cys Pro Ala Trp Val Arg
        290                 295                 300

Leu Ala Gln Asn Tyr His Pro Glu Leu Leu Asp Asn Leu Ser Ser Ala
305                 310                 315                 320

Lys Ser Pro Gln Gln Ile Phe Gly Thr Ala Ser Lys Thr Tyr Tyr Pro
                    325                 330                 335

Ser Ile Ser Gly Ile Ala Pro Glu Asp Val Tyr Thr Val Thr Ile Met
                340                 345                 350

Pro Cys Asn Asp Lys Lys Tyr Glu Ala Asp Ile Pro Phe Met Glu Thr
        355                 360                 365

Asn Ser Leu Arg Asp Ile Asp Ala Ser Leu Thr Thr Arg Glu Leu Ala
370                 375                 380

Lys Met Ile Lys Asp Ala Lys Ile Lys Phe Ala Asp Leu Glu Asp Gly
385                 390                 395                 400

Glu Val Asp Pro Ala Met Gly Thr Tyr Ser Gly Ala Gly Ala Ile Phe
                    405                 410                 415

Gly Ala Thr Gly Gly Val Met Glu Ala Ala Ile Arg Ser Ala Lys Asp
                420                 425                 430

Phe Ala Glu Asn Lys Glu Leu Glu Asn Val Asp Tyr Thr Glu Val Arg
                435                 440                 445

Gly Phe Lys Gly Ile Lys Glu Ala Glu Val Glu Ile Ala Gly Asn Lys
        450                 455                 460

Leu Asn Val Ala Val Ile Asn Gly Ala Ser Asn Phe Phe Glu Phe Met
465                 470                 475                 480

Lys Ser Gly Lys Met Asn Glu Lys Gln Tyr His Phe Ile Glu Val Met
                    485                 490                 495

Ala Cys Pro Gly Gly Cys Ile Asn Gly Gly Gly Gln Pro His Val Asn
                500                 505                 510

Ala Leu Asp Arg Glu Asn Val Asp Tyr Arg Lys Leu Arg Ala Ser Val
                515                 520                 525

Leu Tyr Asn Gln Asp Lys Asn Val Leu Ser Lys Arg Lys Ser His Asp
                530                 535                 540

Asn Pro Ala Ile Ile Lys Met Tyr Asp Ser Tyr Phe Gly Lys Pro Gly
545                 550                 555                 560

Glu Gly Leu Ala His Lys Leu Leu His Val Lys Tyr Thr Lys Asp Lys
                    565                 570                 575

Asn Val Ser Lys His Glu
                580

<210> SEQ ID NO 57
```

```
<211> LENGTH: 505
<212> TYPE: PRT
<213> ORGANISM: Chlamydomonas reinhardtii

<400> SEQUENCE: 57

Met Ala Leu Gly Leu Leu Ala Glu Leu Arg Ala Gly Gln Ala Val Ala
1               5                   10                  15

Cys Ala Arg Arg Thr Asn Ala Pro Ala His Pro Ala Ala Val Val Pro
            20                  25                  30

Cys Leu Pro Ser Arg Ala Gly Lys Phe Phe Asn Leu Ser Gln Lys Val
        35                  40                  45

Pro Ser Ser Gln Ser Ala Arg Gly Ser Thr Ile Arg Val Ala Ala Thr
    50                  55                  60

Ala Thr Asp Ala Val Pro His Trp Lys Leu Ala Leu Glu Glu Leu Asp
65                  70                  75                  80

Lys Pro Lys Asp Gly Arg Lys Val Leu Ile Ala Gln Val Ala Pro
            85                  90                  95

Ala Val Arg Val Ala Ile Ala Glu Ser Phe Gly Leu Ala Pro Gly Ala
            100                 105                 110

Val Ser Pro Gly Lys Leu Ala Thr Gly Leu Arg Ala Leu Gly Phe Asp
        115                 120                 125

Gln Val Phe Asp Thr Leu Phe Ala Ala Asp Leu Thr Ile Met Glu Glu
    130                 135                 140

Gly Thr Glu Leu Leu His Arg Leu Lys Glu His Leu Glu Ala His Pro
145                 150                 155                 160

His Ser Asp Glu Pro Leu Pro Met Phe Thr Ser Cys Cys Pro Gly Trp
            165                 170                 175

Val Ala Met Met Glu Lys Ser Tyr Pro Glu Leu Ile Pro Phe Val Ser
            180                 185                 190

Ser Cys Lys Ser Pro Gln Met Met Met Gly Ala Met Val Lys Thr Tyr
        195                 200                 205

Leu Ser Glu Lys Gln Gly Ile Pro Ala Lys Asp Ile Val Met Val Ser
    210                 215                 220

Val Met Pro Cys Val Arg Lys Gln Gly Glu Ala Asp Arg Glu Trp Phe
225                 230                 235                 240

Cys Val Ser Glu Pro Gly Val Arg Asp Val Asp His Val Ile Thr Thr
            245                 250                 255

Ala Glu Leu Gly Asn Ile Phe Lys Glu Arg Gly Ile Asn Leu Pro Glu
            260                 265                 270

Leu Pro Asp Ser Asp Trp Asp Gln Pro Leu Gly Leu Gly Ser Gly Ala
        275                 280                 285

Gly Val Leu Phe Gly Thr Thr Gly Gly Val Met Glu Ala Ala Leu Arg
    290                 295                 300

Thr Ala Tyr Glu Ile Val Thr Lys Glu Pro Leu Pro Arg Leu Asn Leu
305                 310                 315                 320

Ser Glu Val Arg Gly Leu Asp Gly Ile Lys Glu Ala Ser Val Thr Leu
            325                 330                 335

Val Pro Ala Pro Gly Ser Lys Phe Ala Glu Leu Val Ala Glu Arg Leu
            340                 345                 350

Ala His Lys Val Glu Glu Ala Ala Ala Glu Ala Ala Ala Ala Val
        355                 360                 365

Glu Gly Ala Val Lys Pro Pro Ile Ala Tyr Asp Gly Gly Gln Gly Phe
    370                 375                 380

Ser Thr Asp Asp Gly Lys Gly Gly Leu Lys Leu Arg Val Ala Val Ala
```

```
                385                 390                 395                 400
Asn Gly Leu Gly Asn Ala Lys Lys Leu Ile Gly Lys Met Val Ser Gly
                    405                 410                 415

Glu Ala Lys Tyr Asp Phe Val Glu Ile Met Ala Cys Pro Ala Gly Cys
                420                 425                 430

Val Gly Gly Gly Gln Pro Arg Ser Thr Asp Lys Gln Ile Thr Gln
            435                 440                 445

Lys Arg Gln Ala Ala Leu Tyr Asp Leu Asp Glu Arg Asn Thr Leu Arg
450                 455                 460

Arg Ser His Glu Asn Glu Ala Val Asn Gln Leu Tyr Lys Glu Phe Leu
465                 470                 475                 480

Gly Glu Pro Leu Ser His Arg Ala His Glu Leu Leu His Thr His Tyr
                485                 490                 495

Val Pro Gly Gly Ala Glu Ala Asp Ala
                500                 505

<210> SEQ ID NO 58
<211> LENGTH: 499
<212> TYPE: PRT
<213> ORGANISM: Desulfomicrobium baculatum

<400> SEQUENCE: 58

Met Ser Gln Ala Ala Thr Pro Ala Ala Asp Gly Lys Val Lys Ile Ser
1               5                   10                  15

Ile Asp Pro Leu Thr Arg Val Glu Gly His Leu Lys Ile Glu Val Glu
                20                  25                  30

Val Lys Asp Gly Lys Val Val Asp Ala Lys Cys Ser Gly Gly Met Phe
            35                  40                  45

Arg Gly Phe Glu Gln Ile Leu Arg Gly Arg Asp Pro Arg Asp Ser Ser
    50                  55                  60

Gln Ile Val Gln Arg Ile Cys Gly Val Cys Pro Thr Ala His Cys Thr
65                  70                  75                  80

Ala Ser Val Met Ala Gln Asp Asp Ala Phe Gly Val Lys Val Thr Thr
                85                  90                  95

Asn Gly Arg Ile Thr Arg Asn Leu Ile Phe Gly Ala Asn Tyr Leu Gln
                100                 105                 110

Ser His Ile Leu His Phe Tyr His Leu Ala Ala Leu Asp Tyr Val Lys
            115                 120                 125

Gly Pro Asp Val Ser Pro Phe Val Pro Arg Tyr Ala Asn Ala Asp Leu
130                 135                 140

Leu Thr Asp Arg Ile Lys Asp Gly Ala Lys Ala Asp Ala Thr Asn Thr
145                 150                 155                 160

Tyr Gly Leu Asn Gln Tyr Leu Lys Ala Leu Glu Ile Arg Arg Ile Cys
                165                 170                 175

His Glu Met Val Ala Met Phe Gly Gly Arg Met Pro His Val Gln Gly
            180                 185                 190

Met Val Val Gly Gly Ala Thr Glu Ile Pro Thr Ala Asp Lys Val Ala
                195                 200                 205

Glu Tyr Ala Ala Arg Phe Lys Glu Val Gln Lys Phe Val Ile Glu Glu
    210                 215                 220

Tyr Leu Pro Leu Ile Tyr Thr Leu Gly Ser Val Tyr Thr Asp Leu Phe
225                 230                 235                 240

Glu Thr Gly Ile Gly Trp Lys Asn Val Ile Ala Phe Gly Val Phe Pro
                245                 250                 255
```

-continued

```
Glu Asp Asp Asp Tyr Lys Thr Phe Leu Leu Lys Pro Gly Val Tyr Ile
            260                 265                 270

Asp Gly Lys Asp Glu Glu Phe Asp Ser Lys Leu Val Lys Glu Tyr Val
            275                 280                 285

Gly His Ser Phe Phe Asp His Ser Ala Pro Gly Gly Leu His Tyr Ser
            290                 295                 300

Val Gly Glu Thr Asn Pro Asn Pro Asp Lys Pro Gly Ala Tyr Ser Phe
305                 310                 315                 320

Val Lys Ala Pro Arg Tyr Lys Asp Lys Pro Cys Glu Val Gly Pro Leu
            325                 330                 335

Ala Arg Met Trp Val Gln Asn Pro Glu Leu Ser Pro Val Gly Gln Lys
            340                 345                 350

Leu Leu Lys Glu Leu Tyr Gly Ile Glu Ala Lys Asn Phe Arg Asp Leu
            355                 360                 365

Gly Asp Lys Ala Phe Ser Ile Met Gly Arg His Val Ala Arg Ala Glu
            370                 375                 380

Glu Thr Trp Leu Thr Ala Val Ala Val Glu Lys Trp Leu Lys Gln Val
385                 390                 395                 400

Gln Pro Gly Ala Glu Thr Tyr Val Lys Ser Glu Ile Pro Asp Ala Ala
            405                 410                 415

Glu Gly Thr Gly Phe Thr Glu Ala Pro Arg Gly Ala Leu Leu His Tyr
            420                 425                 430

Leu Lys Ile Lys Asp Lys Lys Ile Glu Asn Tyr Gln Ile Val Ser Ala
            435                 440                 445

Thr Leu Trp Asn Ala Asn Pro Arg Asp Asp Met Gly Gln Arg Gly Pro
450                 455                 460

Ile Glu Glu Ala Leu Ile Gly Val Pro Val Pro Asp Ile Lys Asn Pro
465                 470                 475                 480

Val Asn Val Gly Arg Leu Val Arg Ser Tyr Asp Pro Ala Leu Gly Cys
            485                 490                 495

Ala Val His

<210> SEQ ID NO 59
<211> LENGTH: 283
<212> TYPE: PRT
<213> ORGANISM: Desulfomicrobium baculatum

<400> SEQUENCE: 59

Met Thr Glu Gly Ala Lys Lys Ala Pro Val Ile Trp Val Gln Gly Gln
1               5                  10                  15

Gly Cys Thr Gly Cys Ser Val Ser Leu Leu Asn Ala Val His Pro Arg
            20                  25                  30

Ile Lys Glu Ile Leu Leu Asp Val Ile Ser Leu Glu Phe His Pro Thr
            35                  40                  45

Val Met Ala Ser Glu Gly Glu Met Ala Leu Ala His Met Tyr Glu Ile
50                  55                  60

Ala Glu Lys Phe Asn Gly Asn Phe Phe Leu Leu Val Glu Gly Ala Ile
65                  70                  75                  80

Pro Thr Ala Lys Glu Gly Arg Tyr Cys Ile Val Gly Glu Thr Leu Asp
            85                  90                  95

Ala Lys Gly His His His Glu Val Thr Met Met Glu Leu Ile Arg Asp
            100                 105                 110

Leu Ala Pro Lys Ser Leu Ala Thr Val Ala Val Gly Thr Cys Ser Ala
            115                 120                 125
```

```
Tyr Gly Gly Ile Pro Ala Ala Glu Gly Asn Val Thr Gly Ser Lys Ser
    130                 135                 140

Val Arg Asp Phe Phe Ala Asp Glu Lys Ile Glu Lys Leu Leu Val Asn
145                 150                 155                 160

Val Pro Gly Cys Pro Pro His Pro Asp Trp Met Val Gly Thr Leu Val
                165                 170                 175

Ala Ala Trp Ser His Val Leu Asn Pro Thr Glu His Pro Leu Pro Glu
            180                 185                 190

Leu Asp Asp Gly Arg Pro Leu Leu Phe Phe Gly Asp Asn Ile His
        195                 200                 205

Glu Asn Cys Pro Tyr Leu Asp Lys Tyr Asp Asn Ser Glu Phe Ala Glu
210                 215                 220

Thr Phe Thr Lys Pro Gly Cys Lys Ala Glu Leu Gly Cys Lys Gly Pro
225                 230                 235                 240

Ser Thr Tyr Ala Asp Cys Ala Lys Arg Arg Trp Asn Asn Gly Ile Asn
                245                 250                 255

Trp Cys Val Glu Asn Ala Val Cys Ile Gly Cys Val Glu Pro Asp Phe
                260                 265                 270

Pro Asp Gly Lys Ser Pro Phe Tyr Val Ala Glu
            275                 280

<210> SEQ ID NO 60
<211> LENGTH: 468
<212> TYPE: PRT
<213> ORGANISM: Hydrogenophilus thermoluteolus

<400> SEQUENCE: 60

Met Thr Gln His Ala Pro Gln Ala Val Ser Pro Arg Pro Ser Leu Pro
1               5                   10                  15

Ala Asn Ala Thr Arg Arg Val Ala Ile Asp Pro Leu Ser Arg Val Glu
                20                  25                  30

Gly His Gly Lys Val Thr Ile Trp Leu Asp Asp Gly Gln Val Val
            35                  40                  45

Glu Ala Arg Leu His Ile Val Glu Phe Arg Gly Phe Glu Ala Phe Ile
50                  55                  60

Val Gly Arg Pro Tyr Trp Glu Ala Pro Val Val Gln Arg Leu Cys
65                  70                  75                  80

Gly Ile Cys Pro Val Ser His His Leu Ala Ala Lys Ala Leu Asp
                85                  90                  95

Arg Leu Val Gly Val Thr Gln Leu Pro Pro Thr Ala Glu Lys Met Arg
            100                 105                 110

Arg Leu Met His Tyr Gly Gln Val Leu Gln Ser His Ala Leu His Phe
        115                 120                 125

Phe Tyr Leu Ala Ala Pro Asp Leu Leu Leu Gly Phe Ser Ala Asp Pro
    130                 135                 140

Ala Gln Arg Asn Val Phe Gly Leu Ala Ala Gln Lys Arg Glu Leu Ala
145                 150                 155                 160

Arg Gln Gly Ile Leu Val Arg Gln Phe Gly Gln Glu Cys Ile Glu Ala
                165                 170                 175

Thr Ala Gly Lys Arg Ile His Gly Thr Ser Ala Val Pro Gly Gly Ile
            180                 185                 190

His Lys Asn Leu Ser Arg Arg Glu Arg Met Ala Leu Leu Ser Arg Ala
        195                 200                 205

Pro Glu Ile Arg Ser Trp Cys Glu Ala Ala Val Ala Leu Ile Glu Arg
    210                 215                 220
```

```
Leu Phe Thr Glu His Ala Pro Phe Ala Gln Phe Gly Ser Phe Gln
225                 230                 235                 240

Thr Lys Thr Phe Ser Leu Val Ala Ala Asp Gly Ser Leu Asp Leu Tyr
                245                 250                 255

Asp Gly Thr Phe Arg Val Lys Glu Ala Asn Gly Ala Ile Leu Ile Asp
                260                 265                 270

His Tyr Asp Pro Asn Asp Tyr Asp Gln Leu Leu Val Glu Ala Val Arg
            275                 280                 285

Pro Trp Ser Tyr Met Lys Phe Pro Tyr Leu Lys Ala Tyr Gly Glu Pro
            290                 295                 300

Asp Gly Phe Tyr Arg Val Gly Pro Ser Ala Arg Leu Ile Asn Cys Asp
305                 310                 315                 320

Arg Leu Thr Thr Ala Arg Ala Glu Ala Ala Arg Gln Arg Phe Leu Thr
                325                 330                 335

Phe Asp Gln Gly Thr Val Ala His Ser Thr Leu Gly Tyr His Trp Ala
                340                 345                 350

Arg Leu Ile Glu Met Leu His Cys Ala Glu Leu Ile Glu Ala Leu Leu
            355                 360                 365

Thr Asp Ala Asp Leu Glu Gly Gly Glu Leu Arg Ala Arg Gly Gln Arg
370                 375                 380

Gln His Arg Gly Val Gly Val Ile Glu Ala Pro Arg Gly Thr Leu Ile
385                 390                 395                 400

His His Tyr Glu Val Gly Asp Asp Leu Ile Thr Tyr Cys Asn Leu
                405                 410                 415

Ile Val Ser Thr Thr His Asn Asn Ala Val Met Asn Gln Ala Val Thr
                420                 425                 430

Thr Ala Ala Lys Ala Phe Leu Ser Gly Val Thr Leu Thr Glu Ala Leu
            435                 440                 445

Leu Asn His Ile Glu Val Ala Val Arg Ala Phe Asp Pro Cys Leu Ser
        450                 455                 460

Cys Ala Thr His
465

<210> SEQ ID NO 61
<211> LENGTH: 189
<212> TYPE: PRT
<213> ORGANISM: Hydrogenophilus thermoluteolus

<400> SEQUENCE: 61

Met Thr Ser Ala Ala Pro Ser Ala Met Pro Pro Arg Lys Ile Arg Ile
1               5                   10                  15

Ala Thr Ala Ser Leu Ala Gly Cys Phe Gly Cys His Met Ser Phe Ala
            20                  25                  30

Asp Ile Asp Thr Arg Leu Leu Ala Leu Ala Glu Trp Val Thr Phe Asp
        35                  40                  45

Arg Ser Pro Leu Thr Asp Trp Lys Thr Val Gly Glu Cys Asp Ile Ala
    50                  55                  60

Leu Ile Glu Gly Gly Val Cys Asn Ala Glu Asn Val Glu Val Leu Arg
65                  70                  75                  80

Ala Tyr Arg Arg Ala Ala Arg Ile Leu Val Ala Val Gly Ala Cys Ala
                85                  90                  95

Ile Asn Gly Gly Leu Pro Ala Gln Arg Asn Gln His Arg Val Glu Arg
            100                 105                 110

Leu Leu Thr Gln Val Phe Glu Ala Asp Arg His Leu Ala Pro Gly Ser
```

```
            115                 120                 125
Arg Val Pro Asn Asp Pro Glu Leu Pro Leu Leu Glu His Val His
    130                 135                 140

Pro Ile His Glu Ile Val Arg Val Asp Tyr Tyr Leu Pro Gly Cys Pro
145                 150                 155                 160

Pro Thr Ala Glu Val Ile Trp Thr Phe Leu Thr Asp Leu Leu Val Gly
                165                 170                 175

Arg Glu Pro His Phe Pro Tyr Pro Thr Leu Arg Tyr Asp
            180                 185
```

<210> SEQ ID NO 62
<211> LENGTH: 317
<212> TYPE: PRT
<213> ORGANISM: Desulfovibrio vulgaris

<400> SEQUENCE: 62

```
Met Lys Ile Ser Ile Gly Leu Gly Lys Glu Gly Val Glu Glu Arg Leu
1               5                   10                  15

Ala Glu Arg Gly Val Ser Arg Arg Asp Phe Leu Lys Phe Cys Thr Ala
                20                  25                  30

Ile Ala Val Thr Met Gly Met Gly Pro Ala Phe Ala Pro Glu Val Ala
            35                  40                  45

Arg Ala Leu Met Gly Pro Arg Arg Pro Ser Val Val Tyr Leu His Asn
        50                  55                  60

Ala Glu Cys Thr Gly Cys Ser Glu Ser Val Leu Arg Ala Phe Glu Pro
65                  70                  75                  80

Tyr Ile Asp Thr Leu Ile Leu Asp Thr Leu Ser Leu Asp Tyr His Glu
                85                  90                  95

Thr Ile Met Ala Ala Gly Asp Ala Ala Glu Ala Ala Leu Glu Gln
            100                 105                 110

Ala Val Asn Ser Pro His Gly Phe Ile Ala Val Val Glu Gly Gly Ile
        115                 120                 125

Pro Thr Ala Ala Asn Gly Ile Tyr Gly Lys Val Ala Asn His Thr Met
130                 135                 140

Leu Asp Ile Cys Ser Arg Ile Leu Pro Lys Ala Gln Ala Val Ile Ala
145                 150                 155                 160

Tyr Gly Thr Cys Ala Thr Phe Gly Gly Val Gln Ala Ala Lys Pro Asn
                165                 170                 175

Pro Thr Gly Ala Lys Gly Val Asn Asp Ala Leu Lys His Leu Gly Val
            180                 185                 190

Lys Ala Ile Asn Ile Ala Gly Cys Pro Pro Asn Pro Tyr Asn Leu Val
        195                 200                 205

Gly Thr Ile Val Tyr Tyr Leu Lys Asn Lys Ala Ala Pro Glu Leu Asp
210                 215                 220

Ser Leu Asn Arg Pro Thr Met Phe Phe Gly Gln Thr Val His Glu Gln
225                 230                 235                 240

Cys Pro Arg Leu Pro His Phe Asp Ala Gly Glu Phe Ala Pro Ser Phe
                245                 250                 255

Glu Ser Glu Glu Ala Arg Lys Gly Trp Cys Leu Tyr Glu Leu Gly Cys
            260                 265                 270

Lys Gly Pro Val Thr Met Asn Asn Cys Pro Lys Ile Lys Phe Asn Gln
        275                 280                 285

Thr Asn Trp Pro Val Asp Ala Gly His Pro Cys Ile Gly Cys Ser Glu
    290                 295                 300
```

```
Pro Asp Phe Trp Asp Ala Met Thr Pro Phe Tyr Gln Asn
305                 310                 315
```

<210> SEQ ID NO 63
<211> LENGTH: 567
<212> TYPE: PRT
<213> ORGANISM: Desulfovibrio vulgaris

<400> SEQUENCE: 63

```
Met Ser Gly Cys Arg Ala Gln Asn Ala Pro Gly Gly Ile Pro Val Thr
1               5                   10                  15

Pro Lys Ser Ser Tyr Ser Gly Pro Ile Val Asp Pro Val Thr Arg
                20                  25                  30

Ile Glu Gly His Leu Arg Ile Glu Val Glu Val Glu Asn Gly Lys Val
            35                  40                  45

Lys Asn Ala Tyr Ser Ser Ser Thr Leu Phe Arg Gly Leu Glu Ile Ile
50                  55                  60

Leu Lys Gly Arg Asp Pro Arg Asp Ala Gln His Phe Thr Gln Arg Thr
65                  70                  75                  80

Cys Gly Val Cys Thr Tyr Thr His Ala Leu Ala Ser Thr Arg Cys Val
                85                  90                  95

Asp Asn Ala Val Gly Val His Ile Pro Lys Asn Ala Thr Tyr Ile Arg
                100                 105                 110

Asn Leu Val Leu Gly Ala Gln Tyr Leu His Asp His Ile Val His Phe
            115                 120                 125

Tyr His Leu His Ala Leu Asp Phe Val Asp Val Thr Ala Ala Leu Lys
130                 135                 140

Ala Asp Pro Ala Lys Ala Ala Lys Val Ala Ser Ser Ile Ser Pro Arg
145                 150                 155                 160

Lys Thr Thr Ala Ala Asp Leu Lys Ala Val Gln Asp Lys Leu Lys Thr
                165                 170                 175

Phe Val Glu Thr Gly Gln Leu Gly Pro Phe Thr Asn Ala Tyr Phe Leu
            180                 185                 190

Gly Gly His Pro Ala Tyr Tyr Leu Asp Pro Glu Thr Asn Leu Ile Ala
            195                 200                 205

Thr Ala His Tyr Leu Glu Ala Leu Arg Leu Gln Val Lys Ala Ala Arg
210                 215                 220

Ala Met Ala Val Phe Gly Ala Lys Asn Pro His Thr Gln Phe Thr Val
225                 230                 235                 240

Val Gly Gly Val Thr Cys Tyr Asp Ala Leu Thr Pro Gln Arg Ile Ala
                245                 250                 255

Glu Phe Glu Ala Leu Trp Lys Glu Thr Lys Ala Phe Val Asp Glu Val
            260                 265                 270

Tyr Ile Pro Asp Leu Leu Val Ala Ala Ala Tyr Lys Asp Trp Thr
            275                 280                 285

Gln Tyr Gly Gly Thr Asp Asn Phe Ile Thr Phe Gly Glu Phe Pro Lys
            290                 295                 300

Asp Glu Tyr Asp Leu Asn Ser Arg Phe Phe Lys Pro Gly Val Val Phe
305                 310                 315                 320

Lys Arg Asp Phe Lys Asn Ile Lys Pro Phe Asp Lys Met Gln Ile Glu
                325                 330                 335

Glu His Val Arg His Ser Trp Tyr Glu Gly Ala Glu Ala Arg His Pro
            340                 345                 350

Trp Lys Gly Gln Thr Gln Pro Lys Tyr Thr Asp Leu His Gly Asp Asp
            355                 360                 365
```

```
Arg Tyr Ser Trp Met Lys Ala Pro Arg Tyr Met Gly Glu Pro Met Glu
        370                 375                 380

Thr Gly Pro Leu Ala Gln Val Leu Ile Ala Tyr Ser Gln Gly His Pro
385                 390                 395                 400

Lys Val Lys Ala Val Thr Asp Ala Val Leu Ala Lys Leu Gly Val Gly
                405                 410                 415

Pro Glu Ala Leu Phe Ser Thr Leu Gly Arg Thr Ala Ala Arg Gly Ile
            420                 425                 430

Glu Thr Ala Val Ile Ala Glu Tyr Val Gly Val Met Leu Gln Glu Tyr
        435                 440                 445

Lys Asp Asn Ile Ala Lys Gly Asp Asn Val Ile Cys Ala Pro Trp Glu
    450                 455                 460

Met Pro Lys Gln Ala Glu Gly Val Gly Phe Val Asn Ala Pro Arg Gly
465                 470                 475                 480

Gly Leu Ser His Trp Ile Arg Ile Glu Asp Gly Lys Ile Gly Asn Phe
                485                 490                 495

Gln Leu Val Val Pro Ser Thr Trp Thr Leu Gly Pro Arg Cys Asp Lys
            500                 505                 510

Asn Asn Val Ser Pro Val Glu Ala Ser Leu Ile Gly Thr Pro Val Ala
        515                 520                 525

Asp Ala Lys Arg Pro Val Glu Ile Leu Arg Thr Val His Ser Phe Asp
530                 535                 540

Pro Cys Ile Ala Cys Gly Val His Val Ile Asp Gly His Thr Asn Glu
545                 550                 555                 560

Val His Lys Phe Arg Ile Leu
                565

<210> SEQ ID NO 64
<211> LENGTH: 264
<212> TYPE: PRT
<213> ORGANISM: Desulfovibrio gigas

<400> SEQUENCE: 64

Leu Thr Ala Lys Lys Arg Pro Ser Val Val Tyr Leu His Asn Ala Glu
1               5                   10                  15

Cys Thr Gly Cys Ser Glu Ser Val Leu Arg Thr Val Asp Pro Tyr Val
                20                  25                  30

Asp Glu Leu Ile Leu Asp Val Ile Ser Met Asp Tyr His Glu Thr Leu
            35                  40                  45

Met Ala Gly Ala Gly His Ala Val Glu Glu Ala Leu His Glu Ala Ile
    50                  55                  60

Lys Gly Asp Phe Val Cys Val Ile Glu Gly Ile Pro Met Gly Asp
65                  70                  75                  80

Gly Gly Tyr Trp Gly Lys Val Gly Gly Arg Asn Met Tyr Asp Ile Cys
                85                  90                  95

Ala Glu Val Ala Pro Lys Ala Lys Ala Val Ile Ala Ile Gly Thr Cys
            100                 105                 110

Ala Thr Tyr Gly Gly Val Gln Ala Ala Lys Pro Asn Pro Thr Gly Thr
        115                 120                 125

Val Gly Val Asn Glu Ala Leu Gly Lys Leu Gly Val Lys Ala Ile Asn
    130                 135                 140

Ile Ala Gly Cys Pro Pro Asn Pro Met Asn Phe Val Gly Thr Val Val
145                 150                 155                 160

His Leu Leu Thr Lys Gly Met Pro Glu Leu Asp Lys Gln Gly Arg Pro
```

```
                        165                 170                 175
Val Met Phe Phe Gly Glu Thr Val His Asp Asn Cys Pro Arg Leu Lys
            180                 185                 190

His Phe Glu Ala Gly Glu Phe Ala Thr Ser Phe Gly Ser Pro Glu Ala
            195                 200                 205

Lys Lys Gly Tyr Cys Leu Tyr Glu Leu Gly Cys Lys Gly Pro Asp Thr
            210                 215                 220

Tyr Asn Asn Cys Pro Lys Gln Leu Phe Asn Gln Val Asn Trp Pro Val
225                 230                 235                 240

Gln Ala Gly His Pro Cys Ile Ala Cys Ser Glu Pro Asn Phe Trp Asp
            245                 250                 255

Leu Tyr Ser Pro Phe Tyr Ser Ala
            260

<210> SEQ ID NO 65
<211> LENGTH: 536
<212> TYPE: PRT
<213> ORGANISM: Desulfovibrio gigas

<400> SEQUENCE: 65

Met Ser Glu Met Gln Gly Asn Lys Ile Val Asp Pro Ile Thr Arg
1               5                   10                  15

Ile Glu Gly His Leu Arg Ile Glu Val Glu Val Glu Gly Gly Lys Ile
            20                  25                  30

Lys Asn Ala Trp Ser Met Ser Thr Leu Phe Arg Gly Leu Glu Met Ile
            35                  40                  45

Leu Lys Gly Arg Asp Pro Arg Asp Ala Gln His Phe Thr Gln Arg Ala
50                  55                  60

Cys Gly Val Cys Thr Tyr Val His Ala Leu Ala Ser Val Arg Ala Val
65                  70                  75                  80

Asp Asn Cys Val Gly Val Lys Ile Pro Glu Asn Ala Thr Leu Met Arg
            85                  90                  95

Asn Leu Thr Met Gly Ala Gln Tyr Met His Asp His Leu Val His Phe
            100                 105                 110

Tyr His Leu His Ala Leu Asp Trp Val Asn Val Ala Asn Ala Leu Asn
            115                 120                 125

Ala Asp Pro Ala Lys Ala Ala Arg Leu Ala Asn Asp Leu Ser Pro Arg
            130                 135                 140

Lys Thr Thr Thr Glu Ser Leu Lys Ala Val Gln Ala Lys Val Lys Ala
145                 150                 155                 160

Leu Val Glu Ser Gly Gln Leu Gly Ile Phe Thr Asn Ala Tyr Phe Leu
            165                 170                 175

Gly Gly His Pro Ala Tyr Val Leu Pro Ala Glu Val Asp Leu Ile Ala
            180                 185                 190

Thr Ala His Tyr Leu Glu Ala Leu Arg Val Gln Val Lys Ala Ala Arg
            195                 200                 205

Ala Met Ala Ile Phe Gly Ala Lys Asn Pro His Thr Gln Phe Thr Val
            210                 215                 220

Val Gly Gly Cys Thr Asn Tyr Asp Ser Leu Arg Pro Glu Arg Ile Ala
225                 230                 235                 240

Glu Phe Arg Lys Leu Tyr Lys Glu Val Arg Glu Phe Ile Glu Gln Val
            245                 250                 255

Tyr Ile Thr Asp Leu Leu Ala Val Ala Gly Phe Tyr Lys Asn Trp Ala
            260                 265                 270
```

```
Gly Ile Gly Lys Thr Ser Asn Phe Leu Thr Cys Gly Glu Phe Pro Thr
            275                 280                 285

Asp Glu Tyr Asp Leu Asn Ser Arg Tyr Thr Pro Gln Gly Val Ile Trp
    290                 295                 300

Gly Asn Asp Leu Ser Lys Val Asp Asp Phe Asn Pro Asp Leu Ile Glu
305                 310                 315                 320

Glu His Val Lys Tyr Ser Trp Tyr Glu Gly Ala Asp Ala His His Pro
                325                 330                 335

Tyr Lys Gly Val Thr Lys Pro Lys Trp Thr Phe His Gly Glu Asp
            340                 345                 350

Arg Tyr Ser Trp Met Lys Ala Pro Arg Tyr Lys Gly Glu Ala Phe Glu
    355                 360                 365

Val Gly Pro Leu Ala Ser Val Leu Val Ala Tyr Ala Lys Lys His Glu
    370                 375                 380

Pro Thr Val Lys Ala Val Asp Leu Val Leu Lys Thr Leu Gly Val Gly
385                 390                 395                 400

Pro Glu Ala Leu Phe Ser Thr Leu Gly Arg Thr Ala Ala Arg Gly Ile
                405                 410                 415

Gln Cys Leu Thr Ala Ala Gln Glu Val Glu Val Trp Leu Asp Lys Leu
            420                 425                 430

Glu Ala Asn Val Lys Ala Gly Lys Asp Asp Leu Tyr Thr Asp Trp Gln
    435                 440                 445

Tyr Pro Thr Glu Ser Gln Gly Val Gly Phe Val Asn Ala Pro Arg Gly
    450                 455                 460

Met Leu Ser His Trp Ile Val Gln Arg Gly Lys Ile Glu Asn Phe
465                 470                 475                 480

Gln Leu Val Val Pro Ser Thr Trp Asn Leu Gly Pro Arg Cys Ala Glu
            485                 490                 495

Gly Lys Leu Ser Ala Val Glu Gln Ala Leu Ile Gly Thr Pro Ile Ala
                500                 505                 510

Asp Pro Lys Arg Pro Val Glu Ile Leu Arg Thr Val His Ser Tyr Asp
            515                 520                 525

Pro Cys Ile Ala Cys Gly Val His
            530                 535

<210> SEQ ID NO 66
<211> LENGTH: 585
<212> TYPE: PRT
<213> ORGANISM: Salmonella enterica

<400> SEQUENCE: 66

Met Ala Tyr Pro Tyr Gln Thr Gln Gly Phe Thr Leu Asp Asn Ser Gly
1               5                   10                  15

Arg Arg Ile Val Val Asp Pro Val Thr Arg Ile Glu Gly His Met Arg
            20                  25                  30

Cys Glu Val Asn Ile Asp Ser Asn Asn Val Ile Thr Asn Ala Val Ser
        35                  40                  45

Thr Gly Thr Met Trp Arg Gly Leu Glu Val Ile Leu Lys Gly Arg Asp
    50                  55                  60

Pro Arg Asp Ala Trp Ala Phe Val Glu Arg Ile Cys Gly Val Cys Thr
65                  70                  75                  80

Gly Thr His Ala Leu Thr Ser Ile Arg Ala Val Glu Asn Ala Leu Gly
                85                  90                  95

Ile Ala Ile Pro Asp Asn Ala Asn Cys Ile Arg Asn Met Met Gln Ala
            100                 105                 110
```

```
Thr Leu His Val His Asp His Leu Val His Phe Tyr His Leu His Ala
        115                 120                 125
Leu Asp Trp Val Asp Val Val Ala Ala Leu Lys Ala Asp Pro His Gln
130                 135                 140
Thr Ser Ala Ile Ala Gln Ser Leu Ser Ala Trp Pro Leu Ser Ser Pro
145                 150                 155                 160
Gly Tyr Phe Arg Asp Leu Gln Asn Arg Leu Lys Arg Phe Ile Glu Ser
                165                 170                 175
Gly Gln Leu Gly Pro Phe Arg Asn Gly Tyr Trp Gly His Pro Ala Met
                180                 185                 190
Lys Leu Pro Pro Glu Ala Asn Leu Leu Ala Val Ala His Tyr Leu Glu
        195                 200                 205
Ala Leu Asp Phe Gln Lys Glu Ile Val Lys Ile His Thr Val Phe Gly
210                 215                 220
Gly Lys Asn Pro His Pro Asn Trp Leu Val Gly Val Pro Cys Ala
225                 230                 235                 240
Ile Asn Leu Asp Glu Thr Gly Ala Val Gly Ala Val Asn Met Glu Arg
                245                 250                 255
Leu Asn Leu Val Ser Ser Ile Ile Gln Lys Ala Arg Gln Phe Cys Glu
                260                 265                 270
Gln Val Tyr Leu Pro Asp Val Leu Leu Ile Ala Ser Tyr Tyr Lys Asp
        275                 280                 285
Trp Ala Lys Ile Gly Gly Leu Ser Ser Met Asn Leu Leu Ala Tyr
        290                 295                 300
Gly Glu Phe Pro Asp Asn Pro Asn Asp Tyr Ala Ser Asn Leu Leu
305                 310                 315                 320
Leu Pro Arg Gly Ala Ile Ile Asn Gly Arg Phe Asp Glu Ile His Pro
                325                 330                 335
Val Asp Leu Thr Ala Pro Asp Glu Ile Gln Glu Phe Val Thr His Ser
                340                 345                 350
Trp Tyr Thr Tyr Gly Asn Gly Asn Asn Asp Lys Gly Leu His Pro Trp
        355                 360                 365
Asp Gly Leu Thr Glu Pro Gln Leu Val Met Gly Glu His Tyr Lys Gly
        370                 375                 380
Thr Lys Thr Phe Ile Glu Gln Val Asp Glu Ser Ala Lys Tyr Ser Trp
385                 390                 395                 400
Ile Lys Ser Pro Arg Trp Lys Gly His Ala Met Glu Val Gly Pro Leu
                405                 410                 415
Ala Arg Tyr Leu Ile Gly Tyr His Gln Asn Lys Pro Glu Phe Lys Glu
                420                 425                 430
Pro Val Asp Gln Leu Leu Ser Val Leu Lys Leu Pro Lys Glu Ala Leu
        435                 440                 445
Phe Ser Thr Leu Gly Arg Thr Ala Ala Arg Ala Leu Glu Ser Val Trp
450                 455                 460
Ala Gly Asn Thr Leu Gln Tyr Phe Phe Asp Arg Leu Met Arg Asn Leu
465                 470                 475                 480
Lys Ser Gly Asp Thr Ala Thr Ala Asn Val Thr Leu Trp Glu Pro Asp
                485                 490                 495
Thr Trp Pro Thr Ser Ala Lys Gly Val Gly Phe Ser Glu Ala Pro Arg
                500                 505                 510
Gly Ala Leu Gly His Trp Ile Lys Ile Ala Asn Gln Lys Ile Asp Ser
        515                 520                 525
```

-continued

```
Tyr Gln Cys Val Val Pro Thr Thr Trp Asn Ala Gly Pro Arg Asp Asp
    530                 535                 540

Lys Gly Gln Ile Gly Ala Tyr Glu Ala Ala Leu Met Gly Thr Lys Leu
545                 550                 555                 560

Ala Val Pro Asp Gln Pro Leu Glu Ile Leu Arg Thr Leu His Ser Phe
                565                 570                 575

Asp Pro Cys Leu Ala Cys Ser Thr His
                580                 585

<210> SEQ ID NO 67
<211> LENGTH: 279
<212> TYPE: PRT
<213> ORGANISM: Salmonella enterica

<400> SEQUENCE: 67

Leu Glu Asn Lys Pro Arg Thr Pro Val Ile Trp Leu His Gly Leu Glu
1               5                   10                  15

Cys Thr Cys Cys Thr Glu Ser Phe Ile Arg Ser Ala His Pro Leu Ala
            20                  25                  30

Lys Asp Ala Ile Leu Ser Leu Ile Ser Leu Asp Tyr Asp Asp Thr Ile
        35                  40                  45

Met Ala Ala Gly Gln Gln Ala Glu Gln Ala Leu Ala Asp Val Met
    50                  55                  60

Arg Glu Tyr Lys Gly Asn Tyr Ile Val Ala Val Glu Gly Asn Ala Pro
65                  70                  75                  80

Leu Asn Glu Asp Gly Met Phe Cys Ile Leu Ala Gly Glu Pro Phe Leu
                85                  90                  95

Glu Lys Leu Lys Arg Val Ser Ala Asp Ala Lys Ala Ile Ile Ala Trp
            100                 105                 110

Gly Ser Cys Ala Ser Trp Gly Cys Val Gln Ala Ala Arg Pro Asn Pro
        115                 120                 125

Thr Lys Ala Thr Pro Val His Lys Leu Ile Thr Asp Lys Pro Ile Ile
    130                 135                 140

Lys Val Pro Gly Cys Pro Pro Ile Pro Glu Val Met Ser Ala Val Ile
145                 150                 155                 160

Thr Tyr Met Leu Ala Phe Asp Arg Ile Pro Pro Leu Asp Arg Leu Gly
                165                 170                 175

Arg Pro Lys Met Phe Tyr Gly Arg Ile His Asp Lys Cys Tyr Arg
            180                 185                 190

Arg Ala His Phe Asp Ala Gly Gln Phe Val Glu Ala Trp Asp Asp Glu
        195                 200                 205

Gly Ala Arg Lys Gly Tyr Cys Leu Tyr Lys Met Gly Cys Lys Gly Pro
    210                 215                 220

Thr Thr Tyr Asn Ala Cys Ser Thr Val Arg Trp Asn Asp Gly Val Ser
225                 230                 235                 240

Phe Pro Ile Gln Ser Gly His Gly Cys Leu Gly Cys Ser Glu Asp Gly
                245                 250                 255

Phe Trp Asp Tyr Gly Ser Phe Tyr Ser Arg Ala Thr Gly Ser Arg Ser
            260                 265                 270

His His His His His His His
        275

<210> SEQ ID NO 68
<211> LENGTH: 412
<212> TYPE: PRT
<213> ORGANISM: Pyrococcus furiosus
```

<400> SEQUENCE: 68

```
Met Ile Ile Glu Leu Asp Glu Phe Thr Arg Val Glu Gly Asn Gly Lys
1               5                   10                  15

Ala Glu Ile Val Ile Glu Asn Gly Glu Val Lys Asp Ala Arg Val Lys
                20                  25                  30

Ile Val Glu Gly Pro Arg Phe Phe Glu Ile Leu Thr Leu Gly Arg Asp
            35                  40                  45

Tyr Trp Asp Val Pro Asp Leu Glu Ala Arg Ile Cys Ala Ile Cys Tyr
        50                  55                  60

Ile Ala His Ser Val Ala Ser Val Arg Ala Ile Glu Lys Ala Leu Gly
65                  70                  75                  80

Ile Asp Val Pro Glu Ser Val Glu Lys Leu Arg Glu Leu Ala Leu Trp
                85                  90                  95

Gly Glu Ile Ile Glu Ser His Ala Leu His Leu Tyr Leu Leu Ala Leu
            100                 105                 110

Pro Asp Val Phe Gly Tyr Pro Asp Ala Ile Ser Met Ile Pro Arg His
        115                 120                 125

Gly Glu Leu Val Lys Glu Gly Leu Thr Ile Lys Ala Phe Gly Asn Ala
130                 135                 140

Ile Arg Glu Leu Ile Gly Gly Arg Glu Ile His Gly Ile Asn Ile Lys
145                 150                 155                 160

Pro Gly Gly Phe Gly Arg Tyr Pro Ser Glu Glu Leu Glu Lys Ile
                165                 170                 175

Ala Glu His Ser Lys Ser Leu Ile Lys Phe Ala Arg Arg Ile Val Gly
            180                 185                 190

Ile Phe Ala Ser Gln Glu Ala Gly Gly Ala Val Gly Glu Val Leu Met
        195                 200                 205

Ala Thr Ser Asp Tyr Leu Trp Gly Asp Glu Leu Ile Ile Asn Gly Glu
210                 215                 220

Arg Val Gln Tyr Tyr Glu Val Asp Glu Val Pro Val Gly Tyr Ser Phe
225                 230                 235                 240

Ala Lys His Ser Tyr Tyr Lys Gly Asn Pro Val Phe Val Gly Ala Leu
                245                 250                 255

Pro Arg Leu Leu Leu Lys Gly Glu Ser Ile Glu Gly Glu Ala Ala Arg
            260                 265                 270

Met Leu Glu Glu Tyr Arg Asp Lys Leu Glu Ser Lys Tyr Val Ile Tyr
        275                 280                 285

Asn Asn Leu Ala Gln Ala Ile Glu Leu Leu Tyr Ala Leu Glu Arg Val
290                 295                 300

Pro Gln Leu Val Glu Glu Ile Leu Ser Glu Gly Ile Glu Arg Gly Asn
305                 310                 315                 320

Gly Glu Ile Ser Gln Glu Ser Gly Glu Gly Val Gly Tyr Val Glu Ala
                325                 330                 335

Pro Arg Gly Val Leu Val His His Tyr Arg Ile Glu Asn Gly Lys Val
            340                 345                 350

Val Trp Ser Asn Thr Ile Thr Pro Thr Ala Phe Asn Gln Arg Leu Met
        355                 360                 365

Glu Leu Ser Leu Leu Glu Glu Ala Lys Arg Leu Tyr Gly Ser Glu Ser
    370                 375                 380

Glu Glu Asn Met Lys Lys Arg Leu Glu Val Ile Val Arg Ala Phe Asp
385                 390                 395                 400

Pro Cys Ile Ser Cys Ser Val His Phe Val Lys Leu
```

-continued

```
                405                 410
```

<210> SEQ ID NO 69
<211> LENGTH: 488
<212> TYPE: PRT
<213> ORGANISM: Ralstonia eutropha

<400> SEQUENCE: 69

```
Met Ser Arg Lys Leu Val Ile Asp Pro Val Thr Arg Ile Glu Gly His
1               5                   10                  15

Gly Lys Val Val Val His Leu Asp Asp Asn Lys Val Val Asp Ala
                20                  25                  30

Lys Leu His Val Val Glu Phe Arg Gly Phe Glu Lys Val Gln Gly
            35                  40                  45

His Pro Phe Trp Glu Ala Pro Met Phe Leu Gln Arg Ile Cys Gly Ala
        50                  55                  60

Cys Phe Val Ser His His Leu Cys Gly Ala Lys Ala Leu Asp Asp Met
65                  70                  75                  80

Val Gly Val Gly Leu Lys Ser Gly Ile His Val Thr Pro Thr Ala Glu
                85                  90                  95

Lys Met Arg Arg Leu Gly His Tyr Ala Gln Met Leu Gln Ser His Thr
            100                 105                 110

Thr Ala Tyr Phe Tyr Leu Ile Val Pro Glu Met Leu Phe Gly Met Asp
        115                 120                 125

Ala Pro Pro Ala Gln Arg Asn Val Leu Gly Leu Ile Glu Ala Asn Pro
    130                 135                 140

Asp Leu Val Lys Arg Val Val Met Leu Arg Lys Trp Gly Gln Glu Val
145                 150                 155                 160

Ile Lys Ala Val Phe Gly Lys Lys Met His Gly Ile Asn Ser Val Pro
                165                 170                 175

Gly Gly Val Asn Asn Asn Leu Ser Ile Ala Glu Arg Asp Arg Phe Leu
            180                 185                 190

Asn Gly Glu Glu Gly Leu Leu Ser Val Asp Gln Val Ile Asp Tyr Ala
        195                 200                 205

Gln Asp Gly Leu Arg Leu Phe Tyr Asp Phe His Gln Lys His Arg Ala
    210                 215                 220

Gln Val Asp Ser Phe Ala Asp Val Pro Ala Leu Ser Met Cys Leu Val
225                 230                 235                 240

Gly Asp Asp Asp Asn Val Asp Tyr Tyr His Gly Arg Leu Arg Ile Ile
                245                 250                 255

Asp Asp Asp Lys His Ile Val Arg Glu Phe Asp Tyr His Asp Tyr Leu
            260                 265                 270

Asp His Phe Ser Glu Ala Val Glu Glu Trp Ser Tyr Met Lys Phe Pro
        275                 280                 285

Tyr Leu Lys Glu Leu Gly Arg Glu Gln Gly Ser Val Arg Val Gly Pro
    290                 295                 300

Leu Gly Arg Met Asn Val Thr Lys Ser Leu Pro Thr Pro Leu Ala Gln
305                 310                 315                 320

Glu Ala Leu Glu Arg Phe His Ala Tyr Thr Lys Gly Arg Thr Asn Asn
                325                 330                 335

Met Thr Leu His Thr Asn Trp Ala Arg Ala Ile Glu Ile Leu His Ala
            340                 345                 350

Ala Glu Val Val Lys Glu Leu Leu His Asp Pro Asp Leu Gln Lys Asp
        355                 360                 365
```

```
Gln Leu Val Leu Thr Pro Pro Asn Ala Trp Thr Gly Glu Gly Val
    370             375                 380

Gly Val Val Glu Ala Pro Arg Gly Thr Leu Leu His His Tyr Arg Ala
385             390                 395                 400

Asp Glu Arg Gly Asn Ile Thr Phe Ala Asn Leu Val Val Ala Thr Thr
                405                 410                 415

Gln Asn Asn Gln Val Met Asn Arg Thr Val Arg Ser Val Ala Glu Asp
            420                 425                 430

Tyr Leu Gly Gly His Gly Glu Ile Thr Glu Gly Met Met Asn Ala Ile
                435                 440                 445

Glu Val Gly Ile Arg Ala Tyr Asp Pro Cys Leu Ser Cys Ala Thr His
450                 455                 460

Ala Leu Gly Gln Met Pro Leu Val Val Ser Val Phe Asp Ala Ala Gly
465                 470                 475                 480

Arg Leu Ile Asp Glu Arg Ala Arg
                485
```

<210> SEQ ID NO 70
<211> LENGTH: 602
<212> TYPE: PRT
<213> ORGANISM: Ralstonia eutropha

<400> SEQUENCE: 70

```
Met Asp Ser Arg Ile Thr Thr Ile Leu Glu Arg Tyr Arg Ser Asp Arg
1               5                   10                  15

Thr Arg Leu Ile Asp Ile Leu Trp Asp Val Gln His Glu Tyr Gly His
            20                  25                  30

Ile Pro Asp Ala Val Leu Pro Gln Leu Gly Ala Gly Leu Lys Leu Ser
        35                  40                  45

Pro Leu Asp Ile Arg Glu Thr Ala Ser Phe Tyr His Phe Phe Leu Asp
    50                  55                  60

Lys Pro Ser Gly Lys Tyr Arg Ile Tyr Leu Cys Asn Ser Val Ile Ala
65                  70                  75                  80

Lys Ile Asn Gly Tyr Gln Ala Val Arg Glu Ala Leu Glu Arg Glu Thr
                85                  90                  95

Gly Ile Arg Phe Gly Glu Thr Asp Pro Asn Gly Met Phe Gly Leu Phe
            100                 105                 110

Asp Thr Pro Cys Ile Gly Leu Ser Asp Gln Glu Pro Ala Met Leu Ile
        115                 120                 125

Asp Lys Val Val Phe Thr Arg Leu Arg Pro Gly Lys Ile Thr Asp Ile
    130                 135                 140

Ile Ala Gln Leu Lys Gln Gly Arg Ser Pro Ala Glu Ile Ala Asn Pro
145                 150                 155                 160

Ala Gly Leu Pro Ser Gln Asp Ile Ala Tyr Val Asp Ala Met Val Glu
                165                 170                 175

Ser Asn Val Arg Thr Lys Gly Pro Val Phe Phe Arg Gly Arg Thr Asp
            180                 185                 190

Leu Arg Ser Leu Leu Asp Gln Cys Leu Leu Leu Lys Pro Glu Gln Val
        195                 200                 205

Ile Glu Thr Ile Val Asp Ser Arg Leu Arg Gly Arg Gly Gly Ala Gly
    210                 215                 220

Phe Ser Thr Gly Leu Lys Trp Arg Leu Cys Arg Asp Ala Glu Ser Glu
225                 230                 235                 240

Gln Lys Tyr Val Ile Cys Asn Ala Asp Glu Gly Glu Pro Gly Thr Phe
                245                 250                 255
```

```
Lys Asp Arg Val Leu Leu Thr Arg Ala Pro Lys Lys Val Phe Val Gly
            260                 265                 270

Met Val Ile Ala Ala Tyr Ala Ile Gly Cys Arg Lys Gly Ile Val Tyr
        275                 280                 285

Leu Arg Gly Glu Tyr Phe Tyr Leu Lys Asp Tyr Leu Glu Arg Gln Leu
    290                 295                 300

Gln Glu Leu Arg Glu Asp Gly Leu Leu Gly Arg Ala Ile Gly Arg
305                 310                 315                 320

Ala Gly Phe Asp Phe Asp Ile Arg Ile Gln Met Gly Ala Gly Ala Tyr
                325                 330                 335

Ile Cys Gly Asp Ala Ser Ala Leu Ile Glu Ser Cys Glu Gly Lys Arg
            340                 345                 350

Gly Thr Pro Arg Val Lys Pro Pro Phe Pro Val Gln Gln Gly Tyr Leu
        355                 360                 365

Gly Lys Pro Thr Ser Val Asn Asn Val Glu Thr Phe Ala Ala Val Ser
    370                 375                 380

Arg Ile Met Glu Glu Gly Ala Asp Trp Phe Arg Ala Met Gly Thr Pro
385                 390                 395                 400

Asp Ser Ala Gly Thr Arg Leu Leu Ser Val Ala Gly Asp Cys Ser Lys
                405                 410                 415

Pro Gly Ile Tyr Glu Val Glu Trp Gly Val Thr Leu Asn Glu Val Leu
            420                 425                 430

Ala Met Val Gly Ala Arg Asp Ala Arg Ala Val Gln Ile Ser Gly Pro
        435                 440                 445

Ser Gly Glu Cys Val Ser Val Ala Lys Asp Gly Glu Arg Lys Leu Ala
    450                 455                 460

Tyr Glu Ser Leu Ser Cys Asn Gly Ala Phe Thr Ile Phe Asn Cys Lys
465                 470                 475                 480

Arg Asp Leu Leu Glu Ile Val Arg Asp His Met Gln Phe Phe Val Glu
                485                 490                 495

Glu Ser Cys Gly Ile Cys Val Pro Cys Arg Ala Gly Asn Val Asp Leu
            500                 505                 510

His Arg Lys Val Glu Trp Val Ile Ala Gly Lys Ala Cys Gln Lys Asp
        515                 520                 525

Leu Asp Asp Met Val Ser Trp Gly Ala Leu Val Arg Arg Thr Ser Arg
    530                 535                 540

Cys Gly Leu Gly Ala Thr Ser Pro Lys Pro Ile Leu Thr Thr Leu Glu
545                 550                 555                 560

Lys Phe Pro Glu Ile Tyr Gln Asn Lys Leu Val Arg His Glu Gly Pro
                565                 570                 575

Leu Leu Pro Ser Phe Asp Leu Asp Thr Ala Leu Gly Tyr Glu Lys
            580                 585                 590

Ala Leu Lys Asp Leu Glu Glu Val Thr Arg
        595                 600

<210> SEQ ID NO 71
<211> LENGTH: 715
<212> TYPE: PRT
<213> ORGANISM: Escherichia coli
<220> FEATURE:
<221> NAME/KEY: MISC_FEATURE
<222> LOCATION: (140)..(140)
<223> OTHER INFORMATION: Selenocysteine (U)

<400> SEQUENCE: 71
```

```
Met Lys Lys Val Val Thr Val Cys Pro Tyr Cys Ala Ser Gly Cys Lys
1               5                   10                  15

Ile Asn Leu Val Val Asp Asn Gly Lys Ile Val Arg Ala Glu Ala Ala
            20                  25                  30

Gln Gly Lys Thr Asn Gln Gly Thr Leu Cys Leu Lys Gly Tyr Tyr Gly
        35                  40                  45

Trp Asp Phe Ile Asn Asp Thr Gln Ile Leu Thr Pro Arg Leu Lys Thr
50                  55                  60

Pro Met Ile Arg Arg Gln Arg Gly Gly Lys Leu Glu Pro Val Ser Trp
65                  70                  75                  80

Asp Glu Ala Leu Asn Tyr Val Ala Glu Arg Leu Ser Ala Ile Lys Glu
                85                  90                  95

Lys Tyr Gly Pro Asp Ala Ile Gln Thr Thr Gly Ser Ser Arg Gly Thr
                100                 105                 110

Gly Asn Glu Thr Asn Tyr Val Met Gln Lys Phe Ala Arg Ala Val Ile
            115                 120                 125

Gly Thr Asn Asn Val Asp Cys Cys Ala Arg Val Xaa His Gly Pro Ser
    130                 135                 140

Val Ala Gly Leu His Gln Ser Val Gly Asn Gly Ala Met Ser Asn Ala
145                 150                 155                 160

Ile Asn Glu Ile Asp Asn Thr Asp Leu Val Phe Val Phe Gly Tyr Asn
                165                 170                 175

Pro Ala Asp Ser His Pro Ile Val Ala Asn His Val Ile Asn Ala Lys
                180                 185                 190

Arg Asn Gly Ala Lys Ile Ile Val Cys Asp Pro Arg Lys Ile Glu Thr
            195                 200                 205

Ala Arg Ile Ala Asp Met His Ile Ala Leu Lys Asn Gly Ser Asn Ile
    210                 215                 220

Ala Leu Leu Asn Ala Met Gly His Val Ile Glu Glu Asn Leu Tyr
225                 230                 235                 240

Asp Lys Ala Phe Val Ala Ser Arg Thr Glu Gly Phe Glu Glu Tyr Arg
                245                 250                 255

Lys Ile Val Glu Gly Tyr Thr Pro Glu Ser Val Glu Asp Ile Thr Gly
            260                 265                 270

Val Ser Ala Ser Glu Ile Arg Gln Ala Ala Arg Met Tyr Ala Gln Ala
    275                 280                 285

Lys Ser Ala Ala Ile Leu Trp Gly Met Gly Val Thr Gln Phe Tyr Gln
    290                 295                 300

Gly Val Glu Thr Val Arg Ser Leu Thr Ser Leu Ala Met Leu Thr Gly
305                 310                 315                 320

Asn Leu Gly Lys Pro His Ala Gly Val Asn Pro Val Arg Gly Gln Asn
                325                 330                 335

Asn Val Gln Gly Ala Cys Asp Met Gly Ala Leu Pro Asp Thr Tyr Pro
            340                 345                 350

Gly Tyr Gln Tyr Val Lys Asp Pro Ala Asn Arg Glu Lys Phe Ala Lys
    355                 360                 365

Ala Trp Gly Val Glu Ser Leu Pro Ala His Thr Gly Tyr Arg Ile Ser
    370                 375                 380

Glu Leu Pro His Arg Ala His Gly Glu Val Arg Ala Ala Tyr Ile
385                 390                 395                 400

Met Gly Glu Asp Pro Leu Gln Thr Asp Ala Glu Leu Ser Ala Val Arg
                405                 410                 415

Lys Ala Phe Glu Asp Leu Glu Leu Val Ile Val Gln Asp Ile Phe Met
```

```
                420             425             430
Thr Lys Thr Ala Ser Ala Ala Asp Val Ile Leu Pro Ser Thr Ser Trp
            435                 440                 445
Gly Glu His Glu Gly Val Phe Thr Ala Ala Asp Arg Gly Phe Gln Arg
        450                 455                 460
Phe Phe Lys Ala Val Glu Pro Lys Trp Asp Leu Lys Thr Asp Trp Gln
465                 470                 475                 480
Ile Ile Ser Glu Ile Ala Thr Arg Met Gly Tyr Pro Met His Tyr Asn
                485                 490                 495
Asn Thr Gln Glu Ile Trp Asp Glu Leu Arg His Leu Cys Pro Asp Phe
            500                 505                 510
Tyr Gly Ala Thr Tyr Glu Lys Met Gly Glu Leu Gly Phe Ile Gln Trp
        515                 520                 525
Pro Cys Arg Asp Thr Ser Asp Ala Asp Gln Gly Thr Ser Tyr Leu Phe
    530                 535                 540
Lys Glu Lys Phe Asp Thr Pro Asn Gly Leu Ala Gln Phe Phe Thr Cys
545                 550                 555                 560
Asp Trp Val Ala Pro Ile Asp Lys Leu Thr Asp Glu Tyr Pro Met Val
                565                 570                 575
Leu Ser Thr Val Arg Glu Val Gly His Tyr Ser Cys Arg Ser Met Thr
            580                 585                 590
Gly Asn Cys Ala Ala Leu Ala Ala Leu Ala Asp Glu Pro Gly Tyr Ala
        595                 600                 605
Gln Ile Asn Thr Glu Asp Ala Lys Arg Leu Gly Ile Glu Asp Glu Ala
    610                 615                 620
Leu Val Trp Val His Ser Arg Lys Gly Lys Ile Ile Thr Arg Ala Gln
625                 630                 635                 640
Val Ser Asp Arg Pro Asn Lys Gly Ala Ile Tyr Met Thr Tyr Gln Trp
                645                 650                 655
Trp Ile Gly Ala Cys Asn Glu Leu Val Thr Glu Asn Leu Ser Pro Ile
            660                 665                 670
Thr Lys Thr Pro Glu Tyr Lys Tyr Cys Ala Val Arg Val Glu Pro Ile
        675                 680                 685
Ala Asp Gln Arg Ala Ala Glu Gln Tyr Val Ile Asp Glu Tyr Asn Lys
    690                 695                 700
Leu Lys Thr Arg Leu Arg Glu Ala Ala Leu Ala
705                 710                 715

<210> SEQ ID NO 72
<211> LENGTH: 677
<212> TYPE: PRT
<213> ORGANISM: Comamonas testosteroni

<400> SEQUENCE: 72

Thr Gly Pro Ala Ala Gln Ala Ala Ala Val Gln Arg Val Asp Gly
1               5                   10                  15

Asp Phe Ile Arg Ala Asn Ala Ala Arg Thr Pro Asp Trp Pro Thr Ile
                20                  25                  30

Gly Val Asp Tyr Ala Glu Thr Arg Tyr Ser Arg Leu Asp Gln Ile Asn
            35                  40                  45

Ala Ala Asn Val Lys Asp Leu Gly Leu Ala Trp Ser Tyr Asn Leu Glu
        50                  55                  60

Ser Thr Arg Gly Val Glu Ala Thr Pro Val Val Asp Gly Ile Met
65                  70                  75                  80
```

```
Tyr Val Ser Ala Ser Trp Ser Val Val His Ala Ile Asp Thr Arg Thr
                85                  90                  95
Gly Asn Arg Ile Trp Thr Tyr Asp Pro Gln Ile Asp Arg Ser Thr Gly
            100                 105                 110
Phe Lys Gly Cys Cys Asp Val Val Asn Arg Gly Val Ala Leu Trp Lys
        115                 120                 125
Gly Lys Val Tyr Val Gly Ala Trp Asp Gly Arg Leu Ile Ala Leu Asp
    130                 135                 140
Ala Ala Thr Gly Lys Glu Val Trp His Gln Asn Thr Phe Glu Gly Gln
145                 150                 155                 160
Lys Gly Ser Leu Thr Ile Thr Gly Ala Pro Arg Val Phe Lys Gly Lys
                165                 170                 175
Val Ile Ile Gly Asn Gly Gly Ala Glu Tyr Gly Val Arg Gly Tyr Ile
            180                 185                 190
Thr Ala Tyr Asp Ala Glu Thr Gly Glu Arg Lys Trp Arg Trp Phe Ser
        195                 200                 205
Val Pro Gly Asp Pro Ser Lys Pro Phe Glu Asp Glu Ser Met Lys Arg
    210                 215                 220
Ala Ala Arg Thr Trp Asp Pro Ser Gly Lys Trp Trp Glu Ala Gly Gly
225                 230                 235                 240
Gly Gly Thr Met Trp Asp Ser Met Thr Phe Asp Ala Glu Leu Asn Thr
                245                 250                 255
Met Tyr Val Gly Thr Gly Asn Gly Ser Pro Trp Ser His Lys Val Arg
            260                 265                 270
Ser Pro Lys Gly Gly Asp Asn Leu Tyr Leu Ala Ser Ile Val Ala Leu
        275                 280                 285
Asp Pro Asp Thr Gly Lys Tyr Lys Trp His Tyr Gln Glu Thr Pro Gly
    290                 295                 300
Asp Asn Trp Asp Tyr Thr Ser Thr Gln Pro Met Ile Leu Ala Asp Ile
305                 310                 315                 320
Lys Ile Ala Gly Lys Pro Arg Lys Val Ile Leu His Ala Pro Lys Asn
                325                 330                 335
Gly Phe Phe Val Leu Asp Arg Thr Asn Gly Lys Phe Ile Ser Ala
            340                 345                 350
Lys Asn Phe Val Pro Val Asn Trp Ala Ser Gly Tyr Asp Lys His Gly
        355                 360                 365
Lys Pro Ile Gly Ile Ala Ala Arg Asp Gly Ser Lys Pro Gln Asp
    370                 375                 380
Ala Val Pro Gly Pro Tyr Gly Ala His Asn Trp His Pro Met Ser Phe
385                 390                 395                 400
Asn Pro Gln Thr Gly Leu Val Tyr Leu Pro Ala Gln Asn Val Pro Val
                405                 410                 415
Asn Leu Met Asp Asp Lys Lys Trp Glu Phe Asn Gln Ala Gly Pro Gly
            420                 425                 430
Lys Pro Gln Ser Gly Thr Gly Trp Asn Thr Ala Lys Phe Phe Asn Ala
        435                 440                 445
Glu Pro Pro Lys Ser Lys Pro Phe Gly Arg Leu Leu Ala Trp Asp Pro
    450                 455                 460
Val Ala Gln Lys Ala Ala Trp Ser Val Glu His Val Ser Pro Trp Asn
465                 470                 475                 480
Gly Gly Thr Leu Thr Thr Ala Gly Asn Val Val Phe Gln Gly Thr Ala
                485                 490                 495
Asp Gly Arg Leu Val Ala Tyr His Ala Ala Thr Gly Glu Lys Leu Trp
```

```
                    500                 505                 510
Glu Ala Pro Thr Gly Thr Gly Val Val Ala Ala Pro Ser Thr Tyr Met
            515                 520                 525
Val Asp Gly Arg Gln Tyr Val Ser Val Ala Val Gly Trp Gly Gly Val
        530                 535                 540
Tyr Gly Leu Ala Ala Arg Ala Thr Glu Arg Gln Gly Pro Gly Thr Val
545                 550                 555                 560
Tyr Thr Phe Val Val Gly Gly Lys Ala Arg Met Pro Glu Phe Val Ala
                565                 570                 575
Gln Arg Thr Gly Gln Leu Leu Gln Gly Val Lys Tyr Asp Pro Ala Lys
            580                 585                 590
Val Glu Ala Gly Thr Met Leu Tyr Val Ala Asn Cys Val Phe Cys His
        595                 600                 605
Gly Val Pro Gly Val Asp Arg Gly Gly Asn Ile Pro Asn Leu Gly Tyr
    610                 615                 620
Met Asp Ala Ser Tyr Ile Glu Asn Leu Pro Asn Phe Val Phe Lys Gly
625                 630                 635                 640
Pro Ala Met Val Arg Gly Met Pro Asp Phe Thr Gly Lys Leu Ser Gly
                645                 650                 655
Asp Asp Val Glu Ser Leu Lys Ala Phe Ile Gln Gly Thr Ala Asp Ala
            660                 665                 670
Ile Arg Pro Lys Pro
            675

<210> SEQ ID NO 73
<211> LENGTH: 546
<212> TYPE: PRT
<213> ORGANISM: Phanerochaete chrysosporium

<400> SEQUENCE: 73

Pro Thr Val Ser Ala Thr Pro Tyr Asp Tyr Ile Ile Val Gly Ala Gly
1               5                   10                  15
Pro Gly Gly Ile Ile Ala Ala Asp Arg Leu Ser Glu Ala Gly Lys Lys
                20                  25                  30
Val Leu Leu Leu Glu Arg Gly Gly Pro Ser Thr Lys Gln Thr Gly Gly
            35                  40                  45
Thr Tyr Val Ala Pro Trp Ala Thr Ser Ser Gly Leu Thr Lys Phe Asp
        50                  55                  60
Ile Pro Gly Leu Phe Glu Ser Leu Phe Thr Asp Ser Asn Pro Phe Trp
65              70                  75                  80
Trp Cys Lys Asp Ile Thr Val Phe Ala Gly Cys Leu Val Gly Gly Gly
                85                  90                  95
Thr Ser Val Asn Gly Ala Leu Tyr Trp Tyr Pro Asn Asp Gly Asp Phe
            100                 105                 110
Ser Ser Ser Val Gly Trp Pro Ser Ser Trp Thr Asn His Ala Pro Tyr
        115                 120                 125
Thr Ser Lys Leu Ser Ser Arg Leu Pro Ser Thr His Pro Ser Thr
    130                 135                 140
Asp Gly Gln Arg Tyr Leu Glu Gln Ser Phe Asn Val Val Ser Gln Leu
145                 150                 155                 160
Leu Lys Gly Gln Gly Tyr Asn Gln Ala Thr Ile Asn Asp Asn Pro Asn
                165                 170                 175
Tyr Lys Asp His Val Phe Gly Tyr Ser Ala Phe Asp Phe Leu Asn Gly
            180                 185                 190
```

-continued

Lys Arg Ala Gly Pro Val Ala Thr Tyr Leu Gln Thr Ala Leu Ala Arg
            195                 200                 205

Pro Asn Phe Thr Phe Lys Thr Asn Val Met Val Ser Asn Val Val Arg
210                 215                 220

Asn Gly Ser Gln Ile Leu Gly Val Gln Thr Asn Asp Pro Thr Leu Gly
225                 230                 235                 240

Pro Asn Gly Phe Ile Pro Val Thr Pro Lys Gly Arg Val Ile Leu Ser
            245                 250                 255

Ala Gly Ala Phe Gly Thr Ser Arg Ile Leu Phe Gln Ser Gly Ile Gly
            260                 265                 270

Pro Thr Asp Met Ile Gln Thr Val Gln Ser Asn Pro Thr Ala Ala Ala
            275                 280                 285

Ala Leu Pro Pro Gln Asn Gln Trp Ile Asn Leu Pro Val Gly Met Asn
            290                 295                 300

Ala Gln Asp Asn Pro Ser Ile Asn Leu Val Phe Thr His Pro Ser Ile
305                 310                 315                 320

Asp Ala Tyr Glu Asn Trp Ala Asp Val Trp Ser Asn Pro Arg Pro Ala
            325                 330                 335

Asp Ala Ala Gln Tyr Leu Ala Asn Gln Ser Gly Val Phe Ala Gly Ala
            340                 345                 350

Ser Pro Lys Leu Asn Phe Trp Arg Ala Tyr Ser Gly Ser Asp Gly Phe
            355                 360                 365

Thr Arg Tyr Ala Gln Gly Thr Val Arg Pro Gly Ala Ala Ser Val Asn
            370                 375                 380

Ser Ser Leu Pro Tyr Asn Ala Ser Gln Ile Phe Thr Ile Thr Val Tyr
385                 390                 395                 400

Leu Ser Thr Gly Ile Gln Ser Arg Gly Arg Ile Gly Ile Asp Ala Ala
            405                 410                 415

Leu Arg Gly Thr Val Leu Thr Pro Pro Trp Leu Val Asn Pro Val Asp
            420                 425                 430

Lys Thr Val Leu Leu Gln Ala Leu His Asp Val Ser Asn Ile Gly
            435                 440                 445

Ser Ile Pro Gly Leu Thr Met Ile Thr Pro Asp Val Thr Gln Thr Leu
450                 455                 460

Glu Glu Tyr Val Asp Ala Tyr Asp Pro Ala Thr Met Asn Ser Asn His
465                 470                 475                 480

Trp Val Ser Ser Thr Ile Gly Ser Ser Pro Gln Ser Ala Val Val
            485                 490                 495

Asp Ser Asn Val Lys Val Phe Gly Thr Asn Asn Leu Phe Ile Val Asp
            500                 505                 510

Ala Gly Ile Ile Pro His Leu Pro Thr Gly Asn Pro Gln Gly Thr Leu
            515                 520                 525

Met Ser Ala Ala Glu Gln Ala Ala Lys Ile Leu Ala Leu Ala Gly
530                 535                 540

Gly Pro
545

<210> SEQ ID NO 74
<211> LENGTH: 190
<212> TYPE: PRT
<213> ORGANISM: Phanerochaete chrysosporium

<400> SEQUENCE: 74

Glu Ser Ala Ser Gln Phe Thr Asp Pro Thr Thr Gly Phe Gln Phe Thr
1               5                   10                  15

```
Gly Ile Thr Asp Pro Val His Asp Val Thr Tyr Gly Phe Val Phe Pro
            20                  25                  30

Pro Leu Ala Thr Ser Gly Ala Gln Ser Thr Glu Phe Ile Gly Glu Val
        35                  40                  45

Val Ala Pro Ile Ala Ser Lys Trp Ile Gly Ile Ala Leu Gly Gly Ala
50                  55                  60

Met Asn Asn Asp Leu Leu Leu Val Ala Trp Ala Asn Gly Asn Gln Ile
65                  70                  75                  80

Val Ser Ser Thr Arg Trp Ala Thr Gly Tyr Val Gln Pro Thr Ala Tyr
                85                  90                  95

Thr Gly Thr Ala Thr Leu Thr Thr Leu Pro Glu Thr Thr Ile Asn Ser
            100                 105                 110

Thr His Trp Lys Trp Val Phe Arg Cys Gln Gly Cys Thr Glu Trp Asn
        115                 120                 125

Asn Gly Gly Gly Ile Asp Val Thr Ser Gln Gly Val Leu Ala Trp Ala
130                 135                 140

Phe Ser Asn Val Ala Val Asp Asp Pro Ser Asp Pro Gln Ser Thr Phe
145                 150                 155                 160

Ser Glu His Thr Asp Phe Gly Phe Phe Gly Ile Asp Tyr Ser Thr Ala
                165                 170                 175

His Ser Ala Asn Tyr Gln Asn Tyr Leu Asn Gly Asp Ser Gly
            180                 185                 190

<210> SEQ ID NO 75
<211> LENGTH: 807
<212> TYPE: PRT
<213> ORGANISM: Myricoccum thermophilum

<400> SEQUENCE: 75

Glu Asn Asn Val Pro Asn Thr Phe Thr Asp Pro Asp Ser Gly Ile Thr
1               5                   10                  15

Phe Asn Thr Trp Gly Leu Asp Glu Asp Ser Pro Gln Thr Gln Gly Gly
            20                  25                  30

Phe Thr Phe Gly Val Ala Leu Pro Ser Asp Ala Leu Thr Thr Asp Ala
        35                  40                  45

Ser Glu Phe Ile Gly Tyr Leu Lys Cys Ala Arg Asn Asp Glu Ser Gly
    50                  55                  60

Trp Cys Gly Ile Ser Leu Gly Gly Pro Met Thr Asn Ser Leu Leu Ile
65                  70                  75                  80

Thr Ala Trp Pro His Glu Asp Thr Val Tyr Thr Ser Leu Arg Phe Ala
                85                  90                  95

Thr Gly Tyr Ala Met Pro Asp Val Tyr Glu Gly Asp Ala Glu Ile Thr
            100                 105                 110

Gln Val Ser Ser Val Asn Ser Thr His Phe Ser Leu Ile Phe Arg
        115                 120                 125

Cys Lys Asn Cys Leu Gln Trp Ser His Gly Gly Ser Gly Gly Ala
130                 135                 140

Ser Thr Ser Gly Gly Val Leu Val Leu Gly Trp Val Gln Ala Phe Asp
145                 150                 155                 160

Asp Pro Gly Asn Pro Thr Cys Pro Glu Gln Ile Thr Leu Gln Gln His
                165                 170                 175

Asp Asn Gly Met Gly Ile Trp Gly Ala Gln Leu Asn Thr Asp Ala Ala
            180                 185                 190

Ser Pro Ser Tyr Thr Asp Trp Ala Ala Gln Ala Thr Lys Thr Val Thr
```

```
            195                 200                 205
Gly Asp Cys Glu Gly Pro Thr Glu Ser Val Val Gly Val Pro Val
210                 215                 220

Pro Thr Gly Val Ser Phe Asp Tyr Ile Val Val Gly Gly Ala Gly
225                 230                 235                 240

Gly Ile Pro Ala Ala Asp Lys Leu Ser Glu Ala Gly Lys Ser Val Leu
                245                 250                 255

Leu Ile Glu Lys Gly Phe Ala Ser Thr Ala Asn Thr Gly Gly Thr Leu
                260                 265                 270

Gly Pro Glu Trp Leu Glu Gly His Asp Leu Thr Arg Phe Asp Val Pro
                275                 280                 285

Gly Leu Cys Asn Gln Ile Trp Val Asp Ser Lys Gly Ile Ala Cys Glu
                290                 295                 300

Asp Thr Asp Gln Met Ala Gly Cys Val Leu Gly Gly Thr Ala Val
305                 310                 315                 320

Asn Ala Gly Leu Trp Phe Lys Pro Tyr Ser Leu Asp Trp Asp Tyr Leu
                325                 330                 335

Phe Pro Asp Gly Trp Lys Tyr Asn Asp Val Gln Pro Ala Ile Asn Arg
                340                 345                 350

Ala Leu Ser Arg Ile Pro Gly Thr Asp Ala Pro Ser Thr Asp Gly Lys
                355                 360                 365

Arg Tyr Tyr Gln Glu Gly Phe Glu Val Leu Ser Lys Gly Leu Ala Ala
                370                 375                 380

Gly Gly Trp Thr Ser Val Thr Ala Asn Asn Ala Pro Asp Lys Lys Asn
385                 390                 395                 400

Arg Thr Phe Ala His Ala Pro Phe Met Phe Ala Gly Gly Glu Arg Asn
                405                 410                 415

Gly Pro Leu Gly Thr Tyr Phe Gln Thr Ala Lys Lys Arg Asn Asn Phe
                420                 425                 430

Asp Val Trp Leu Asn Thr Ser Val Lys Arg Val Ile Arg Glu Gly Gly
                435                 440                 445

His Ile Thr Gly Val Glu Val Glu Pro Phe Arg Asp Gly Gly Tyr Glu
                450                 455                 460

Gly Ile Val Pro Val Thr Lys Val Thr Gly Arg Val Ile Leu Ser Ala
465                 470                 475                 480

Gly Thr Phe Gly Ser Ala Lys Ile Leu Leu Arg Ser Gly Ile Gly Pro
                485                 490                 495

Glu Asp Gln Leu Glu Val Val Ala Ala Ser Glu Lys Asp Gly Pro Thr
                500                 505                 510

Met Ile Gly Asn Ser Ser Trp Ile Asn Leu Pro Val Gly Tyr Asn Leu
                515                 520                 525

Asp Asp His Leu Asn Thr Asp Thr Val Ile Ser His Pro Asp Val Val
                530                 535                 540

Phe Tyr Asp Phe Tyr Glu Ala Trp Asp Pro Ile Glu Ser Asp Lys
545                 550                 555                 560

Asn Ser Tyr Leu Glu Ser Arg Thr Gly Ile Leu Ala Gln Ala Pro
                565                 570                 575

Asn Ile Gly Pro Met Phe Trp Glu Glu Ile Val Gly Ala Asp Gly Ile
                580                 585                 590

Val Arg Gln Leu Gln Trp Thr Ala Arg Val Glu Gly Ser Leu Gly Ala
                595                 600                 605

Pro Asn Gly His Thr Met Thr Met Ser Gln Tyr Leu Gly Arg Gly Ala
                610                 615                 620
```

```
Thr Ser Arg Gly Arg Met Thr Ile Thr Pro Ser Leu Thr Thr Ile Val
625                 630                 635                 640

Ser Asp Val Pro Tyr Leu Lys Asp Pro Asn Asp Lys Glu Ala Val Ile
            645                 650                 655

Gln Gly Ile Ile Asn Leu Gln Asn Ala Leu Gln Asn Val Ala Asn Leu
                660                 665                 670

Thr Trp Leu Phe Pro Asn Ser Thr Ile Thr Pro Arg Glu Tyr Val Glu
            675                 680                 685

Ser Met Val Val Ser Pro Ser Asn Arg Arg Ser Asn His Trp Met Gly
690                 695                 700

Thr Asn Lys Leu Gly Thr Asp Asp Gly Arg Lys Gly Gly Ser Ala Val
705                 710                 715                 720

Val Asp Leu Asp Thr Arg Val Tyr Gly Thr Asp Asn Leu Phe Val Ile
            725                 730                 735

Asp Ala Ser Ile Phe Pro Gly Val Pro Thr Thr Asn Pro Thr Ser Tyr
            740                 745                 750

Ile Val Val Ala Ala Glu His Ala Ser Ser Arg Ile Leu Ala Leu Pro
        755                 760                 765

Asp Leu Glu Pro Val Pro Lys Tyr Gly Gln Cys Gly Gly Arg Glu Trp
770                 775                 780

Thr Gly Ser Phe Val Cys Ala Asp Gly Ser Thr Cys Glu Tyr Gln Asn
785                 790                 795                 800

Glu Trp Tyr Ser Gln Cys Leu
            805

<210> SEQ ID NO 76
<211> LENGTH: 454
<212> TYPE: PRT
<213> ORGANISM: Acinetobacter calcoaceticus

<400> SEQUENCE: 76

Asp Val Pro Leu Thr Pro Ser Gln Phe Ala Lys Ala Lys Ser Glu Asn
1               5                   10                  15

Phe Asp Lys Lys Val Ile Leu Ser Asn Leu Asn Lys Pro His Ala Leu
            20                  25                  30

Leu Trp Gly Pro Asp Asn Gln Ile Trp Leu Thr Glu Arg Ala Thr Gly
        35                  40                  45

Lys Ile Leu Arg Val Asn Pro Glu Ser Gly Ser Val Lys Thr Val Phe
50                  55                  60

Gln Val Pro Glu Ile Val Asn Asp Ala Asp Gly Gln Asn Gly Leu Leu
65                  70                  75                  80

Gly Phe Ala Phe His Pro Asp Phe Lys Asn Asn Pro Tyr Ile Tyr Ile
            85                  90                  95

Ser Gly Thr Phe Lys Asn Pro Lys Ser Thr Asp Lys Glu Leu Pro Asn
            100                 105                 110

Gln Thr Ile Ile Arg Arg Tyr Thr Tyr Asn Lys Ser Thr Asp Thr Leu
        115                 120                 125

Glu Lys Pro Val Asp Leu Leu Ala Gly Leu Pro Ser Ser Lys Asp His
130                 135                 140

Gln Ser Gly Arg Leu Val Ile Gly Pro Asp Gln Lys Ile Tyr Tyr Thr
145                 150                 155                 160

Ile Gly Asp Gln Gly Arg Asn Gln Leu Ala Tyr Leu Phe Leu Pro Asn
            165                 170                 175

Gln Ala Gln His Thr Pro Thr Gln Gln Glu Leu Asn Gly Lys Asp Tyr
```

```
              180                 185                 190
His Thr Tyr Met Gly Lys Val Leu Arg Leu Asn Leu Asp Gly Ser Ile
            195                 200                 205

Pro Lys Asp Asn Pro Ser Phe Asn Gly Val Val Ser His Ile Tyr Thr
        210                 215                 220

Leu Gly His Arg Asn Pro Gln Gly Leu Ala Phe Thr Pro Asn Gly Lys
225                 230                 235                 240

Leu Leu Gln Ser Glu Gln Gly Pro Asn Ser Asp Asp Glu Ile Asn Leu
                245                 250                 255

Ile Val Lys Gly Gly Asn Tyr Gly Trp Pro Asn Val Ala Gly Tyr Lys
            260                 265                 270

Asp Asp Ser Gly Tyr Ala Tyr Ala Asn Tyr Ser Ala Ala Ala Asn Lys
        275                 280                 285

Ser Ile Lys Asp Leu Ala Gln Asn Gly Val Lys Val Ala Ala Gly Val
    290                 295                 300

Pro Val Thr Lys Glu Ser Glu Trp Thr Gly Lys Asn Phe Val Pro Pro
305                 310                 315                 320

Leu Lys Thr Leu Tyr Thr Val Gln Asp Thr Tyr Asn Tyr Asn Asp Pro
                325                 330                 335

Thr Cys Gly Glu Met Thr Tyr Ile Cys Trp Pro Thr Val Ala Pro Ser
            340                 345                 350

Ser Ala Tyr Val Tyr Lys Gly Gly Lys Ala Ile Thr Gly Trp Glu
        355                 360                 365

Asn Thr Leu Leu Val Pro Ser Leu Lys Arg Gly Val Ile Phe Arg Ile
    370                 375                 380

Lys Leu Asp Pro Thr Tyr Ser Thr Thr Tyr Asp Asp Ala Val Pro Met
385                 390                 395                 400

Phe Lys Ser Asn Asn Arg Tyr Arg Asp Val Ile Ala Ser Pro Asp Gly
                405                 410                 415

Asn Val Leu Tyr Val Leu Thr Asp Thr Ala Gly Asn Val Gln Lys Asp
            420                 425                 430

Asp Gly Ser Val Thr Asn Thr Leu Glu Asn Pro Gly Ser Leu Ile Lys
        435                 440                 445

Phe Thr Tyr Lys Ala Lys
    450

<210> SEQ ID NO 77
<211> LENGTH: 977
<212> TYPE: PRT
<213> ORGANISM: Desulfovibrio gigas
<220> FEATURE:
<221> NAME/KEY: MISC_FEATURE
<222> LOCATION: (158)..(158)
<223> OTHER INFORMATION: Selenocysteine (U)

<400> SEQUENCE: 77

Ala Thr Met Ala Leu Lys Thr Val Asp Ala Lys Gln Thr Thr Ser Val
1               5                   10                  15

Cys Cys Tyr Cys Ser Val Gly Cys Gly Leu Ile Val His Thr Asp Lys
            20                  25                  30

Lys Thr Asn Arg Ala Ile Asn Val Glu Gly Asp Pro Asp His Pro Ile
        35                  40                  45

Asn Glu Gly Ser Leu Cys Ala Lys Gly Ala Ser Thr Trp Gln Leu Ala
    50                  55                  60

Glu Asn Glu Arg Arg Pro Ala Asn Pro Leu Tyr Arg Ala Pro Gly Ser
65                  70                  75                  80
```

```
Asp Gln Trp Glu Glu Lys Ser Trp Asp Trp Met Leu Asp Thr Ile Ala
                85                  90                  95
Glu Arg Val Ala Lys Thr Arg Glu Ala Thr Phe Val Thr Lys Asn Ala
            100                 105                 110
Lys Gly Gln Val Val Asn Arg Cys Asp Gly Ile Ala Ser Val Gly Ser
        115                 120                 125
Ala Ala Met Asp Asn Glu Glu Cys Trp Ile Tyr Gln Ala Trp Leu Arg
    130                 135                 140
Ser Leu Gly Leu Phe Tyr Ile Glu His Gln Ala Arg Ile Xaa His Ser
145                 150                 155                 160
Ala Thr Val Ala Ala Leu Ala Glu Ser Tyr Gly Arg Gly Ala Met Thr
                165                 170                 175
Asn His Trp Ile Asp Leu Lys Asn Ser Asp Val Ile Leu Met Met Gly
            180                 185                 190
Ser Asn Pro Ala Glu Asn His Pro Ile Ser Phe Lys Trp Val Met Arg
        195                 200                 205
Ala Lys Asp Lys Gly Ala Thr Leu Ile His Val Asp Pro Arg Tyr Thr
    210                 215                 220
Arg Thr Ser Thr Lys Cys Asp Leu Tyr Ala Pro Leu Arg Ser Gly Ser
225                 230                 235                 240
Asp Ile Ala Phe Leu Asn Gly Met Thr Lys Tyr Ile Leu Glu Lys Glu
                245                 250                 255
Leu Tyr Phe Lys Asp Tyr Val Val Asn Tyr Thr Asn Ala Ser Phe Ile
            260                 265                 270
Val Gly Glu Gly Phe Ala Phe Glu Gly Leu Phe Ala Gly Tyr Asn
        275                 280                 285
Lys Glu Thr Arg Lys Tyr Asp Lys Ser Lys Trp Gly Phe Glu Arg Asp
    290                 295                 300
Glu Asn Gly Asn Pro Lys Arg Asp Glu Thr Leu Lys His Pro Arg Cys
305                 310                 315                 320
Val Phe Gln Ile Met Lys Lys His Tyr Glu Arg Tyr Asp Leu Asp Lys
                325                 330                 335
Ile Ser Ala Ile Cys Gly Thr Pro Lys Glu Leu Ile Leu Lys Val Tyr
            340                 345                 350
Asp Ala Tyr Cys Ala Thr Gly Lys Pro Asp Lys Ala Gly Thr Ile Met
        355                 360                 365
Tyr Ala Met Gly Trp Thr Gln His Thr Val Gly Val Gln Asn Ile Arg
    370                 375                 380
Ala Met Ser Ile Asn Gln Leu Leu Leu Gly Asn Ile Gly Val Ala Gly
385                 390                 395                 400
Gly Gly Val Asn Ala Leu Arg Gly Glu Ala Asn Val Gln Gly Ser Thr
                405                 410                 415
Asp His Gly Leu Leu Met His Ile Tyr Pro Gly Tyr Leu Gly Thr Ala
            420                 425                 430
Arg Ala Ser Ile Pro Thr Tyr Glu Glu Tyr Thr Lys Lys Phe Thr Pro
        435                 440                 445
Val Ser Lys Asp Pro Gln Ser Ala Asn Trp Trp Ser Asn Phe Pro Lys
    450                 455                 460
Tyr Ser Ala Ser Tyr Ile Lys Ser Met Trp Pro Asp Ala Asp Leu Asn
465                 470                 475                 480
Glu Ala Tyr Gly Tyr Leu Pro Lys Gly Glu Asp Gly Lys Asp Tyr Ser
                485                 490                 495
```

-continued

```
Trp Leu Thr Leu Phe Asp Asp Met Phe Gln Gly Lys Ile Lys Gly Phe
            500                 505                 510

Phe Ala Trp Gly Gln Asn Pro Ala Cys Ser Gly Ala Asn Ser Asn Lys
        515                 520                 525

Thr Arg Glu Ala Leu Thr Lys Leu Asp Trp Met Val Asn Val Asn Ile
    530                 535                 540

Phe Asp Asn Glu Thr Gly Ser Phe Trp Arg Gly Pro Asp Met Asp Pro
545                 550                 555                 560

Lys Lys Ile Lys Thr Glu Val Phe Phe Leu Pro Cys Ala Val Ala Ile
                565                 570                 575

Glu Lys Glu Gly Ser Ile Ser Asn Ser Gly Arg Trp Met Gln Trp Arg
            580                 585                 590

Tyr Val Gly Pro Glu Pro Arg Lys Asn Ala Ile Pro Asp Gly Asp Leu
        595                 600                 605

Ile Val Glu Leu Ala Lys Arg Val Gln Lys Leu Leu Ala Lys Thr Pro
    610                 615                 620

Gly Lys Leu Ala Ala Pro Val Thr Lys Leu Lys Thr Asp Tyr Trp Val
625                 630                 635                 640

Asn Asp His Gly His Phe Asp Pro His Lys Ile Ala Lys Leu Ile Asn
                645                 650                 655

Gly Phe Ala Leu Lys Asp Phe Lys Val Gly Asp Val Glu Tyr Lys Ala
            660                 665                 670

Gly Gln Gln Ile Ala Thr Phe Gly His Leu Gln Ala Asp Gly Ser Thr
        675                 680                 685

Thr Ser Gly Cys Trp Ile Tyr Thr Gly Ser Tyr Thr Glu Lys Gly Asn
690                 695                 700

Met Ala Ala Arg Arg Asp Lys Thr Gln Thr Asp Met Gln Ala Lys Ile
705                 710                 715                 720

Gly Leu Tyr Pro Gly Trp Thr Trp Ala Trp Pro Val Asn Arg Arg Ile
            725                 730                 735

Ile Tyr Asn Arg Ala Ser Val Asp Leu Asn Gly Lys Pro Tyr Ala Pro
        740                 745                 750

Glu Lys Ala Val Val Glu Trp Asn Ala Ala Glu Lys Lys Trp Val Gly
    755                 760                 765

Asp Val Pro Asp Gly Pro Trp Pro Gln Ala Asp Lys Glu Lys Gly
770                 775                 780

Lys Arg Ala Phe Ile Met Lys Pro Glu Gly Tyr Ala Tyr Leu Tyr Gly
785                 790                 795                 800

Pro Gly Arg Glu Asp Gly Pro Leu Pro Glu Tyr Tyr Glu Pro Met Glu
            805                 810                 815

Cys Pro Val Ile Glu His Pro Phe Ser Lys Thr Leu His Asn Pro Thr
        820                 825                 830

Ala Leu His Phe Ala Thr Glu Glu Lys Ala Val Cys Asp Pro Arg Tyr
    835                 840                 845

Pro Phe Ile Cys Ser Thr Tyr Arg Val Thr Glu His Trp Gln Thr Gly
    850                 855                 860

Leu Met Thr Arg Asn Thr Pro Trp Leu Leu Glu Ala Glu Pro Gln Met
865                 870                 875                 880

Phe Cys Glu Met Ser Glu Glu Leu Ala Thr Leu Arg Gly Ile Lys Asn
                885                 890                 895

Gly Asp Lys Val Ile Leu Glu Ser Val Arg Gly Lys Leu Trp Ala Lys
            900                 905                 910

Ala Ile Ile Thr Lys Arg Ile Lys Pro Phe Ala Ile Gln Gly Gln Gln
```

```
                        915                 920                 925

Val His Met Val Gly Ile Pro Trp His Tyr Gly Trp Ser Phe Pro Lys
        930                 935                 940

Asn Gly Gly Asp Ala Ala Asn Ile Leu Thr Pro Ser Val Gly Asn Pro
945                 950                 955                 960

Asn Thr Gly Ile Pro Glu Thr Lys Ala Phe Met Val Asn Val Thr Lys
                965                 970                 975

Ala

<210> SEQ ID NO 78
<211> LENGTH: 214
<212> TYPE: PRT
<213> ORGANISM: Desulfovibrio gigas

<400> SEQUENCE: 78

Ser Lys Gly Phe Phe Val Asp Thr Thr Arg Cys Thr Ala Cys Arg Gly
1               5                   10                  15

Cys Gln Val Ala Cys Lys Gln Trp His Gly Asn Pro Ala Thr Pro Thr
            20                  25                  30

Glu Asn Thr Gly Phe His Gln Asn Pro Pro Asp Phe Asn Phe His Thr
        35                  40                  45

Tyr Lys Leu Val Arg Met His Glu Gln Glu Ile Asp Gly Arg Ile Asp
    50                  55                  60

Trp Leu Phe Phe Pro Asp Gln Cys Arg His Cys Ile Ala Pro Pro Cys
65                  70                  75                  80

Lys Ala Thr Ala Asp Met Glu Asp Glu Ser Ala Ile Ile His Asp Asp
                85                  90                  95

Ala Thr Gly Cys Val Leu Phe Thr Pro Lys Thr Lys Asp Leu Glu Asp
            100                 105                 110

Tyr Glu Ser Val Ile Ser Ala Cys Pro Tyr Asp Val Pro Arg Lys Val
        115                 120                 125

Ala Glu Ser Asn Gln Met Ala Lys Cys Asp Met Cys Ile Asp Arg Ile
    130                 135                 140

Thr Asn Gly Leu Arg Pro Ala Cys Val Thr Ser Cys Pro Thr Gly Ala
145                 150                 155                 160

Met Asn Phe Gly Asp Leu Ser Glu Met Glu Ala Met Ala Ser Ala Arg
                165                 170                 175

Leu Ala Glu Ile Lys Ala Ala Tyr Ser Asp Ala Lys Leu Cys Asp Pro
            180                 185                 190

Asp Asp Val Arg Val Ile Phe Leu Thr Ala His Asn Pro Lys Leu Tyr
        195                 200                 205

His Glu Tyr Ala Val Ala
    210
```

METHOD FOR PRODUCING A DEUTERATED OR TRITIATED NAD(P)H

CROSS-REFERENCE TO RELATED APPLICATIONS

This application is the National Stage of International Application No. PCT/EP2019/053447, filed Feb. 12, 2019, which claims priority to EP 18156330.5, filed Feb. 12, 2018, which are entirely incorporated herein by reference.

FIELD OF THE INVENTION

The present invention relates to methods for producing labelled cofactors comprising one or more $^xH$ atom, wherein x is 2 or 3. The invention also relates to methods of producing labelled reaction products comprising one or more $^xH$ atom derived from the labelled cofactor. The invention further relates to systems for the production of such labelled cofactors and labelled reaction products.

BACKGROUND

Incorporation of deuterium ($^2H$) into a molecule can induce changes to the kinetic, spectroscopic, mass and optical properties relative to the corresponding ($^1H$)-isotopologue. Accordingly, deuterated molecules are frequently utilised in chemical- and biochemical-mechanistic studies, with the deuterium kinetic isotope effect (DKIE), for example, often being employed to elucidate the rate-determining elements of multistep reactions. Recently, deuterated pharmaceuticals, long used in diagnostic studies, are being re-evaluated for previously overlooked DKIE-induced therapeutic properties, with a number of new drug companies synthesising only deuterium-labelled compounds.

Methods of incorporating $^2H$ labels into molecules are known. For example, a common strategy is to employ a deuterated reducing agent such as $LiAl(^2H)_4$ or $NaB(^2H)_4$ to deliver a deuteride ($^2H^-$) anion to an oxidised carbon. However, such reagents are extremely expensive, frequently dangerously reactive, and typically react with little or no chemo-, regio- and/or stereo-selectivity.

Other known methods of incorporating $^2H$ atoms into organic compounds include chemical 'hydrogenation'-type reactions, which have been used to add $^2H_2$ across double bonds. Such methods rely on the use of $^2H_2$ as the reductant, with the $^2H_2$ gas being activated by metal catalysts. However, such methods typically rely on the use of expensive metals such as platinum. Furthermore, the hydrogenation reaction typically requires conditions of high temperatures and high pressures, which are often impractical, prohibitively expensive and/or unsafe to use commercially. In addition, such hydrogenation reactions typically proceed with little or no selectivity, meaning that control of the final product and accurate distribution of the $^2H$ label(s) can be unachievable. An alternative route to deuterated compounds involves catalysed H/D exchange. However, this strategy tends to lead to complete or near-complete deuteration of the compound, and is thus also unsuitable for selective labelling.

Various attempts to overcome the technical challenges of such chemical reaction routes have been made. One approach that has been considered is to exploit the chemistry of biological cofactors such as nicotinamide adenine dinucleotide (NAD). Cofactors are non-protein chemical compounds that play an essential role in many enzyme catalysed biochemical reactions, and which typically act to transfer chemical groups between enzymes. In vivo, reduction of the oxidised cofactor ($NAD^+$) by hydride transfer from a reductant yields the reduced cofactor (NADH). The reduced cofactor can be coupled to enzymatic reduction of an oxidised centre (typically an oxidised carbon centre) to yield a reduced centre. Limited attempts have been made to reduce the oxidised cofactor using sources of $^2H$ to yield $[^2H]$-NADH, with a view to using the labelled reduced cofactor to reduce carbon centres in a selective manner. However, attempts to date have been largely unsuccessful.

One potential approach that has been considered relies on chemical reduction of the oxidised cofactor to generate $^xH$-labelled cofactor, wherein x is 2 or 3. However, such approaches have proven to be unsuccessful, as the use of the necessary chemical reductants tends to lead to generation of bio-inactive forms of the cofactor. Such methods thus cannot be used to efficiently generate reduced labelled products.

An alternative approach that has been considered relies on the enzymatic reduction of $NAD^+$ to $[^2H]$-NADH. The oxidoreductase enzymes formate dehydrogenase, glucose dehydrogenase and alcohol dehydrogenase have all been considered for their abilities to abstract deuteride anions from labelled organic compounds (formate, glucose and ethanol, respectively), and to transfer the deuteride anions to $NAD^+$ to form $[^2H]$-NADH. However, these methods are unsuited to being used commercially due to the very high price of the necessary reductant ($^2H$-formate, $^2H$-glucose and $^2H$-ethanol, respectively). Such reactions also typically demand that the deuterated reducing equivalent be used in superstoichiometric quantities. Furthermore, the reactions are atomically inefficient. Accordingly, purification of the product is required to prevent contamination with waste oxidised reductant.

In a variation of such methods, some approaches have proposed the in situ generation of isotopically labelled reductants for subsequent use. For example, $^2H$-glyceraldehyde-3-phosphate can be obtained by chemical exchange and tautomerisation of the $^1H$ compound in the presence of $^2H_2O$, with the enzyme glyceraldehyde-3-phosphate dehydrogenase being used to abstract the deuterium label from the $^2H$-glyceraldehyde-3-phosphate and transfer it to $NAD^+$ to form $[^2H]$-NADH, which can subsequently be used in downstream reactions such as the reductive deuteration of pyruvate to $^2H$-lactate. Similarly, enzymes such as alanine racemase can be used to catalyse the non-selective chemical exchange of $^1H$-alanine to $^2H$-alanine in the presence of $^2H_2O$, before an amino acid dehydrogenase is used to abstract the deuterium label from the $^2H$-alanine and transfer it to $NAD^+$ to form $[^2H]$-NADH, which again can subsequently be used in downstream reactions. Again, these methods have significant problems. The reactions are atomically inefficient. Purification of the desired product is also required to prevent contamination with waste oxidised reductant; such reactants being typically toxic and/or reactive. Furthermore, especially in enzyme mediated systems the percentage of the $^2H$ label incorporated into the co-factor is typically dependent on the proportions of the relative enzymes present, and cannot be controlled simply by controlling the percentage of the isotopic label in the aqueous solution.

Accordingly, there is a pressing need for improved methods of generating $^xH$-labelled cofactors and $^xH$-labelled reaction products. There is specifically a need for methods that avoid the requirement for expensive or dangerously reactive chemical reagents; methods that offer selective labelling of the final reaction product; methods that allow selective reduction of oxidised carbon centres and/or that do not rely on the use of expensive labelled reductants. The present invention aims to address some or all of these problems.

SUMMARY OF THE INVENTION

The inventors have surprisingly found that it is possible to use $^xH^+$ ions in solution to enzymatically reduce an oxidised cofactor in the presence of an electron source. The inventors have found that it is possible to produce $^xH$-labelled cofactors and reaction products in an atom-efficient, clean process. The claimed methods differ from those previously described as the reductant which is oxidised to provide electrons need not be labelled with $^xH$ in order to produce a reduced labelled cofactor comprising one or more $^xH$ atom, or to produce a reduced labelled reaction product comprising one or more $^xH$ atom. This has additional advantages in terms of reduced costs and ease of operation of the method. For example, the reductant which is oxidised to provide electrons need not be highly purified.

Accordingly, the invention provides a method of producing a reduced labelled cofactor comprising one or more $^xH$ atom, wherein x is 2 or 3, wherein said method comprises:
  i) providing a composition comprising (i) $^xH^+$ ions and (ii) an oxidised cofactor;
  ii) transferring electrons from an electron source to a first polypeptide which is an NADH:acceptor oxidoreductase or an NADPH:acceptor oxidoreductase or a functional derivative or fragment thereof; and
  iii) contacting the $^xH^+$ ions and the oxidised cofactor with the first polypeptide thereby reducing the oxidised cofactor to form a reduced labelled cofactor comprising one or more $^xH$ atoms.

This method is illustrated schematically in FIG. 1.

The inventors have previously reported in WO 2013/050760 a co-factor regeneration system for regenerating cofactors such as NADH. The inventors demonstrated that electrons could be transferred to an oxidised cofactor to reduce it in a reversible manner, and demonstrated cycling of unlabelled [$^1$H]-NADH. However, whilst methods of cycling unlabelled [$^1$H]-NADH are known, the successful production of labelled cofactor is by no means trivial. For example, it was previously considered that the changes in over-potential requirements that arise from the use of labelled reactants would prevent the successful operation of methods involving labelled reactants. Kinetic isotope effects were also considered likely to impede the successful cycling of labelled cofactors due to variations in bond strength, leading to a diminished ability of finely tuned enzymes to activate bonds to $^xH$ atoms or to mediate the transfer of $^xH$ atoms or ions to and from cofactors. It was also previously believed that in order to generate $^xH$-labelled reduced cofactors, the reductant which is oxidised to extract electrons for use in the reduction reaction would necessarily have to be labelled with $^xH$ itself. This general understanding was reinforced by analogy with the observation (discussed in more detail herein) that for metal-catalysed reductive insertion of deuterium into organic compounds such as cofactors, labelling of the $H_2$ gas reductant (i.e. use of $^xH_2$) is required to yield a labelled reduced cofactor. Whilst such reductants are not incompatible with the methods of the invention, the ability of the methods of the invention to operate with unlabelled reductants represents a significant advantage. Furthermore, the claimed method has been shown to be extremely efficient, even when non-labelled reductants are used as the source of electrons, thus representing a significant advantage over previously known methods. In addition, the methods of the invention have been found to yield biologically active reduced cofactors. These aspects of the invention represent a surprising finding of the present inventors.

The invention also provides a method of producing a reduced labelled reaction product comprising one or more $^xH$ atom, wherein x is 2 or 3, wherein said method comprises producing a reduced labelled cofactor according to the invention, and
  iv) contacting the reduced labelled cofactor and an oxidised reactant with at least one enzyme that is an NADH-dependent oxidoreductase or an NADPH-dependent oxidoreductase or a functional derivative or fragment thereof such that the enzyme selectively transfers an $^xH$ atom from the reduced labelled cofactor to the oxidised reactant thereby producing a reduced labelled reaction product and an oxidised cofactor.

This method is illustrated schematically in FIG. 2.

The invention further provides a system for performing a method of the invention, the system comprising:
  i) a composition comprising (i) $^xH^+$ ions wherein x is 2 or 3;
  ii) an oxidised cofactor;
  iii) an electron source; and
  iv) a first polypeptide which is an NADH:acceptor oxidoreductase or an NADPH:acceptor oxidoreductase or a functional derivative or fragment thereof;

wherein the system is configured such that, in use, (a) electrons are transferred from the electron source to the first polypeptide and (b) $^xH^+$ ions and the oxidised cofactor are contacted with the first polypeptide so as to reduce the oxidised cofactor to form a reduced labelled cofactor comprising one or more $^xH$ atoms.

In the methods of the invention, electrons are transferred from the electron source to the first polypeptide. Contacting of the first polypeptide with $^xH^+$ ions and an oxidised cofactor as defined herein results in the reduction of the oxidised cofactor by the electrons and $^xH^+$ ions to form a reduced labelled cofactor, with the reduction reaction catalysed by the first polypeptide. Subsequent re-oxidation of the reduced labelled cofactor by contact with an NAD(P)H-dependent oxidoreductase and an oxidised reactant (which is reduced to form a reduced labelled reaction product) reforms the oxidised cofactor which can undergo the cycle multiple times. The inventors have found that it is thus possible to exploit the extreme efficiency and high selectivity of enzymatic reactions to label cofactors and reaction products with $^xH$ atoms, wherein x is 2 or 3, in a much more cost effective, safe, efficient and clean manner than has hitherto been possible. Importantly, the methods of the invention do not require the use of any exogenous "co-substrate" to mediate the transfer of $^xH^+$ ions to the oxidised cofactor; rather, the $^xH^+$ ions are contacted with the first polypeptide and are transferred directly from the composition in which they are contained, e.g. directly from $^xH_2O$, to the first polypeptide, where they, together with the electrons transferred to the first polypeptide, form a reduced labelled cofactor.

DESCRIPTION OF THE SEQUENCE LISTING

SEQ ID NO: 1—the amino acid sequence of the *Ralstonia eutropha* soluble hydrogenase diaphorase HoxF.

SEQ ID NO: 2—the amino acid sequence of the *Ralstonia eutropha* soluble hydrogenase diaphorase HoxU.

SEQ ID NO: 3—the amino acid sequence of the *Ralstonia eutropha* soluble hydrogenase diaphorase HoxI.

SEQ ID NO: 4—the amino acid sequence of the flavoprotein (Fp) subcomplex of *Bos taurus* Complex 1, 51 kDa.

SEQ ID NO: 5—the amino acid sequence of the flavoprotein (Fp) subcomplex of *Bos taurus* Complex 1, 24 kDa.

SEQ ID NO: 6—the amino acid sequence of the *Ralstonia eutropha* NAD$^+$-dependent formate dehydrogenase, diaphorase moiety (FdsB).

SEQ ID NO: 7—the amino acid sequence of the *Ralstonia eutropha* NAD$^+$-dependent formate dehydrogenase, diaphorase moiety (FdsG).

SEQ ID NO: 8—the amino acid sequence of the *Rhodobacter capsulatus* NAD$^+$-dependent formate dehydrogenase, diaphorase moiety (FdsB).

SEQ ID NO: 9—the amino acid sequence of the *Rhodobacter capsulatus* NAD$^+$-dependent formate dehydrogenase, diaphorase moiety (FdsG)

SEQ ID NO: 10—the amino acid sequence of the NADPH oxidoreductase moiety from *Pyrococcus furiosus* soluble hydrogenase I, gamma subunit.

SEQ ID NO: 11—the amino acid sequence of the NADPH oxidoreductase moiety from *Pyrococcus furiosus* soluble hydrogenase I, beta subunit.

SEQ ID NO: 12—the amino acid sequence of the NADPH oxidoreductase moiety from *Pyrococcus furiosus* soluble hydrogenase II, gamma subunit.

SEQ ID NO: 13—the amino acid sequence of the NADPH oxidoreductase moiety from *Pyrococcus furiosus* soluble hydrogenase II, beta subunit.

SEQ ID NO: 14—the amino acid sequence of the diaphorase moiety of *Rhodococcus opacus* SH, HoxF.

SEQ ID NO: 15—the amino acid sequence of the diaphorase moiety of *Rhodococcus opacus* SH, HoxU.

SEQ ID NO: 16—the amino acid sequence of the diaphorase moiety of *Allochromatium vinosum* SH, HoxF.

SEQ ID NO: 17—the amino acid sequence of the diaphorase moiety of *Allochromatium vinosum* SH, HoxU.

SEQ ID NO: 18—the amino acid sequence of the diaphorase moiety of *Thiocapsa roseopersicina* Hox1 F.

SEQ ID NO: 19—the amino acid sequence of the diaphorase moiety of *Thiocapsa roseopersicina* Hox1 U.

SEQ ID NO: 20—the amino acid sequence of the diaphorase moiety of *Thiocapsa roseopersicina* Hox2F.

SEQ ID NO: 21—the amino acid sequence of the diaphorase moiety of *Thiocapsa roseopersicina* Hox2U.

SEQ ID NO: 22—the amino acid sequence of the diaphorase moiety of *Synechocystis* sp. PCC 6803 HoxF.

SEQ ID NO: 23—the amino acid sequence of the diaphorase moiety of *Synechocystis* sp. PCC 6803 HoxU.

SEQ ID NO: 24—the amino acid sequence of the diaphorase moiety of *Synechococcus elongatus* PCC 6301 HoxF.

SEQ ID NO: 25—the amino acid sequence of the diaphorase moiety of *Synechococcus elongatus* PCC 6301 HoxU.

SEQ ID NO: 26—the amino acid sequence of the diaphorase moiety of *Hydrogenophilus thermoluteolus* SH HoxF.

SEQ ID NO: 27—the amino acid sequence of the diaphorase moiety of *Hydrogenophilus thermoluteolus* SH HoxU.

SEQ ID NO: 28—the amino acid sequence of the ferredoxin-NADP+ reductase of *Chlamydomonas reinhardtii*.

SEQ ID NO: 29—the amino acid sequence of the ferredoxin-NADP+ reductase of *Anabaena*.

SEQ ID NO: 30—the amino acid sequence of the *Ralstonia eutropha* soluble hydrogenase moiety (HoxH).

SEQ ID NO: 31—the amino acid sequence of the *Ralstonia eutropha* soluble hydrogenase moiety (HoxY).

SEQ ID NO: 32—the amino acid sequence of the *Ralstonia eutropha* membrane-bound hydrogenase moiety (HoxG).

SEQ ID NO: 33—the amino acid sequence of the *Ralstonia eutropha* membrane-bound hydrogenase moiety (HoxK).

SEQ ID NO: 34—the amino acid sequence of the *Ralstonia eutropha* membrane-bound hydrogenase moiety (HoxZ).

SEQ ID NO: 35—the amino acid sequence of the *Ralstonia eutropha* regulatory hydrogenase moiety (HoxB).

SEQ ID NO: 36—the amino acid sequence of the *Ralstonia eutropha* regulatory hydrogenase moiety (HoxC).

SEQ ID NO: 37—the amino acid sequence of the *Escherichia coli* hydrogenase 1 (large subunit).

SEQ ID NO: 38—the amino acid sequence of the *Escherichia coli* hydrogenase 1 (small subunit).

SEQ ID NO: 39—the amino acid sequence of the *Escherichia coli* hydrogenase 2 (large subunit).

SEQ ID NO: 40—the amino acid sequence of the *Escherichia coli* hydrogenase 2 (small subunit).

SEQ ID NO: 41—the amino acid sequence of the *Aquifex aeolicus* hydrogenase 1 (large subunit).

SEQ ID NO: 42—the amino acid sequence of the *Aquifex aeolicus* hydrogenase 1 (small subunit).

SEQ ID NO: 43—the amino acid sequence of the *Hydrogenovibrio marinus* hydrogenase (large subunit).

SEQ ID NO: 44—the amino acid sequence of the *Hydrogenovibrio marinus* hydrogenase (small subunit).

SEQ ID NO: 45—the amino acid sequence of the *Thiocapsa roseopersicina* hydrogenase HupL.

SEQ ID NO: 46—the amino acid sequence of the *Thiocapsa roseopersicina* hydrogenase HupS.

SEQ ID NO: 47—the amino acid sequence of the *Alteromonas macleodii* hydrogenase small subunit.

SEQ ID NO: 48—the amino acid sequence of the *Alteromonas macleodii* hydrogenase large subunit.

SEQ ID NO: 49—the amino acid sequence of the *Rhodococcus opacus* SH hydrogenase moiety HoxH.

SEQ ID NO: 50—the amino acid sequence of the *Rhodococcus opacus* SH hydrogenase moiety HoxY.

SEQ ID NO: 51—the amino acid sequence of the *Allochromatium vinosum* Membrane Bound Hydrogenase large subunit.

SEQ ID NO: 52—the amino acid sequence of the *Allochromatium vinosum* Membrane Bound Hydrogenase small subunit.

SEQ ID NO: 53—the amino acid sequence of the *Desulfovibrio fructosovorans* nickel-iron hydrogenase large subunit.

SEQ ID NO: 54—the amino acid sequence of the *Desulfovibrio fructosovorans* nickel-iron hydrogenase small subunit.

SEQ ID NO: 55—the amino acid sequence of the *Clostridium pasteurianum* iron-iron hydrogenase 1.

SEQ ID NO: 56—the amino acid sequence of the *Clostridium acetobutylicum* iron-iron hydrogenase.

SEQ ID NO: 57—the amino acid sequence of the *Chlamydomonas reinhardtii* iron-iron hydrogenase.

SEQ ID NO: 58—the amino acid sequence of the *Desulfomicrobium baculatum* nickel-iron-selenium hydrogenase large subunit.

SEQ ID NO: 59—the amino acid sequence of the *Desulfomicrobium baculatum* nickel-iron-selenium hydrogenase small subunit.

SEQ ID NO: 60—the amino acid sequence of the *Hydrogenophilus thermoluteolus* SH moiety HoxH.

SEQ ID NO: 61—the amino acid sequence of the *Hydrogenophilus thermoluteolus* SH moiety HoxY.

SEQ ID NO: 62—the amino acid sequence of the *Desulfovibrio vulgaris* Nickel Iron hydrogenase Small subunit, pdb 1 H2A, Chain S.

SEQ ID NO: 63—the amino acid sequence of the *Desulfovibrio vulgaris* Nickel Iron hydrogenase Large subunit, pdb 1 H2A, Chain L.

SEQ ID NO: 64—the amino acid sequence of the *Desulfovibrio gigas* Periplasmic [NiFe] hydrogenase Small subunit.

SEQ ID NO: 65—the amino acid sequence of the *Desulfovibrio gigas* Periplasmic [NiFe] hydrogenase Large subunit.

SEQ ID NO: 66—the amino acid sequence of the *Salmonella enterica* serovar *Typhimurium* LT2 nickel-iron hydrogenase 5 Large subunit.

SEQ ID NO: 67—the amino acid sequence of the *Salmonella enterica* serovar *Typhimurium* LT2 nickel-iron hydrogenase 5 Small subunit.

SEQ ID NO: 68—the amino acid sequence of the *Pyrococcus furiosus* soluble hydrogenase alpha subunit.

SEQ ID NO: 69—the amino acid sequence of the *Ralstonia eutropha* soluble hydrogenase moiety variant HoxH_164A.

SEQ ID NO: 70—the amino acid sequence of the *Ralstonia eutropha* soluble hydrogenase variant HoxF_E341A+D467S.

SEQ ID NO: 71—the amino acid sequence of the *E. coli* Mo-containing formate dehydrogenase (EcFDH-H).

SED ID NO: 72—the amino acid sequence of the *Comamonas testosteroni* PQQ and heme dependent ethanol dehydrogenase.

SEQ ID NO: 73—the amino acid sequence of the *Phanerochaete chrysosporium* FAD and heme dependent Cellobiose dehydrogenase (FAD containing subunit).

SEQ ID NO: 74—the amino acid sequence of the *Phanerochaete chrysosporium* FAD and heme dependent Cellobiose dehydrogenase (Heme containing subunit).

SEQ ID NO: 75—the amino acid sequence of the *Myricoccum thermophilum* heme containing Cellobiose dehydrogenase.

SEQ ID NO: 76—the amino acid sequence of the *Acinetobacter calcoaceticus* PQQ containing Glucose Dehydrogenase.

SEQ ID NO: 77—the amino acid sequence of the *Desulfovibrio gigas* W-containing Formate Dehydrogenase alpha subunit.

SEQ ID NO: 78—the amino acid sequence of the *Desulfovibrio gigas* W-containing Formate Dehydrogenase beta subunit.

BRIEF DESCRIPTION OF THE FIGURES

FIG. 8C shows an expanded region of the spectrum shown in FIG. 8B confirming high $^2$H incorporation in the reduced cofactor. Data are described in Example 1A.

FIG. 9C shows an expanded region of the spectrum shown in FIG. 9B confirming high $^2$H incorporation in the reduced cofactor. Data are described in Example 1B.

FIG. 10C shows an expanded region of the spectrum shown in FIG. 1B confirming high $^2$H incorporation in the reduced cofactor. Data are described in Example 1C.

FIG. 11C shows an expanded region of the spectrum shown in FIG. 11B confirming high $^2$H incorporation in the reduced cofactor. Data are described in Example 2.

FIG. 12C shows an expanded region of the spectrum shown in FIG. 12B confirming high $^2$H incorporation in the reduced cofactor. Data are described in Example 3.

FIG. 13C shows an expanded region of the spectrum shown in FIG. 13B confirming high $^2$H incorporation in the reduced cofactor. Data are described in Example 4.

Pt/C=platinum supported on carbon;
Pt+NAD-R/C=platinum and NAD$^+$ reductase supported on carbon;
H2ase+NAD-R/C=hydrogenase and NAD$^+$ reductase supported on carbon;
soluble hydrogenase=unsupported soluble hydrogenase enzyme comprising both a first polypeptide and a second polypeptide as described herein.

Figure 15:
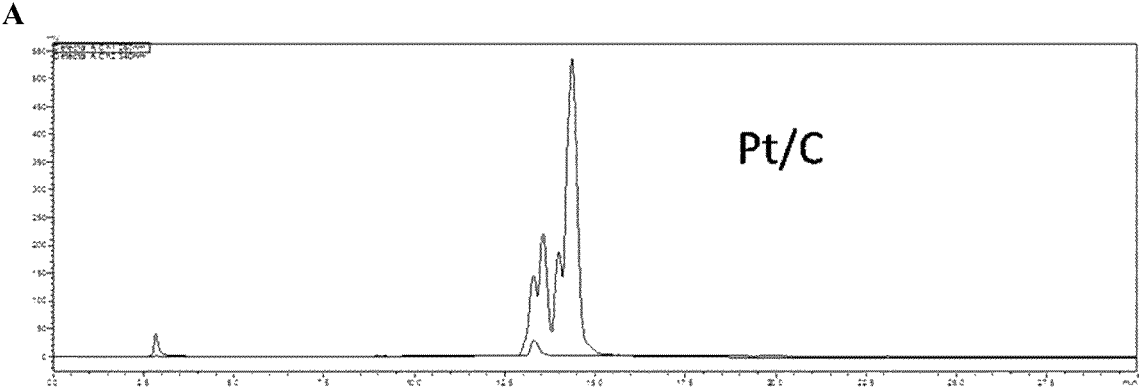
Figure 15:
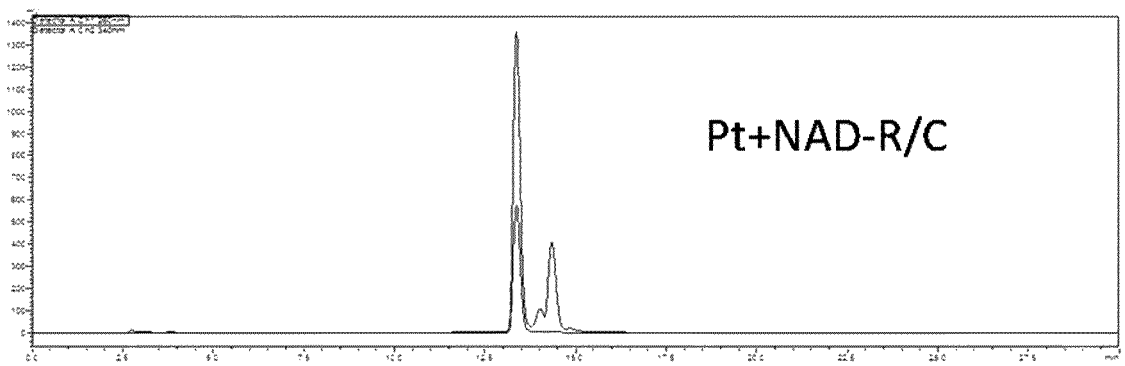
Figure 15:
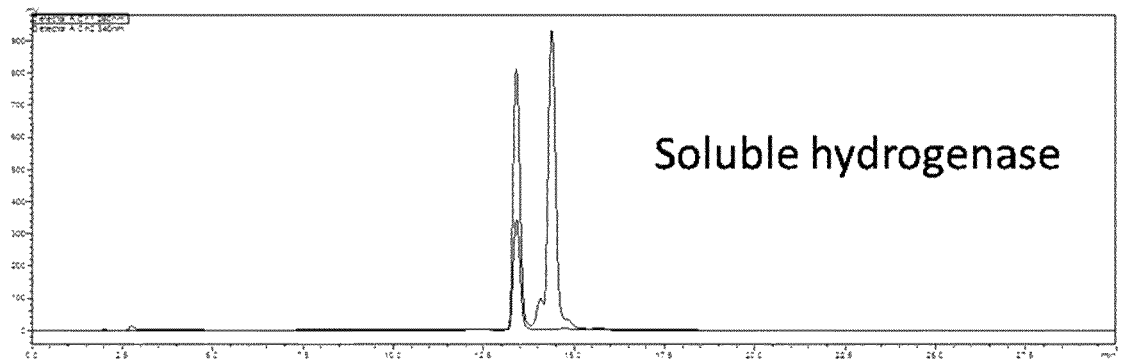
Figure 15:
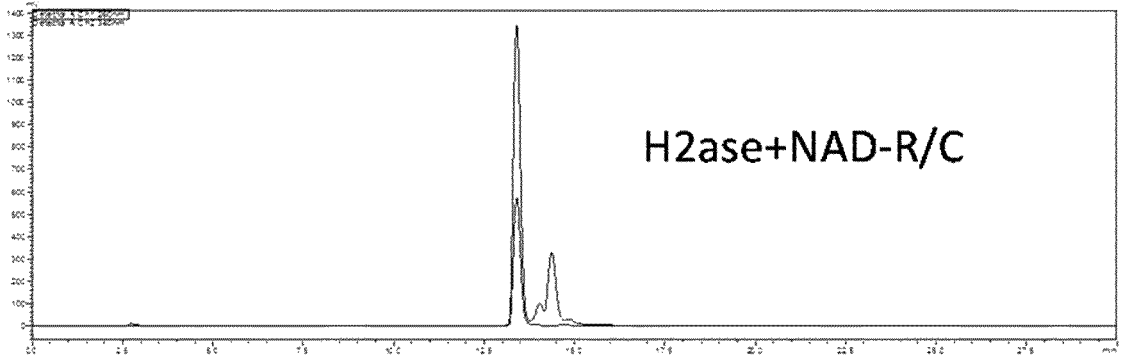
Figure 15:
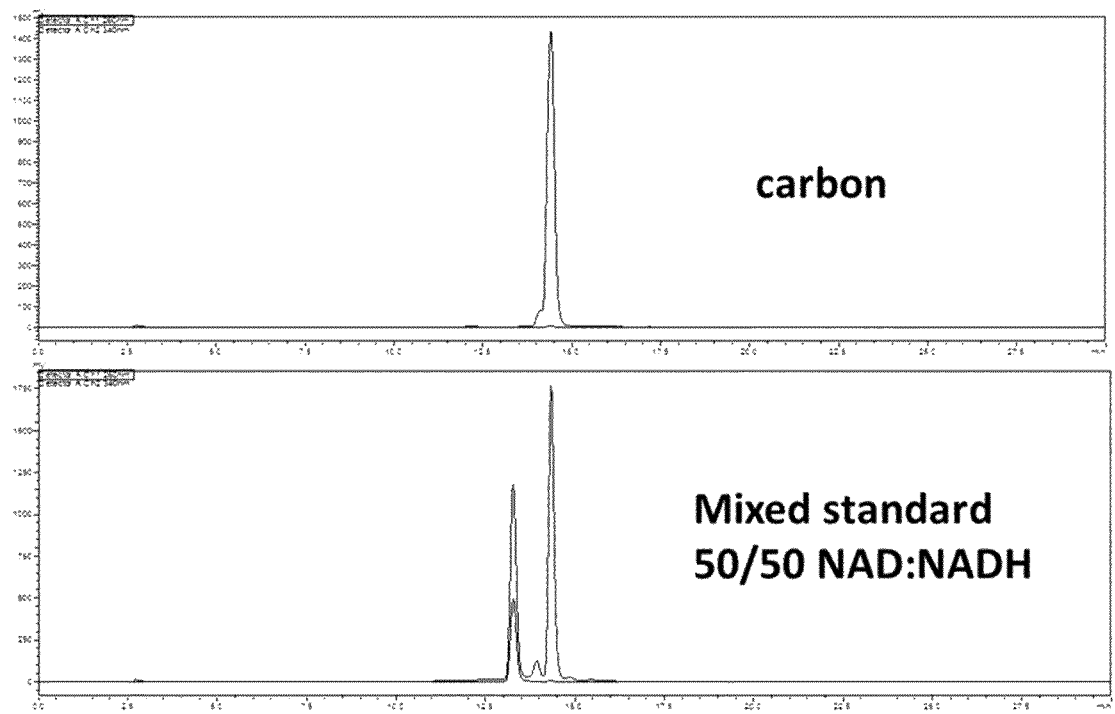
Figure 15:
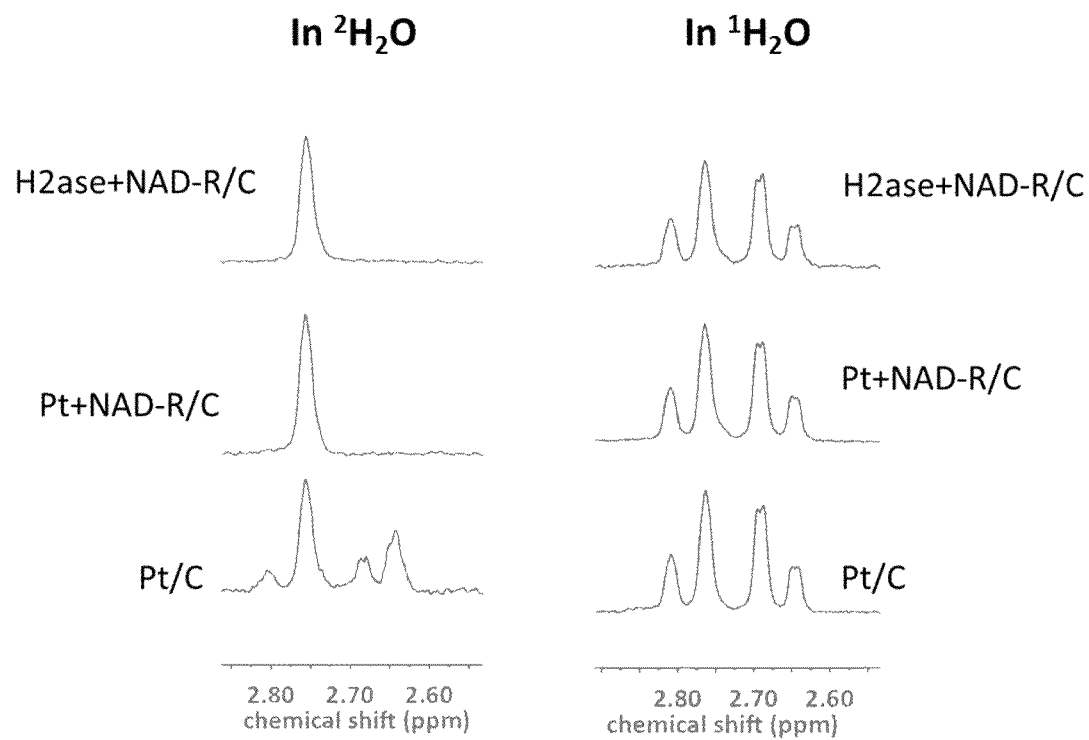

FIG. 15A shows HPLC spectra comparing the selectivity of the methods of the invention as described in Example 5. The traces show that the Pt/C system leads to significant generation of by-products. In contrast, systems utilizing NAD-R as the first polypeptide in accordance with the methods of the invention show high selectivity for 4-NADH. FIG. 15B shows typical $^1$H NMR data (400 MHz, 298 K) for such reactions. Results are described in Example 5.

Figure 16:
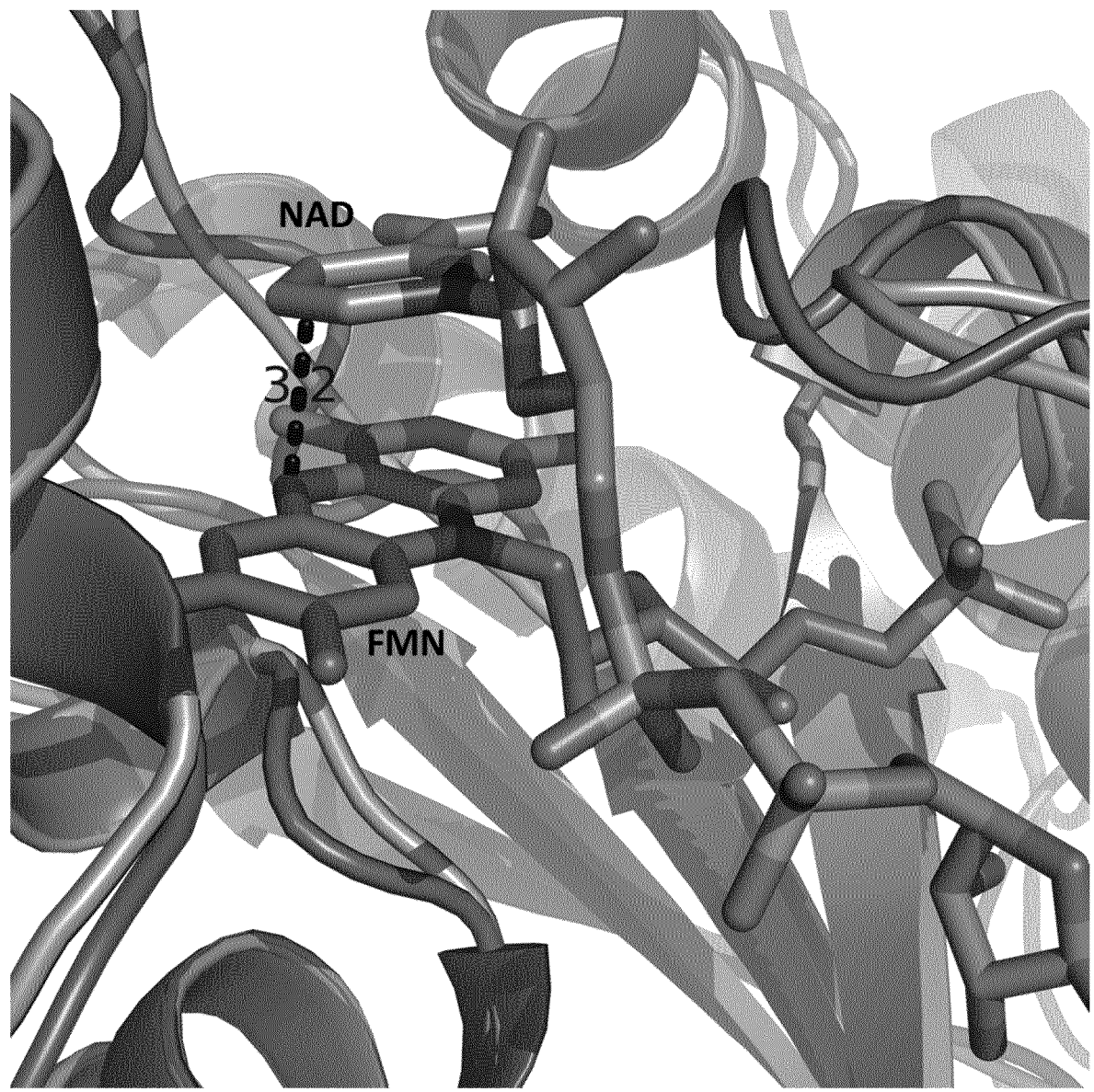

FIG. 16 shows an X-ray determined crystal structure of the NAD$^+$ binding site of Complex 1 from *Thermus thermophilus* (Tt) (PDB code: 3IAM; dark grey) and an overlay of a homology model of the *R. eutropha* HoxFU protein (SEQ ID NOs: 1, 2; light grey) showing the corresponding NAD-R active site. Figure was generated using the standard software package PyMol. FMN and NADH cofactors are labelled—the FMN is underneath the NADH. The black dotted line denotes the distance between the atoms in FMN and NADH that the hydride is transferred between. The structure confirms that the hydride from FMN is delivered to the si face of the cofactor and confirms that electron transfer and proton transfer are decoupled by using NAD-R.

Figure 17:
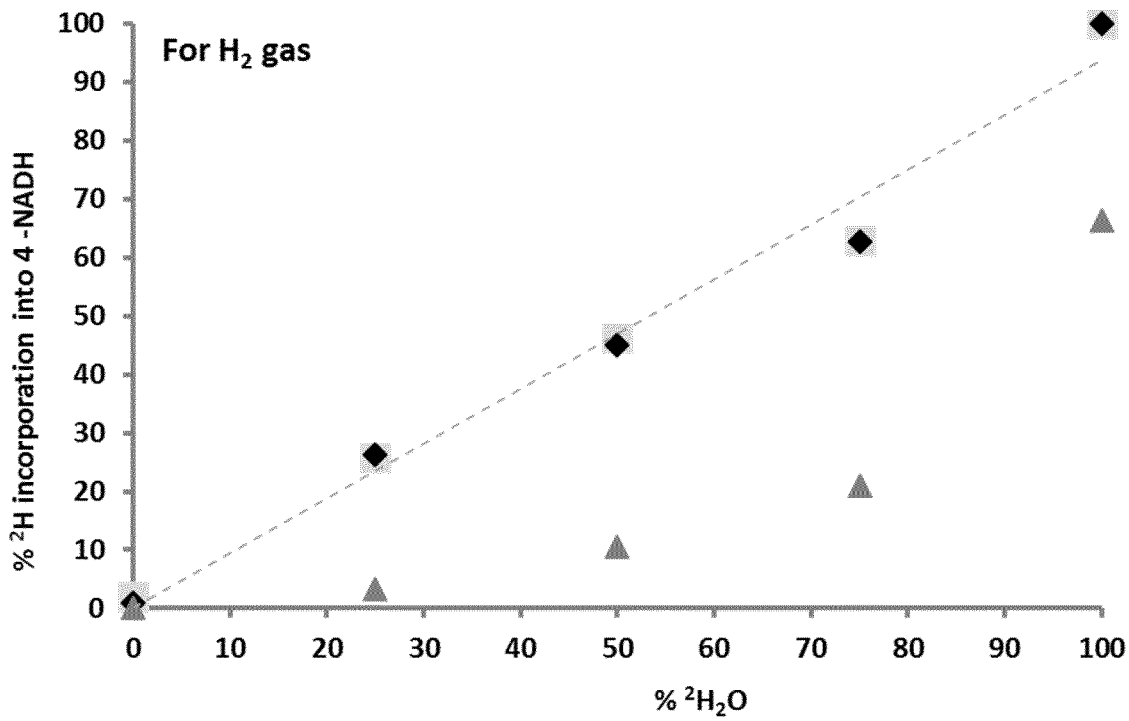
Figure 17:
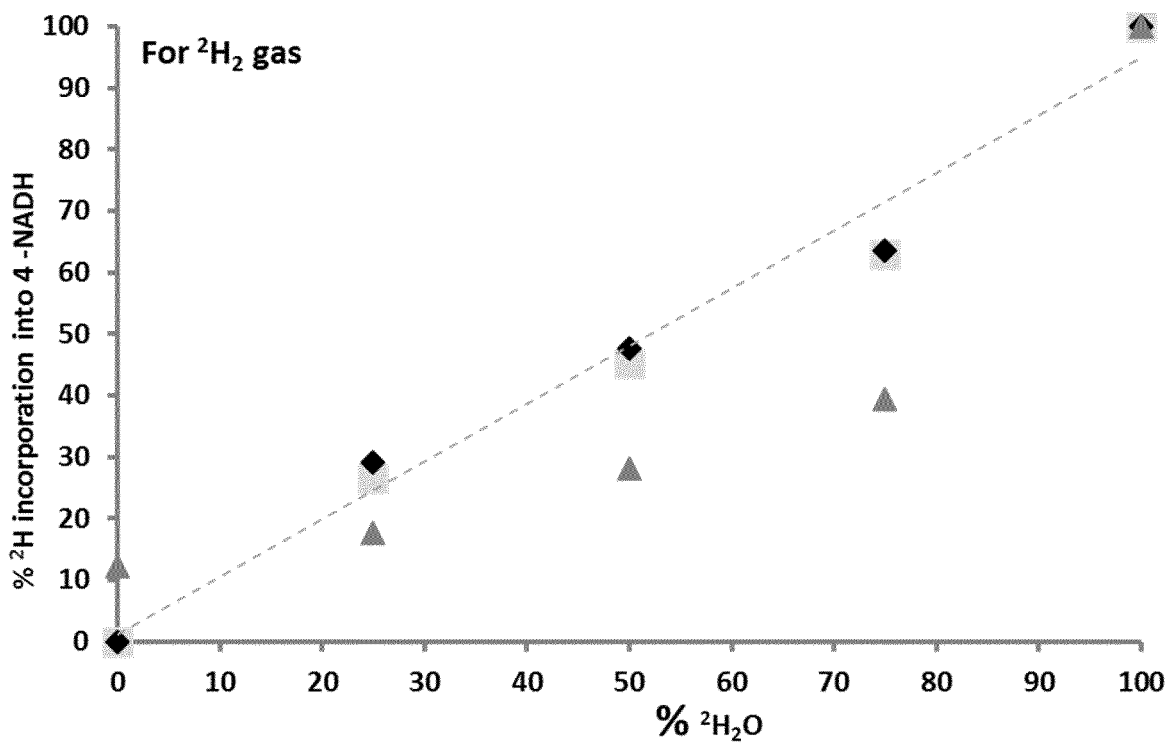

FIG. 17 shows a plot of $^2$H incorporation under a series of $^1$H$_2$O:$^2$H$_2$O environments in (A) $^1$H$_2$ and (B) $^2$H$_2$ gas following H$_2$-driven NAD$^+$ reduction by the Pt/C (dark grey, triangles); Pt+NAD-R/C (black, diamonds); and H2ase+NAD-R/C (light grey, squares) systems described in the Examples. The catalysts were removed prior to analysis by UV-vis spectroscopy and NMR. The dashed line is a line of best fit for the Pt+NAD-R/C system. Results are described in Example 6.

Figure 18:
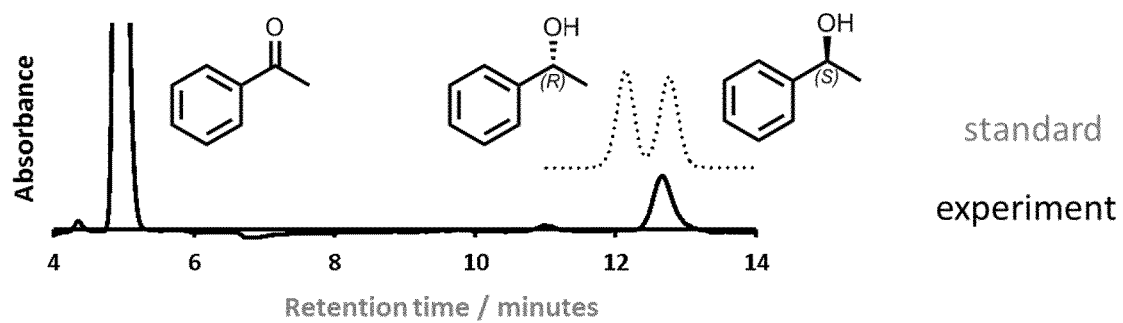
Figure 18:
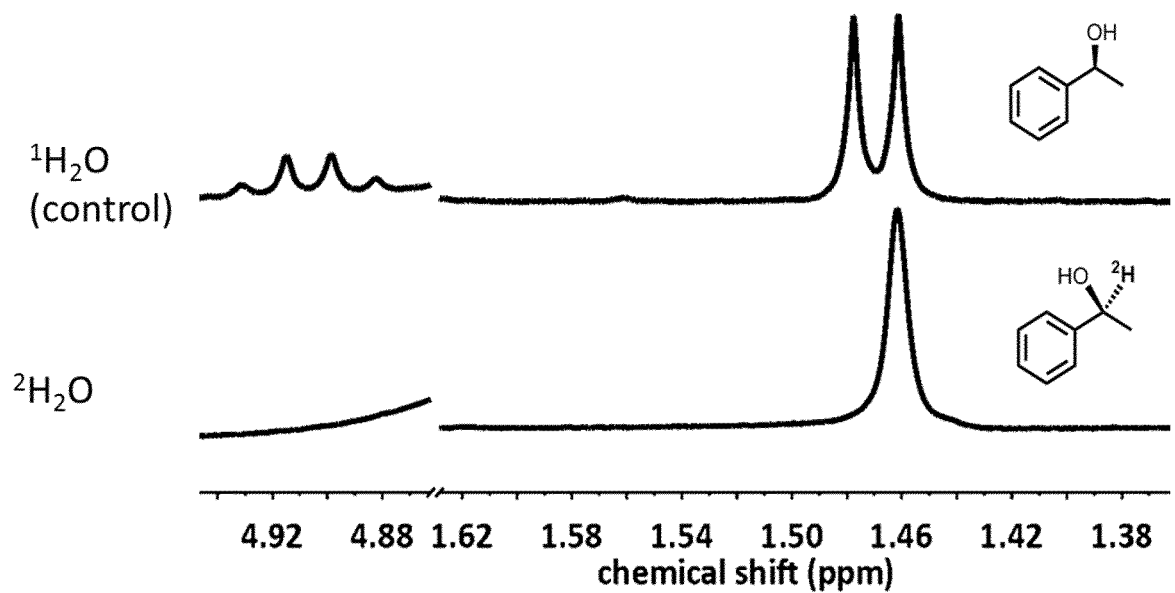
Figure 18:
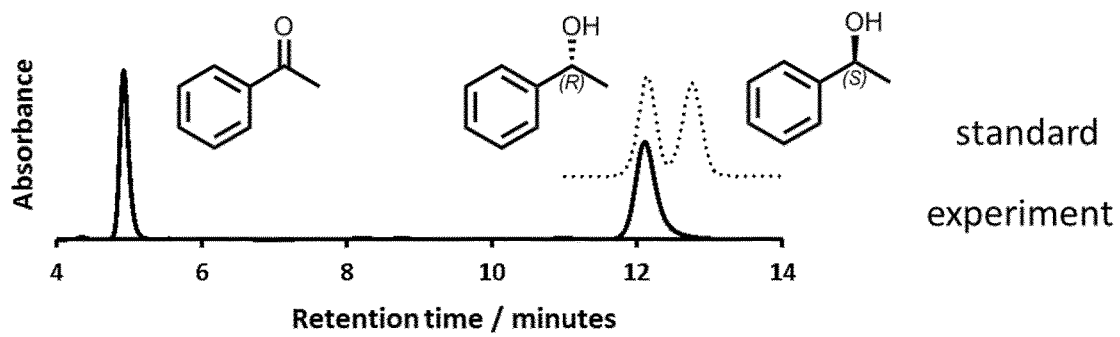
Figure 18:
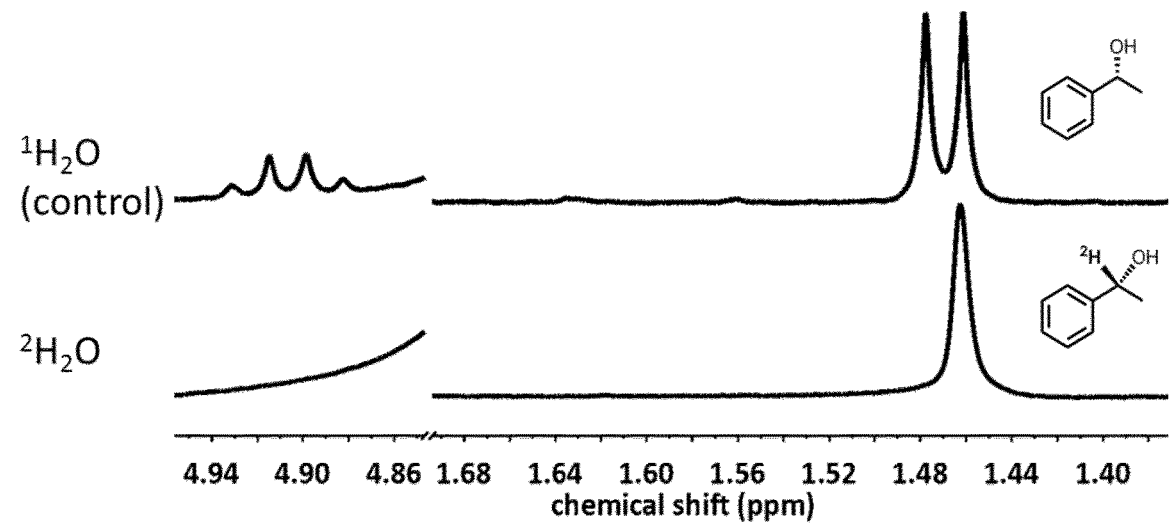
Figure 18:
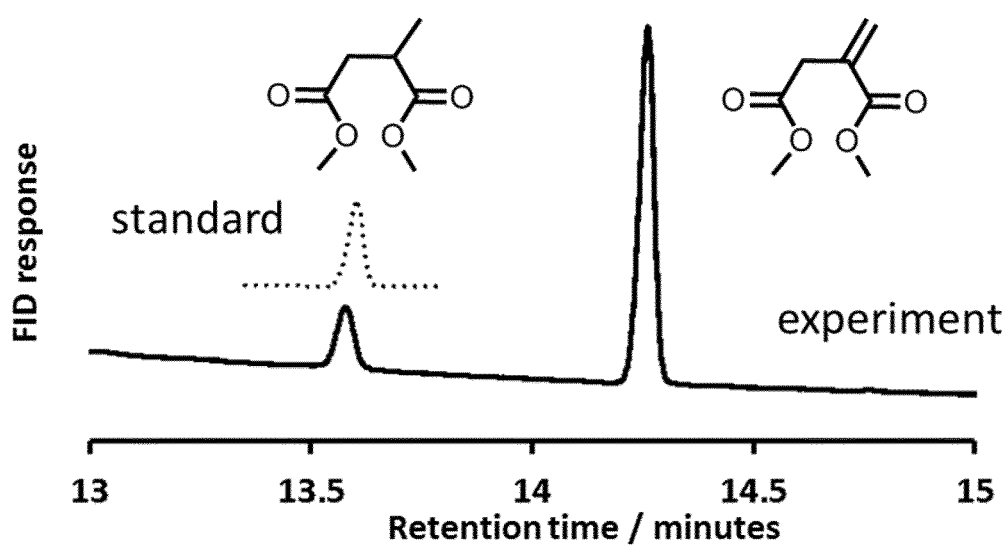
Figure 18:
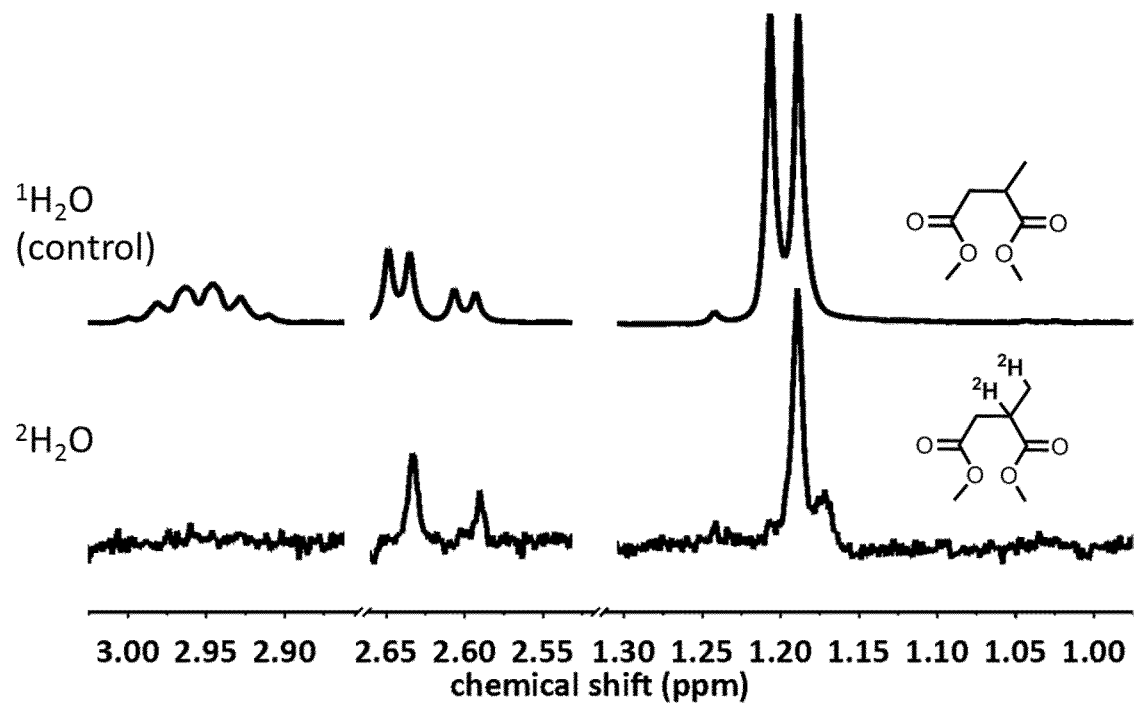
Figure 18:
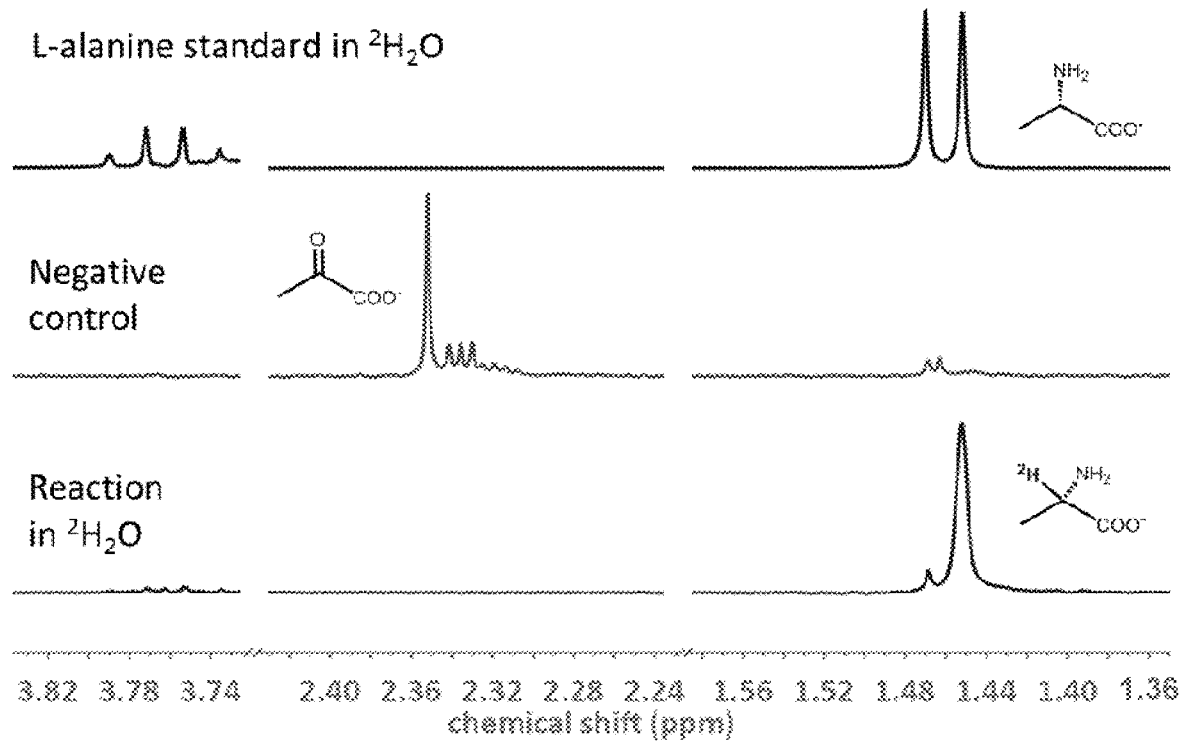

FIG. 18 shows spectroscopic analysis of reactions in which labelled NADH is supplied to an NADH-dependent enzyme for chemo- and stereo-selective incorporation of at least one $^2$H atom. Using methods of the invention wherein the electron source is *E. coli* hydrogenase 2 (SEQ ID NOs: 39, 40) and the first polypeptide is *R. eutropha* soluble hydrogenase with an inactivated hydrogenase moiety (SEQ ID NOs: 1, 2, 31, 69), and the first and second polypeptide are immobilized by adsorption onto carbon particles, the labelled cofactor was continually recycled and supplied to (A) an S-selective ADH, (B) an R-selective ADH, (C) an ene reductase and (D) an L-alanine dehydrogenase. The reaction products were analysed using either HPLC or GC and/or combination with $^1$H NMR. $^1$H NMR for analogous experiments in $^1$H$_2$O (control) and $^2$H$_2$O (experiment) are shown. Only those in $^2$H$_2$O lead to labelled product. Experiments are described in Example 7.

FIG. 18A (i): Chiral HPLC; (ii) $^1$H NMR
FIG. 18B (i): Chiral HPLC; (ii) $^1$H NMR
FIG. 18C (i): GC; (ii) $^1$H NMR
FIG. 18D: $^1$H NMR
FIG. 18E shows a summary of the reactions described in Example 7.

Figure 19:
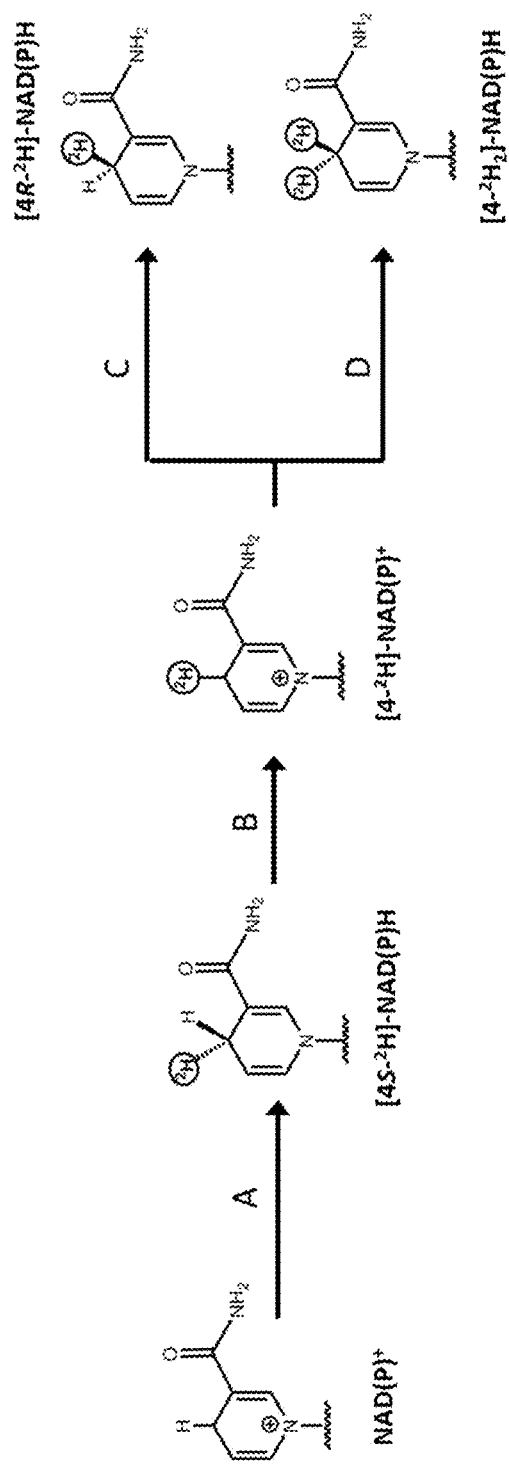

FIG. 19 shows a reaction scheme demonstrating how the methods of the invention can be used to selectively generate [4S-$^2$H]-NAD(P)H, [4R-$^2$H]-NAD(P)H, [4-$^2$H]-NAD(P)H and [4-$^2$H]-NAD(P)$^+$.

Figure 20:
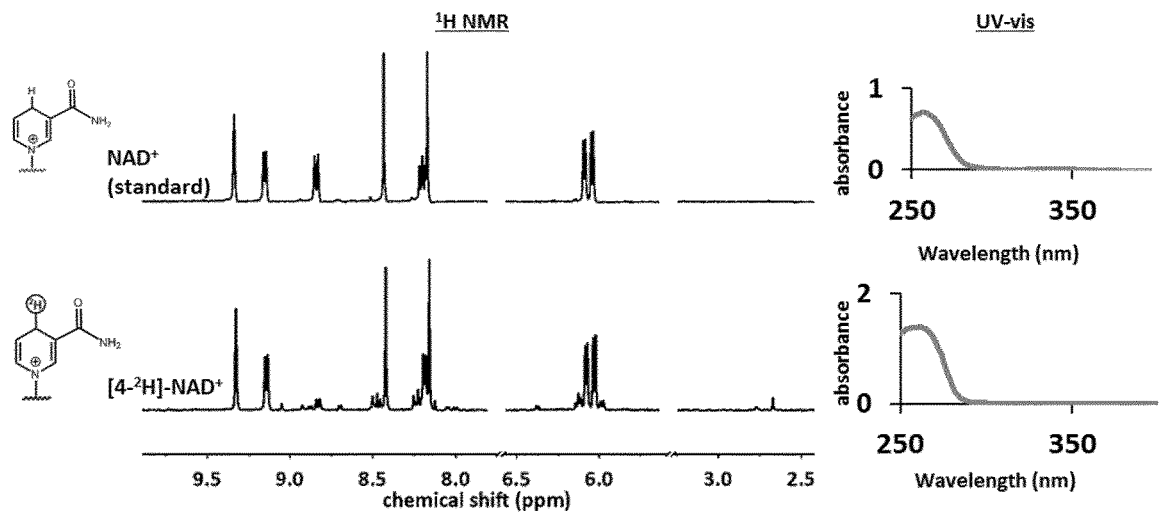
Figure 20:
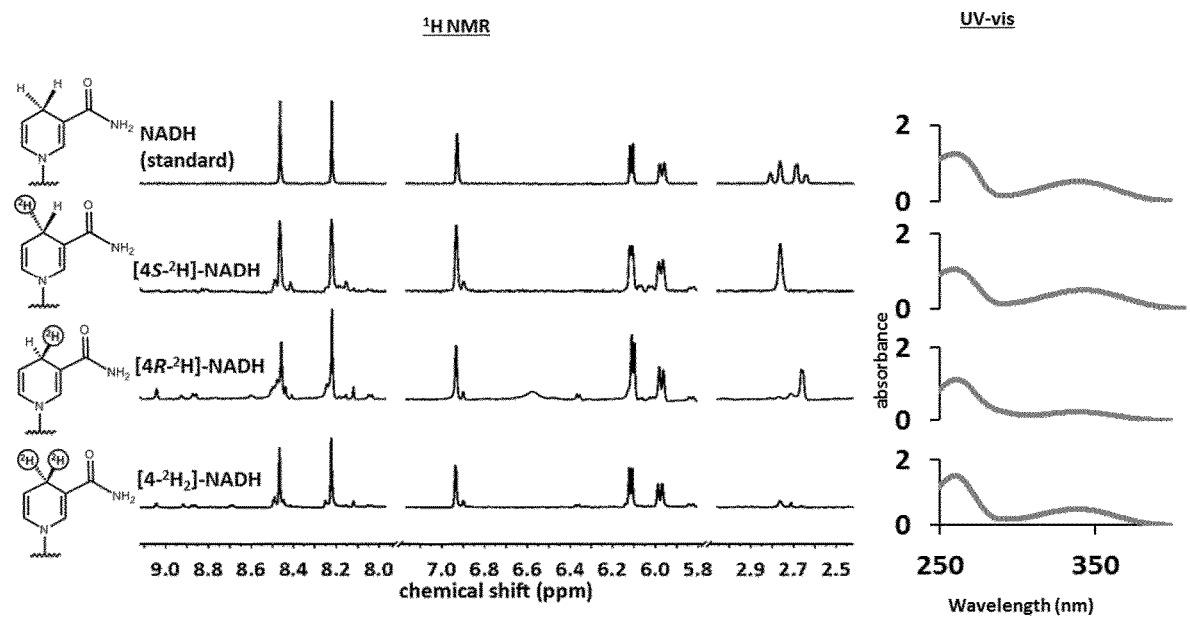

FIG. 20 shows UV-vis and $^1$H NMR spectroscopic results demonstrating the selective generation of [4S-$^2$H]-NADH, [4R-$^2$H]-NADH, [4-$^2$H]-NADH and [4-$^2$H]-NAD$^+$ using methods of the invention. Experiments are described in Example 8.

Figure 21:
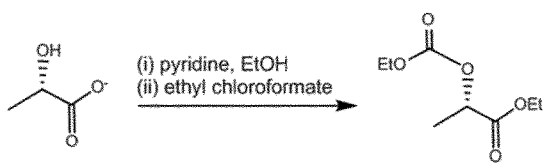
Figure 21:
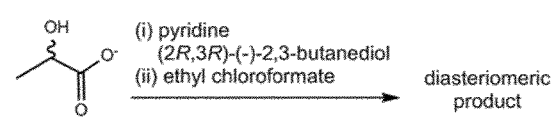
Figure 21:
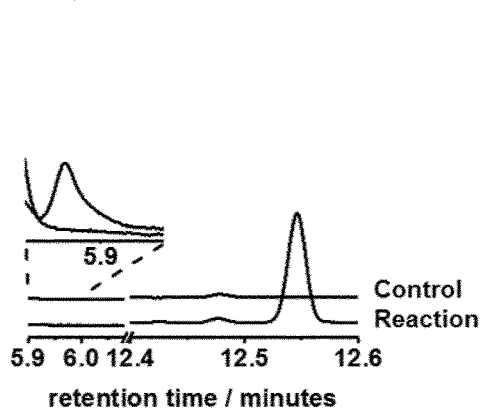
Figure 21:
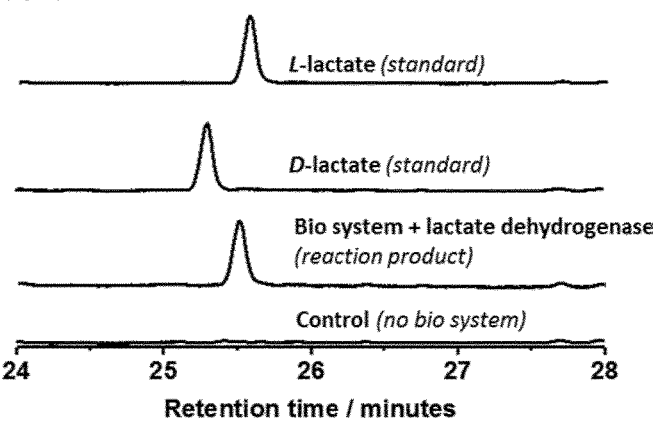
Figure 21:
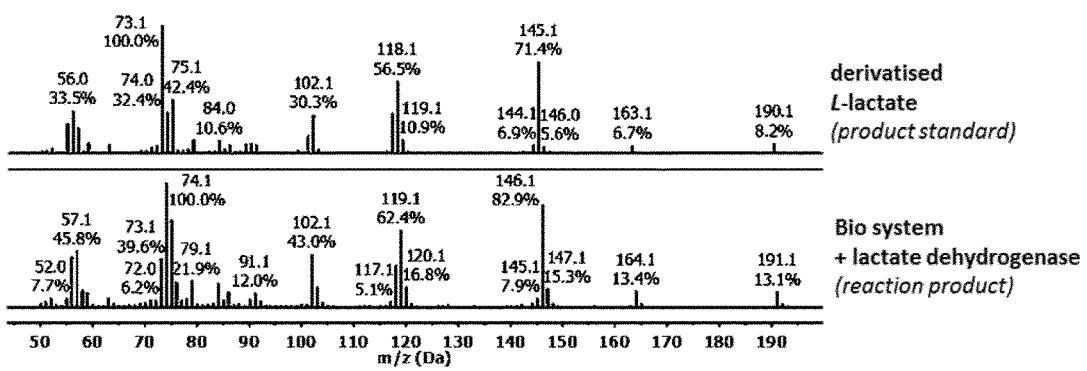
Figure 21:
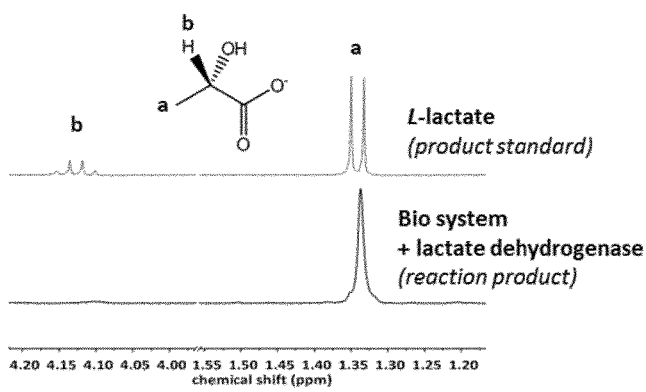
Figure 21:
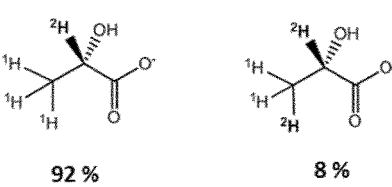

FIG. 21 shows results characterizing the products from the reductive deuteration of pyruvate using the methods of the invention. The results are compared to isotopically unenriched commercial lactate standards and a control reaction without the system of the invention present. (a)(i) Reaction scheme showing the derivatization of lactate for analysis by (a)(ii) GC-FID. (b)(i) Reaction scheme showing the diastereotopic derivatization of lactate for analysis by (b)(ii) GC-FID. (b) Mass spectra (EI, 70 eV) and (c) $^1$H NMR analysis ($^2$H$_2$O, p$^2$H 8.0, 500 MHz, 293 K) of L-lactate produced in the deuteration reaction compared to an isotopically unenriched standard. (d) Determined distribution of $^2$H labels across the product L-lactate. Results are described in Example 9.1.

Figure 22:
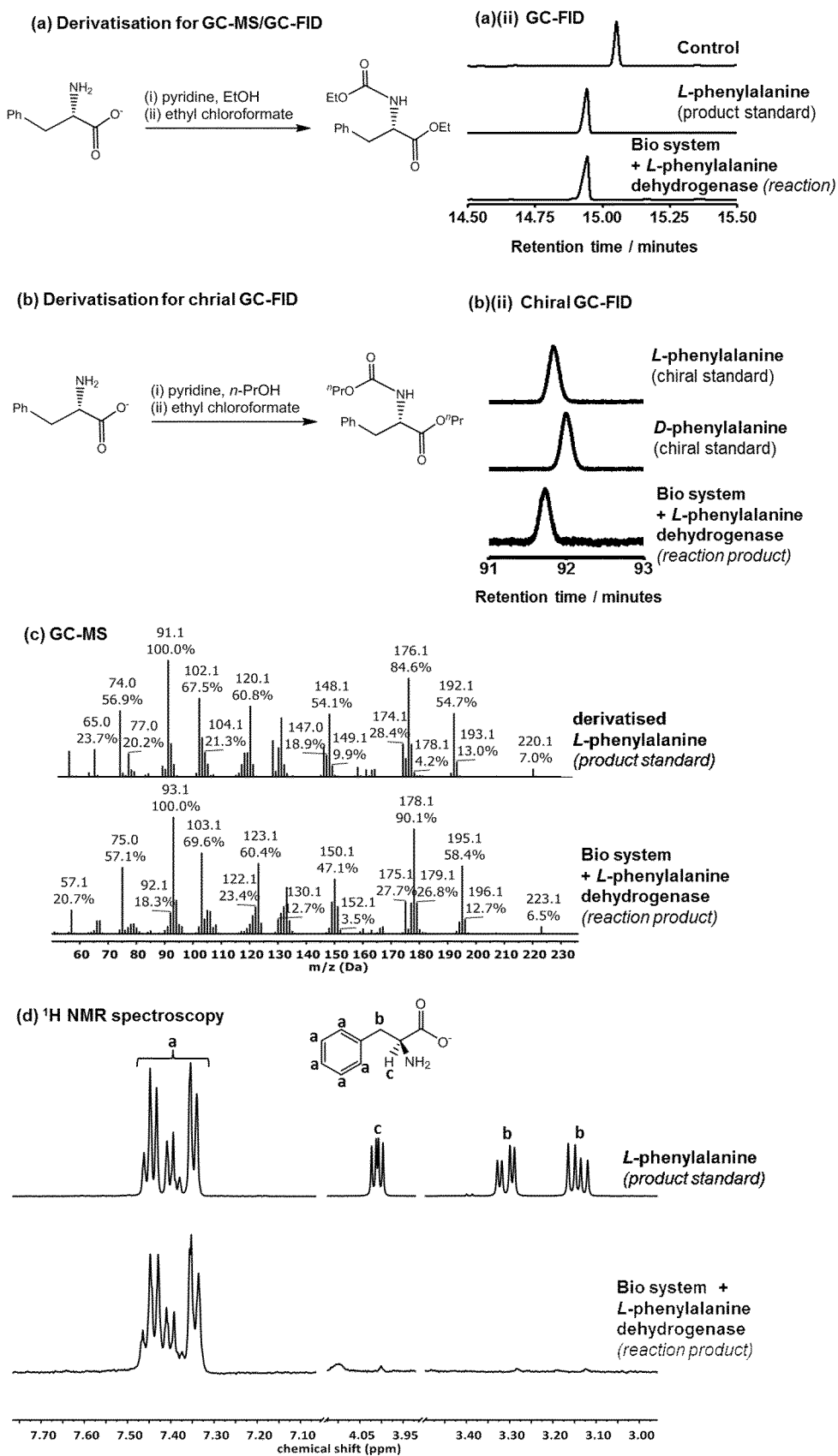

FIG. 22 shows results characterizing the products from the reductive deuteration of phenylpyruvate using the methods of the invention. The results are compared to isotopically unenriched commercial phenylalanine standards and a control reaction without the system of the invention present. (a)(i) Reaction scheme showing the derivatization of phenylalanine for analysis by (a)(ii) GC-FID. (b)(i) Reaction scheme showing the derivatization of phenylalanine for analysis by (b)(ii) chiral-GC-FID. (c) Mass spectra (EI, 70 eV) and (d) $^1$H NMR analysis ($^2$H$_2$O, p$^2$H 8.0, 500 MHz, 293 K) of L-phenylalanine produced in the deuteration reaction compared to an isotopically unenriched standard. Results are described in Example 9.2.

Figure 23:
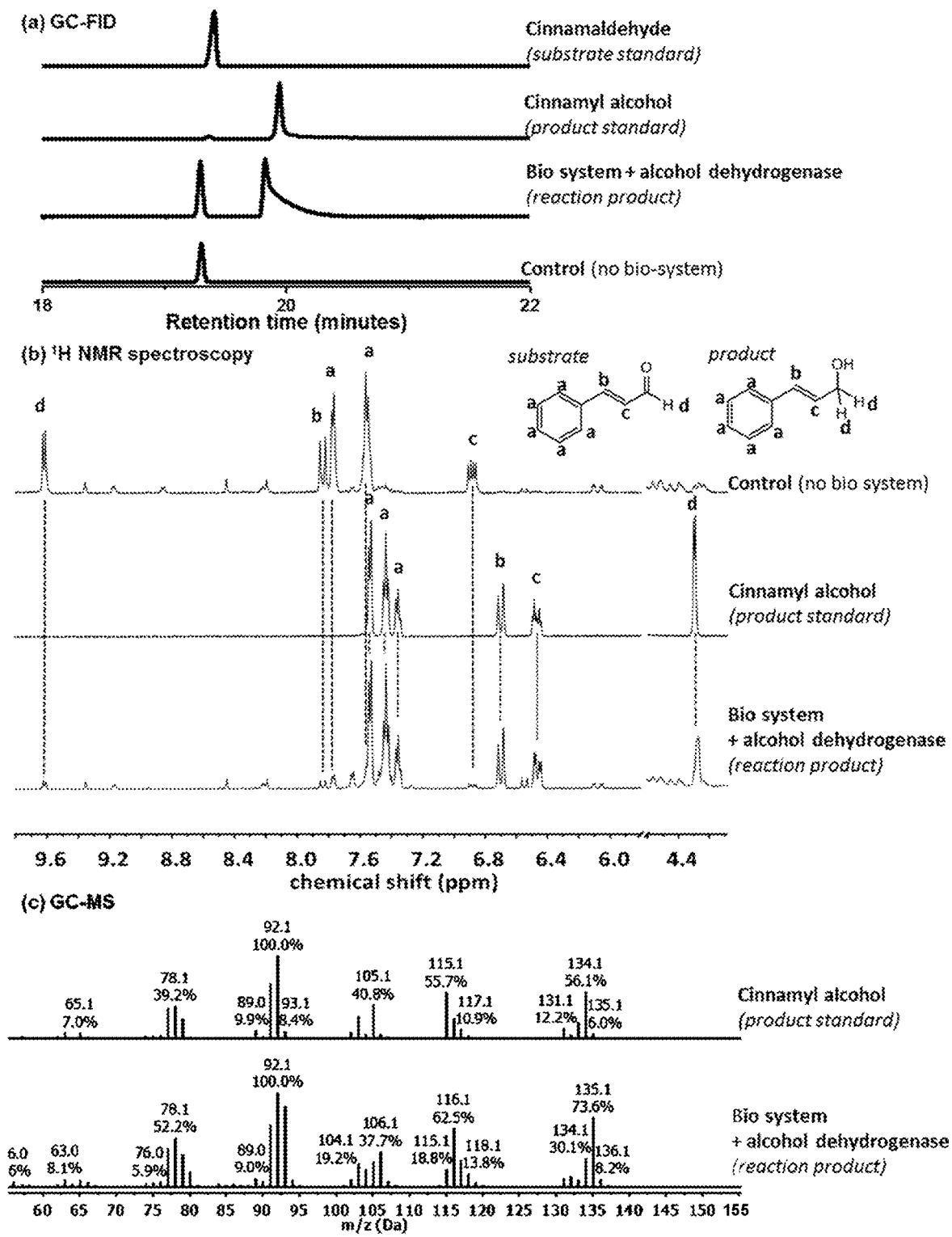

FIG. 23 shows results characterizing the products from the reductive deuteration of cinnamaldehyde using the methods of the invention. In each case the results are compared to an isotopically unenriched commercial cinnamyl alcohol standard. (a) GC-FID determination of the cinnamyl alcohol produced compared to cinnamaldehyde, cinnamyl alcohol standards and a control reaction (with no bio system added) showing that only a single product is made in each reaction with no side product formation. (b) $^1$H NMR analysis ($^2$H$_2$O, p$^2$H 8.0, 500 MHz, 293 K) of the cinnamyl alcohol produced shows that high $^2$H incorporation is achieved. (c) Mass spectra (EI, 70 eV) of the cinnamyl alcohol produced compared to an isotopically unenriched standard. Results are described in Example 9.3 (reaction A).

Figure 24:
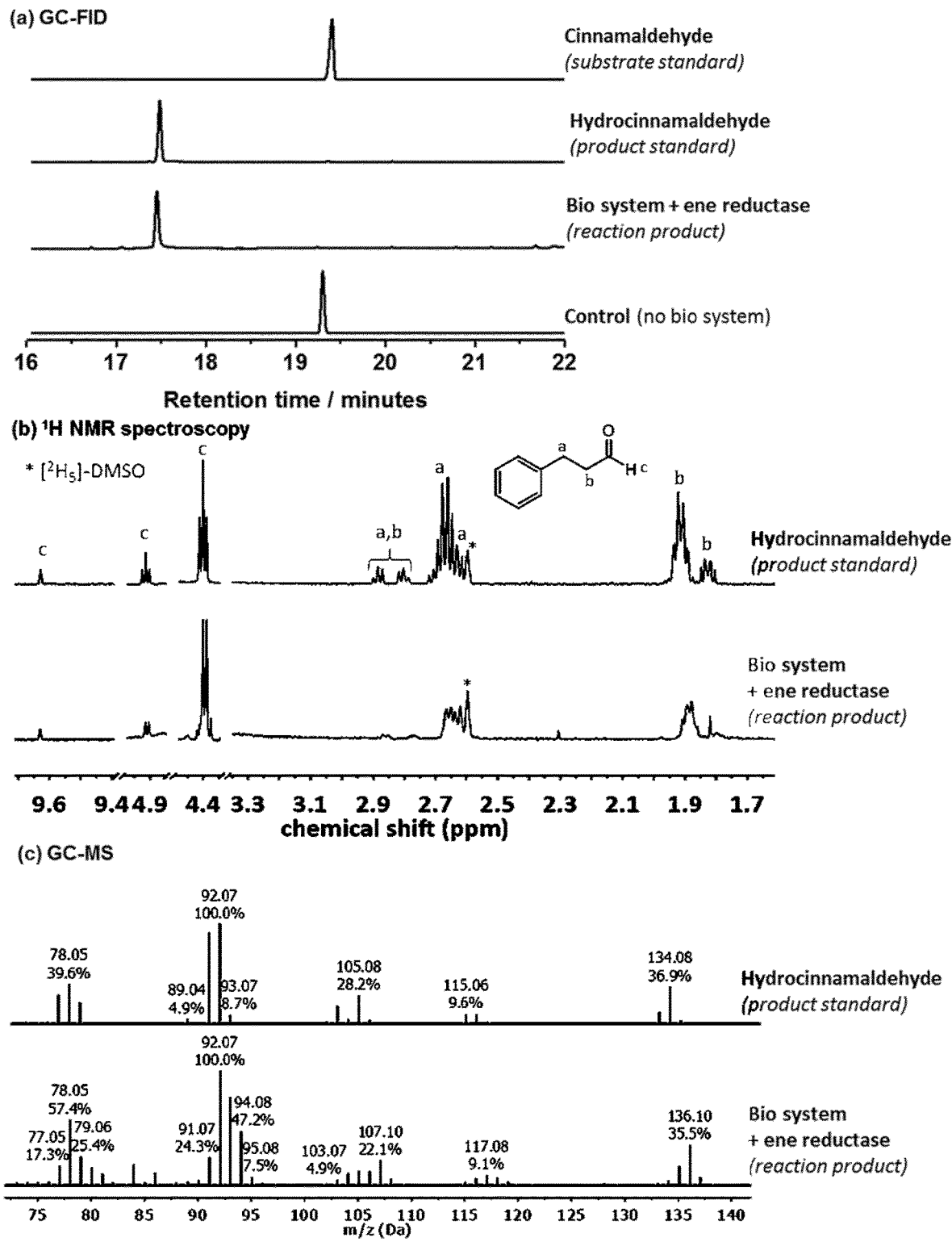

FIG. 24 shows results characterizing the products from the reductive deuteration of cinnamaldehyde using the methods of the invention. In each case the results are compared to an isotopically unenriched commercial hydrocinnamaldehyde standard. (a) GC-FID determination of the cinnamyl alcohol produced compared to cinnamaldehyde, hydrocinnamaldehyde standards and a control reaction (with no bio-system added) showing that only a single product is made with no side product formation. (b) $^1$H NMR analysis ($^2$H$_2$O, p$^2$H 8.0, 500 MHz, 293 K) of the hydrocinnamaldehyde produced shows that high $^2$H incorporation is achieved. (c) Mass spectra (EI, 70 eV) of the hydrocinnamaldehyde produced compared to the isotopically unenriched standard. Results are described in Example 9.3 (reaction B).

Figure 25:
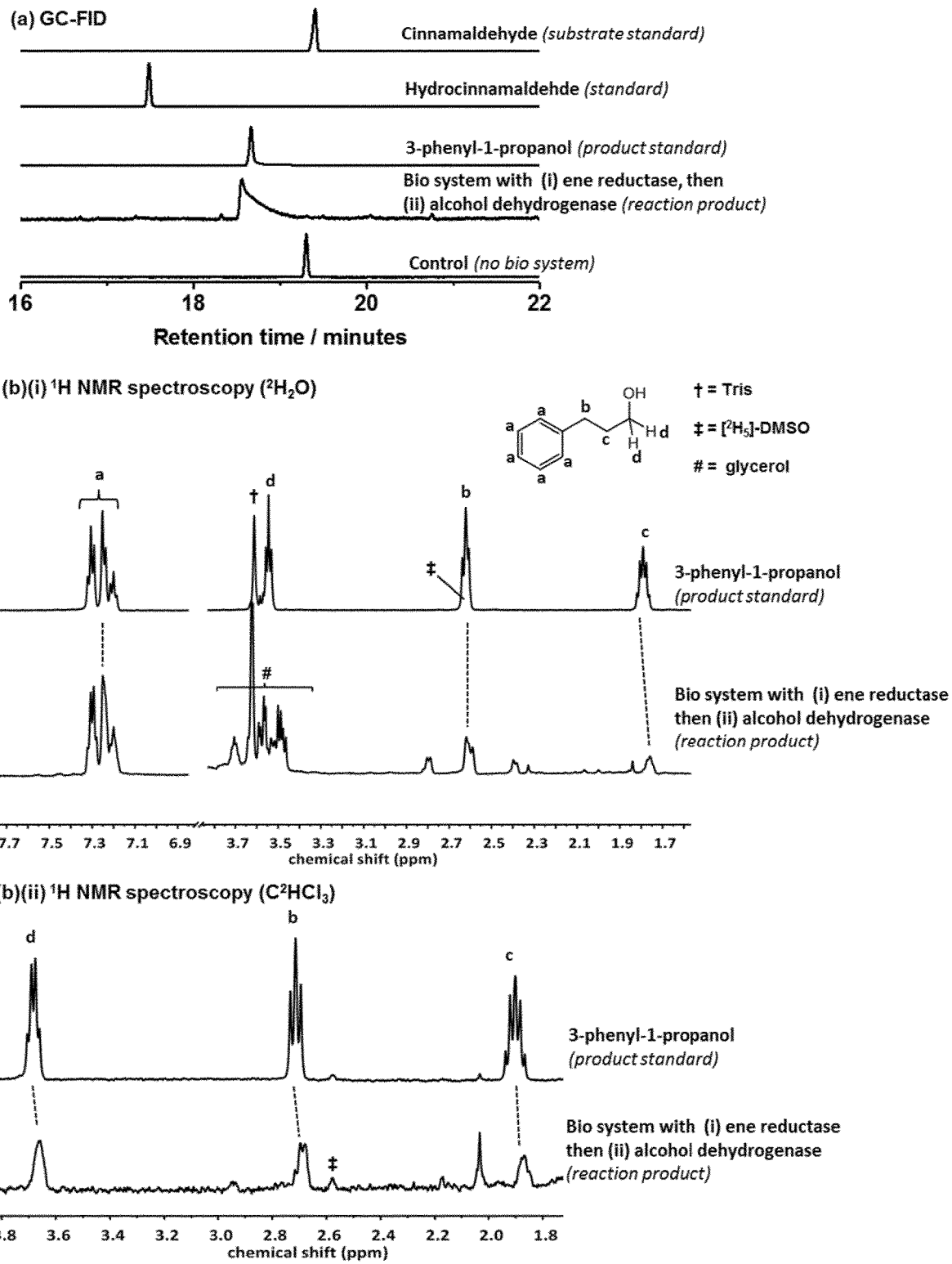
Figure 25:
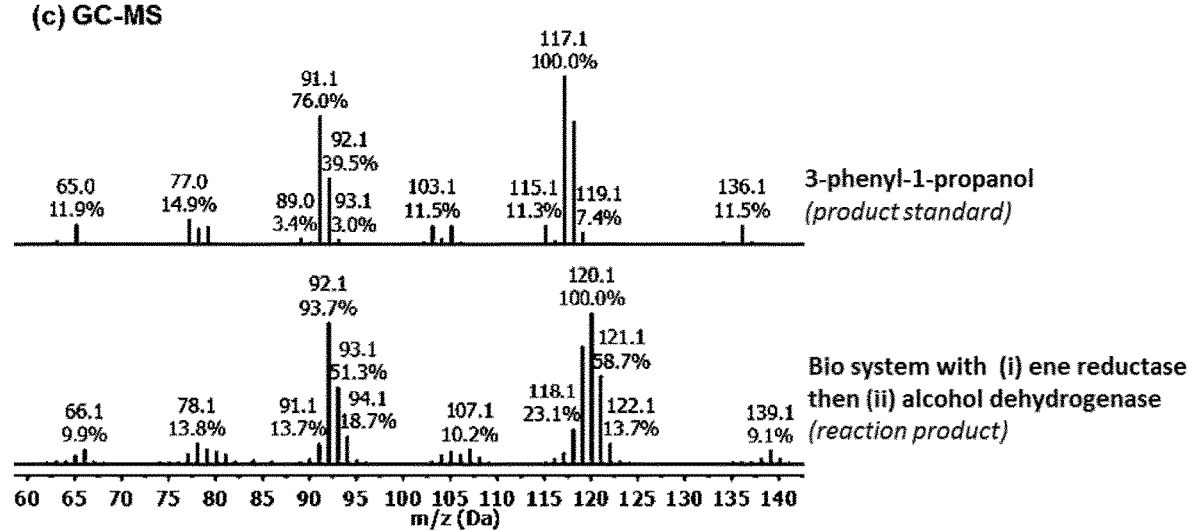

FIG. 25 shows results characterizing the products generated using a two-step, one pot reductive deuteration reaction in accordance with the methods of the invention, with (i) an ene reductase acting on cinnamaldehyde and (ii) and alcohol dehydrogenase acting on the intermediate hydrocinnamaldehyde. In each case the results are compared to an isotopically unenriched commercial 3-phenyl-1-propanol standard. (a) GC-FID determination of the 3-phenyl-1-propanol produced compared to cinnamaldehyde, hydrocinnamaldehyde and 3-phenyl-1-propanol standards and a control reaction (with no bio-system added) showing that only a single product is made in each reaction with no side product formation. (b) 1H NMR analysis ($^2$H$_2$O, p$^2$H 8.0, 500 MHZ, 293 K) of the 3-phenyl-1-propanol produced shows that high 2H incorporation is achieved. (c) Mass spectra (EI, 70 eV) of the 3-phenyl-1-propanol produced compared to the isotopically unenriched standard. Results are described in Example 9.3 (reaction C).

Figure 26:
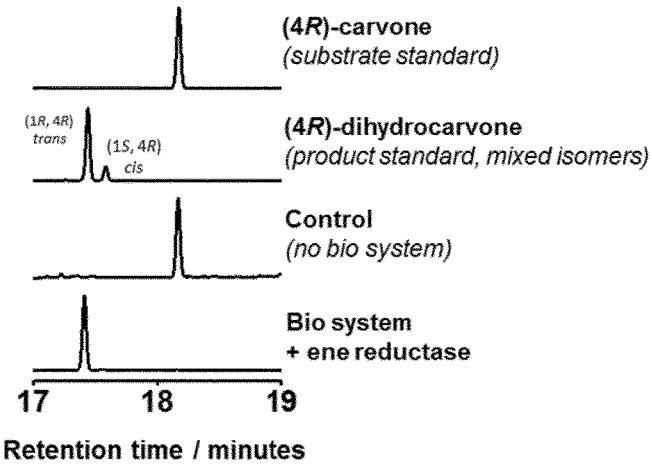
Figure 26:
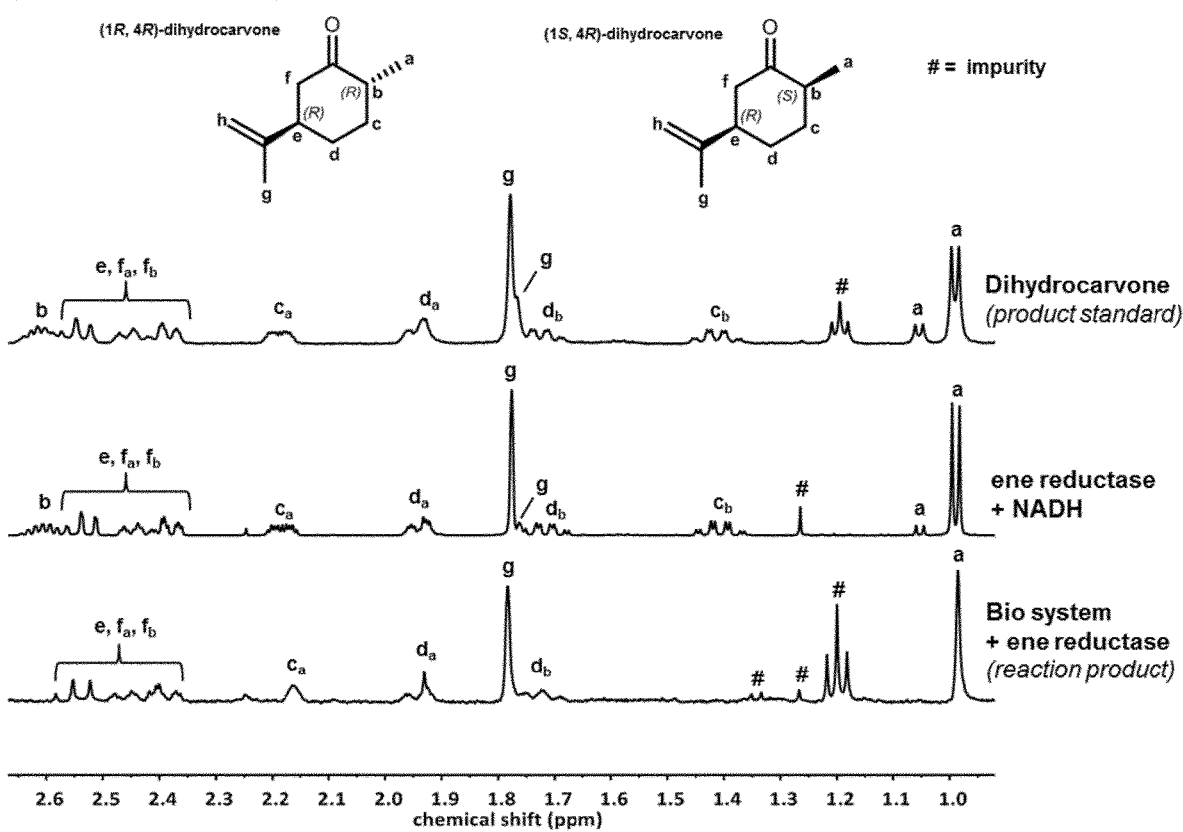
Figure 26:
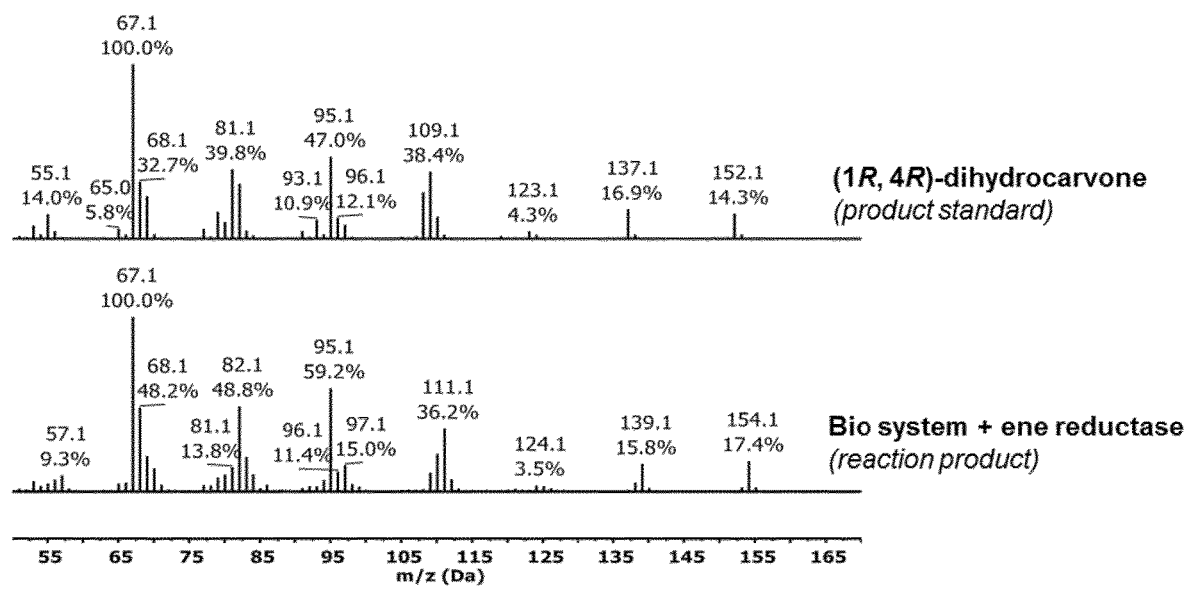

FIG. 26 shows results characterizing the products from the reductive deuteration of (4R)-carvone by using the heterogeneous bio-system with an ene reductase. In each case the results are compared to an isotopically unenriched commercial dihydrocarvone standard, or a sample prepared by supplying an ene reductase with substrate and super-stoichiometric NADH. (a) GC-FID determination of the dihydrocarvone produced compared to standards and a control reaction (with no bio-system added). (b) $^1$H NMR analysis ($^2$H$_2$O, p$^2$H 8.0, 500 MHz, 293 K) and (c) Mass spectra (EI, 70 eV) of the dihydrocarvone produced from the reaction. Results are described in Example 9.4 (reaction A).

Figure 27:
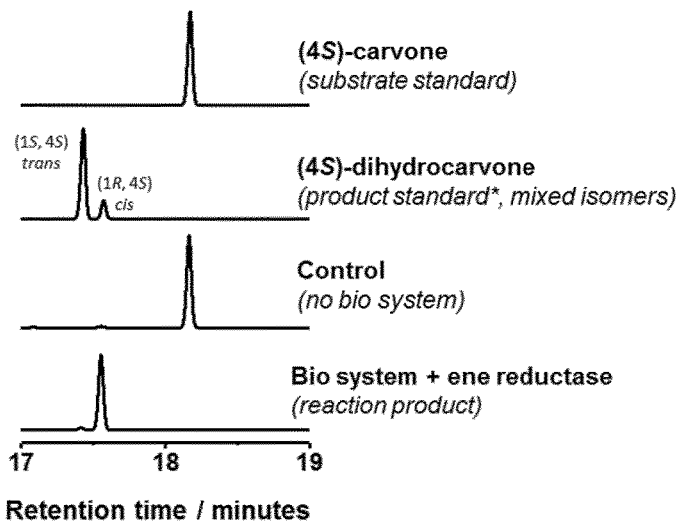
Figure 27:
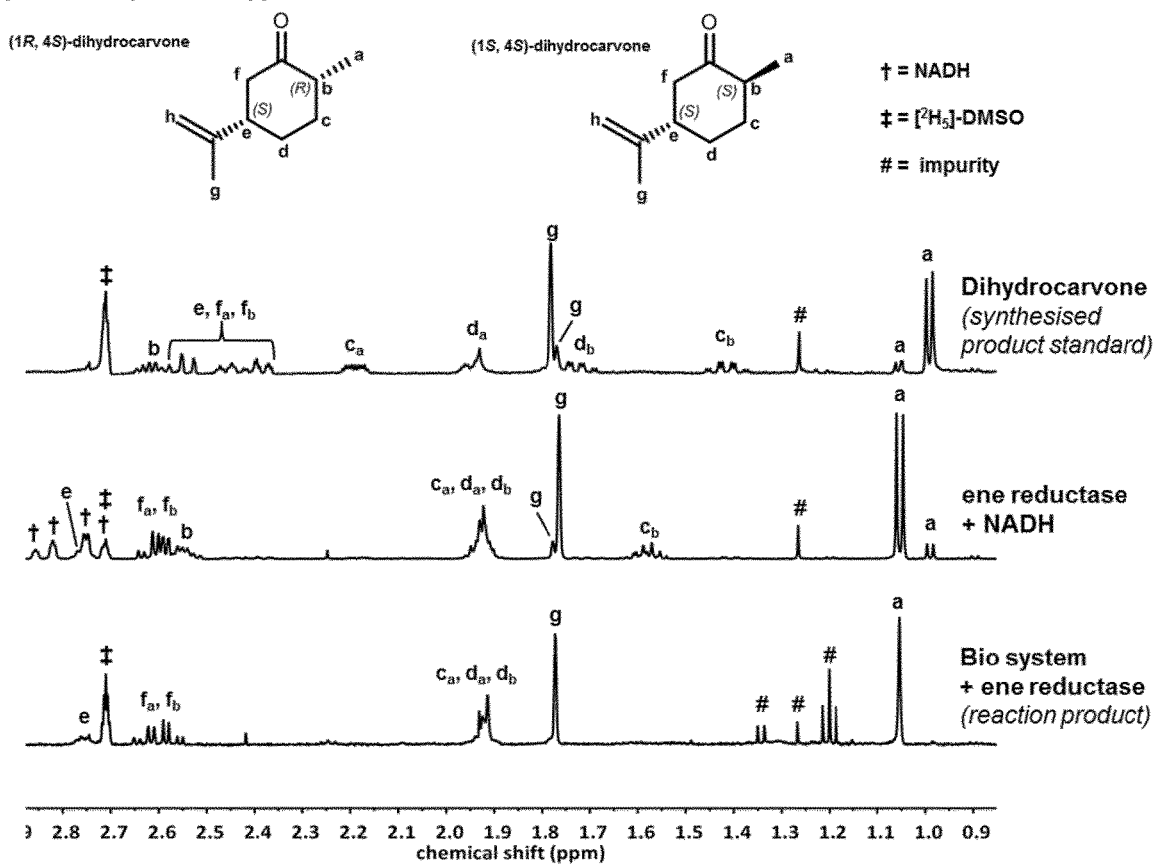
Figure 27:
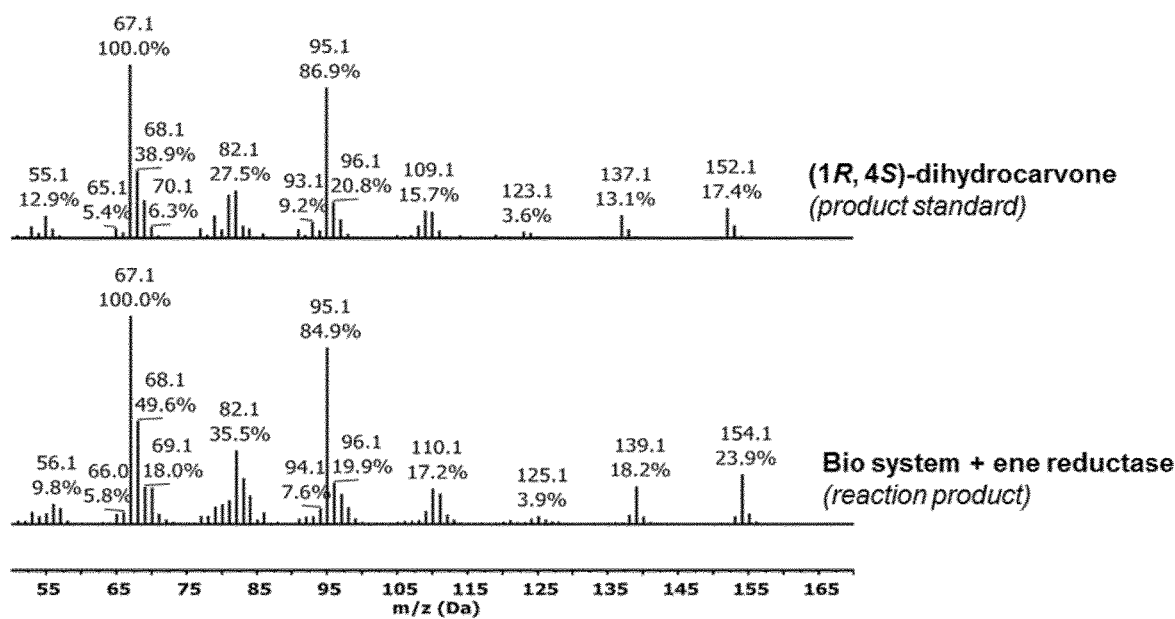

FIG. 27 shows results characterizing the products from the reductive deuteration of (4S)-carvone by using the heterogeneous bio-system with an ene reductase. In each case the results are compared to an isotopically unenriched dihydrocarvone samples, prepared by zinc reduction of the carvone or by supplying the ene reductase with substrate and super-stoichiometric NADH. (a) GC-FID determination of the dihydrocarvone produced compared to standards and a control reaction (with no bio-system added). (b) $^1$H NMR analysis ($^2$H$_2$O, p$^2$H 8.0, 500 MHz, 293 K) and (c) Mass spectra (EI, 70 eV) of the dihydrocarvone produced from the reaction compared to isotopically unenriched samples. Results are described in Example 9.4 (reaction B).

Figure 28:
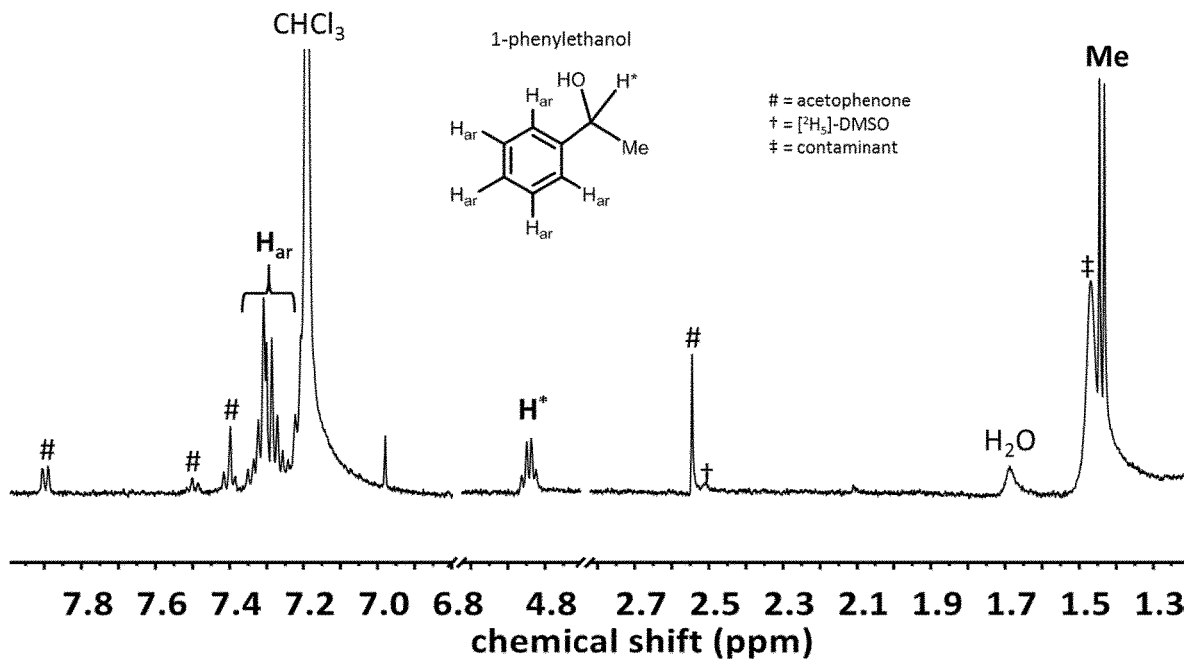
Figure 28:
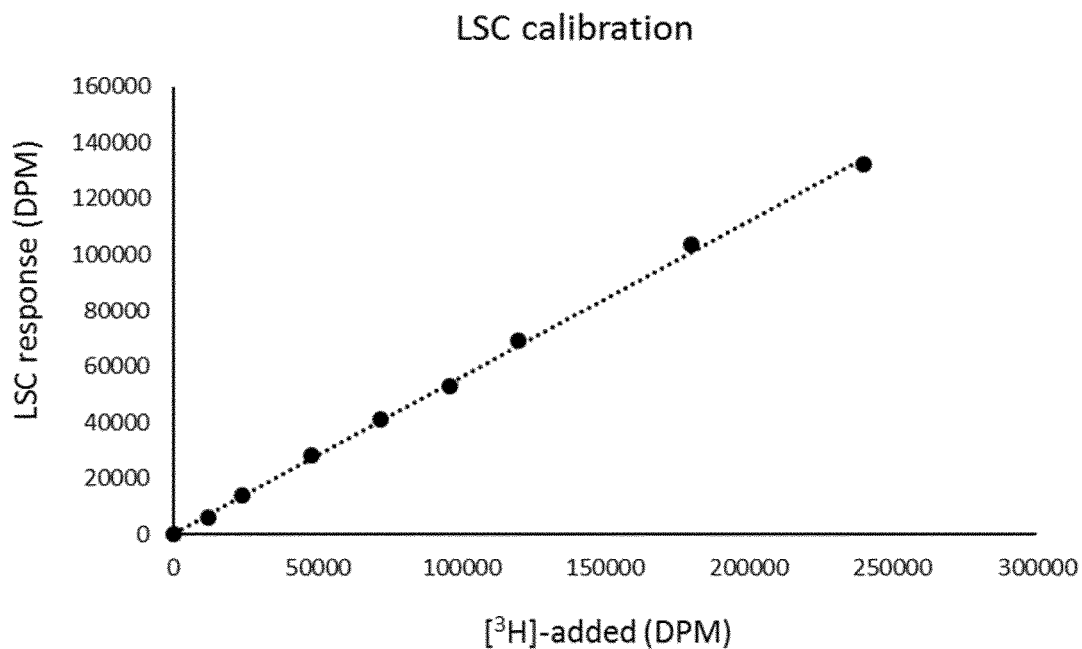

FIG. 28 shows that the methods of the invention can be used in selective reductive tritaration of reactants such as acetophenone. (a) 1H NMR analysis of product confirms (>80%) acetophenone was converted to 1-phenylethanol. (b) Liquid scintillation calibration allowed the radioactivity of the extracted product sample to be determined. Results are described in Example 10.

DETAILED DESCRIPTION OF THE INVENTION

Methods of the Invention

As described above, the invention provides methods for producing reduced labelled reaction products comprising one or more $^x$H atom, wherein x is 2 or 3. In such methods, the oxidised cofactor produced in step (iv) of the method is preferably re-reduced to form a reduced labelled cofactor in accordance with the methods described herein. Preferably, the reduced labelled reaction product thus produced is subsequently oxidised and reduced multiple times in methods of the invention, thereby recycling the cofactor.

Figure 1:
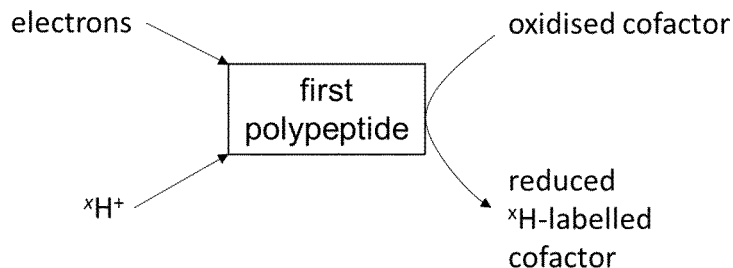
FIG. 1 shows a schematic diagram of the production of reduced labelled cofactor in accordance with the methods of the invention.
Figure 2:
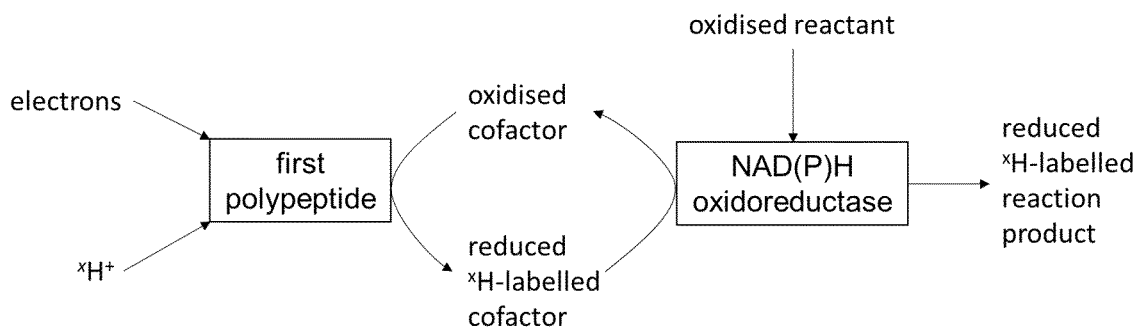
FIG. 2 shows a schematic diagram of the production of reduced labelled reaction product in accordance with the methods of the invention.

For avoidance of doubt, by recycling the cofactor, it is meant that a single cofactor molecule can be reduced in a method of the invention to form a reduced labelled cofactor. The reduced labelled cofactor can subsequently transfer a labelled hydrogen atom to an oxidised reactant to yield a reduced labelled reaction product and an oxidised cofactor, which can be re-reduced as described. The repeated reduction and oxidation of the cofactor corresponds to recycling of the cofactor. The net result is that the cofactor itself is not consumed, and the $^x$H$^+$ ions and electrons are consumed by the oxidised reactant in the production of reduced labelled reaction product. This method is illustrated schematically in FIG. 2.

In methods of the invention which involve recycling the cofactor, each cofactor molecule is typically recycled as defined herein at least 10 times, such as at least 100 times, more preferably at least 1000 times e.g. at least 10,000 times or at least 100,000 times, such as at least 1,000,000 times. Accordingly, in methods of the invention, the turnover number (TN) is typically at least 10, such as at least 100, more preferably at least 1000 e.g. at least 10,000 or at least 100,000, such as at least 1,000,000. As those skilled in the art will appreciate, the TN indicates the number of moles of product generated per mole of cofactor, and is thus a measure of the number of times each cofactor molecule is used.

Enzyme turnover can be calculated in a number of ways. The Total Turnover Number (TTN, also known as the TON) is a measure of the number of moles of product per mole of enzyme (specifically per mole of the first polypeptide). Accordingly, in methods of the invention for the production of a reduced labelled cofactor, the TTN indicates the number of moles of reduced labelled cofactor generated per mole of first polypeptide. As those skilled in the art will appreciate, the TTN thus indicates the number of times that the enzyme (i.e. the first polypeptide) has turned over.

The Turnover Frequency (TOF) is a measure of the number of moles of product generated per second per mole of enzyme (first polypeptide) present. Accordingly, in methods of the invention for the production of a reduced labelled cofactor, the TTN indicates the number of moles of reduced labelled cofactor generated per second per mole of first polypeptide. Accordingly, the TOF is identified with the number of catalytic cycles undertaken by each enzyme molecule per second.

Preferably, in the methods of the invention, the first polypeptide has a TOF of 0.1 to 1000 s$^{-1}$, more preferably 1 to 100 s$^{-1}$ such as from about 10 to about 50 s$^{-1}$.

The composition comprising $^xH^+$ ions and oxidised cofactor typically comprises $^2H_2O$ or $^3H_2O$ as the source of $^xH^+$ ions; typically the composition further comprises substances such as buffers and the like, as described herein, in addition to the oxidised cofactor itself. Typically, therefore, the $^xH^+$ ions are provided as $^2H_2O$ or $^3H_2O$. Those skilled in the art will appreciate that when the composition comprising H$^+$ ions comprises both $^xH_2O$ and $^1H_2O$, the $^xH^+$ ions may be present in the form of $^1H^xHO$. Those skilled in the art will appreciate that $^xH^+$ ions can be present in the form of hydrogen-containing compounds or in the form of solvated ions e.g. $^xH^+_{(aq)}$ e.g. $^xH_3O^+$, $^1H_2{}^xHO^+$ or $^1H^xH_2O^+$. Even at neutral or alkaline pH (p$^x$H) a non-zero concentration of $^xH^+_{(aq)}$ ions are present in aqueous solution. Of course, the composition comprising $^xH^+$ ions and oxidised cofactor may also comprise reduced cofactor, oxidised reactant and/or reduced labelled reaction product according to the methods of the invention.

It will be apparent that as used herein, labelled organic molecules such as glucose, formate, and ethanol are not sources of $^xH^+$ ions.

Most preferably, the $^xH^+$ ions are provided as $^2H_2O$. The compositions of the invention can comprise unlabelled water (H$_2$O) or can be free of H$_2$O. Preferably, when the $^xH^+$ ions used in the methods of the invention are $^2H^+$ ions, the ratio of $^2H^+$ to H$^+$ ions (i.e. H$_2$O) is at least 1:99, such as at least 10:90, more preferably at least 20:80 e.g. at least 50:50 such as at least 80:20, more preferably at least 90:10 e.g. at least 95:5 such as at least 99:1. Preferably, when the $^xH^+$ ions used in the methods of the invention are $^2H^+$ ions, the composition comprising (i) H$^+$ ions is free or essentially free of H$_2$O (e.g. less than 0.1% or less than 0.01% H$_2$O); i.e. when $^2H^+$ ions are used in the methods of the invention, the composition preferably comprises large amounts of $^2H^+$ ions.

In the methods of the invention, the concentration of $^xH^+$ ions in the composition comprising $^xH^+$ ions can be controlled to produce reduced labelled cofactor and/or labelled reaction product in the desired percentage purity. For example, for some applications it is desirable to produce reduced labelled cofactor or reduced labelled reaction product wherein the label is present at ppm levels, i.e. where the amount of reduced labelled cofactor or reduced labelled reaction product is from about 0.00001% to about 0.01%, such as from about 0.0001% to about 0.001%, relative to the amount of the unlabelled cofactor or product. In other applications it is desirable to produce reduced labelled cofactor or reduced labelled reaction product wherein the labelled cofactor or product is present in larger amounts, such as in amounts of from 1% to 100%, such as from 10% to about 99% e.g. from about 40% or about 50% to about 95% or about 90%, relative to the amount of the unlabelled cofactor or product. The extremely high efficiency of the reactions employed in the methods of the invention allow this to be controlled with accuracy by controlling the amount of $^xH^+$ ions in the composition comprising H$^+$ ions. For example, if it is desired to produce reduced cofactor wherein 10% of the reduced cofactor is labelled with $^xH$, this can be achieved by the use of a composition comprising 10% $^xH^+$ ions relative to the total number of H$^+$ ions in the concentration.

For example, when it is desired to produce reduced labelled cofactor or reduced labelled reaction product wherein the label is present at ppm levels as described above, this can be achieved by use of a composition comprising $^xH^+$ ions in an amount of from about 0.00001% to about 0.01%, such as from about 0.0001% to about 0.001%, relative to the total amount of H$^+$ ions in the concentration. Preferably, when 3H$^+$ ions are used in the methods of the invention, the composition comprises ppm levels of 3H$^+$ ions.

In the methods of the invention, any cofactor that can be reduced by an NADH:acceptor oxidoreductase or an NADPH:acceptor oxidoreductase or a functional derivative or fragment thereof as defined herein can be used. Preferably, the cofactor is nicotinamide adenine dinucleotide or nicotinamide adenine dinucleotide phosphate. More preferably, the cofactor is nicotinamide adenine dinucleotide.

Nicotinamide adenine dinucleotide exists in the oxidised form (NAD$^+$) and the reduced form (NADH). Similarly, nicotinamide adenine dinucleotide phosphate exists in the oxidised form (NADP$^+$) and the reduced form (NADPH). The oxidized forms NAD$^+$ and NADP$^+$ act as electron acceptors, by being reduced. NADH and NADPH, in turn, can act as reducing agents, by being oxidized. Those skilled in the art will appreciate that the term NAD(P)H refers to either NADH or NADPH. The term NAD(P)$^+$ refers to either NAD$^+$ or NADP$^+$. The structures of NAD$^+$ and NADP$^+$ are shown below:

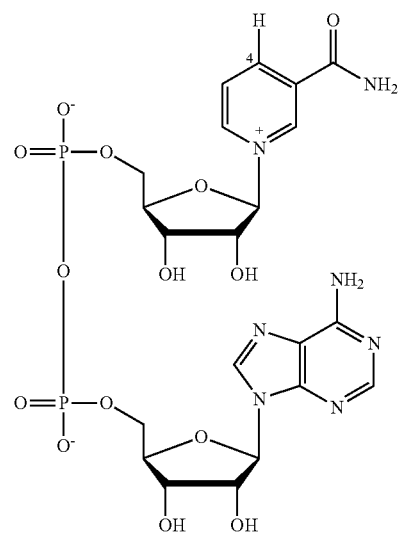

NAD$^+$, showing the 4-position of the nicotinamide ring

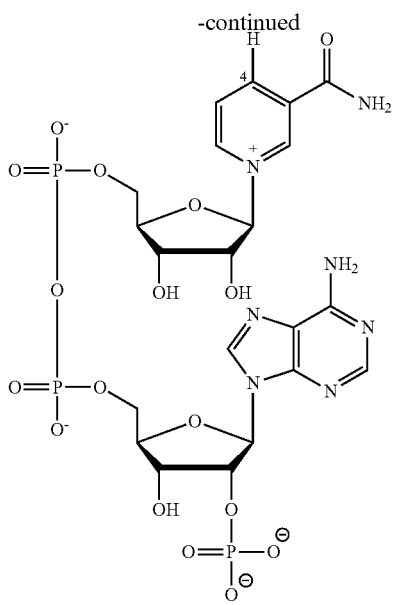

NADP$^+$, showing the 4-position of the nicotinamide ring

As described herein, the methods of the invention comprise reduction of an oxidised cofactor. Preferably, the reduction involves adding an $^xH$ atom at the 4-position of the nicotinamide ring of the oxidised cofactor, as shown below. (The 4-position of the nicotinamide ring in NAD$^+$ and NADP$^+$ is indicated above).

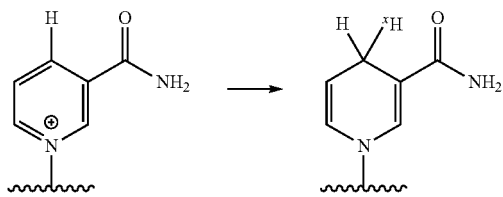

The 4-position of the nicotinamide ring in NAD$^+$ and NADP$^+$ comprises a hydrogen atom. In NAD$^+$ and NADP$^+$, that hydrogen atom is typically $^1H$. However, the methods of the invention are not limited to methods wherein the hydrogen atom at the 4-position of the nicotinamide ring is $^1H$, but also embrace those methods wherein the hydrogen atom at the 4-position of the nicotinamide ring of the oxidised cofactor is $^2H$ or $^3H$. In other words, in the methods of the invention, the oxidised cofactor is NAD$^+$, NADP$^+$, or a labelled version of NAD$^+$ or NADP$^+$ comprising at least one $^xH$ atom, typically wherein the $^xH$ atom is at the 4-position of the nicotinamide ring.

The methods of the invention can be used to generate both stereoisomers of the singularly labelled reduced cofactor, the doubly labelled reduced cofactor and the labelled oxidised cofactor; i.e. [4S-$^xH$]-NAD(P)H, [4R-$^xH$]-NAD(P)H, [4-$^xH_2$]-NAD(P)H and [4-$^xH$]-NAD(P)$^+$. As used herein, the term [4S-$^xH$]-NAD(P)H refers to the reduced form of NAD(P)H wherein the carbon atom at the 4-position of the nicotinamide ring is bonded to a $^1H$ atom and an $^xH$ atom and wherein the absolute stereochemistry at that carbon position is S, as defined by the Cahn-Ingold-Prelog rules. As used herein, the term [4R-$^xH$]-NAD(P)H refers to the reduced form of NAD(P)H wherein the carbon atom at the 4-position of the nicotinamide ring is bonded to a $^1H$ atom and an $^xH$ atom and wherein the absolute stereochemistry at that carbon position is R, as defined by the Cahn-Ingold-Prelog rules. As used herein, the term [4-$^xH_2$]-NAD(P)H refers to the reduced form of NAD(P)H wherein the carbon atom at the 4-position of the nicotinamide ring is bonded to two $^xH$ atoms. As used herein, the term [4-$^xH$]-NAD(P)$^+$ refers to the oxidised form of NAD(P)H wherein the carbon atom at the 4-position of the nicotinamide ring is bonded to one $^xH$ atom. Preferably, in the methods of the invention, the oxidised cofactor is NAD$^+$ or NADP$^+$. Most preferably, the oxidised cofactor is NAD$^+$. Accordingly, the invention also provides methods for producing an oxidised labelled cofactor comprising an $^xH$ atom, wherein x is 2 or 3, comprising producing a reduced labelled cofactor comprising one or more $^xH$ atom according to the methods of the invention; and oxidising the reduced labelled cofactor thus produced.

The methods of the invention involve transferring electrons from an electron source to a first polypeptide which is an NADH:acceptor oxidoreductase or an NADPH:acceptor oxidoreductase or a functional derivative or fragment thereof, and contacting $^xH^+$ ions and oxidised cofactor with the first polypeptide thereby reducing the oxidised cofactor to form a reduced labelled cofactor comprising one or more $^xH$ atoms.

Those skilled in the art will appreciate that contacting $^xH^+$ ions and oxidised cofactor with the first polypeptide involves the direct contact of the $^xH^+$ ions with the first polypeptide and the direct transfer of said $^xH^+$ ions to the first polypeptide. In other words, the $^xH^+$ ions are transferred directly from the composition in which they are contained (e.g. directly from $^xH_2O$, e.g. directly from $^2H_2O$ or $^3H_2O$) to the first polypeptide. The transfer of the $^xH^+$ ions to the first polypeptide is a consequence of the contacting of the $^xH^+$ ions with the first polypeptide. As explained above, labelled organic molecules such as glucose, formate, and ethanol are not sources of $^xH^+$ ions as used herein. As such, those skilled in the art will appreciate that $^xH^+$ ions are not transferred to the first polypeptide by contacting the first polypeptide by such labelled organic molecules.

Furthermore, the invention does not involve the abstraction of $^xH^+$ ions from such labelled organic molecules, irrespective of whether such labelled organic molecules are provided exogenously or generated in situ, e.g. by chemical exchange with $^xH_2O$. Thus, the methods of the invention do not involve the use of labelled organic molecules as co-substrates to mediate the transfer of $^xH^+$ ions from the composition in which they are contained (e.g. directly from $^xH_2O$, e.g. directly from $^2H_2O$ or $^3H_2O$) to the first polypeptide.

Preferably, therefore, in the invention, contacting the $^xH^+$ ions and the oxidised cofactor with the first polypeptide comprises directly transferring an $^xH^+$ ion to the first polypeptide. Preferably, contacting the $^xH^+$ ions and the oxidised cofactor with the first polypeptide comprises directly transferring an $^xH^+$ ion directly from $^xH_2O$, e.g. directly from $^2H_2O$ or $^3H_2O$) to the first polypeptide. Preferably, contacting the $^xH^+$ ions and the oxidised cofactor with the first polypeptide comprises directly transferring an $^xH^+$ ion directly from $^xH_2O$, e.g. directly from $^2H_2O$ or $^3H_2O$) to the first polypeptide without transferring an $^xH^+$ ion to an organic molecule (i.e. to a co-substrate). Preferably, the methods of the invention do not comprise contacting the first polypeptide with a labelled organic reactant containing an $^xH$ atom. Preferably, the methods of the invention do not comprise transferring an $^xH^+$ ion from $^xH_2O$ (e.g. from $^2H_2O$ or $^3H_2O$) to an organic molecule (i.e. to a co-substrate). Preferably, the methods of the invention do not comprise transferring an $^xH^+$ ion from an organic molecule (i.e. a co-substrate) to the first polypeptide. In other words, the methods of the invention preferably do not comprise using a labelled organic molecule as a co-substrate to mediate the transfer of $^xH^+$ ions from the composition in which they are contained (e.g. from $^xH_2O$, e.g. from $^2H_2O$ or $^3H_2O$) to the first polypeptide.

Accordingly, the invention preferably provides a method of producing a reduced labelled cofactor comprising one or more $^xH$ atom, wherein x is 2 or 3, wherein said method comprises:
  i) providing a composition comprising (i) $^xH^+$ ions and (ii) an oxidised cofactor;
  ii) transferring electrons from an electron source to a first polypeptide which is an NADH:acceptor oxidoreductase or an NADPH:acceptor oxidoreductase or a functional derivative or fragment thereof; and
  iii) contacting the $^xH^+$ ions and the oxidised cofactor with the first polypeptide, thereby directly transferring an $^xH^+$ ion to the first polypeptide, and thereby reducing the oxidised cofactor to form a reduced labelled cofactor comprising one or more $^xH$ atoms.

Preferably, said method is a method of producing a reduced labelled reaction product comprising one or more $^xH$ atom, wherein x is 2 or 3, and said method comprises producing a reduced labelled cofactor as defined herein; and
  iv) contacting the reduced labelled cofactor and an oxidised reactant with at least one enzyme that is an NADH-dependent oxidoreductase or an NADPH-dependent oxidoreductase or a functional derivative or fragment thereof such that the enzyme selectively transfers an $^xH$ atom from the reduced labelled cofactor to the oxidised reactant thereby producing a reduced labelled reaction product and an oxidised cofactor.

As described herein in more detail, such methods preferably further comprise reducing the oxidised cofactor produced in step (iv) in a method of the invention. Such methods may likewise comprise producing a reduced labelled reaction product according to steps (i) to (iv), and repeating steps (ii) to (iv) multiple times, thereby recycling the cofactor.

In the methods of the invention, any suitable NADH:acceptor oxidoreductase or NADPH:acceptor oxidoreductase or functional derivative or fragment thereof can be used as the first polypeptide. An NADH:acceptor oxidoreductase or NADPH:acceptor oxidoreductase or functional derivative or fragment thereof can be referred to as a diaphorase or diaphorase moiety.

As used herein, a NADH:acceptor oxidoreductase is a polypeptide capable of catalysing the reduction of NAD$^+$ to NADH. As used herein, a NADPH:acceptor oxidoreductase is a polypeptide capable of catalysing the reduction of NADP$^+$ to NADPH. It will be apparent to the skilled person that an NAD(P)H:acceptor oxidoreductase may either be a single polypeptide or may comprise multiple polypeptides, e.g. additional peptides in addition to the NAD(P)H:acceptor oxidoreductase. The NAD(P)H:acceptor oxidoreductase may also be a portion such as one or more domains of a multidomain polypeptide.

The first polypeptide preferably transfers an $^xH^-$ anion (wherein x=2 or 3) to the oxidised labelled cofactor thereby forming the reduced labelled cofactor. Without being bound by theory, it is believed that the $^xH^-$ ion is transferred to the oxidised cofactor in a concerted "two electron, one $^xH^+$" process, the two electrons and single proton combining to form an $^xH^-$ anion. The two electrons and single proton are believed to be typically transferred by a cofactor such as a flavin cofactor contained in the first polypeptide. However, as those skilled in the art will appreciate the precise mechanism by which the $^xH^-$ ion is transferred to the oxidised cofactor is immaterial to the efficacy of the overall process.

Preferably, the first polypeptide comprises a cofactor such as a flavin group. Preferably, the flavin group is an FAD (flavin adenine dinucleotide) or FMN (flavin mononucleotide) group.

Preferably, the structure of the first polypeptide is suitable for binding nucleotides such as NAD(P)$^+$ or NAD(P)H. A preferred structural motif for binding such nucleotides is the Rossmann fold. The Rossmann fold can be considered as a super-secondary structural motif characterized by alternating beta strand/alpha helix/beta strand secondary structures. Typically, Rossmann folds comprise up to four α helices and a sheet typically comprising 6 β strands. Proteins comprising Rossmann folds are well known to those skilled in the art.

Preferably, the first polypeptide comprises or consists of a diaphorase moiety. Diaphorases are a ubiquitous class of flavin-containing enzymes that typically catalyze the reduction of various dyes which act as hydrogen acceptors from NADH and NADPH. Diaphorases can be obtained from bacteria, plants and animals. Any suitable diaphorase capable of reducing an oxidised cofactor as defined herein in the presence of electrons and $^xH^+$ ions can be used in the methods of the invention.

Preferably, the first polypeptide comprises or consists of one or more than one of:
  i) the amino acid sequence of *Ralstonia eutropha* diaphorase HoxF (SEQ ID NO: 1) or an amino acid sequence having at least 60% homology therewith;
  ii) the amino acid sequence of *Ralstonia eutropha* diaphorase HoxU (SEQ ID NO: 2) or an amino acid sequence having at least 60% homology therewith;
  iii) the amino acid sequence of *Ralstonia eutropha* diaphorase HoxI (SEQ ID NO: 3) or an amino acid sequence having at least 60% homology therewith;
  iv) the amino acid sequence of the 51 kDa protein of the flavoprotein (Fp) subcomplex of Complex I of *Bos taurus* (SEQ ID NO: 4) or an amino acid sequence having at least 60% homology therewith;
  v) the amino acid sequence of the 24 kDa subcomplex of Complex I of *Bos taurus* (SEQ ID NO: 5) or an amino acid sequence having at least 60% homology therewith;
  vi) the amino acid sequence of *Ralstonia eutropha* NAD$^+$-dependent formate dehydrogenase diaphorase moiety FdsB (SEQ ID NO: 6) or an amino acid sequence having at least 60% homology therewith;
  vii) the amino acid sequence of *Ralstonia eutropha* NAD$^+$-dependent formate dehydrogenase diaphorase moiety FdsG (SEQ ID NO: 7) or an amino acid sequence having at least 60% homology therewith;
  viii) the amino acid sequence of *Rhodobacter capsulatus* NAD$^+$-dependent formate dehydrogenase, diaphorase moiety FdsB (SEQ ID NO: 8) or an amino acid sequence having at least 60% homology therewith;
  ix) the amino acid sequence of *Rhodobacter capsulatus* NAD$^+$-dependent formate dehydrogenase, diaphorase moiety FdsG (SEQ ID NO: 9) or an amino acid sequence having at least 60% homology therewith;
  x) the amino acid sequence of the NADPH oxidoreductase moiety from *Pyrococcus furiosus* soluble hydrogenase I gamma subunit (SEQ ID NO: 10) or an amino acid sequence having at least 60% homology therewith;

xi) the amino acid sequence of the NADPH oxidoreductase moiety from *Pyrococcus furiosus* soluble hydrogenase I beta subunit (SEQ ID NO: 11) or an amino acid sequence having at least 60% homology therewith;

xii) the amino acid sequence of the NADPH oxidoreductase moiety from *Pyrococcus furiosus* soluble hydrogenase II gamma subunit (SEQ ID NO: 12) or an amino acid sequence having at least 60% homology therewith;

xiii) the amino acid sequence of the amino acid sequence of the NADPH oxidoreductase moiety from *Pyrococcus furiosus* soluble hydrogenase II beta subunit (SEQ ID NO: 13) or an amino acid sequence having at least 60% homology therewith;

xiv) the amino acid sequence of the diaphorase moiety of *Rhodococcus opacus* soluble hydrogenase HoxF (SEQ ID NO: 14) or an amino acid sequence having at least 60% homology therewith;

xv) the amino acid sequence of the diaphorase moiety of *Rhodococcus opacus* soluble hydrogenase HoxU (SEQ ID NO: 15) or an amino acid sequence having at least 60% homology therewith;

xvi) the amino acid sequence of the diaphorase moiety of *Allochromatium vinosum* soluble hydrogenase HoxF (SEQ ID NO: 16) or an amino acid sequence having at least 60% homology therewith;

xvii) the amino acid sequence of the diaphorase moiety of *Allochromatium vinosum* soluble hydrogenase HoxU (SEQ ID NO: 17) or an amino acid sequence having at least 60% homology therewith;

xviii) the amino acid sequence of the diaphorase moiety of *Thiocapsa roseopersicina* Hox1F (SEQ ID NO: 18) or an amino acid sequence having at least 60% homology therewith;

xix) the amino acid sequence of the diaphorase moiety of *Thiocapsa roseopersicina* soluble hydrogenase Hox1U (SEQ ID NO: 19) or an amino acid sequence having at least 60% homology therewith;

xx) the amino acid sequence of the diaphorase moiety of *Thiocapsa roseopersicina* Hox2F (SEQ ID NO: 20) or an amino acid sequence having at least 60% homology therewith;

xxi) the amino acid sequence of the diaphorase moiety of *Thiocapsa roseopersicina* soluble hydrogenase Hox2U (SEQ ID NO: 21) or an amino acid sequence having at least 60% homology therewith;

xxii) the amino acid sequence of the diaphorase moiety of *Synechocystis* sp. PCC 6803 HoxF (SEQ ID NO: 22) or an amino acid sequence having at least 60% homology therewith;

xxiii) the amino acid sequence of the diaphorase moiety of *Synechocystis* sp. PCC 6803 HoxU (SEQ ID NO: 23) or an amino acid sequence having at least 60% homology therewith;

xxiv) the amino acid sequence of the diaphorase moiety of *Synechococcus elongatus* PCC 6301 HoxF (SEQ ID NO: 24) or an amino acid sequence having at least 60% homology therewith;

xxv) the amino acid sequence of the diaphorase moiety of *Synechococcus elongatus* PCC 6301 HoxU (SEQ ID NO: 25) or an amino acid sequence having at least 60% homology therewith;

xxvi) the amino acid sequence of *Hydrogenophilus thermoluteolus* diaphorase HoxF (SEQ ID NO: 26) or an amino acid sequence having at least 60% homology therewith;

xxvii) the amino acid sequence of *Hydrogenophilus thermoluteolus* diaphorase HoxU (SEQ ID NO: 27) or an amino acid sequence having at least 60% homology therewith;

xxviii) the amino acid sequence of *Chlamydomonas reinhardtii* Ferredoxin-NADP$^+$ reductase (SEQ ID NO: 28) or an amino acid sequence having at least 60% homology therewith;

xxix) the amino acid sequence of *Anabaena* Ferredoxin-NADP$^+$ reductase (SEQ ID NO: 29) or an amino acid sequence having at least 60% homology therewith;

xxx) the amino acid sequence of *Ralstonia eutropha* diaphorase HoxF (SEQ ID NO: 70) or an amino acid sequence having at least 60% homology therewith;

xxxi) the amino acid sequence of *Ralstonia eutropha* diaphorase with inactive hydrogenase (SEQ ID NO: 1 and/or 2 and/or 69 and/or 31) or an amino acid sequence having at least 60% homology therewith or a functional fragment, derivative or variant thereof.

One or more of the amino acid sequences described in (i) to (xxxi) above can be used as the first polypeptide.

When the first polypeptide comprises a variant of SEQ ID NO: 1, the variant may comprise point mutations such that the variant comprises one or more of the following mutations:

i) K, S, A, N, R or H at position 326; more preferably, the variant comprises D326K;

ii) K, S, A, N, R or H at position 401; more preferably, the variant comprises D401K;

iii) K, S, A, N, R or H at position 467; more preferably, the variant comprises D467S;

iv) K, S, A, N, R or H at position 340; more preferably, the variant comprises D340A; and/or v) K, S, A, N, R or H at position 341; more preferably, the variant comprises E341A or H341.

The above mutations are complementary and can be combined, for example, when the first polypeptide is a variant of SEQ ID NO: 1, the variant may preferably comprises D340A and E341A; D340A and D401K; D326K and D401K; D467S and D401K; D340N and D467S; and/or E341A and D467S. Without being bound by theory, it is believed that such variants can accommodate the additional negatively charged phosphate group of NADP$^+$ resulting in improved affinity and/or oxidation and/or reduction activity due to reduced negative charge around the NADP$^+$ binding site.

The first polypeptide preferably comprises or consists of the amino acid sequence of *Ralstonia eutropha* soluble hydrogenase moiety HoxF (SEQ ID NO: 1) or an amino acid sequence having at least 60% homology therewith. The first polypeptide can optionally further comprise the amino acid sequence of *Ralstonia eutropha* soluble hydrogenase moiety HoxU (SEQ ID NO: 2) or an amino acid sequence having at least 60% homology therewith. Accordingly, the first polypeptide may comprise or consist of the amino acid sequence of *Ralstonia eutropha* soluble hydrogenase moieties HoxFU (SEQ ID NOs: 1, 2) or amino acid sequences having at least 60% homology therewith.

When the first polypeptide comprises the amino acid sequence of *Ralstonia eutropha* soluble hydrogenase moiety HoxF (SEQ ID NO: 1) or an amino acid sequence having at least 60% homology therewith, and optionally the amino acid sequence of *Ralstonia eutropha* soluble hydrogenase moiety HoxU (SEQ ID NO: 2) or an amino acid sequence having at least 60% homology therewith, the first polypeptide may optionally further comprise the amino acid sequence of *Ralstonia eutropha* soluble hydrogenase moieties HoxH and/or HoxY (SEQ ID NOs: 30, 31) or amino acid sequences having at least 60% homology therewith. Without being bound by theory, it is believed that the presence of a HoxHY component in the first polypeptide increases the stability of the NADH:acceptor oxidoreductase or NADPH:acceptor oxidoreductase moiety leading to increased efficiency and/or activity. Many suitable methods for increasing the stability of proteins/protein complexes are known in the art and may be used in the methods of the present invention.

Preferably, therefore, the first polypeptide comprises a HoxHYFU tetramer. More preferably, the first polypeptide comprises the HoxHYFU tetramer of *Ralstonia eutropha* (SEQ ID NOs: 1, 2, 30, 31), or an amino acid sequence having at least 60% homology therewith. Still more preferably, the first polypeptide comprises the HoxHYFU tetramer of *Ralstonia eutropha* wherein the HoxH moiety is a non-functional variant, preferably comprising the point mutation I64A (SEQ ID NO: 69), or a sequence having at least 60% homology therewith (in which case the HoxH moiety comprises the point mutation I64A). HoxHYFU constructs comprising the I64A point mutation in the HoxH moiety are also known as HoxFU or NAD-R (SEQ ID NOs: 1, 2, 31, 69).

Preferably, when the first polypeptide comprises or consists of one or more amino acid sequences having at least 60% homology with a specified sequence, each amino acid sequence independently has at least 70%, such as at least 80%, more preferably at least 90%, e.g. at least 95%, preferably at least 97%, such as at least 98%, preferably at least 99% homology with the specified sequence. More preferably, each amino acid sequence independently has at least 70%, such as at least 80%, more preferably at least 90%, e.g. at least 95%, preferably at least 97%, such as at least 98%, preferably at least 99% identity with the specified sequence. For avoidance of doubt, if the first polypeptide comprises two or more amino acid sequences, the percentage homology of each of the two or more sequences with respect to their respective specified sequences can be the same or different. Percentage homology and/or percentage identity are each preferably determined across the length of the specified sequence.

Variants of NADH:acceptor oxidoreductase or NADPH:acceptor oxidoreductases are also suitable for use as the first polypeptide in the methods of the present invention. For example, the first polypeptide may preferably be modified to have an increased catalytic activity for reducing the oxidised cofactor or oxidising the reduced cofactor as compared to the native enzymes. Preferably, variants have increased catalytic activity as compared to the activity of the *Ralstonia eutropha* diaphorase HoxF or HoxFU moieties (SEQ ID NOs 1, 2). Preferably, the catalytic activity is at least 2 times, such as at least 5 times, e.g. at least 10 times, such as at least 100 times, preferably at least 1000 times the catalytic activity of the *Ralstonia eutropha* diaphorase HoxF or HoxFU moieties.

Catalytic activity can be determined in any suitable method. For example, the catalytic activity can be associated with the Michaelis constant $K_M$ (with increased activity being typically associated with decreased $K_M$ values) or with the catalytic rate constant, $k_{cat}$ (with increased activity being typically associated with increased $k_{cat}$ values). Measuring $K_M$ and $k_{cat}$ is routine to those skilled in the art. For example, the $K_M$ of the first polypeptide for a reduced cofactor can be determined spectrophotometrically by measuring absorption at 578 nm under anaerobic conditions at 30° C. in 50 mM Tris-HCl buffer, pH 8.0, containing 1 mM reduced cofactor, 5 mM benzyl viologen (oxidized; $\varepsilon=8.9$ mM$^{-1}$ cm$^{-1}$), 90 µM dithionite, and 10 to 30 pmol of enzyme. Alternatively, the $K_M$ of the first polypeptide for oxidised cofactor can be determined electrochemically, by adsorbing the first polypeptide onto a pyrolytic graphite electrode immersed in an electrochemical cell containing buffered electrolyte (eg 50 mM phosphate at pH 7.0) and holding the electrode at a constant potential of −412 mV vs a standard hydrogen electrode while the concentration of the oxidised cofactor is increased by injection into the solution. The intercept on the (substrate concentration) axis of a plot of (substrate concentration)/(current magnitude) vs (substrate concentration) is equal to ($-K_M$) (Lauterbach et al, PLoS ONE; doi:10.1371/journal.pone.0025939). The intercept on the (substrate concentration)/(current magnitude) axis of such a plot is equal to $K_M/V_{max}$ with $V_{max}=k_{cat}[E]$ where [E] is the amount of enzyme present, which can typically be determined by integrating the background-subtracted redox peak observed for the enzyme in the absence of substrate.

More preferably, the first polypeptide consists or comprises of the *Ralstonia eutropha* NAD$^+$-reducing soluble hydrogenase or a functional fragment, derivative or variant thereof. Still more preferably, the first polypeptide consists or comprises of the *R. eutropha* HoxF moiety (SEQ ID NO: 1) and optionally the HoxU diaphorase moieties (SEQ ID NO: 2) or an amino acid sequence having at least 60% homology (e.g. at least 70%, such as at least 80%, more preferably at least 90%, e.g. at least 95%, preferably at least 97%, such as at least 98%, preferably at least 99% homology) therewith. More preferably the first polypeptide consists or comprises of the HoxHYFU tetramer of *Ralstonia eutropha* (SEQ ID NOs: 1, 2, 30, 31), or an amino acid sequence having at least 60% homology (e.g. at least 70%, such as at least 80%, more preferably at least 90%, e.g. at least 95%, preferably at least 97%, such as at least 98%, preferably at least 99% homology) therewith. Most preferably, the first polypeptide comprises HoxFU (also referred to herein as NAD-R, i.e. the HoxHYFU tetramer of *Ralstonia eutropha* wherein the HoxH moiety comprises the point mutation I64A (SEQ ID NOs: 1, 2, 31, 69)), or a sequence having at least 60% homology (e.g. at least 70%, such as at least 80%, more preferably at least 90%, e.g. at least 95%, preferably at least 97%, such as at least 98%, preferably at least 99% homology) therewith (wherein the HoxH moiety comprises the point mutation I64A).

Figure 3:
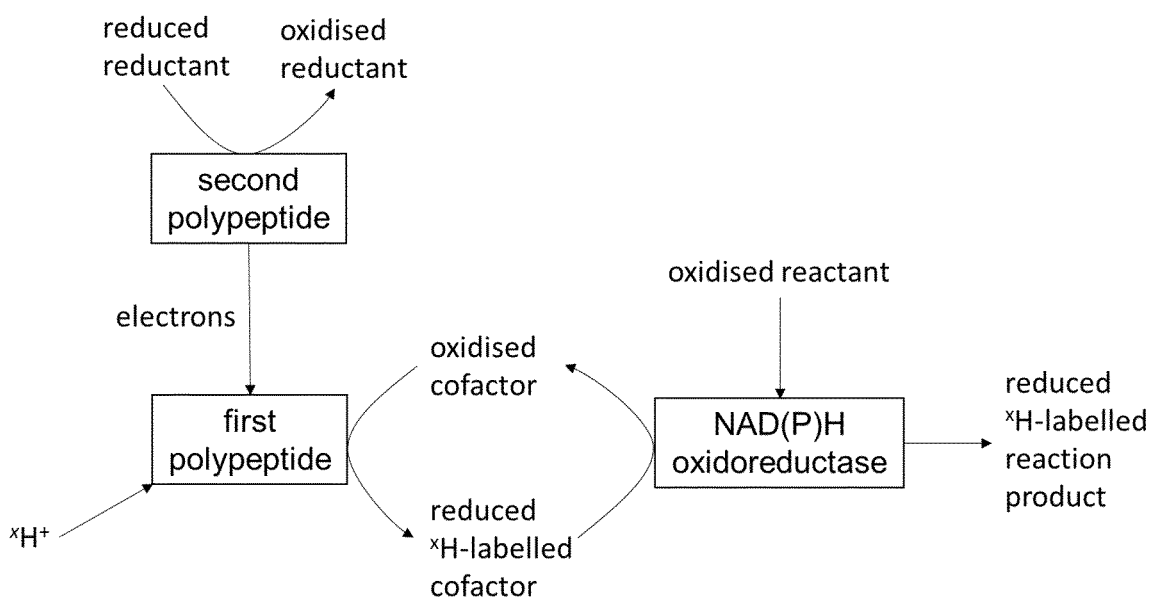
FIG. 3 shows a schematic diagram of the extraction of electrons from a reductant via a second polypeptide and the use of such electrons in the production of reduced labelled reaction product in accordance with the methods of the invention.

In the methods of the invention, the electron source preferably comprises a second polypeptide capable of oxidising a reductant to extract electrons (as illustrated in FIG. 3); a synthetic organic, inorganic or metallic oxidation catalyst capable of oxidising a reductant to extract electrons; or an electrode connected to an electrode controller.

Preferably, the reductant is an organic compound such as formate, glucose, an alcohol, or the like, or is hydrogen (i.e. $H_2$ or $^xH_2$ or mixtures thereof). Where the reductant is other than hydrogen, preferably the reductant is unlabelled. In one embodiment, the reductant is unlabelled. More preferably, the reductant is selected from formate, glucose, ethanol, $H_2$, $^xH_2$ or mixtures thereof. Still more preferably, the reductant is $H_2$ or $^xH_2$ or mixtures thereof. Those skilled in the art can readily determine the most suitable reductant for a given application. For example, when high purity of the labelled cofactor or reduced reaction product is prioritised, the reductant is often preferably $^xH_2$. When reduced costs or high throughput is prioritised, the reductant is often preferably $H_2$. Most usually it is preferred that the reductant is $H_2$.

When the reductant is $H_2$ or $^xH_2$, the second polypeptide and/or the synthetic organic, inorganic or metallic oxidation catalyst is preferably selected or modified to catalyze $H_2$ or $^xH_2$ oxidation close to the thermodynamic potential $E°$ of the $2H^+/H_2$ couple ("$E°(2H^+/H_2)$") under the experimental conditions. (Those skilled in the art will appreciate that $E°$ $(2H^+/H_2)=-0.413$ V at 25° C., pH 7.0 and 1 bar $H_2$, and varies according to the Nernst equation). Preferably, the second polypeptide and/or the synthetic organic, inorganic or metallic oxidation catalyst is preferably selected or modified to catalyze $H_2$ or $^xH_2$ oxidation at applied potentials of less than 100 mV more positive than $E°$ $(2H^+/H_2)$; more preferably at applied potentials of less than 50 mV more positive than $E°$ $(2H^+/H_2)$. Methods of determining the ability of a catalyst such as a second polypeptide or a synthetic organic, inorganic or metallic oxidation catalyst as defined herein to catalyze $H_2$ or $^xH_2$ oxidation close to $E°$ $(2H^+/H_2)$ under the experimental conditions at issue are routine for those skilled in the art and are, for example, described in Vincent et al, *J. Am. Chem. Soc.* (2005) 127, 18179-18189.

When the electron source comprises a second polypeptide, the second polypeptide is preferably an oxidising enzyme or functional derivative or fragment thereof capable of oxidising a reductant to extract electrons, wherein the second polypeptide transfers electrons from the reductant to the first polypeptide via an electronically-conducting pathway. Those skilled in the art will appreciate that as used herein, an oxidising enzyme is an enzyme capable of oxidising a reductant to extract electrons and deliver those electrons to a suitable electronically-conducting pathway for transfer to the first polypeptide. As used herein, the term "oxidising enzyme" thus also includes enzymes such as oxidases and dehydrogenases.

Figure 4:
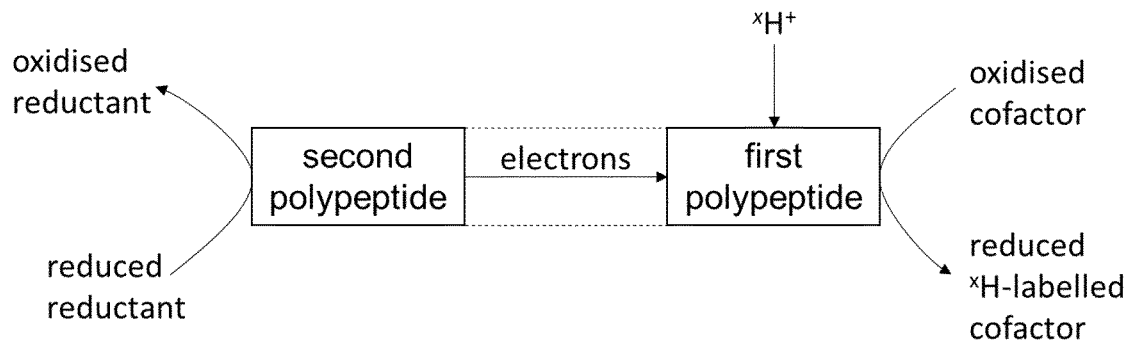
FIG. 4 shows a schematic diagram of the production of reduced labelled cofactor by oxidation of a reductant by a modular, multidomain or multicomponent protein or protein complex comprising both a first polypeptide and a second polypeptide, in accordance with the methods of the invention.

When the electron source comprises a second polypeptide, the first polypeptide and the second polypeptide may constitute component parts of a modular, multidomain or multicomponent protein or protein complex. This is shown schematically in FIG. 4.

When the first polypeptide and the second polypeptide constitute component parts of a modular, multidomain or multicomponent protein or protein complex, the first and second polypeptide are preferably either native partners or genetically fused redox partners. More preferably, the first and second polypeptide are native partners. As those skilled in the art will appreciate, native partners are associated together in vivo and are typically attached via non-covalent means such as by non-specific interactions, hydrophobic interactions, hydrophilic interactions (including hydrogen bonds), ionic interactions, and Van der Waals forces. In some embodiments, however, when the electron source comprises a second polypeptide, the first polypeptide and the second polypeptide are not native partners; i.e. they do not occur together in nature as an enzyme complex and in the cellular environment electrons are not transferred from the second polypeptide to the first polypeptide. In such embodiments, it is preferable that the first polypeptide and the second polypeptide are selected from or derived from different bacterial species or from different bacterial genera, or the first polypeptide and the second polypeptide are selected from or derived from the same bacterial genus or species, but from different enzymes within the said same bacterial genus or species.

When the first polypeptide and the second polypeptide constitute component parts of a modular, multidomain or multicomponent protein or protein complex, the electron-conducting pathway from the first polypeptide to the second polypeptide can comprise any suitable means. Preferably, the electron transfer pathway comprises metal centres such as metal atoms (e.g. in heme centres) or metal clusters, preferably iron-sulphur-containing clusters [FeS]-clusters. As those skilled in the art will appreciate, [FeS]-clusters include [3Fe4S] and [4Fe4S] clusters.

Preferably, when the electron source comprises a second polypeptide, the second polypeptide is selected or modified to oxidise $H_2$ or $^xH_2$ (wherein x=2 or 3) under the conditions of the method. More preferably the second polypeptide is a hydrogenase enzyme or a functional derivative or fragment thereof. Any suitable hydrogenase can be used. Preferably, the hydrogenase comprises an active site comprising iron atoms (as in the [FeFe]-hydrogenases) or both nickel and iron atoms (as in the [NiFe]- and [NiFeSe]-hydrogenases).

Preferably, when the electron source comprises a second polypeptide which is a hydrogenase, the hydrogenase is selected or modified to be oxygen tolerant. Oxygen tolerant hydrogenases are capable of oxidising $H_2$ or $^xH_2$ in the presence of oxygen, such as in the presence of at least 0.01% $O_2$, preferably at least 0.1% $O_2$, more preferably at least 1% $O_2$, such as at least 5% $O_2$, e.g. at least 10% $O_2$ such as at least 20% $O_2$ or more whilst retaining at least 1%, preferably at least 5%, such as at least 10%, preferably at least 20%, more preferably at least 50% such as at least 80% e.g. at least 90% preferably at least 95% e.g. at least 99% of their $H_2$- or $^xH_2$-oxidation activity under anaerobic conditions. Various oxygen-tolerant hydrogenases are known to those skilled in the art.

Preferably, when the electron source comprises a second polypeptide which is a hydrogenase, the hydrogenase comprises or consists of:
i) the amino acid sequence of *Ralstonia eutropha* soluble hydrogenase moiety (SEQ ID NOs: 30 and/or 31) or an amino acid sequence having at least 60% homology therewith;
ii) the amino acid sequence of *Ralstonia eutropha* membrane-bound hydrogenase moiety (SEQ ID NOs: 32 and/or 33 and/or 34) or an amino acid sequence having at least 60% homology therewith;
iii) the amino acid sequence of *Ralstonia eutropha* regulatory hydrogenase moiety (SEQ ID NOs: 35 and/or 36) or an amino acid sequence having at least 60% homology therewith;
iv) the amino acid sequence of *Escherichia coli* hydrogenase 1 (SEQ ID NOs:37 and/or 38) or an amino acid sequence having at least 60% homology therewith;
v) the amino acid sequence of *Escherichia coli* hydrogenase 2 (SEQ ID NOs:39 and/or 40) or an amino acid sequence having at least 60% homology therewith;
vi) the amino acid sequence of *Aquifex aeolicus* hydrogenase 1 (SEQ ID NO:41 and/or 42) or an amino acid sequence having at least 60% homology therewith;
vii) the amino acid sequence of *Hydrogenovibrio marinus* hydrogenase (SEQ ID NOs: 43 and/or 44) or an amino acid sequence having at least 60% homology therewith;
viii) the amino acid sequence of *Thiocapsa roseopersicina* hydrogenase (SEQ ID NOs: 45 and 46) or an amino acid sequence having at least 60% homology therewith;
ix) the amino acid sequence of *Alteromonas macleodii* hydrogenase (SEQ ID NOs: 47 and/or 48) or an amino acid sequence having at least 60% homology therewith;
x) the amino acid sequence of *Rhodococcus opacus* soluble hydrogenase moiety (SEQ ID NOs: 49 and/or 50) or an amino acid sequence having at least 60% homology therewith;

xi) the amino acid sequence of *Allochromatium vinosum* membrane bound hydrogenase (SEQ ID NOs: 51 and/or 52) or an amino acid sequence having at least 60% homology therewith;

xii) the amino acid sequence of *Desulfovibrio fructosovorans* membrane bound hydrogenase (SEQ ID NOs: 53 and/or 54) or an amino acid sequence having at least 60% homology therewith;

xiii) the amino acid sequence of *Clostridium pasteurianum* iron-iron hydrogenase (SEQ ID NOs: 55) or an amino acid sequence having at least 60% homology therewith;

xiv) the amino acid sequence of *Clostridium acetobutylicum* iron-iron hydrogenase (SEQ ID NOs: 56) or an amino acid sequence having at least 60% homology therewith;

xv) the amino acid sequence of *Chlamydomonas reinhardtii* iron-iron hydrogenase (SEQ ID NOs: 57) or an amino acid sequence having at least 60% homology therewith;

xvi) the amino acid sequence of *Desulfomicrobium baculatum* nickel-iron selenium hydrogenase (SEQ ID NOs: 58 and/or 59) or an amino acid sequence having at least 60% homology therewith;

xvii) the amino acid sequence of *Hydrogenophilus thermoluteolus* soluble hydrogenase moiety (SEQ ID NOs: 60 and/or 61) or an amino acid sequence having at least 60% homology therewith;

xviii) the amino acid sequence of *Desulfovibrio vulgaris* Nickel Iron hydrogenase (pdb 1H2A) (SEQ ID NOs: 62 and/or 63) or an amino acid sequence having at least 60% homology therewith;

xix) the amino acid sequence of *Desulfovibrio gigas* Periplasmic [NiFe] hydrogenase (SEQ ID NOs: 64 and/or 65) or an amino acid sequence having at least 60% homology therewith;

xx) the amino acid sequence of *Salmonella enterica* serovar *Typhimurium* LT2 nickel-iron hydrogenase 5 (SEQ ID NO: 66 and/or 67) or an amino acid sequence having at least 60% homology therewith.

xxi) the amino acid sequence of *Pyrococcus furiosus* soluble alpha subunit (SEQ ID NOs: 68) or an amino acid sequence having at least 60% homology therewith; or a functional fragment, derivative or variant thereof.

When the electron source comprises a second polypeptide which is a hydrogenase, the hydrogenase may optionally not comprise a FMN and/or a FAD prosthetic group. Without being bound by theory, it is believed that hydrogenases lacking such groups typically have increased stability compared to hydrogenases comprising such prosthetic groups. Examples of hydrogenases lacking a FMN prosthetic group include *Ralstonia eutropha* membrane-bound hydrogenase (SEQ ID NOs: 32-34), *Ralstonia eutropha* regulatory hydrogenase (SEQ ID NOs:35-36), *Escherichia coli* hydrogenase 1 (SEQ ID NOs:37-38), *Escherichia coli* hydrogenase 2 (SEQ ID NOs:39-40), *Aquifex aeolicus* hydrogenase 1 (SEQ ID NOs:41-42), *Hydrogenovibrio marinus* membrane-bound hydrogenase (SEQ ID NOs: 43-44), *Desulfovibrio vulgaris* Nickel Iron hydrogenase (SEQ ID NOs: 62-63) and *Desulfovibrio gigas* Periplasmic [NiFe] hydrogenase (SEQ ID NOs: 64-65). Such hydrogenases are particularly suitable when the first polypeptide and the second polypeptide constitute component parts of a modular, multidomain or multicomponent protein or protein complex.

Preferably, when the electron source comprises a second polypeptide which is a hydrogenase, the hydrogenase is selected from *Escherichia coli* hydrogenase 1 (SEQ ID NOs:37, 38), *Escherichia coli* hydrogenase 2 (SEQ ID NOs:39, 40), *Ralstonia eutropha* soluble hydrogenase (HoxHY, SEQ ID NOs: 30, 31), *Hydrogenophilus thermoluteolus* hydrogenase (SEQ ID NOs: 60, 61), *Desulfovibrio gigas* hydrogenase (SEQ ID NO: 64, 65), *Desulfovibrio fructosovorans* hydrogenase (SEQ ID NO: 53, 54) and *Desulfovibrio vulgaris* (SEQ ID NO: 62, 63), or an amino acid sequence having at least 60% homology therewith. Most preferably, the second polypeptide is *Escherichia coli* hydrogenase 1 (SEQ ID NOs: 37, 38), *Escherichia coli* hydrogenase 2 (SEQ ID NOs: 39, 40) or *Ralstonia eutropha* soluble hydrogenase (HoxHY, SEQ ID NOs: 30, 31).

In other circumstances where it is preferable that the reductant is not $H_2$ or $^xH_2$, the second polypeptide may be preferably selected or modified to oxidise formate, glucose or an alcohol under the conditions of the method. When the reductant is glucose, the second polypeptide is preferably a glucose oxidase enzyme such as glucose dehydrogenase from *Acinetobacter calcoaceticus* (SEQ ID NO: 76), or *Myriococcum thermophilum* cellobiose dehydrogenase (SEQ ID NO: 75), or cellobiose dehydrogenase from *Phanerochaete chrysosporium* (SEQ ID NO: 73 and/or 74)) or an amino acid sequence having at least 60% homology therewith. When the reductant is an alcohol such as ethanol, the second polypeptide is preferably an alcohol dehydrogenase enzyme such as the PQQ- and heme-dependent ethanol dehydrogenase from *Comamonas testosteroni* (SEQ ID NO: 72). When the reductant is formate, the second polypeptide is preferably a formate dehydrogenase enzyme, more preferably the molybdenum-containing formate dehydrogenase H from *Escherichia coli* (EcFDH-H) (SEQ ID NO: 71), or an amino acid sequence having at least 60% homology therewith; or the tungsten-containing formate dehydrogenase 1 from *Desulfovibrio gigas* (SEQ ID NO: 77 and/or 78) or an amino acid sequence having at least 60% homology therewith. Most preferably, when the reductant is formate, the second polypeptide is the molybdenum-containing formate dehydrogenase H from *Escherichia coli* (EcFDH-H) (SEQ ID NO: 71).

Preferably, when the second polypeptide comprises or consists of one or more amino acid sequences having at least 60% homology with a specified sequence, each amino acid sequence independently has at least 70%, such as at least 80%, more preferably at least 90%, e.g. at least 95%, preferably at least 97%, such as at least 98%, preferably at least 99% homology with the specified sequence. More preferably, each amino acid sequence independently has at least 70%, such as at least 80%, more preferably at least 90%, e.g. at least 95%, preferably at least 97%, such as at least 98%, preferably at least 99% identity with the specified sequence. For avoidance of doubt, if the second polypeptide comprises two or more amino acid sequences, the percentage homology of each of the two or more sequences with respect to their respective specified sequences can be the same or different. Percentage homology and/or percentage identity are each preferably determined across the length of the specified reference sequence.

As described herein the first polypeptide and/or the second polypeptide (if present) may be a functional fragment, derivative or variant of an enzyme or amino acid sequence. As those skilled in the art will appreciate, fragments of amino acid sequences include deletion variants of such sequences wherein one or more, such as at least 1, 2, 5, 10, 20, 50 or 100 amino acids are deleted. Deletion may occur at the C-terminus or N-terminus of the native sequence or within the native sequence. Typically, deletion of one or more amino acids does not influence the residues immediately surrounding the active site of an enzyme. Derivatives of amino acid sequences include post-translationally modified sequences including sequences which are modified in vivo or ex vivo. Many different protein modifications are known to those skilled in the art and include modifications to introduce new functionalities to amino acid residues, modifications to protect reactive amino acid residues or modifications to couple amino acid residues to chemical moieties such as reactive functional groups on linkers or substrates (surfaces) for attachment to such amino acid residues.

Derivatives of amino acid sequences include addition variants of such sequences wherein one or more, such as at least 1, 2, 5, 10, 20, 50 or 100 amino acids are added or introduced into the native sequence. Addition may occur at the C-terminus or N-terminus of the native sequence or within the native sequence. Typically, addition of one or more amino acids does not influence the residues immediately surrounding the active site of an enzyme.

Variants of amino acid sequences include sequences wherein one or more amino acid such as at least 1, 2, 5, 10, 20, 50 or 100 amino acid residues in the native sequence are exchanged for one or more non-native residues. Such variants can thus comprise point mutations or can be more profound e.g. native chemical ligation can be used to splice non-native amino acid sequences into partial native sequences to produce variants of native enzymes. Variants of amino acid sequences include sequences carrying naturally occurring amino acids and/or unnatural amino acids. Variants, derivatives and functional fragments of the aforementioned amino acid sequences retain at least some of the activity/functionality of the native/wild-type sequence. Preferably, variants, derivatives and functional fragments of the aforementioned sequences have increased/improved activity/functionality when compared to the native/wild-type sequence.

When the electron source comprises a synthetic (i.e. non-biological) organic, inorganic or metallic oxidation catalyst, the catalyst is any synthetic organic, inorganic or metallic oxidation catalyst capable of oxidising a reductant to extract electrons. As used herein, a synthetic oxidation catalyst includes substances such as metals which occur naturally but which are non-biological. As used herein, enzymes are not synthetic catalysts. As explained below, exemplary synthetic catalysts include metals and metal-containing compounds such as metal oxides, metal hydroxides, and the like.

The synthetic (non-biological) catalyst oxidises the reductant to form an oxidised product. The electrons extracted from the reductant are transferred via an electron conducting pathway to the first polypeptide. The electrons are used by the first polypeptide to reduce the oxidised cofactor as described herein.

Preferably, when the electron source comprises a synthetic oxidation catalyst, the synthetic oxidation catalyst is selected or modified to oxidise $H_2$ or $^xH_2$ under the conditions of the method. Any suitable synthetic oxidation catalyst may be used. Many suitable $H_2/^xH_2$ oxidation catalysts are known to those skilled in the art and can be readily applied in the methods of the invention.

Preferably, when the electron source comprises a synthetic oxidation catalyst, the synthetic oxidation catalyst is capable of oxidising $H_2$ or $^xH_2$ in the presence of oxygen, such as in the presence of at least 0.01% $O_2$, preferably at least 0.1% $O_2$, more preferably at least 1% $O_2$, such as at least 5% $O_2$, e.g. at least 10% $O_2$ such as at least 20% $O_2$ or more whilst retaining at least 1%, preferably at least 5%, such as at least 10%, preferably at least 20%, more preferably at least 50% such as at least 80% e.g. at least 90% preferably at least 95% e.g. at least 99% of its $H_2$- or $^xH_2$-oxidation activity under anaerobic conditions.

Preferably, the oxidation catalyst is a metal or metal-containing catalyst. Preferably, the oxidation catalyst comprises platinum, palladium, iridium, nickel, rhodium and/or ruthenium. More preferably, the oxidation catalyst comprises platinum. Many suitable metallic oxidation catalysts are known to those skilled in the art and can be readily applied in the methods of the invention. When the electron source comprises a non-metallic synthetic catalyst, any suitable non-metallic synthetic oxidation catalyst may be used. Preferable non-metallic synthetic oxidation catalysts include frustrated Lewis pair catalysts. Many such catalysts are known to those skilled in the art and can be readily applied in the methods of the invention.

In the methods of the invention, the electron source and the first polypeptide are preferably each in electronic contact with an electronically conducting support. More preferably, the electron source and the first polypeptide are each in electronic contact with the same electronically conducting support such that electrons flow from the electron source via the electronically conducting support to the first polypeptide.

Alternatively, the electron source may be in electronic contact with an electronically conducting first support and the first polypeptide in electronic contact with an electronically conducting second support; and the first support in electronic contact with the second support, such that electrons flow from the electron source to the electronically conducting first support, from the electronically conducting first support to the electronically conducting second support via the electronic contact between the first and second supports, and from the electronically conducting second support to the first polypeptide.

When the electron source and/or the first polypeptide are in electronic contact with a support, any suitable means of contact can be used. Preferably, the electron source and/or the first polypeptide are immobilized on the respective support(s). Any suitable means of contact can be used providing the electron source and/or the first polypeptide are immobilized in electronic contact with the support. As used herein, the term "immobilized" embraces adsorption, entrapment and/or cross-linkage between the support and the electron source or polypeptide. Adsorption embraces non-covalent interactions including electrostatic interactions, hydrophobic interactions, and the like. A charged adsorption enhancer such as polymyxin B sulphate can be used to enhance adsorption. Entrapment embraces containment of the electron source and/or the first polypeptide onto the surface of the support, e.g. within a polymeric film or in a hydrogel. Cross-linkage embraces covalent attachment, either directly between the electron source and/or the first polypeptide (e.g. via amide coupling, such as via EDC/NHS and/or other coupling agents routine to those skilled in the art) or using one or more covalent cross-linkers such as thiol-terminated linkers or crosslinking reagents. Immobilization means comprising or consisting of adsorption are preferred. Combination of some or all of the above mentioned immobilization means may be used.

Preferably, the support independently comprises a material comprising carbon, a metal or metal alloy, a metal oxide (include mixed metal oxides), a metal hydroxide (including layered double hydroxides), a metal chalcogenide, a semi-conducting material (including silicates, germanium compounds and gallium compounds such as silicon carbide, doped silicon and/or doped germanium) or an electronically-conductive polymer; or mixtures thereof. As those skilled in the art will appreciated, suitable support materials can include mixtures of materials described herein, such as mixtures of metal oxides or mixed metal oxides. Any suitable support material can be used.

More preferably, the support material independently comprises:
  i) carbon; and/or
  ii) a metal or metal alloy selected from gold, silver, tungsten, iridium, platinum, palladium, copper, titanium, brass, and steel; and/or
  iii) a material selected from titanium oxide, indium oxide, tin oxide and indium tin oxide.

Still more preferably, the support material comprises a carbon material. Still more preferably, the support material independently comprises a carbon material comprising graphite, carbon nanotube(s), carbon black, activated carbon, carbon nanopowder, vitreous carbon, carbon fibre(s), carbon cloth, carbon felt, carbon paper, graphene, highly oriented pyrolytic graphite, pyrolytic graphite, or doped diamond. Most preferably, the support material independently comprises a carbon material comprising graphite (or highly oriented pyrolytic graphite or pyrolytic graphite) or carbon black; most preferably carbon black.

Preferably, the support is an electronically conducting particle. Preferred electronically conducting particles comprise materials described herein. Preferably, when each support comprise particles, the particles have a particle size of from about 1 nm to about 100 μm, such as from about 10 nm to about 10 um e.g. from about 100 nm to about 1 um. Methods of determining particle size are routine in the art and include, for example, dynamic light scattering. Suitable electronically conducting particles for use in the methods of the invention include conductive carbon black particles such as "Black Pearls 2000" particles available from Cabot corp (Boston, Mass., USA).

When the electron source comprises an electrode connected to an electrode controller, any suitable electrode material can be used. Preferred electrode materials comprise carbon, a metal or metal alloy, a metal oxide (include mixed metal oxides), a metal hydroxide (including layered double hydroxides), a metal chalcogenide, or an electronically-conductive polymer; or mixtures thereof. Suitable electrode materials can include mixtures of materials described herein, such as mixtures of metal oxides or mixed metal oxides.

Preferred Electrode Materials Comprise:
  i) carbon; and/or
  ii) a metal or metal alloy selected from gold, silver, tungsten, iridium, platinum, palladium, copper, titanium, brass, and steel; and/or
  iii) a material selected from titanium oxide, indium oxide, tin oxide and indium tin oxide.

More preferred electrode materials comprise a carbon material. Still more preferred electrode materials comprise a carbon material comprising graphite, carbon nanotube(s), carbon black, activated carbon, carbon nanopowder, vitreous carbon, carbon fibre(s), carbon cloth, carbon felt, carbon paper, graphene, highly oriented pyrolytic graphite, pyrolytic graphite, or doped diamond (e.g. boron-doped diamond). Most preferred electrode materials comprises carbon materials comprising graphite (or highly oriented pyrolytic graphite or pyrolytic graphite).

Preferably, in the methods of the invention, the first polypeptide and/or the electron source are provided in a form which can be easily removed from the reaction mixture. Preferably, the first polypeptide and the electron source comprise a heterogeneous system with the composition comprising $^xH^+$ ions. For example, the composition comprising $^xH^+$ ions is preferably a liquid and the first polypeptide and the electron source are in electronic contact with one or more electronically conducting support(s) which can be removed from the composition by sedimentation, filtration, centrifugation, or the like. For example, the first polypeptide and the electron source may be immobilized onto carbon materials as defined herein (e.g. carbon powder, carbon nanotubes, carbon black, carbon felt, activated carbon, or the like), and the carbon material(s) can be removed from the composition by sedimentation, filtration, centrifugation, etc. Many such methods are known to those skilled in the art, e.g. filtration can be achieved using a simple filter paper to remove solid components from a liquid composition; or a mixed solid/liquid composition can be allowed to settle and the liquid then decanted from the settled solids.

Figure 5:
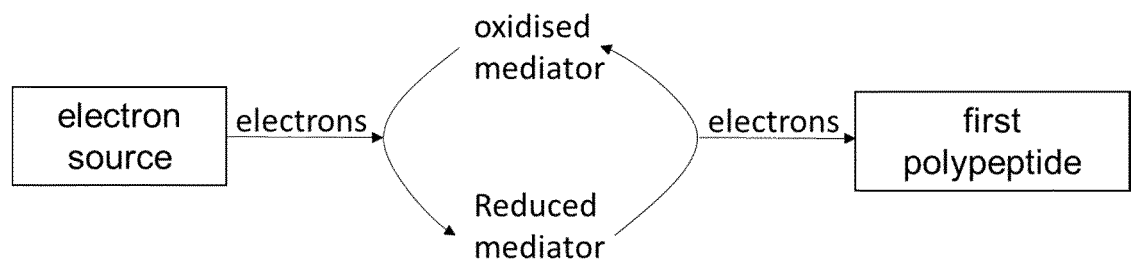
FIG. 5 shows a schematic diagram of the transfer of electrons from an electron source to a first polypeptide via a mediator.

In the methods of the invention, electrons are transferred from the electron source to the first polypeptide. Preferably, electrons are directly transferred from the electron source to the first polypeptide along an electronically conducting pathway. Alternatively, electron transfer along the electronically-conducting pathway can be mediated by one or more electron mediators, as shown schematically in FIG. 5. Suitable mediators include methyl viologen, benzyl viologen, methylene blue, flavin mononucleotide and flavin adenine dinucleotide.

In the methods of the invention, an electronically conducting pathway can be formed e.g. when the first polypeptide and the electron source are localised on the same electronically conducting supports. In another embodiment, the first polypeptide and the electron source can be localised or comprise or consist of different electronically conducting supports. In such cases the electronically-conducting pathway may comprise a linker such as a wire between the supports. The linker may be a molecular linker such as conductive polymeric strand or may be a metallic linker such as a metallic wire.

In the methods of the invention, the cofactor is preferably initially added to or present in an aqueous solution at a concentration of 1 μM to 1 M, such as from 5 μM to 800 mM, e.g. from 10 μM to 600 mM such as from 25 μM to 400 mM e.g. from 50 μM to 200 mM such as from 100 μM to about 100 mM e.g. from about 250 μM to about 10 mM such as from about 500 μM to about 1 mM.

The methods of the invention are typically conducted under a gas atmosphere; i.e. in the presence of gas (for example in the headspace of a reactor). Preferably, the gas atmosphere comprises an inert gas and/or hydrogen ($H_2$ and/or $^xH_2$) optionally in the presence of $O_2$. Preferred inert gases include nitrogen, argon, helium, neon, krypton, xenon, radon and sulfur hexafluoride ($SF_6$) and mixtures thereof, more preferably nitrogen and/or argon, most preferably nitrogen. When the gas atmosphere comprises hydrogen ($H_2$ or $^xH_2$), the hydrogen is preferably present at a concentration of 1-100%, with the remaining gas comprising an inert gas as defined herein and/or $O_2$. Preferred gas atmospheres include from 80-100% $H_2$ with the remaining gas comprising one or more inert gases; and from 0-20% $H_2$ with the remaining gas comprising one or more inert gases and/or 02 (such as from 1-4% $H_2$ in air). The gas atmosphere may optionally also include non-inert gases such as ammonia, carbon dioxide and hydrogen sulphide. Preferably, however, the gas atmosphere is free of ammonia, carbon dioxide and hydrogen sulphide.

The methods of the invention are typically conducted in an aqueous composition which may optionally comprise e.g.

buffer salts. For some applications buffers are not required and the methods of the invention can be conducted without any buffering agents. Preferred buffer salts which can be used in the methods of the invention include Tris; phosphate; citric acid/Na$_2$HPO$_4$; citric acid/sodium citrate; sodium acetate/acetic acid; Na$_2$HPO$_4$/NaH$_2$PO$_4$; imidazole (glyoxalin)/HCl; sodium carbonate/sodium bicarbonate; ammonium carbonate/ammonium bicarbonate; MES; Bis-Tris; ADA; aces; PIPES; MOPSO; Bis-Tris Propane; BES; MOPS; TES; HEPES; DIPSO; MOBS; TAPSO; Trizma; HEPPSO; POPSO; TEA; EPPS; Tricine; Gly-Gly; Bicine; HEPBS; TAPS; AMPD; TABS; AMPSO; CHES; CAPSO; AMP; CAPS and CABS. Selection of appropriate buffers for a desired pH is routine to those skilled in the art, and guidance is available at e.g. http://www.sigmaaldrich.com/life-science/core-bioreagents/biological-buffers/learning-center/buffer-reference-center.html. Buffer salts used can be $^x$H-labelled, for example by exchanging labile protons for $^x$H$^+$ ions by dissolving the salt in an $^x$H-labelled solvent and subsequent solvent removal. Buffer salts are preferably used at concentrations of from 1 mM to 1 M, preferably from 10 mM to 100 mM such as about 50 mM in solution. Most preferred buffers for use in methods of the invention include 50 mM Tris-HCl, p($^x$H) 8.0.

The methods of the invention are typically conducted in an aqueous composition. However, non-aqueous components can optionally be used instead or as well as water in the compositions used in the methods of the invention. For example, the compositions comprising $^x$H$^+$ ions may optionally comprise one or more organic solvents (e.g. alcohols) or one or more ionic liquids.

Figure 6:
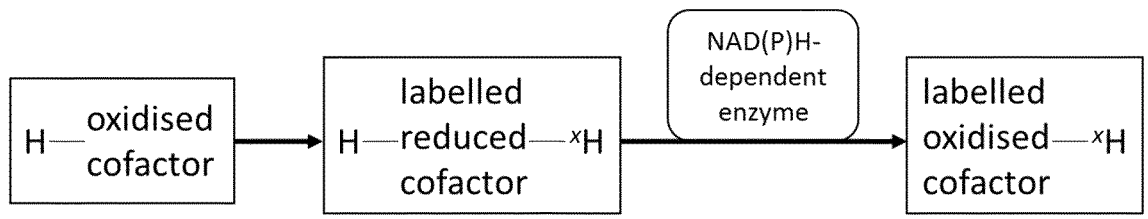
FIG. 6 shows a schematic diagram of how the methods of the invention can be used to generate a labelled oxidised cofactor from an unlabelled oxidised cofactor in accordance with the invention.

The methods of the invention can be used to make an oxidised labelled cofactor from a reduced labelled cofactor. Such methods involve the production of a singularly or doubly $^x$H-labelled reduced cofactor using methods of the invention as described herein and then removal of the non-required $^1$H$^-$ or $^x$H$^-$ using an appropriate NADH-dependent enzyme to yield the oxidised labelled cofactor. This method is illustrated schematically in FIG. 6. Suitable NADH-dependent enzymes for use in such methods include those enzymes used to produce reduced labelled reaction products as described herein. Preferably, the enzymes used in this step can selectively remove either the (R) or (S) $^x$H atom. For example, an (R)-selective or (S)-selective NADH- or NADPH-dependent oxidoreductase, such as an (R)-selective or (S)-selective alcohol dehydrogenase, may be used to provide the labelled oxidised cofactor.

For example, the method of the invention can be used to label an unlabelled cofactor to produce 4S-labelled reduced cofactor e.g. (4S-$^x$H)-NADH. Selective oxidation with an S-selective oxidoreductase, such as an (S)-selective alcohol dehydrogenase, leaves a labelled oxidised cofactor, e.g. (4-$^x$H)-NAD$^+$. Further reaction of the labelled NAD$^+$ according to the methods of the invention can lead to a doubly $^x$H-labelled reduced cofactor at the 4-position.

When the methods of the invention comprise producing a reduced labelled reaction product comprising one or more $^x$H atom, the at least one enzyme that is an NADH-dependent oxidoreductase or an NADPH-dependent oxidoreductase or a functional derivative or fragment thereof is preferably at least one of an NAD(P)H-dependent alcohol dehydrogenase, an NAD(P)H-dependent ene reductase, an NAD(P)H-dependent imine reductase or an NAD(P)H-dependent amino-acid dehydrogenase. Other suitable NADH-dependent oxidoreductase or NADPH-dependent oxidoreductase enzymes include dehydrogenase, reductase, oxidase, synthase, transhydrogenase, dioxygenase and/or ene reductase enzymes. More preferably, the NADH-dependent oxidoreductase or NADPH-dependent oxidoreductase is at least one of an alcohol dehydrogenase or an amino acid dehydrogenase. As those skilled in the art will appreciate, any suitable NAD(P)H-dependent enzyme can be used, and the enzyme can be modified or selected to be specific for the desired reduction reaction. Variants, derivatives and functional fragments of the aforementioned oxidoreductases are also embraced by the present invention. Variants, derivatives and functional fragments of the aforementioned oxidoreductases retain at least some of the activity/functionality of the native/wild-type enzyme. Preferably, variants, derivatives and functional fragments of the aforementioned oxidoreductases have increased/improved activity/functionality when compared to the native/wild-type enzyme.

When the methods of the invention comprise producing a reduced labelled reaction product comprising one or more $^x$H atom, the at least one enzyme that is an NADH-dependent oxidoreductase or an NADPH-dependent oxidoreductase or a functional derivative or fragment thereof is preferably immobilised onto a support as defined herein. More preferably, the at least one enzyme that is an NADH-dependent oxidoreductase or an NADPH-dependent oxidoreductase or a functional derivative or fragment thereof is immobilised onto the same support as the first polypeptide and/or the electron source. Most preferably, the at least one enzyme that is an NADH-dependent oxidoreductase or an NADPH-dependent oxidoreductase or a functional derivative or fragment thereof is immobilised onto the same support as the first polypeptide and the electron source, as such configurations allow facile purification of the product by sedimentation, filtration, centrifugation, or the like as described herein.

The methods of the invention can be used to produce a variety of reduced labelled reaction products including alcohols, e.g. using alcohol dehydrogenases. For example, ketones, aldehydes, carboxylic acids and amino acids can be reduced to form labelled alcohols. Similarly imines can be reduced to form labelled amines, e.g. using imine reductases. Olefins (alkenes) can be reduced to alkane groups, e.g. using ene reductases. Labelled amines and amino acids can also be produced by reductive amination of ketones, e.g. using amine dehydrogenases or amino acid dehydrogenases.

Accordingly, in preferred embodiments of the methods of the invention, the composition comprising $^x$H$^+$ ions comprises $^2$H$_2$O or $^3$H$_2$O; and the oxidised cofactor is NAD$^+$, NADP$^+$, or a labelled version of NAD$^+$ or NADP$^+$ comprising at least one $^x$H atom, wherein the $^x$H atom is at the 4-position of the nicotinamide ring.

In more preferred embodiments of the methods of the invention, the composition comprising $^x$H$^+$ ions comprises $^2$H$_2$O or $^3$H$_2$O;

the oxidised cofactor is NAD$^+$, NADP$^+$, or a labelled version of NAD$^+$ or NADP$^+$ comprising at least one $^x$H atom, wherein the $^x$H atom is at the 4-position of the nicotinamide ring.

the first polypeptide is one or more of the amino acid sequences of any one of SEQ ID NOs 1 to 29 or 69 to 70, or an amino acid sequence having at least 60% homology (such as at least 70%, at least 80%, at least 90% or at least 95% homology) therewith;

the electron source is a second polypeptide or a synthetic organic, inorganic or metallic oxidation catalyst or an electrode connected to an electrode controller; wherein optionally:

the second polypeptide is one or more of the amino acid sequences of any one of SEQ ID NOs 30 to 68, or an amino acid sequence having at least 60% homology (such as at least 70%, at least 80%, at least 90% or at least 95% homology) therewith; and/or the synthetic oxidation catalyst comprises platinum, palladium, iridium, nickel, rhodium and/or ruthenium; or is frustrated Lewis pair catalyst; and/or the reductant is $H_2$ or $^xH_2$ wherein x=2 or 3; and/or the electrode material comprises:
carbon; and/or
a metal or metal alloy selected from gold, silver, tungsten, iridium, platinum, palladium, copper, titanium, brass, and steel; and/or
a material selected from titanium oxide, indium oxide, tin oxide, indium tin oxide
and
i) the electron source and the first polypeptide each comprise or are in electronic contact with
an electronically conducting support; wherein optionally the support material comprises:
carbon; and/or
a metal or metal alloy selected from gold, silver, tungsten, iridium, platinum, palladium, copper, titanium, brass, and steel; and/or
a material selected from titanium oxide, indium oxide, tin oxide, indium tin oxide;
or
ii) the first polypeptide and the second polypeptide constitute component parts of a modular, multidomain or multicomponent protein or protein complex.

In still more preferred embodiments of the methods of the invention, the composition comprising H ions comprises $^2H_2O$;

the oxidised cofactor is $NAD^+$ or a labelled version of $NAD^+$ comprising at least one $^xH$ atom, wherein the $^xH$ atom is at the 4-position of the nicotinamide ring;

the first polypeptide is the HoxHYFU tetramer of *Ralstonia eutropha* (SEQ ID NOs: 1, 2, 30, 31), or an amino acid sequence having at least 60% homology (such as at least 70%, at least 80%, at least 90% or at least 95% homology) therewith; wherein optionally the HoxH moiety is a non-functional variant comprising the point mutation I64A (SEQ ID NO: 69);

the electron source is a second polypeptide or a synthetic organic, inorganic or metallic oxidation catalyst, or an electrode connected to an electrode controller; wherein optionally:

the second polypeptide is one or more of the amino acid sequences of any one of SEQ ID NOs 30-31, 37-40, 53-54 and/or 60-65, or an amino acid sequence having at least 80% homology (such as at least 90% or at least 95% homology) therewith; and/or the synthetic oxidation catalyst comprises platinum; and the reductant is $H_2$; and/or the electrode material comprises carbon; and i) the electron source and the first polypeptide each comprise or are in electronic contact with the same electronically conducting support; wherein optionally the support material comprises carbon or ii) the first polypeptide and the second polypeptide constitute component parts of a modular, multidomain or multicomponent protein or protein complex.

The invention also provides a system for performing a method of the invention, the system comprising:

i) a composition comprising (i) $^xH^+$ ions wherein x is 2 or 3; and (ii) an oxidised cofactor, wherein preferably the oxidised cofactor and/or the composition is as defined herein;

ii) an electron source, wherein preferably the electron source is as defined herein; and iii) a first polypeptide which is an NADH:acceptor oxidoreductase or an NADPH:acceptor oxidoreductase or a functional derivative or fragment thereof, wherein preferably the first polypeptide is as defined herein;

wherein the system is configured such that, in use, (a) electrons are transferred from the electron source to the first polypeptide and (b) $^xH^+$ ions and the oxidised cofactor are contacted with the first polypeptide so as to reduce the oxidised cofactor to form a reduced labelled cofactor comprising one or more $^xH$ atoms.

The following Examples illustrate the invention. They do not, however, limit the invention in any way. In this regard, it is important to understand that the particular assays used in the Examples section are designed only to provide an indication of the efficacy of the method of the invention. There are many assays available to determine reaction efficiency and labelling success, and a negative result in any one particular assay is therefore not determinative.

EXAMPLES

Protein Expression

Methods for expression of proteins in cellular (e.g. microbial) expression systems are well known and routine to those skilled in the art. For example, the first polypeptide and the second polypeptide (if present) can be independently isolated from their host organisms using routine purification methods. For example, host cells can be grown in a suitable medium. Lysing of cells allows internal components of the cells to be accessed. Membrane proteins can be solubilised with detergents such as Triton X (e.g. Triton X-114, (1,1,3, 3-Tetramethylbutyl)phenyl-polyethylene glycol, available from Sigma Aldrich). Soluble or solubilized proteins can be isolated and purified using standard chromatographic techniques such as size exclusion chromatography, ion exchange chromatography and hydrophobic interaction chromatography. Alternatively, the first polypeptide and the second polypeptide (if present) can be independently encoded in one or more nucleotide vector and subsequently expressed in an appropriate host cell (e.g. a microbial cell, such as *E. coli*). Purification tags such as a HIS (hexa-histidine) tag can be encoded (typically at the C- or N-terminal of the relevant polypeptide) and can be used to isolate the tagged protein using affinity chromatography for example using nickel- or cobalt-NTA chromatography. If desired, protease recognition sequences can be incorporated between the first and/or second polypeptide and the affinity purification tag to allow the tag to be removed post expression. Such techniques are routine to those skilled in the art and are described in, for example, Sambrook et al, "Molecular Cloning: A Laboratory Manual", Cold Spring Harbor Laboratory Press.

Sequence Homology

Standard methods in the art may be used to determine homology. For example the UWGCG Package provides the BESTFIT program which can be used to calculate homology, for example used on its default settings (Devereux et al (1984) *Nucleic Acids Research* 12, p 387-395). The PILEUP and BLAST algorithms can be used to calculate homology or line up sequences (such as identifying equivalent residues or corresponding sequences (typically on their default settings)), for example as described in Altschul S. F. (1993) J Mol Evol 36:290-300; Altschul, S. F et al (1990) J Mol Biol 215:403-10). Software for performing BLAST analyses is publicly available through the National Center for Biotechnology Information (http://www.ncbi.nlm.nih.gov/).

Similarity can be measured using pairwise identity or by applying a scoring matrix such as BLOSUM62 and converting to an equivalent identity. Since they represent functional rather than evolved changes, deliberately mutated positions would be masked when determining homology. Similarity may be determined more sensitively by the application of position-specific scoring matrices using, for example, PSIBLAST on a comprehensive database of protein sequences. A different scoring matrix could be used that reflect amino acid chemico-physical properties rather than frequency of substitution over evolutionary time scales (e.g. charge). Conservative substitutions replace amino acids with other amino acids of similar chemical structure, similar chemical properties or similar side-chain volume. The amino acids introduced may have similar polarity, hydrophilicity, hydrophobicity, basicity, acidity, neutrality or charge to the amino acids they replace. Alternatively, the conservative substitution may introduce another amino acid that is aromatic or aliphatic in the place of a pre-existing aromatic or aliphatic amino acid. Conservative amino acid changes are well-known in the art and may be selected in accordance with the properties of the 20 main amino acids as defined in Table A below. Where amino acids have similar polarity, this can also be determined by reference to the hydropathy scale for amino acid side chains in Table B.

TABLE A

Chemical properties of amino acids

| | | | |
|---|---|---|---|
| Ala | aliphatic, hydrophobic, neutral | Met | hydrophobic, neutral |
| Cys | polar, hydrophobic, neutral | Asn | polar, hydrophilic, neutral |
| Asp | polar, hydrophilic, charged (−) | Pro | hydrophobic, neutral |
| Glu | polar, hydrophilic, charged (−) | Gln | polar, hydrophilic, neutral |
| Phe | aromatic, hydrophobic, neutral | Arg | polar, hydrophilic, charged (+) |
| Gly | aliphatic, neutral | Ser | polar, hydrophilic, neutral |
| His | aromatic, polar, hydrophilic, charged (+) | Thr | polar, hydrophilic, neutral |
| Ile | aliphatic, hydrophobic, neutral | Val | aliphatic, hydrophobic, neutral |
| Lys | polar, hydrophilic, charged(+) | Trp | aromatic, hydrophobic, neutral |
| Leu | aliphatic, hydrophobic, neutral | Tyr | aromatic, polar, hydrophobic |

TABLE B

Hydropathy scale

| Side Chain | Hydropathy |
|---|---|
| Ile | 4.5 |
| Val | 4.2 |
| Leu | 3.8 |
| Phe | 2.8 |
| Cys | 2.5 |
| Met | 1.9 |
| Ala | 1.8 |
| Gly | −0.4 |
| Thr | −0.7 |

TABLE B-continued

Hydropathy scale

| Side Chain | Hydropathy |
|---|---|
| Ser | −0.8 |
| Trp | −0.9 |
| Tyr | −1.3 |
| Pro | −1.6 |
| His | −3.2 |
| Glu | −3.5 |
| Gln | −3.5 |
| Asp | −3.5 |
| Asn | −3.5 |
| Lys | −3.9 |
| Arg | −4.5 |

Preferably, sequence homology can be assessed in terms of sequence identity. Any of a variety of sequence alignment methods can be used to determine percent identity, including, without limitation, global methods, local methods and hybrid methods, such as, e.g., segment approach methods. Protocols to determine percent identity are routine procedures within the scope of those skilled in the art. Global methods align sequences from the beginning to the end of the molecule and determine the best alignment by adding up scores of individual residue pairs and by imposing gap penalties. Preferred methods include CLUSTAL W (Thompson et al., Nucleic Acids Research, 22(22) 4673-4680 (1994)) and iterative refinement (Gotoh, J. Mol. Biol. 264(4) 823-838 (1996)). Local methods align sequences by identifying one or more conserved motifs shared by all of the input sequences. Preferred methods include Match-box, (Depiereux and Feytmans, CABIOS 8(5) 501-509 (1992)); Gibbs sampling, (Lawrence et al., Science 262(5131) 208-214 (1993)); and Align-M (Van Walle et al., Bioinformatics, 20(9) 1428-1435 (2004)). Thus, percent sequence identity is determined by conventional methods. See, for example, Altschul et al., Bull. Math. Bio. 48: 603-16, 1986 and Henikoff and Henikoff, Proc. Natl. Acad. Sci. USA 89:10915-19, 1992. Briefly, two amino acid sequences are aligned to optimize the alignment scores using a gap opening penalty of 10, a gap extension penalty of 1, and the "blosum 62" scoring matrix of Henikoff and Henikoff (ibid.) as shown below (amino acids are indicated by the standard one-letter codes).

Alignment scores for determining sequence identity

|   | A | R | N | D | C | Q | E | G | H | I | L | K | M | F | P | S | T | W | Y | V |
|---|---|---|---|---|---|---|---|---|---|---|---|---|---|---|---|---|---|---|---|---|
| A | 4 | | | | | | | | | | | | | | | | | | | |
| R | -1 | 5 | | | | | | | | | | | | | | | | | | |
| N | -2 | 0 | 6 | | | | | | | | | | | | | | | | | |
| D | -2 | -2 | 1 | 6 | | | | | | | | | | | | | | | | |
| C | 0 | -3 | -3 | -3 | 9 | | | | | | | | | | | | | | | |
| Q | -1 | 1 | 0 | 0 | -3 | 5 | | | | | | | | | | | | | | |
| E | -1 | 0 | 0 | 2 | -4 | 2 | 5 | | | | | | | | | | | | | |
| G | 0 | -2 | 0 | -1 | -3 | -2 | -2 | 6 | | | | | | | | | | | | |
| H | -2 | 0 | 1 | -1 | -3 | 0 | 0 | -2 | 8 | | | | | | | | | | | |
| I | -1 | -3 | -3 | -3 | -1 | -3 | -3 | -4 | -3 | 4 | | | | | | | | | | |
| L | -1 | -2 | -3 | -4 | -1 | -2 | -3 | -4 | -3 | 2 | 4 | | | | | | | | | |
| K | -1 | 2 | 0 | -1 | -3 | 1 | 1 | -2 | -1 | -3 | -2 | 5 | | | | | | | | |
| M | -1 | -1 | -2 | -3 | -1 | 0 | -2 | -3 | -2 | 1 | 2 | -1 | 5 | | | | | | | |
| F | -2 | -3 | -3 | -3 | -2 | -3 | -3 | -3 | -1 | 0 | 0 | -3 | 0 | 6 | | | | | | |
| P | -1 | -2 | -2 | -1 | -3 | -1 | -1 | -2 | -2 | -3 | -3 | -1 | -2 | -4 | 7 | | | | | |
| S | 1 | -1 | 1 | 0 | -1 | 0 | 0 | 0 | -1 | -2 | -2 | 0 | -1 | -2 | -1 | 4 | | | | |
| T | 0 | -1 | 0 | -1 | -1 | -1 | -1 | -2 | -2 | -1 | -1 | -1 | -1 | -2 | -1 | 1 | 5 | | | |
| W | -3 | -3 | -4 | -4 | -2 | -2 | -3 | -2 | -2 | -3 | -2 | -3 | -1 | 1 | -4 | -3 | -2 | 11 | | |
| Y | -2 | -2 | -2 | -3 | -2 | -1 | -2 | -3 | 2 | -1 | -1 | -2 | -1 | 3 | -3 | -2 | -2 | 2 | 7 | |
| V | 0 | -3 | -3 | -3 | -1 | -2 | -2 | -3 | -3 | 3 | 1 | -2 | 1 | -1 | -2 | -2 | 0 | -3 | -1 | 4 |

Percent Identity is then Calculated as:

$$100 \times (T/L)$$

where

T=Total number of identical matches

L=Length of the longer sequence plus the number of gaps introduced into the longer sequence in order to align the two sequences Materials and Reagents General reagents and buffer salts (Sigma Aldrich), NAD$^+$ and NADP$^+$ (Prozomix), Pt/C (nominally 20 wt. %, Alfa Aesar), and carbon black particles (Black Pearls 2000, BP2000, Cabot Corporation), were all used as received without further purification. All non-deuterated solutions were prepared with MilliQ water (Millipore, 18 MΩcm), and deuterated solutions with $^2H_2O$ (99.98%, Sigma Aldrich). All solvents were deoxygenated by sparging with dry $N_2$ for 60 minutes prior to use.

[$^2H_5$]-Tris.$^2$HCl was prepared by dissolving the required amount of Trizma® base in $^2H_2O$ and then evaporating to dryness. After repeating twice more, the pD (p$^2$H) of the Tris solution was adjusted to 8.0 by the addition of small aliquots of $^2$HCl (3.0 M). To preserve the isotopic purity of the buffer solution, the sample was deoxygenated with $N_2$ that had first been bubbled through sacrificial $^2H_2O$. Comparison to the Tris peak (δ=3.70 ppm) in the $^1$H NMR spectrum indicated that the final %$^2H_2O$ was not below 99 mol. % (unless specifically diluted with $^1H_2O$).

pD (p$^2$H) is measured as described in Covington et al. (*Anal. Chem.* (1968) 40 (4), 700-706).

Enzyme Purification and Isolation

*R. eutropha* soluble hydrogenase (SH; SEQ ID NOs: 1, 2, 3, 30, 31) was prepared as described in Lauterbach et al, *FEBS J.*, 2013, 280, 3058-3068 and Lauterbach and Lenz, *J. Am. Chem. Soc.*, 2013, 135, 17897-905. *E. coli* hydrogenase 1 (Hyd1, SEQ ID NOs: 37-38) and *E. coli* hydrogenase 2 (Hyd2; SEQ ID NOs: 39-40) were prepared as described in Lukey et al, *J. Biol. Chem.*, 2010, 285, 3928-3938. *R. eutropha* NAD$^+$ reductase (HoxFU, also referred to as NAD-R; SEQ ID NOs: 1, 2, 31, 69) was prepared as described in Lauterbach and Lenz, *J. Am. Chem. Soc.*, 2013, 135, 17897-17905. Commercial samples of alcohol dehydrogenases (ADH101 and ADH105, Johnson Matthey Catalysis and Chiral Technologies), ene-reductase (ENE107, Johnson Matthey Catalysis and Chiral Technologies), L-alanine dehydrogenase (Sigma) were all received in their lyophilised forms and used without modification. ADH101 (Johnson Matthey Catalysis and Chiral Technologies) is a (R)-selective ("pro-R") ketone reductase (alcohol dehydrogenase). ADH 105 (Johnson Matthey Catalysis and Chiral Technologies) is an (S) selective ("pro-S") ketone reductase (alcohol dehydrogenase).

As discussed above, *R. eutropha* soluble hydrogenase (SH) comprises 4 subunits HoxHYFU, with HoxHY being related to $H_2/H^+$ cycling and HoxFU to NAD$^+$/NADH. The HoxHY subunit is relatively unstable, but can be rendered obsolete by a single amino acid mutation (I64A) to a yield a more robust construct: HoxFU. HoxFU can be considered to be a stabilised NAD$^+$-reductase (diaphorase) suitable for coupling to various other external $H_2$-oxidising systems, and is abbreviated to "NAD-R" for ease.

Catalyst Syntheses

All catalysts were prepared in a glovebox under a protective $N_2$ atmosphere ($O_2$<0.1 ppm), and in deoxygenated Tris-HCl (100 mM, pH 8.0). When the reaction was to be carried out under deuterated conditions, the non-isotopically enriched catalyst solution was centrifuged (12,000 rpm, 5 mins), decanted, and the solid re-suspended in an equal volume of [$^2H_5$]-Tris.$^2$HCl (100 mM, pD 8.0).

Pt/C was prepared by sonication of a 20 mg/mL suspension for 5×15 minutes (with agitation of the solution in between). Suspensions of Pt/C were allowed to stand for between 15 minutes and 24 hours prior to use. For Pt+NAD-R/C, an aliquot of NAD$^+$ reductase (1.4 mg/mL) was added to an equal volume of the Pt/C suspension and allowed to stand at 4° C. for 60 minutes prior to centrifugation (12,000 rpm, 5 mins), removal of the liquid, and re-suspension in the deuterated or non-deuterated buffer.

For experiments utilising carbon black, a suspension of BP2000 (20 mg/mL) was sonicated in the same manner as Pt/C. Particles of H2ase+NAD-R/C were then prepared by pre-mixing aliquots of the enzymes, and then adding them to a defined volume of BP2000. The H2ase+NAD-R/C particles then stood at 4° C. for 60 minutes, prior to centrifugation (12,000 rpm, 5 mins), removal of the excess solution, and re-suspension in the deuterated or non-deuterated buffer.

Enzyme-modified particles were then used immediately, or snap-frozen in liquid $N_2$ and stored at −80° C. prior to use. Whilst no attempt was made to quantify the degree of enzyme immobilisation, a considerable reduction in the brown hue of the solutions indicated that it was very high. If an additional enzyme (namely the NADH-dependent oxidoreductases) was to be co-immobilised on to the particles, this was done using a very large excess, after the particles had already been coated with H2ase and NAD-R.

Reaction Conditions

All reactions were set up in a glovebox under a protective $N_2$ atmosphere ($O_2$<0.1 ppm) and were conducted on a 500 µL scale in sealed 1.5 mL micro-centrifuge tubes (Eppendorf) punctured with a single hole in the lid (Ø 1.0 mm). Solid catalysts were typically added at a loading of 100 µg(C)/mL and SH was added at 20 µL/mL. In order to help dissolve organic compounds such as AcPh, 2.0-5.0 vol. % ($^2H_6$)-dimethylsulphoxide was included in the reactions as required (with the deuterium label serving only to ease analysis, and playing no part in the reaction). The sealed tubes were then transferred to a Tinyclave pressure vessel (Buchi) and were charged with 2 bar partial pressures of $^1H_2$ or $^2H_2$ as required. The vessel was laid horizontally and rocked back and forth at 15 rpm whilst the reactions took place. Alternatively, a modified shaker was used that enabled a steady flow of the selected hydrogen gas across the reaction headspace with simultaneous agitation.

Product Analysis

Following depressurisation of the reaction vessel, the catalyst was separated from the reaction mixture by two rounds of centrifugations (10,000×g, 5 mins) or by filtration through a nylon syringe filter (Gilson, 0.22 µm). The solutions were then subject to one or more of the following analyses: H NMR spectroscopy, UV-Vis spectroscopy, high-performance liquid chromatography (HPLC), and gas chromatography (GC). The general methods for each of these techniques are described below:

$^1H$ NMR Spectroscopy

Following removal of the catalyst particles by filtration and centrifugation, 350-450 µL of the sample solution was transferred to a Norell® SelectSeries™ 5 mm 400 MHz sample tube. A further 50-150 µL of $^2H_2O$ was added for field locking purposes and, when required, 0.5 mM of acetone or 1.0 mM of 4,4-dimethyl-4-silapentane-1-sulfonic acid (DSS) was also included to act as a reference. $^1H$ NMR spectroscopy was carried out on either a Bruker Avance III HD nanobay (400 MHz) or Bruker Avance III (500 MHz) instrument, with samples for direct comparison always being run on the same machine. Both machines were equipped with 5 mm z-gradient broadband multinuclear probes. Spectra were acquired according to the parameters in the Table below. Data were acquired using either the standard Bruker $^1H$ 1D zg30 pulse program, or, for samples requiring solvent suppression, the noesygpprd program.

| Machine | Avance III - 400 | Avance III - 500 |
| --- | --- | --- |
| Experiment | $^1H$ | $^1H$ |
| RF pulse energy (MHz) | 400.13 | 499.9 |
| Temperature (K) | 298 ± 2 | 298 ± 2 |
| Number of scans | 32 | 32 |
| Pulse width (µs) | 14.0 | 10.3 |
| Spectral width (Hz) | 8000 | 8000 |
| Acquisition time (s) | 4.09 | 2.04 |
| Relaxation delay (s) | 1.00 | 2.00 |

In the first instance, the Bruker proc_Id or proc_1dakps processing algorithms were applied, followed by additional manual re-phasing where necessary. A multipoint baseline correction was also applied across the entirety of the spectral window and a line broadening corresponding to 0.3 Hz was applied to each spectrum to improve the S/N ratio. Signals were referenced against an internal acetone standard (δ=2.22 ppm), DMSO (δ=2.71), or the Tris peak (δ=3.70 ppm), all of which were referenced originally to DSS (δ=0.00 ppm).

Figure 7:
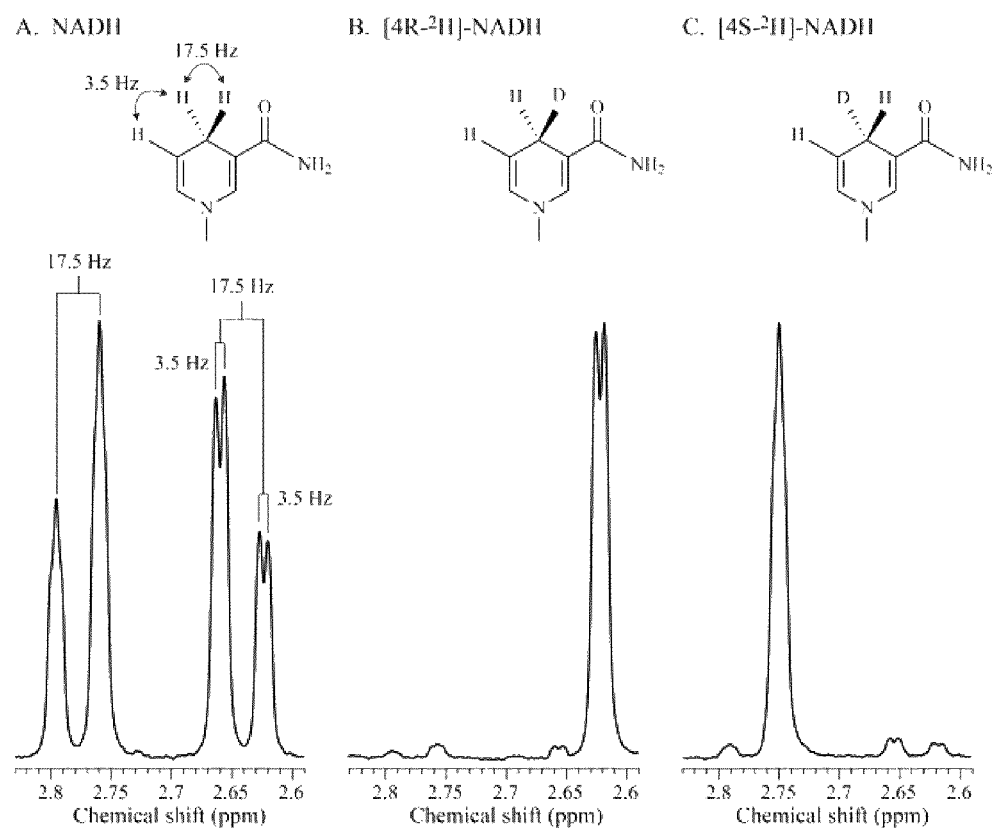
FIG. 7 shows $^1$H NMR of (A) NADH; (B) [4R-$^2$H]-NADH and [4S-$^2$H]-NADH. Spectra reproduced from Hirst et al., Biochemistry 2013, 52, 4048-4055.

The spectra of nicotinamide cofactors and their deuterated analogues were assigned according to well established literature arguments (see for example FIG. 7; reproduced from Hirst et al., Biochemistry 2013, 52, 4048-4055). Comparison of the peak(s) between 2.64-2.84 ppm (corresponding to protons on the 4-position of the dihydronicotinamide ring) were used to discern the relative abundance of the various isotopologues of NADH in solution. Control experiments showed that, within experimental error, the isotopic constitution of the NMR solvent does not influence the interpretation of the isotopic constitution of the NADH. Values of >95% isotopic purity are quoted to reflect the limit of detection in the experimental setup used, and do not necessarily indicate that other isotopologues were generated.

HPLC

All HPLC was conducted on a Shimadzu UFLC LC-20AD prominence liquid chromatograph equipped with a dual wavelength UV-spectrophotometric detection. MilliQ water and HPLC grade solvents were used throughout. The following protocols were used depending on the nature of the analytes followed:

HPLC Method A

Description: Hydrophilic Interaction Liquid Chromatography (HILIC) for cofactor analysis Sample: Samples were first filtered through a nylon syringe filter (Gilson, 0.22 µm), and then centrifuged at 14,000 rpm for 5 minutes to remove any smaller particulates. 50 vol. % MeCN was added to the samples, prior to an additional round of centrifugation and transfer to glass HPLC vials.

Column: SeQuant® ZIC®-HILIC, 5 µM particle size, 200 Å pore size, 150×4.6 mm bed, equipped with a 20×2.1 mm guard Buffer A: 90 vol. % MeCN (Honeywell, CHROMASOLV® 99.9%): 10 vol. % MilliQ, 20 mM ammonium acetate, pH 7.5

Buffer B: 100 vol. % MilliQ, 20 mM ammonium acetate, pH 7.5

Column temperature=40° C.

Flow rate=1 mL/min

Injection volume=10 µL

Detection=260 and 340 nm

Pump Profile

| Time (minutes) | Solvent ratio (vol % A:vol % B) |
| --- | --- |
| 0 → 1 | 100:0 |
| 1 → 31 | 100:0 → 20:80 (linear gradient) |
| 31 → 33 | 20:80 |
| 33 → 35 | 100:0 |

HPLC Method B

Description: Chiral HPLC for resolution of stereoisomers

Sample: Samples were extracted with a 2×volume of heptane: 2-propanol (99:1 vol/vol), and then centrifuged at 14,000 rpm for 5 minutes before being transferred to glass vials for HPLC.

Column: Chiralpak IA column (15 cm×4.6 mm, 5 μm particle size) equipped with a 20×2.1 mm guard column
Buffer: heptane: 2-propanol (99:1 vol/vol)
Column temperature=40° C.
Flow rate=1 mL/min
Injection volume=10 μL
Detection=210 nm
Pump profile=isocratic over 15 minutes

GC

GC was carried out on a ThermoScientific Trace 1310 equipped with an autosampler.

Sample: Samples were extracted with a 2×volume of ethyl acetate, and then centrifuged at 14,000 rpm for 5 minutes before being transferred to glass vials for GC.
Column: DB-1701 (agilent), 30 m length, 0.25 mm diameter, 0.25 μm (film thickness)
Carrier: He (CP grade), 0.5 mL minute (constant flow)
Detection: FID ($H_2$=25 mL/min, air=350 mL/min, makeup $N_2$=40 mL/min)
Oven Profile:

| Time (minutes) | Oven |
|---|---|
| 0 → 2 | Hold at 40° C. |
| 2 → 23 | Ramp to 250° C. at 10° C./min |
| 23 → 33 | Hold at 250° C. for 10 mins |

UV-Vis Spectroscopy

Reactions which resulted in changes in the relative concentration of NAD(P)$^+$/NAD(P)H could be followed be UV-vis spectroscopy. Typically, solid particulates were removed from the solution by filtration or centrifugation (as described above) and the sample diluted in MilliQ ($^1H_2O$) water so that the cofactors were in the range 0.1-0.2 mM. A background spectrum of pure MilliQ was subtracted from that acquired for the sample. Measurements were made in a quartz cuvette (path length 1 cm, Hellma) on a Cary 60 UV/Vis spectrophotometer (Agilent). The ratio of NAD to NADH could then be determined by measuring the ratio of $A_{260\ nm}:A_{340\ nm}$.

Example 1

Examples 1A-1C demonstrate the method of the invention with the electron source being a second polypeptide and the first and second polypeptides not being component parts of an enzyme complex.

Example 1A

Carbon particles were modified with NAD$^+$-reductase (NAD-R, i.e. *R. eutropha* soluble hydrogenase with an inactivated hydrogenase moiety, I64A, SEQ ID NOs: 1, 2, 31, 69) as the first polypeptide and *E. coli* hydrogenase 2 (SEQ ID NOs: 39-40) as the second polypeptide, as described above. The NAD$^+$-reductase and hydrogenase are not native redox partners in vivo. Enzymes were not exchanged into deuterated buffer. Enzymes were prepared following standard protocols. Carbon particles (Black Pearls 2000) were prepared by sonication for 90 minutes in [$^2H_5$]-Tris.$^2$HCl (100 mM, p$^2$H 8.0) at a concentration of 20 mg mL$^{-1}$. A mixture of the hydrogenase and NAD$^+$-reductase (each of a concentration of between 1-2 mg/mL) was added to an aliquot of carbon particles and left at 4° C. for 90 minutes. The particles were then centrifuged (12,000 rpm, 2 mins) and the supernatant removed and replaced with sufficient $^2$H-Tris.$^2$HCl to give a concentration of 10 mg(C)/mL. Enzyme loading was determined as 3-5 μg of each enzyme per 100 μg(C) (assuming enzymes were fully immobilised).

An aliquot containing 100 μg of enzyme modified particles was then added to 500 μL of [$^2H_5$]-Tris.$^2$HCl (100 mM in $^2H_2O$, p$^2$H 8.0) containing 1.0 mM NAD$^+$, which had been pre-saturated with $^1H_2$ gas. The reaction solution was subsequently sealed in a pressure vessel under 2 bar of $^1H_2$ and rocked at 15 rpm for 18 hours at 20° C.

Production of reduced cofactor (NADH) was monitored by UV-Visible spectroscopy with the characteristic peak observed at 340 nm indicative of formation of the reduced cofactor. Confirmation of the isotopic composition of the NADH was made by $^1$H NMR spectroscopy. The general procedures for these methods are described above.

UV-visible spectra (FIG. 8A) demonstrated generation of reduced cofactor at a conversion of >95%.

$^1$H NMR spectroscopy (FIG. 8B) of the final reaction solution showed generation of a product having a single singlet peak at a chemical shift of δ=2.77 ppm (expanded region shown in FIG. 8C) confirming generation of deuterated cofactor. Comparison with literature spectra (FIG. 7; reproduced from Hirst et al., Biochemistry 2013, 52, 4048-4055) confirmed that the produced product is [4S-$^2$H]-NADH only. >95% incorporation of $^2$H was observed. The observed >95% incorporation reflects the limit of detection in the experimental setup used, and does not indicate any generation of [4-H]-NADH.

Figure 8:
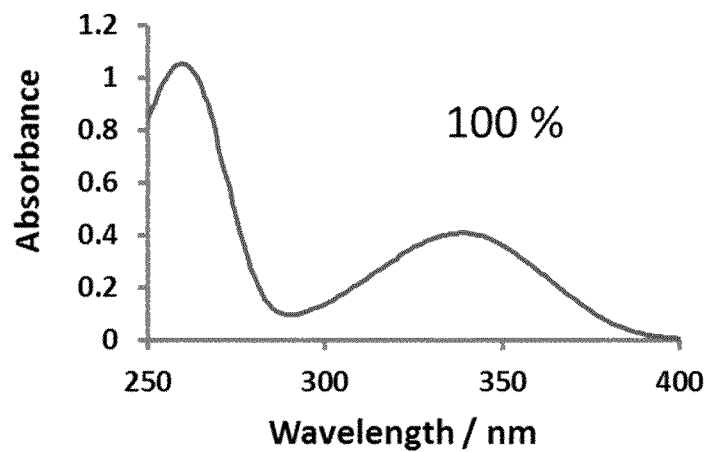
FIG. 8 shows UV-VIS (A) and $^1$H-NMR (B) spectra demonstrating generation of reduced cofactor ([4S-$^2$H]-NADH) from oxidised unlabelled cofactor (NAD$^+$) using methods of the invention wherein the electron source is *E. coli* hydrogenase 2 (SEQ ID NOs: 39-40) and the first polypeptide is *R. eutropha* soluble hydrogenase with an inactivated hydrogenase moiety (SEQ ID NOs: 1, 2, 31, 69), and the first and second polypeptide are immobilized by adsorption onto carbon particles.
Figure 8:
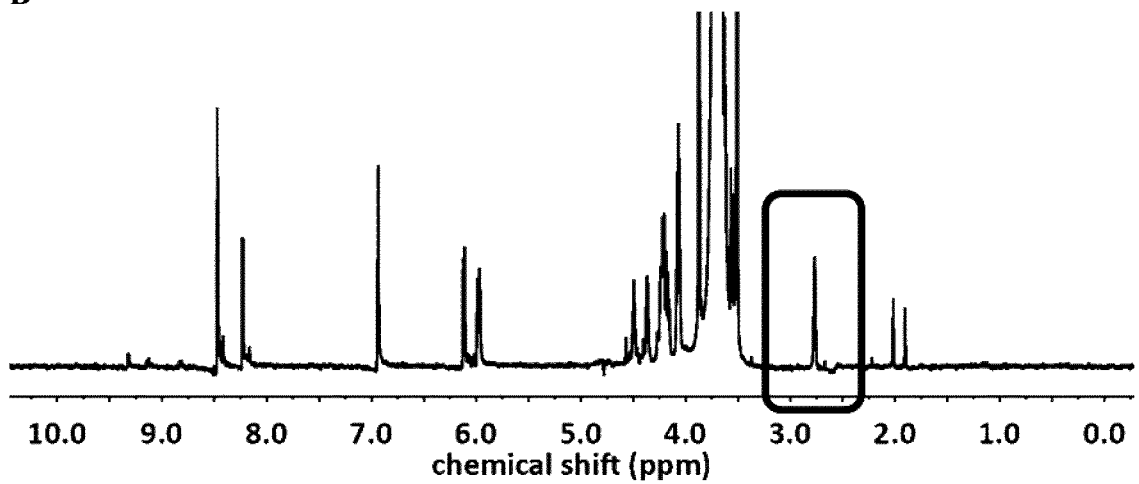
Figure 8:
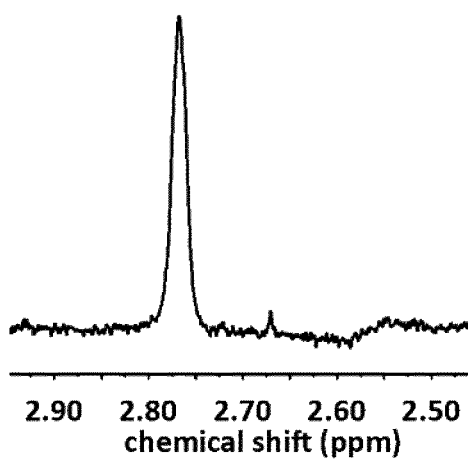

The $^1$H NMR spectra shown in FIG. 8B were generated with the following parameters: 400 MHz, 128 scans, water suppression, LB=0.3 Hz, $^2H_2O$ (p$^2$H 8.0), 298 K Example 1B The reaction was conducted in a similar manner to that described in Example 1A, but using *E. coli* hydrogenase 1 (SEQ ID NOs: 37-38) as the second polypeptide.

In brief, the following conditions were used: 100 μg(C) with 15-20 μg of immobilised hydrogenase (*E. coli* hydrogenase 1) and NAD$^+$ reductase (NAD-R, SEQ ID NOs: 1, 2, 31, 69) was suspended in 500 μL [$^2H_5$]-Tris.$^2$HCl (100 mM in $^2H_2O$, p$^2$H 8.0) containing 4 mM NAD$^+$ which had been pre-saturated with $^1H_2$ gas. The reaction solution was subsequently sealed in a pressure vessel under 2 bar of $^1H_2$ and rocked at 30 rpm for 16 hours at 20° C.

Figure 9:
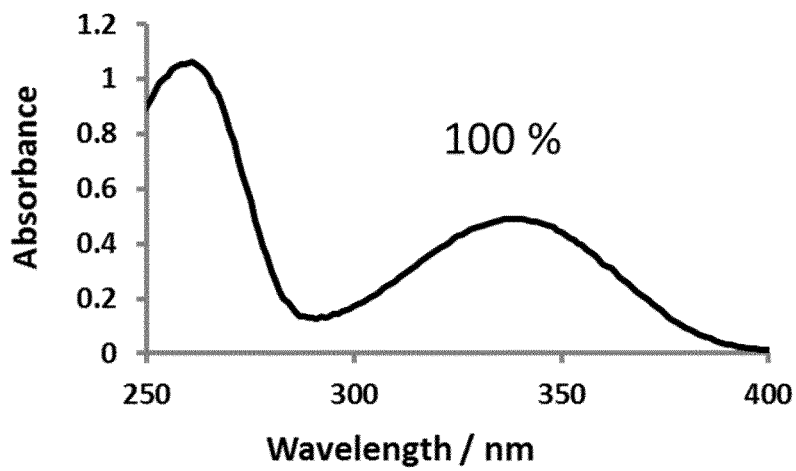
FIG. 9 shows UV-VIS (A) and $^1$H-NMR (B) spectra demonstrating generation of reduced cofactor ([4S-$^2$H]-NADH) from oxidised unlabelled cofactor (NAD$^+$) using methods of the invention wherein the electron source is *E. coli* hydrogenase 1 (SEQ ID NO: 37-38) and the first polypeptide is *R. eutropha* soluble hydrogenase with an inactivated hydrogenase moiety (SEQ ID NO: 1, 2, 31, 69), and the first and second polypeptide are immobilized by adsorption onto carbon particles.
Figure 9:
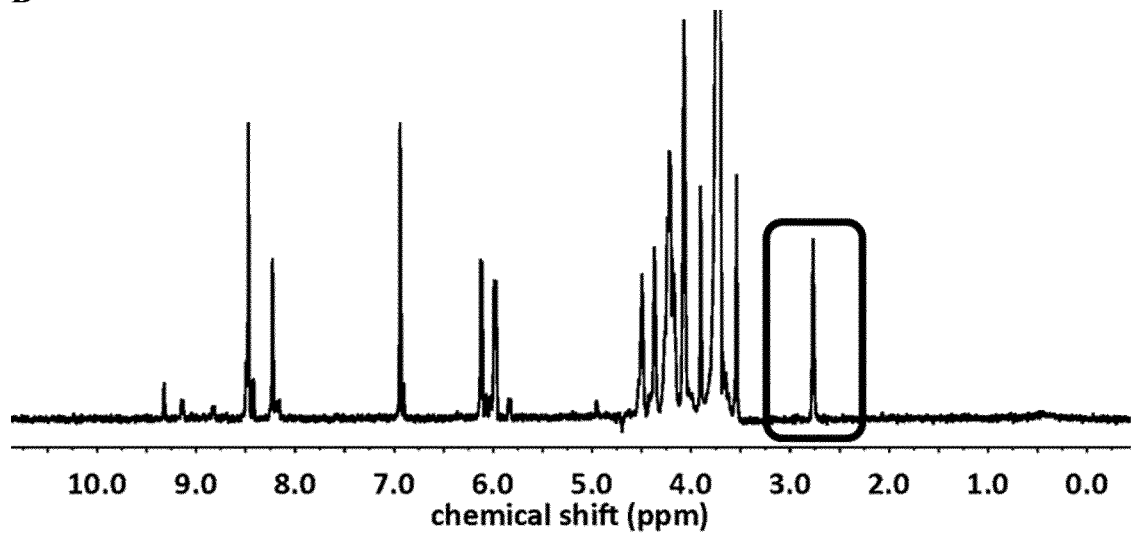
Figure 9:
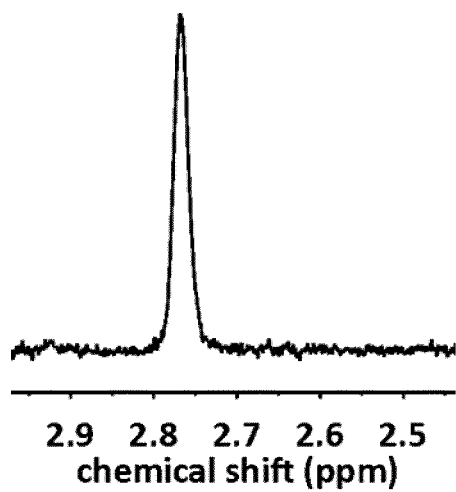

Product analysis as described in Example 1A showed high conversion (>95%) to NADH, with high selectivity (>95%) for the [4S-$^2$H]-NADH isotopomer (see FIGS. 9A, 9B and 9C).

The $^1$H NMR spectra shown in FIGS. 9B and 9C were generated with the following parameters: 400 MHz, 8 scans, water suppression, LB=0.3 Hz, $^2H_2O$ (p$^2$H 8.0), 298 K Example 1C The reaction was conducted in a similar manner to that described in Example 1A, but using *E. coli* hydrogenase 1 (SEQ ID NOs: 37-38) as the second polypeptide and HoxF NAD$^+$ reductase (SEQ ID NO: 1) as the first polypeptide.

In brief, the following conditions were used: 200 μg(C) with 40 μg of immobilised hydrogenase and NAD$^+$ reductase was suspended in 800 μL [$^2H_5$]-Tris.$^2$HCl (100 mM in $^2H_2O$, p$^2$H 8.0) containing 3.5 mM NAD$^+$ which had been pre-saturated with $^1H_2$ gas. The reaction solution was subsequently sealed in a shaker plate under a steady stream of $^1H_2$ and shaken at 500 rpm for 16 hours at 20° C.

Figure 10:
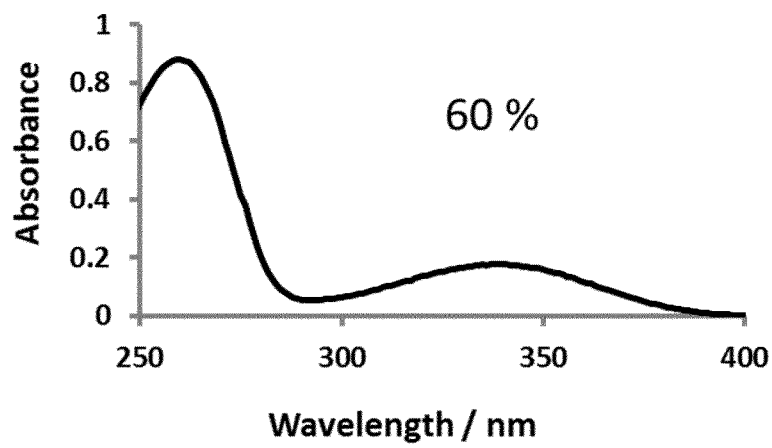
FIG. 10 shows UV-VIS (A) and $^1$H-NMR (B) spectra demonstrating generation of reduced cofactor ([4S-$^2$H]-NADH) from oxidised unlabelled cofactor (NAD$^+$) using methods of the invention wherein the electron source is *E. coli* hydrogenase 2 (SEQ ID NOs: 39-40) and the first polypeptide is *R. eutropha* HoxF (SEQ ID NO: 1), and the first and second polypeptide are immobilized by adsorption onto carbon particles.
Figure 10:
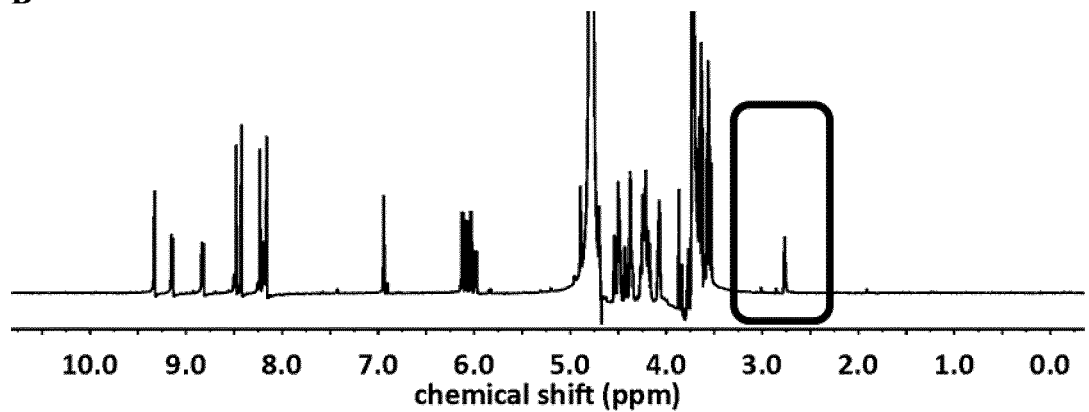
Figure 10:
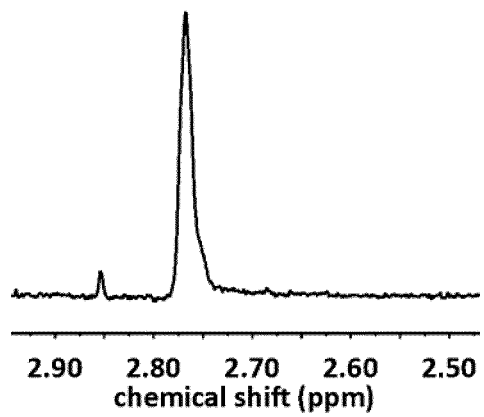

Product analysis as described in Example 1A showed a conversion of around 60% to NADH, with high selectivity (>95%) for the [4S-$^2$H]-NADH isotopomer (see FIGS. 10A, 10B and 10C).

The $^1$H NMR spectra shown in FIGS. 10B and 10C were generated with the following parameters: 500 MHz, 64 scans, LB=0.3 Hz, $^2$H$_2$O (p$^2$H 8.0), 298 K.

Example 2

This Example demonstrates the method of the invention with the electron source being a second polypeptide and the first and second polypeptides being component parts of an enzyme complex.

*R. eutropha* soluble hydrogenase (SEQ ID NOs: 1, 2, 3, 30, 31) was placed in 500 μL [$^2$H$_5$]-Tris.$^2$HCl (100 mM in $^2$H$_2$O, p$^2$H 8.0) containing 1 mM NAD$^+$. The reaction solution was subsequently sealed in a pressure vessel under 2 bar of $^1$H$_2$ and rocked at 15 rpm for 15 hours at 20° C.

Figure 11:
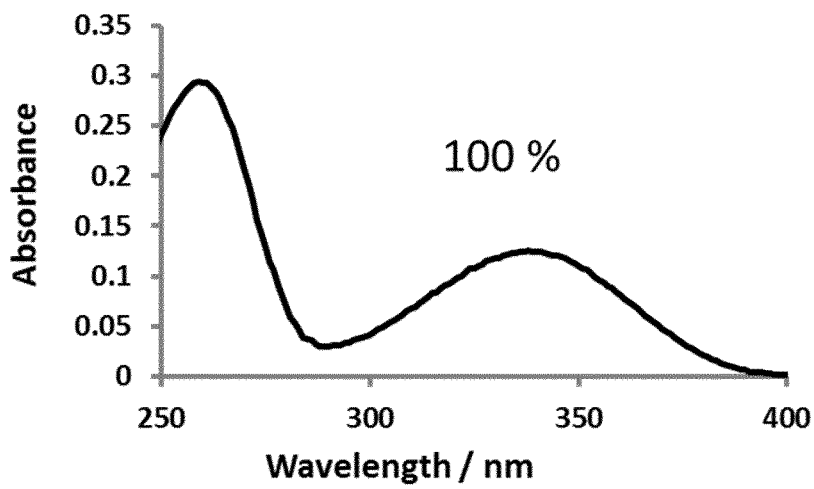
FIG. 11 shows UV-VIS (A) and $^1$H-NMR (B) spectra demonstrating generation of reduced cofactor ([4S-$^2$H]-NADH) from oxidised unlabelled cofactor (NAD$^+$) using methods of the invention wherein the electron source is the hydrogenase moiety of *R. eutropha* soluble hydrogenase (SEQ ID NOs: 30-31) and the first polypeptide is the diaphorase moiety of the *R. eutropha* soluble hydrogenase (SEQ ID NOs: 1-3) and the first and second polypeptides are component parts of a native enzyme complex.
Figure 11:
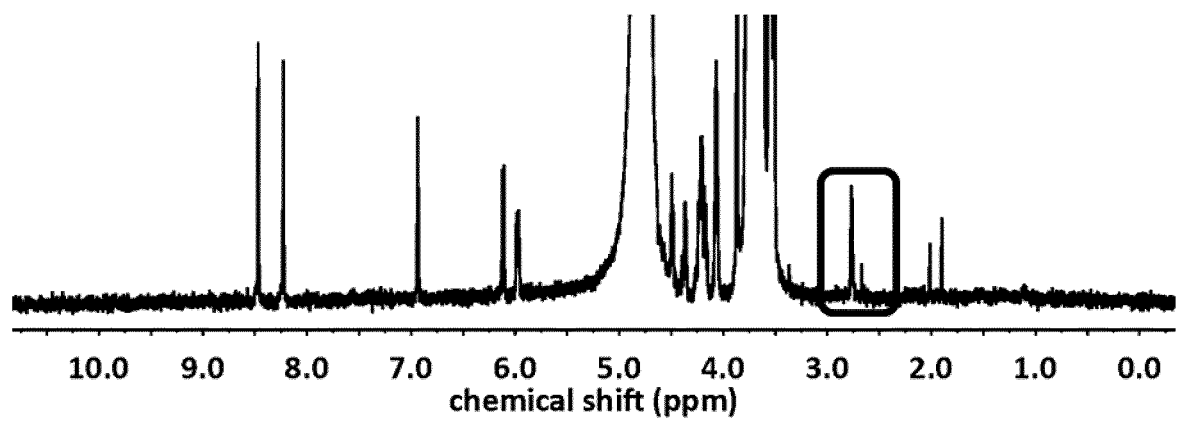
Figure 11:
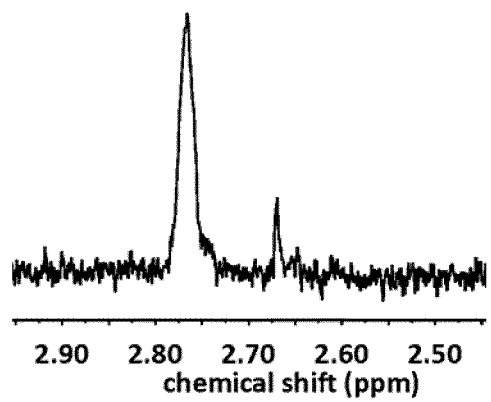

Product analysis as described in Example 1A showed high conversion (>95%) to NADH, with high selectivity (>95%) for the [4S-$^2$H]-NADH isotopomer (see FIGS. 11A, 11B and 11C). The identity of the product ([4-$^2$H]-NADH as opposed to [4-$^1$H]-NADH) was confirmed by $^1$H-NMR spectroscopy. This experiment confirms that it is not necessary to use labelled reductant if operating in $^2$H$_2$O.

The $^1$H NMR spectra shown in FIGS. 11B and 11C were generated with the following parameters: 400 MHz, 32 scans, LB=0.3 Hz, $^2$H$_2$O (p$^2$H 8.0), 298 K.

Example 3

This Example demonstrates the method of the invention with the electron source being a carbon electrode.

*R. eutropha* soluble hydrogenase with inactive hydrogenase (NAD-R, SEQ ID NOs: 1, 2, 31, 69) was immobilised on carbon particles (Black Pearls 2000) as described in Example 1A. The carbon particles were then immobilised on a 3 mm diameter pyrolytic graphite edge rotating disk electrode (see Lauterbach et al, PLoS ONE; doi:10.1371/journal.pone.0025939). The enzyme-modified particles were deposited on the electrode and allowed to partially dry over ca 2 minutes before submersing into the electrochemical cell.

The modified electrode was placed in an electrochemical cell containing NAD$^+$ (10 mM) in 5 mL [$^2$H]-Tris.$^2$ HCl (100 mM in $^2$H$_2$O, p$^2$H 8.0) and rotated at 1000 rpm. The electrode was held at −0.75 V vs SCE (SCE=saturated calomel electrode; SCE=+0.248V vs SHE at 20° C.) for 16 hours. At this potential, no direct reduction of the cofactor at the electrode is observed.

Figure 12:
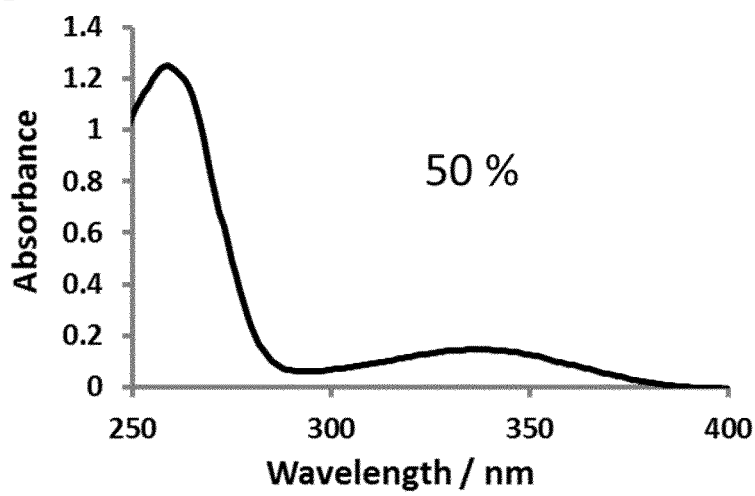
FIG. 12 shows UV-VIS (A) and $^1$H-NMR (B) spectra demonstrating generation of reduced cofactor ([4S-$^2$H]-NADH) from oxidised unlabelled cofactor (NAD$^+$) using methods of the invention wherein the electron source is a carbon electrode and the first polypeptide is *R. eutropha* soluble hydrogenase with an inactivated hydrogenase moiety (SEQ ID NOs: 1, 2, 31, 69) and the first polypeptide is adsorbed onto the carbon electrode.
Figure 12:
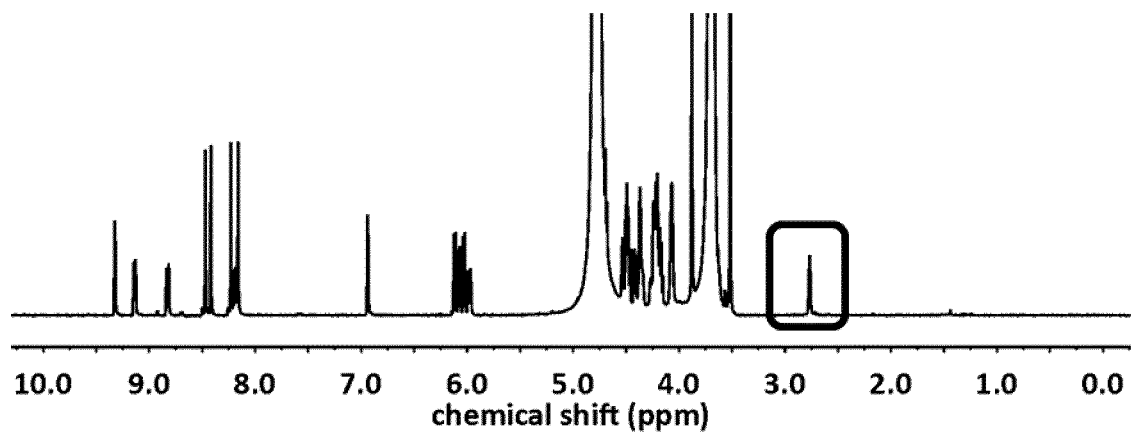
Figure 12:
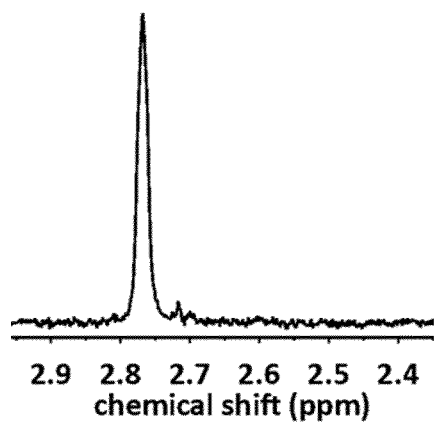

Product analysis as described in Example 1A showed a conversion of around 50% to NADH, with high selectivity (>95%) for the [4S-$^2$H]-NADH isotopomer (see FIGS. 12A, 12B and 12C).

The $^1$H NMR spectra shown in FIGS. 12B and 12C were generated with the following parameters: 400 MHz, 256 scans, LB=0.3 Hz, $^2$H$_2$O (p$^2$H 8.0), 298 K, multipoint baseline correction.

Example 4

This Example demonstrates the method of the invention for the generation of labelled-NADPH, with the electron source being a second polypeptide and the first and second polypeptides not being component parts of an enzyme complex.

The reaction was conducted in a similar manner to that described in Example 1A, but using *E. coli* hydrogenase 2 (SEQ ID NOs: 39-40) as the second polypeptide and HoxHYFE$^{341A+D467S}$U (SEQ ID NOs: 2, 30, 31, 70) as the first polypeptide.

The following conditions were used: 100 μg(C) with 6 μg of immobilised hydrogenase and 10 μg of immobilised NAD$^+$ reductase was suspended in 300 μL [$^2$H$_5$]-Tris.$^2$HCl (50 mM in $^2$H$_2$O, p$^2$H 8.0) containing 5 mM NADP$^+$ which had been pre-saturated with $^1$H$_2$ gas. The reaction solution was subsequently sealed in a pressure vessel under 2 bar of $^1$H$_2$ and rocked at 30 rpm for 16 hours at 20° C.

Figure 13:
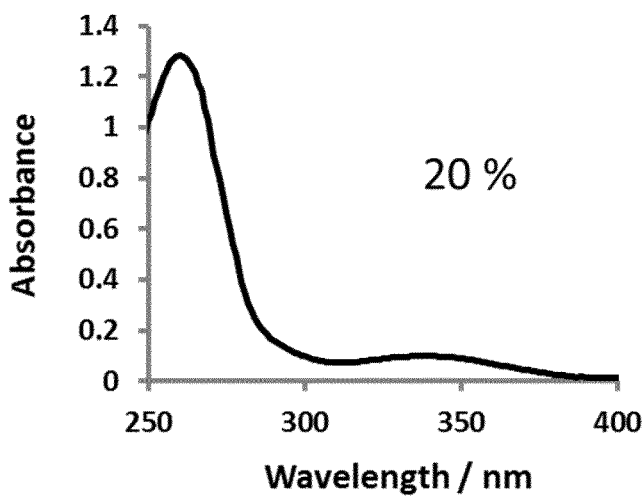
FIG. 13 shows UV-VIS (A) and $^1$H-NMR (B) spectra demonstrating generation of reduced cofactor ([4S-$^2$H]-NADPH) from oxidised unlabelled cofactor (NADP$^+$) using methods of the invention wherein the electron source is *E. coli* hydrogenase 2 (SEQ ID NOs: 39-40) and the first polypeptide is the soluble hydrogenase from *R. eutropha* (HoxHYFU, with D467S and E341A mutations in HoxF; SEQ ID NOs: 2, 30, 31, 70), and the first and second polypeptide are immobilized by adsorption onto carbon particles.
Figure 13:
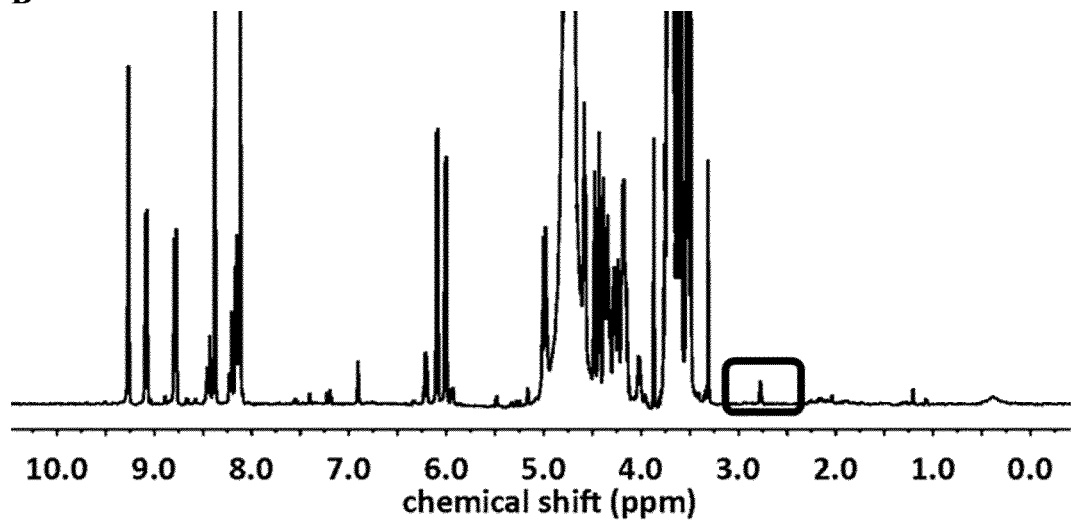
Figure 13:
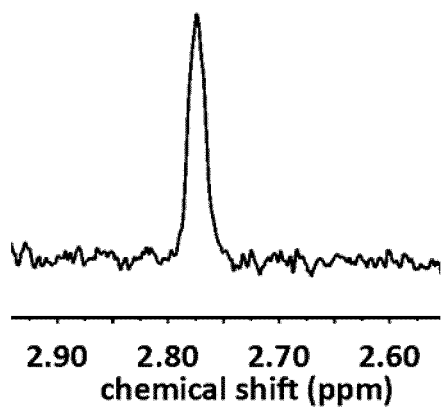

Product analysis as described in Example 1A showed a conversion of around 20% to NADPH, with high selectivity (>95%) for the [4S-$^2$H]-NADPH isotopomer (see FIGS. 13A, 13B and 13C).

The $^1$H NMR spectra shown in FIGS. 13B and 13C were generated with the following parameters: 400 MHz, 64 scans, LB=1.0 Hz, $^2$H$_2$O (p$^2$H 8.0), 298 K. Two individual runs were pooled together to make a sample of the required volume and concentration.

Example 5

This Example provides a systematic comparison of various embodiments of the methods of the invention for production of [4-$^2$H]-NADH. Catalysts were screened for activity in converting NAD$^+$ to [$^2$H]-NADH under various reaction conditions.

Figure 14:
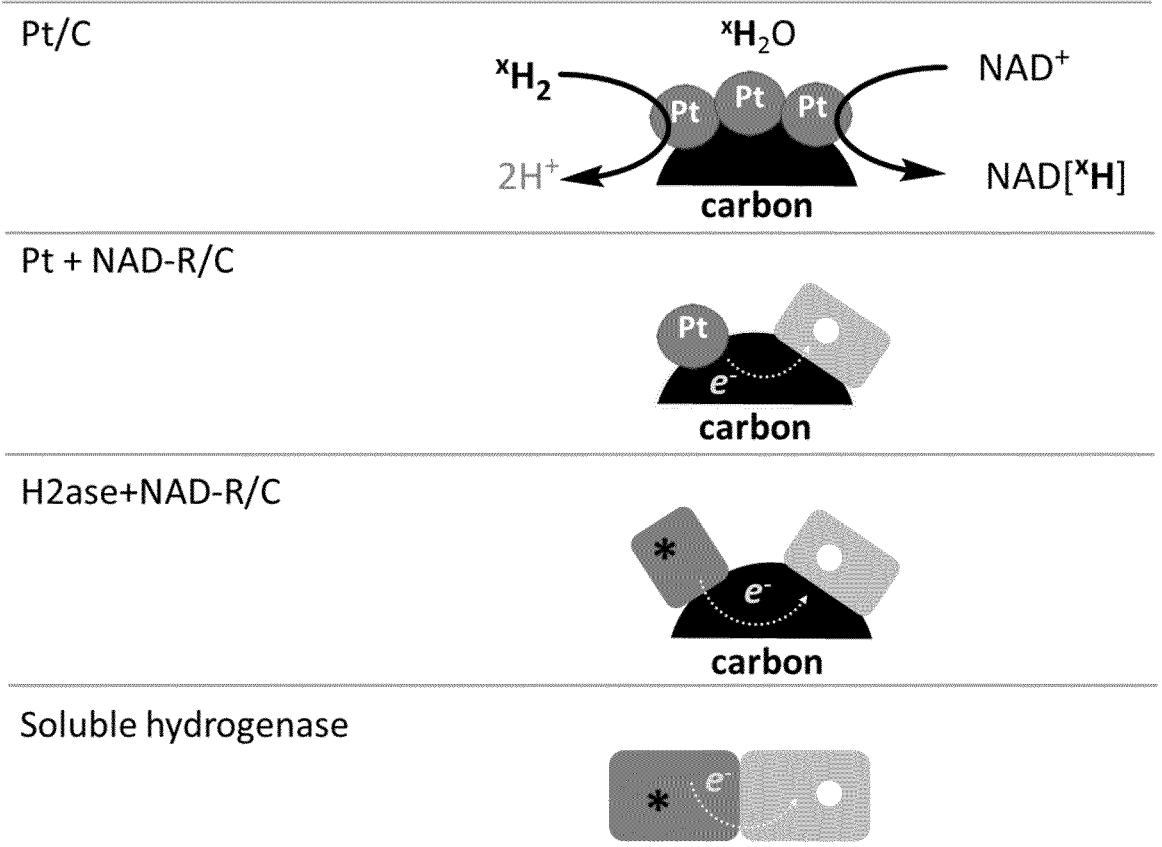
FIG. 14 shows schematic representations of methods investigated for generation of reduced labelled cofactor, [$^x$H]-NAD, from NAD$^+$. All systems include a catalyst for $H_2$ oxidation and a NAD$^+$ reducing catalyst.

Experiments were carried out to screen the selectivity of H$_2$-driven NAD$^+$ reduction by the routes illustrated in FIG. 14. Experiments compared reduction of NAD$^+$ by (i) Pt/C (platinum supported on carbon); (ii) Pt+NAD-R/C (platinum and NAD$^+$ reductase (SEQ ID NO: 1, 2, 31, 69) supported on carbon); (iii) H2ase+NAD-R/C (*E. coli* hydrogenase 2 (SEQ ID NOs: 39-40) and NAD$^+$ reductase (SEQ ID NO: 1, 2, 31, 69) supported on carbon) and (iv) soluble hydrogenase (SEQ ID NOs: 1, 2, 30, 31) alone. The chemical, isotopic and stereo-selectivity under a number of $^x$H$_2$ and $^x$H$_2$O conditions is reported in Table 1 below.

The heterogeneous catalysts were prepared as dispersions in aqueous buffer solution by sonication of either Pt/C (nominally 20 wt. %, Alfa Aesar) or carbon black (Black Pearls 2000, Cabot) at 20 mg mL$^{-1}$. Enzyme-modified particles were prepared by pre-mixing the required enzyme solutions before adding dispersed carbon particle solution as described in Example 1A. The particle-enzyme solutions were left at 4° C. for enzyme immobilisation. The heterogeneous systems were compared to a native enzyme, *R. eutropha* soluble hydrogenase (SEQ ID NOs: 1, 2, 30, 31), which was added to reactions in solution.

The catalysts were injected into $^x$H$_2$-saturated solution containing NAD$^+$ (4-5 mM) and left under 2 bar $^x$H$_2$ for 16 hours. The reactions were analysed using a combination of UV-vis spectroscopy, HPLC and NMR as described in Example 1A. Experiments were carried out on a small scale (500 μL) with low catalyst loading (100 μg carbon mL$^{-1}$). The mass of NAD reductase exposed to the carbon particles was kept constant and unabsorbed enzyme was removed by centrifugation before use.

Initial experiments were performed in protiated solvent ($^1$H$_2$O) and diprotium gas ($^1$H$_2$) to evaluate the selectivity of the catalysts towards the formation of 4-NADH. For each system the chemo-selectivity refers to the concentration of 4-NADH generated relative to the loss of NAD$^+$, as determined from HPLC traces (Table 1, Entries 1-4). Whilst the conversion of NAD$^+$ was of a similar magnitude for all catalysts (usually 60-90%), the selectivity towards the formation of the desired 4-NADH was highly variable for the Pt/C system. For this latter case, yellowing of the reaction solution and appearance of extra peaks in subsequent HPLC analysis were evidence of the formation of biologically inactive side products (likely including $NAD_2$ dimers, 2-/6-NADH, and over-reduced compounds) (FIG. 15A). Such behaviour is in contrast to those catalysts bearing an $NAD^+$ reductase moiety, (Pt+NAD-R/C, H2ase+NAD-R/C and SH), which showed clean formation of only 4-NADH (FIG. 15A). Without being bound by theory, the inventors believe that the high selectivity of the $NAD^+$ reductase is due to concerted $H^+ + 2e^-$ ($=H^-$) transfer from the flavin active site to the oxidised cofactor, preventing formation of radicals. The flavin and the $NAD^+$ are positioned such that hydride transfer only occurs to the 4 position on the nicotinamide ring thus only forming 4-NADH.

The Pt+NAD-R/C system also shows high selectivity for 4-NADH. This is particularly noteworthy, suggesting that there is rapid electron transfer from $H_2$ oxidation at Pt through the carbon particle to the $NAD^+$ reductase for selective $NAD^+$ reduction and that no unselective $NAD^+$ reduction at Pt occurs.

Analogous experiments were performed for each catalyst system with the same diprotium gas ($^1H_2$) as the reductant, but with deuterated solvent, $^2H_2O$ (Table 1, Entries 5-8). The same selectivity as observed for $NAD^+$ reduction in $^1H_2O$ was recorded. The extent of $^2H$ incorporation to generate [4-$^2H$]-NADH was analysed using NMR (FIG. 15B). The % isotopic selectivity refers to [4-$^2H$]-NADH as a percentage of 4-NADH. The non-enzymatic Pt/C system shows a mixture of H and $^2H$ incorporation where $^xH$ originates from $^1H_2$ gas (35%) or the $^2H_2O$ solution (65%), respectively. In contrast, in systems operating according to the methods of the invention (Pt+NAD-R/C, H2ase+NAD-R/C and soluble hydrogenase alone) the $^xH$ is exclusively taken from solution. This provides evidence that the flavin active site in the first polypeptide combines electrons from the FeS cluster chain with $^xH^+$ from solution and this hydride ($^xH^-$) is selectively transferred to the oxidised cofactor, generating only [4-$^2H$]-NADH.

The high level of $^2H$ incorporation observed for the Pt+NAD-R/C system further supports the observation that electrons from $H_2$ oxidation at Pt are rapidly transferred to the $NAD^+$ reductase for $NAD^+$ reduction as both the chemo and isotopic selectivity of the $NAD^+$ reductase are conserved.

TABLE 1

Catalyst screening for conversion of $NAD^+$ to [4-$^2H$]-NADH

| Entry | Catalyst | Reductant | Solvent[c] |
|---|---|---|---|
| 1 | Pt/C | $^1H_2$ | $^1H_2O$ |
| 2 | Pt + $NAD^+$ reductase/C | | |
| 3 | Hydrogenase + $NAD^+$reductase/C | | |
| 4[b] | Soluble hydrogenase | | |
| 5 | Pt/C | $^1H_2$ | $^2H_2O$ |
| 6 | Pt + $NAD^+$ reductase/C | | |
| 7 | Hydrogenase + $NAD^+$reductase/C | | |
| 8[b] | Soluble hydrogenase | | |

| Entry | % Conversion[d] | % Chemo-selectivity[e] | % Isotopic-selectivity[f] | % Stereo-selectivity[g] | Yield/mM[h] |
|---|---|---|---|---|---|
| 1 | 80 | 85 | — | — | |
| 2 | 90 | 100 | — | — | |
| 3 | 90 | 100 | — | — | |
| 4[b] | 90 | 100 | — | — | |
| 5 | 80 | 85 | 65 | 54 | 1.0 |
| 6 | 90 | 100 | 100 | 98 | 3.6 |
| 7 | 90 | 100 | 100 | 100 | 3.6 |
| 8[b] | 90 | 100 | 100 | 100 | 4.5 |

Reactions conducted on 500 μL scale with 4 mM NAD under 2 bar gas pressure for 16 hours and rocking at 15 rpm (unless otherwise specified); (b) 5 mM $NAD^+$; (c) $^1H_2O$=Tris-HCl (100 mM, pH 8.0), $^2H_2O$=$d_5$-[$^2H_5$]-Tris.$^2$HCl (100 mM, pD 8.0); (d) Conversion refers to loss of $NAD^+$, as determined by HPLC; (e) chemo-selectivity reported as the percentage of 4-NADH compared to the loss of $NAD^+$, as determined by HPLC; (f) isotopic-selectivity reported as the percent of labelled 4-NADH compared to total 4-NADH, as determined by NMR; (g) stereo-selectivity for [4S-$^2H$]-NADH compared to labelled 4-NADH, as determined by NMR; (h) overall yield of [4S-$^2H$]-NADH. Representative HPLC and NMR traces are shown in FIG. 15A,B.

As expected, the results in Table 1 confirm that bare Pt shows very poor selectivity towards 4-NADH under any conditions. The results in Table 1 show that much higher yields of [4S-$^2H$]-NADH are achieved using the Pt+NAD-R/C, H2ase+NAD-R/C and soluble hydrogenase systems according to the methods of the invention than are achieved using the purely chemical Pt/C system.

The reduced labelled cofactor, [4-$^2H$]-NADH, can be formed as either the R- or S-stereoisomer, and the stereochemistry of the reduced cofactor can be assigned using NMR as described above. The results summarised in Table 1 demonstrate that the purely chemical Pt/C system gives a roughly racemic product. By contrast, all the systems using the $NAD^+$ reductase for $NAD^+$ reduction in accordance with the methods of the invention selectively generate [4S-$^2H$]-NADH.

Without being bound by theory, the inventors believe that the stereoselectivity of the biological systems using $NAD^+$ reductase for $NAD^+$ reduction in accordance with the methods of the invention is a consequence of the structure of the active site of the enzyme. Inspection of the crystal structure of the structurally similar protein, Complex 1 from *Thermus thermophilus* (Tt) and comparison with a homology model of the *R. eutropha* HoxFU protein (SEQ ID NOs: 1, 2) (FIG. 16) shows the interaction of the NAD$^+$ reductase flavin active site and the reduced cofactor and provides evidence that a hydride from the FMN cofactor contained in the protein would be transferred to the si-face of the nicotinamide ring to preferentially generate [4S-$^2$H]-NADH.

Example 6

This Example confirms that the isotopic composition of the reaction medium (rather than the reductant) determines the isotopic composition of the reaction product.

The mechanisms of [4-$^x$H]-NADH generation by the heterogeneous systems described in Example 5 were further probed by comparing $^x$H incorporation under either $^1$H$_2$ or $^2$H$_2$ in a series of $^1$H$_2$O:$^2$H$_2$O mixtures (100:0, 75:25, 50:50, 25:75, and 0:100 v/v %).

Experiments compared reduction of NAD by (i) Pt/C (platinum supported on carbon); (ii) Pt+NAD-R/C (platinum and NAD$^+$ reductase (SEQ ID NOs: 1, 2, 31, 69) supported on carbon) and (iii) H2ase+NAD-R/C (*E. coli* hydrogenase 1 (SEQ ID NOs: 37-38) and NAD$^+$ reductase (SEQ ID NOs: 1, 2, 31, 69) supported on carbon). The isotopic selectivity under a number of $^x$H$_2$ and $^x$H$_2$O conditions is reported in FIG. 17.

The required solution were prepared by mixing solutions of Tris-HCl (100 mM, pH 8.0) in $^1$H$_2$O with [$^2$H$_5$]-Tris.$^2$HCl (100 mM, pD 8.0) in $^2$H$_2$O in the appropriate volumes. The catalysts were injected into $^x$H$_2$-saturated solution containing NAD$^+$ (4 mM) and left under 2 bar $^x$H$_2$ for 16 hours. Experiments were carried out on a small scale (500 μL) with low catalyst loading (100 μg carbon mL). The reactions were analysed using a combination HPLC and NMR as described in Example 1A. The yield of reduced cofactor (of any isotopic composition) was between 50-90 mol % in all cases. The %$^2$H incorporation was determined by comparison of the relative intensities of the peaks corresponding to [4S-$^2$H]-NADH, [4R-$^2$H]-NADH, and [4-$^1$H$_2$]-NADH in the $^1$H NMR spectrum.

The results in FIG. 17 show that in the methods of the invention, $^2$H incorporation for systems including a NAD$^+$ reductase as the first polypeptide exclusively reflects the ratio of $^2$H:$^1$H available in the solvent (black diamonds and light grey squares). In contrast, the purely chemical system (Pt/C) (grey triangles) shows a strong bias towards incorporation of $^1$H under all conditions.

The results in FIG. 17 show that the Pt/C system is complex and non-selective in its behaviour, taking the $^x$H moiety from both the reductant gas and the reaction solution. Consequently, for the Pt/C system, 100% $^2$H incorporation into the NADH can only be achieved when both 1000% $^2$H$_2$O solvent and 1000% $^2$H$_2$ gas are both employed. In contrast, the biological systems operating in accordance with the methods of the invention take the $^x$H label entirely from the reaction medium. Surprisingly, the results also show that production of [4-$^2$H]-NADH is as effective with $^2$H$_2$ as the reductant as it is with $^1$H$_2$.

This Example thus shows that in the methods of the invention, the isotopic composition of the reaction medium (rather than the reductant) determines in all cases the isotopic composition of the reaction product. A desired ratio of labelled:unlabelled cofactor can therefore be achieved by controlling the isotopic composition of the reaction medium.

Example 7

This Example demonstrates that the methods of the invention can be used to supply labelled cofactor to a NAD(P) H-dependent oxidoreductase in order to generate a chemo- and stereo-selectively labelled product. Four examples are used to verify that the methods of the invention are capable of generating and recycling deuterium-labelled cofactors to drive two alcohol dehydrogenases (Johnson Matthey R-selective ADH101 and S-selective ADH 105), an ene reductase (Johnson Matthey ENE 107) and an amino acid dehydrogenase (Sigma L-alanine dehydrogenase) in the conversion of unlabelled substrate to labelled product.

Firstly, an R-selective ADH and an S-selective ADH (ADH101 and ADH105 respectively) were used to deliver a deuteride to opposing faces of acetophenone, thereby separately generating both enantiomers of [$^2$H]-phenylethanol.

Reactions were carried out using around 100 μg(C) catalyst with 10-20 μg of *E. coli* hydrogenase 1 (SEQ ID NOs: 37-38) and I64A (SEQ ID NOs: 1, 2, 31, 69) prepared according to the methodologies in Example 1). The catalyst was added to 500 μL of [$^2$H$_5$]-Tris.$^2$HCl (100 mM, p$^2$H 8.0) containing 0.1 mM NAD$^+$, 10 mM acetophenone, and 5 vol. % [$^2$H$_6$]-DMSO pre-saturated with $^1$H$_2$ gas. 0.5 mg of the required alcohol dehydrogenase was then added and the reaction solution was sealed in a shaker plate under a steady stream of $^1$H$_2$ and shaken at 750 rpm for 20 hours at 20° C.

The reaction was analysed qualitatively by $^1$H NMR and extracted into heptane for chiral HPLC (FIGS. 18Ai and 18Bi). The HPLC shows that the conversion has taken place and that the correct enantiomers have been produced (R- for ADH101 and S- for ADH105). The absence of a multiplet peak at δ=4.91 ppm in the $^1$H NMR spectrum, and collapse of coupling in the peak at δ=1.47 ppm (relative to $^1$H-standard), are diagnostic of the correct isotopologue having been produced (FIGS. 18Aii and 18Bii). Both methods of analysis indicate that the conversions are greater than 50% and selectivity for the desired deuterated enantiomer are >95%. Such results indicate a cofactor turnover of >50.

A second reaction was tested employing an ene-reductase, to further demonstrate the chemoselectivity of the invention by the reduction of a C=C in the presence of C=O. In this reaction dimethyl itaconate was converted to dimethyl [2-$^2$H]-2-([$^2$H$_1$]methyl) succinate. The reactions conditions were 200 μg(C) catalyst with 5-10 μg of *E. coli* hydrogenase 1 (SEQ ID NOs: 37-38) and I64A (SEQ ID NOs: 1, 2, 31, 69) co-immobilised on it (prepared as above). 500 μL of [$^2$H$_5$]-Tris.$^2$HCl (100 mM, p$^2$H 8.0) containing 0.5 mM NAD$^+$, 5 mM dimethyl itaconate, and 2 vol. % [$^2$H$_6$]-DMSO presaturated with $^1$H$_2$ gas charged with the catalyst. 0.5 mg of ene reductase was added and the reaction solution was sealed in a shaker plate under a steady stream of $^1$H$_2$ and shaken at 500 rpm for 16 hours at 20° C.

The reaction was analysed qualitatively by $^1$H NMR and extracted into EtOAC for GC (FIG. 18C). The GC shows that the conversion has taken place. The absence of a multiplet peak at δ=2.95 ppm, and collapse of coupling in peaks at δ=2.62 ppm and δ=1.19 ppm in the $^1$H NMR spectrum (relative to $^1$H-standard), are diagnostic of the correct isotopologue having been produced. Both methods of analysis indicate that the conversions are around 20% and selectivity for the desired deuterated enantiomer are >90%. Such results indicate a cofactor turnover of around 4.

Finally, a reaction was conducted to demonstrate the ability of the catalyst in a reductive amination reaction, involving the conversion of an alpha-keto acid (pyruvate) to a deuterated amino acid ([2S-$^2$H]-alanine). In these reactions 400 μg(C) catalyst with 20-40 μg of hydrogenase 1 (SEQ ID NOs: 37-38) and I64A (SEQ ID NOs: 1, 2, 31, 69) co-immobilised on it (prepared as above). 500 μL of [$^2$H$_{11}$]-Tris.$^2$HCl (100 mM, p$^2$H 8.0) containing 0.5 mM NAD$^+$, 5 mM sodium pyruvate, and 25 mM $NH_4Cl$ was presaturated with $^1H_2$ gas and charged with the catalyst. 0.5 mg of L-alanine dehydrogenase was added and the reaction solution was sealed in a shaker plate under a steady stream of $^1H_2$ and shaken at 500 rpm for 16 hours at 20° C.

The reaction was analysed qualitatively by $^1H$ NMR. The absence of a multiplet peak at δ=3.83 ppm, and collapse of coupling in the peak at δ=1.45 ppm in the $^1H$ NMR spectrum (relative to $^1H$-standard), are diagnostic of the correct isotopologue having been produced (see FIG. 18D). The complete disappearance of the peak corresponding to the pyruvate starting material (which remained in the control experiment) indicates that the conversion to alanine is high, with the maximum cofactor turnover of 10 having been achieved. The selectivity for [2S-$^2H$]-alanine appears also to be high (around 85%).

A summary of the reactions demonstrated is shown in FIG. 18E.

Example 8

This Example demonstrates that the methods of the invention can be used to synthesize a range of labelled cofactors.

The results above demonstrate that the methods of the invention can selectively generate the S isomer of the deuterium labelled cofactor, (i.e. [4S-$^2H$]-NADH, and that this cofactor can be used by an R-selective alcohol dehydrogenase (ADH) for reductive deuterium addition to a ketone. However, for a number of applications for examples in mechanistic studies it is desirable to have access to other deuterium labelled cofactors.

FIG. 19 details routes to [4-$^2H$]-NA(P)D$^+$, [4-$^2H$]-NAD(P)H, [4R-$^2H$]-NAD(P)H, and [4S-$^2H$]-NAD(P)H using the methods of the invention. [4S-$^2H$]-NAD(P)H can be obtained from NAD$^+$ using the methods of the invention described above. If [4S-$^2H$]-NAD(P)H is provided to a S-selective oxidoreductase, the $^2H$ label is not incorporated into the reduced product (FIG. 19, Step B), and the resulting cofactor is the labelled oxidised cofactor, [4-$^2H$]-NA(P)D$^+$. The labelled oxidised cofactor can be further reduced using the methods of the invention to obtain the doubly-reduced cofactor, ([4-$^2H_2$]NAD(P)H (FIG. 19, step D). Alternatively, analogous methods to those of the invention but conducted in unlabelled solvent (e.g. $^1H_2O$) can be used to reduce the labelled oxidised cofactor, [4-$^2H$]-NA(P)D$^+$ to generate [4R-$^2H$]NAD(P)H (FIG. 19, step C). If the oxidoreductase used is immobilised on a solid surface such as carbon particles it can be easily removed from solution e.g. by filtration leaving the organic product and any unreacted reactants behind. The desired cofactor can easily be isolated by evaporation of the aqueous solution. The absence of labelled reductant in solution significantly simplifies isolation of the cofactors after each step.

The above methods were demonstrated using the H2ase+NAD-R/C system for selective NAD$^+$ reduction. This system was chosen due to its selectivity and the ease of separation of the catalyst from the reaction mixtures. Any of the systems in accordance with the methods of invention can be used to generate the cofactors.

The general scheme shown in FIG. 19 was used to prepare different isotopologues of NADH (in oxidised and reduced forms). In brief, after preparing [4S-$^2H$]-NADH according to the methods of the invention, the [4S-$^2H$]-NADH was re-oxidised by reaction with excess AcPh and an immobilised ADH105 (an S-selective enzyme), to leave [4-$^2H$]-NAD$^+$. Following removal of unreacted ADH101 (an R-selective enzyme) and the side-product PhEtOH, the [4-$^2H$]-NAD$^+$ was transferred to either $^1H_2O$ or $^2H_2O$ solutions. Further reduction using the H2ase+NAD-R/C system in the presence of $H_2$, yielded the cofactors [4-$^2H_2$]-NADH (when a $^2H_2O$ solvent was used) and [4R-$^2H$]-NADH (when a $^1H_2O$ solvent was used), respectively.

The following conditions were used in the reactions (using FIG. 19 for step labels):

Step A: Synthesis of [4S-$^2H$]-NADH from [4-$^1H$]-NAD$^+$

100 μg(C) catalyst with 20-40 μg of *E. coli* hydrogenase 1 (SEQ ID NOs: 37-38) and I64A (SEQ ID NOs: 1, 2, 31, 69) co-immobilised on it (prepared as previously) was added to 500 μL of [$^2H_5$]-Tris.$^2HCl$ (100 mM, p$^2H$ 8.0) containing 4 mM NAD$^+$, which had been presaturated with $^1H_2$ gas. The reaction solution was sealed under 2 bar $H_2$ for 16 hours, whilst rocking at 30 rpm. Analysis by UV-spectrophotometry and $^1H$ NMR spectroscopy indicated complete conversion of the cofactor to the desired [4S-$^2H$]-NADH form.

Step B: Synthesis of [4-$^2H$]-NAD$^+$ from [4S-$^2H$]-NADH

Johnson Matthey alcohol dehydrogenase (ADH105) was immobilised on carbon particles by suspending a concentrated solution (20 mg/mL) in an equal volume of sonicated BP2000 particles (20 mg/mL) for 30 minutes at 4° C. Following centrifugation (12,000 rpm, 5 minutes) the supernatant was removed, and the particles washed once in 100 μL $^2H_2O$. The ADH particles were then added to a deoxygenated solution of [4S-$^2H$]-NADH (1 mL, 4 mM) in [$^2H_5$]-Tris.$^2HCl$ (100 mM, p$^2H$ 8.0), followed by neat acetophenone (10 mM), and the whole solution was shaken under $N_2$ for a period of 5 days. The ADH particles were removed by centrifugation (12,000 rpm, 5 minutes) and the sacrificial acetophenone/phenylethanol removed by extraction with $C^2HCl_3$ (3×500 μL). Analysis by UV-spectrophotometry and $^1H$ NMR spectroscopy indicated >90% conversion of the cofactor to the desired [4-$^2H$]-NAD$^+$ form, with the absence of a doublet at δ=8.8 ppm being evidence of the labelling at the 4-position.

Step C: Synthesis of [4-$^2H_2$]-NADH from [4-$^2H$]-NAD$^+$

Particles of the same constitution as Step A were added at a loading of 200 μg(C)/mL to a solution of [4-$^2H_2$]-NADH (500 μL, 3 mM) that had been pre-saturated with $^1H_2$ gas. The solution was then sealed under 2 bar $H_2$ and rocked at 30 rpm for 16 hours. Analysis by UV-spectrophotometry and $^1H$ NMR spectroscopy indicated >90% conversion of the cofactor to the desired [4-$^2H_2$]-NAD$^+$ form, with the relative absence of signals at δ=2.6-2.8 ppm being evidence of the complete labelling.

Step D: Synthesis of [4R-$^2H$]-NADH from [4-$^2H$]-NAD$^+$

A solution of [4-$^2H$]-NAD$^+$ (1 mL, 3 mM) in [$^2H_5$]-Tris.$^2HCl$ (100 mM, p$^2H$ 8.0) was prepared according to Step B, except using free alcohol dehydrogenase (rather than immobilised). To the solution was added an equal volume of acetonitrile, and precipitated alcohol dehydrogenase removed by centrifugation (12,000 rpm, 5 minutes). The solution was gently evaporated to dryness on a rotary evaporator, and the solid re-dissolved in deionised $^1H_2O$.

The evaporation and re-dissolution steps were repeated twice more. The solution was evaporated a final time, before being transferred to a glovebox and being re-dissolved in deoxygenated deionised $^1H_2O$ (1 mL). The cofactor solution was subsequently saturated with $^1H_2$ gas. 200 μgC catalyst with 30-40 μg of *E. coli* hydrogenase 2 (SEQ ID NOs: 39, 40) and NAD$^+$ reductase immobilised on the surface was added to solution, which was subsequently sealed under 2 bar $H_2$ and shaken at 30 rpm for 18 hours. The carbon catalyst was removed by centrifugation (12,000 rpm, 5 minutes) and the solution analysed by UV-spectrophotometry and $^1H$ NMR spectroscopy. The analysis indicated around 60% conversion to the reduced cofactor, with a high selectivity (>90%) for the [4R-$^2$H]-NADH form, as evidence by the signal at δ=2.66 ppm.

Each of the cofactors produced was analysed using UV-vis spectroscopy and NMR as described in Example 1A. Data are shown in FIG. 20.

Example 9

This Example provides further verification that the methods of the invention can be used to supply labelled cofactor to a NAD(P)H-dependent oxidoreductase in order to generate a chemo- and stereo-selectively labelled product.

In the results discussed below, the %$^2$H incorporation achieved at the target sites using this approach was between 93-99%. The demonstrated ability to work across diverse functional group space indicates the utility of this approach to generate libraries of well-defined [$^2$H]-labelled chiral building blocks, e.g. for fine chemical synthesis, for small molecules for analytical applications, or for later-stage deuteration of pharmaceutical precursors, particularly where biocatalysis is already implemented in the reaction sequence.

All experiments in this Example were conducted using the biocatalyst system of the invention with *E. coli* hydrogenase 1 (SEQ ID Nos: 37-38) and NAD$^+$ reductase I64A (SEQ ID Nos: 1, 2, 31, 69) prepared as described above. Commercial enzymes were received in lyophilized form and used without further purification. Catalyst system was prepared by sonication of a 20 mg/mL suspension of BP2000 carbon black in Tris-HCl buffer for 5×15 minutes (with agitation of the solution in between). Equal volumes of hydrogenase (4 mg/mL) and NAD$^+$ reductase (1.4 mg/mL) were then pre-mixed together, and added immediately to an aliquot of sonicated carbon. After standing at 4° C. for 60 minutes, the solid catalyst was then removed from the preparatory solution by centrifugation (10,000×g, 5 mins) before being re-suspended in deuterated or non-deuterated buffer as required. Enzyme loadings: hydrogenase loading of 39 pmoles per 100 μg of carbon, NAD$^+$ reductase loading of 65 pmoles per 100 μg of carbon.

Deuterated buffer ($^2H_5$)-Tris-$^2$HCl was prepared by dissolving the required amount of Trizma® base in $^2H_2O$ and then evaporating to dryness. After repeating twice more, the pD (p$^2$H) of the Tris solution was adjusted to 8.0 by the addition of small aliquots of $^2$HCl (3.0 M) prior to deoxygenation by sparging with dry $N_2$. Solutions of fully deuterated ($^2H_{11}$)-Tris-$^2$HCl were also used for analytical purposes, and were prepared in a similar manner. $^1H$ NMR spectroscopy indicated that the final %$^2H_2O$ of deuterated buffer solutions was not below 99 mol. % (unless specifically diluted with $^1H_2O$). Other conditions and analysis conducted as described above unless otherwise stated.

GC-FID was carried out on a ThermoScientific Trace 1310. GC-MS was carried out on an Agilent 7890B GC coupled to an Agilent 7200 Accurate Mass Q-ToF MS operating under EI mode. For both machines, injections were carried out by means of a robotic autosampler. The relevant columns and chromatography conditions are stated as required.

All HPLC was conducted on a Shimadzu UFLC LC-20AD Prominence liquid chromatograph equipped with a dual wavelength UV-spectrophotometric detector and a robotic autosampler. MilliQ water and HPLC grade solvents were used throughout. The relevant columns and chromatography conditions are stated as required.

Example 9.1

In this reaction pyruvate was converted to [2 L-$^2$H]-lactate. The reactions were conducted in 0.5 mL of ($^2H_1$)-Tris-$^2$HCl (100 mM, p$^2$H 8.0) containing 5 mM sodium pyruvate, 0.5 mM NAD$^+$, and 500 μg of L-lactate dehydrogenase (Merck). The mixture was presaturated with $H_2$ gas prior to addition of the heterogeneous biocatalytic system at a loading of 400 μg. The reactions were shaken at 500 rpm under a steady flow of $H_2$ for 16 hours. The reaction was analysed by GC, MS and NMR.

GC-FID: analytes were first derivatised and then subjected to analysis by GC-FID. 100 μL of reaction mixture was combined with 23 μL of EtOH and 13 μL of pyridine by means of a vortex mixer. Subsequently, 15 μL of ethyl chloroformate was added, and the reaction allowed to proceed until no further $CO_2$ was evolved. The derivatised pyruvate/lactate was extracted with 100 μL of $C^2HCl_3$, and transferred to a glass vial for analysis by GC. Conditions as below:

Column: DB-1701 (Agilent), 30 m length, 0.25 mm diameter, 0.25 μm film thickness; Carrier: He (CP grade), 1.1 mL minute (constant flow); Inlet temperature: 250° C.; Injection conditions: Splitless with split flow 50 mL/min, splitless time 0.7 mins, purge 5 mL/min; Injection volume: 0.5 μL; Detection: FID; Detector temperature: 200° C.; Detection gases: $H_2$ (35 mL/min), air (350 mL/min), makeup $N_2$ (40 mL/min); Oven heating profile:

0-2 mins, Hold at 45° C.
2-15 mins, Ramp to 250° C. at 16° C./min
15-20 mins, Hold at 250° C. for 5 mins Chiral GC-FID: The ee of the lactate product was determined by first derivatising with a chiral alcohol ((2R,3R)-(−)-2,3-butanediol) and then analysing the reaction solution by GC-FID. 100 μL of reaction mixture was combined with 35 μL of (2R,3R)-(−)-2,3-butanediol and 13 μL of pyridine by means of a vortex mixer. Subsequently, 15 μL of ethyl chloroformate was added, and the reaction allowed to proceed until no further $CO_2$ was evolved. Commercial standards of L- and D-lactate were similarly derivatised for comparison. The derivatised analytes were then extracted with 100 μL of $C^2HCl_3$, and transferred to a glass vial for analysis by GC. The formation of diastereomeric products allowed for the analysis to be conducted on an achiral GC column. Conditions as below:

Column: DB-1701 (Agilent), 30 m length, 0.25 mm diameter, 0.25 μm film thickness; Carrier: He (CP grade), 170 kPa (constant pressure); Inlet temperature: 230° C.; Injection conditions: Splitless with split flow 50 mL/min, splitless time 0.7 mins, purge 5 mL/min; Injection volume: 0.5 μL; Detection: FID;

Detector temperature: 250° C.; Detection gases: $H_2$ (35 mL/min), air (350 mL/min), makeup $N_2$ (40 mL/min); Oven heating profile:

| Time (minutes) | Temperature |
|---|---|
| 0 → 5 | Hold at 100° C. |
| 5 → 30 | Ramp to 150° C. at 2° C./min |
| 30 → 35 | Hold at 150° C. for 5 minutes |
| 35 → 41.5 | Ramp to 280° C. at 2° C./min |
| 41.5 → 46.5 | Hold at 280° C. for 5 minutes |

GC-MS: Following analysis by GC-FID the EtOH/ethyl chloroformate derivatised reaction solutions were further analysed by GC-MS according to the method shown below. A commercial sample of sodium lactate of natural isotopic abundance was derivatised and analysed in an identical manner for comparison. Conditions as below:

Column: DB-1701 (agilent), 30 m length, 0.25 mm diameter, 0.25 μm (film thickness); Carrier: He (CP grade), 100 kPa (constant pressure); Inlet temperature: 250° C.; Injection conditions: Split (10:1) with split flow 12 mL/min, splitless time 0.7 mins, purge 5 mL/min; Detection: Mass Spec, EI (70 eV), source temperature 230° C. Scan range 50-650 amu with a scan rate of 5 Hz. Transfer line 300° C.; Oven heating profile:

| Time (minutes) | Temperature |
|---|---|
| 0 → 5 | Hold at 50° C. |
| 5 → 16.3 | Ramp to 275° C. at 20° C./min |
| 16.3 → 18.8 | Hold at 275° C. for 2.5 mins |

$^1$H NMR spectroscopy: After removal of the catalyst, the unmodified reaction solutions were analysed by $^1$H NMR spectroscopy at 500 MHz and 298 K.

Results are shown in FIG. 21.

The very high conversion of pyruvate to lactate was confirmed by GC-FID analysis of the derivatised reaction solution (see FIG. 21(a)(ii)). Here, the peak corresponding to the pyruvate starting material (detected as ethyl pyruvate, RT=5.85 minutes) disappeared almost entirely in the biohydrogenation reaction compared to a control in which no catalyst was included. The appearance of a peak at RT=12.55 minutes, corresponding to the derivatised form of lactate, provided confirmation that the reaction had proceeded to 95% completion. Similarly, derivatisation of L- and D-lactate with a second chiral alcohol affords diastereomeric products with differing retention times (L=25.5 mins, R=25.3 mins, see FIG. 21(b)(ii)). Hence, by comparison, it could be confirmed that the lactate produced in the biohydrogenation was entirely of the L-form, within the limits of detection (>99%). The site and extent of $^2$H labelling on the L-lactate product was determined through a combination of GC-MS and $^1$H NMR spectroscopy, FIGS. 21(c) and (d), respectively. In the $^1$H NMR spectrum, the signal corresponding to the —CH$_3$ protons could be used to detect $^2$H labelling on the α-carbon of L-lactate, forming a doublet (3=1.34 ppm, J=9.2 Hz) when a $^1$H nucleus was at the α-position, and a broad singlet (3=1.34 ppm) when a $^2$H was present. Similarly, a quartet (δ=4.13 ppm, J=8.7 Hz) corresponding to the α-$^1$H signal was present in non-deuterated samples, but absent in those with a $^2$H-label. Deuterium exchange on the —CH$_3$ group to yield —CH$_2$$^2$H was also evidenced by a smaller, broad shoulder at 3=1.32 (although it is not possible to determine the extent of complete deuterium exchange of the —CH$_3$ group via this method). Analysis of the ethoxycarbonyl ethylester derivatised lactate by mass spectroscopy gave a series of diagnostic peaks, notably the molecular ions at m/z=190.1 [$C_8H_{15}O_5^{+•}$] and m/z=191.1 [$^2$H—$C_8H_{14}O_5^{+•}$], which could be used to determine the extent of $^2$H incorporation at the α-position as >97%. The peak at m/z=192.1 could also be used to estimate the extent of formation of [$^2$H$_2$—$C_8H_{13}O_5^+$ •] (FIG. 21(e)).

Example 9.2

In this reaction phenylpyruvate was converted to [2,3-$^2$H$_3$]-L-phenylalanine. Phenylpyruvic acid (5 mM) in 0.5 mL of ($^2$H$_{11}$)-Tris-$^2$HCl (100 mM, p$^2$H 8.0) was first allowed to stand for 24 hours in order to exchange labile protons for deuterons, before the addition of 25 mM NH$_4$Cl, 0.5 mM NAD$^+$, and 500 μg of L-phenylalanine dehydrogenase. The mixture was presaturated with H$_2$ gas prior to addition of the Bio-catalyst systems at a loading of 400 μg. The reaction was then shaken at 500 rpm under a steady flow of H$_2$ for 16 hours.

GC-FID: In order to determine the conversion of phenylpyruvate to alanine, the analytes were first derivatised and then subjected to analysis by GC-FID. 100 μL of reaction mixture was combined with 23 μL of EtOH and 13 μL of pyridine by means of a vortex mixer. Subsequently, 15 μL of ethyl chloroformate was added, and the reaction allowed to proceed until no further CO$_2$ was evolved. The derivatised pyruvate/alanine was extracted with 100 μL of C$^2$HCl$_3$, and transferred to a glass vial for analysis by GC. Conditions as below:

Column: DB-1701 (Agilent), 30 m length, 0.25 mm diameter, 0.25 μm film thickness; Carrier: He (CP grade), 170 kPa (constant pressure); Inlet temperature: 230° C.; Injection conditions: Splitless with split flow 50 mL/min, splitless time 0.7 mins, purge 5 mL/min; Injection volume: 0.5 μL; Detection: FID;

Detector temperature: 250° C.; Detection gases: H$_2$ (35 mL/min), air (350 mL/min), makeup N$_2$ (40 mL/min); Oven heating profile:

| Time (minutes) | Temperature |
|---|---|
| 0 → 5 | Hold at 100° C. |
| 5 →30 | Ramp to 150° C. at 2° C./min |
| 30 → 35 | Hold at 150° C. for 5 minutes |
| 35 → 41.5 | Ramp to 280° C. at 2° C./min |
| 41.5 → 46.5 | Hold at 280° C. for 5 minutes |

GC-MS: The N-ethoxycarbonyl ethylester-derivatised samples from the GC-FID analysis described (see above) were subsequently analysed by GC-MS according to the method below. A commercial sample of L-phenylalanine of natural isotopic abundance was derivatised and analysed in an identical manner for comparison. Conditions as below:
Column: DB-1701 (agilent), 30 m length, 0.25 mm diameter, 0.25 μm (film thickness); Carrier: He (CP grade), 100 kPa (constant pressure); Inlet temperature: 250° C.; Injection conditions: Split (10:1) with split flow 12 mL/min, splitless time 0.7 mins, purge 5 mL/min; Detection: Mass Spec, EI (70 eV), source temperature 230° C. Scan range 50-650 amu with a scan rate of 5 Hz. Transfer line 300° C.; Oven heating profile:

| Time (minutes) | Temperature |
|---|---|
| 0 → 5 | Hold at 50° C. |
| 5 → 16.3 | Ramp to 275° C. at 20° C./min |
| 16.3 → 18.8 | Hold at 275° C. for 2.5 mins |

Chiral GC-FID: Derivatisation of the samples for analysis by chiral GC-FID to establish the enantiomeric excess of the reaction, was carried out as described above, except with nPrOH (30 μL) substituted for EtOH. Chiral GC-FID was then carried out according to the following method. Conditions as below:

Column: CP-Chirasil-Dex CB (Agilent), 25 m length, 0.25 mm diameter, 0.25 μm (film thickness), fitted with a guard of 10 m undeactivated fused silica of the same diameter; Carrier: He (CP grade), 2 mL/min (constant flow); Inlet temperature: 200° C.; Injection conditions: Splitless with split flow 80 mL/min, splitless time 0.8 mins, purge 5 mL/min.; Injection volume=0.3 μL; Detection: FID; Detector temperature: 200° C.; Detection gases: $H_2$ (35 mL/min), air (350 mL/min), makeup $N_2$ (40 mL/min); Oven heating profile:

| Time (minutes) | Temperature |
| --- | --- |
| 0 → 5 | Hold at 70° C. |
| 5 → 115 | Ramp to 180° C. at 1° C./min |
| 115 → 130 | Hold at 180° C. for 15 minutes |

$^1$H NMR spectroscopy: After removal of the catalyst, the unmodified reaction solutions were analysed by $^1$H NMR spectroscopy at 500 MHz and 298 K.

Results are shown in FIG. 22.

The very high conversion of phenylpyruvate to phenylalanine was confirmed by GC-FID analysis of the derivatised reaction solution (see FIG. 22(a)(ii)). Here, the peak corresponding to the derivatised phenylpyruvate starting material (RT=15.05 minutes) disappeared almost entirely in the bio-hydrogenation reaction compared to a control in which no catalyst was included. The appearance of a peak (RT=14.94 minutes) corresponding to the N-ethoxycarbonyl ethylester derivatised form of phenylalanine, provided confirmation that the reaction had proceeded to ≥99% completion. Similarly, derivatisation of commercial standards of L- and D-phenylalanine and analysis on a chiral GC-column gave rise to two peaks (L=91.78 minutes, D=92.00 minutes, see FIG. 22(b)(ii)). Hence, it could be confirmed that the alanine produced in the biohydrogenation was entirely of the L-form, within the limits of detection. The site and extent of $^2$H labelling on the L-phenylalanine product was determined through a combination of GC-MS and $^1$H NMR spectroscopy (see FIGS. 22(c) and (d) respectively). In this case, the phenylpyruvate starting material was left in the reaction solution to allow exchange of the labile protons for deuterons in the solvent. Following reduction by the biocatalyst system and L-phenylalanine dehydrogenase, the resulting product was labelled on both α- and β-positions. Accordingly, the signals at δ=4.01 ppm (dd, 1H, αH, J=4.1 Hz, J=6.2 Hz), δ=3.31 ppm (dd, 1H, βH, J=4.1 Hz, J=11.7 Hz), and δ=3.14 ppm (dd, 1H, βH, J=6.4 Hz, J=11.7 Hz) which were all observed in the commercial standard of L-phenylalanine, were found to be absent in the reaction product. Similarly, GC-MS analysis of the ethoxycarbonyl ethylester-derivative of phenylalanine demonstrated the expected +3 mass shift of the molecular from m/z 220.1 to 223.1 (see FIG. 22(c)).

Example 9.3

In this reaction cinnamaldehyde was selectively deuterated using alcohol dehydrogenase (reaction A), ene reductase (reaction B), or both ene reductase and subsequently alcohol dehydrogenase (reaction C).

Cinnamaldehyde was used as a substrate (bearing an alpha, beta-unsaturated aldehyde moiety) to investigate the chemoselectivity of the $H_2$-driven labelling strategy. Conventional hydrogenation of this substrate typically results in a mixture of products (hydrocinnamaldehyde, cinnamyl alcohol and 3-phenyl-1-propanol) (56), however, by using either an ene reductase or an alcohol dehydrogenase alone, or the two enzymes in a step-wise one-pot reaction, the results below demonstrate that high chemical control over the deuterium-labelled product could be achieved.

Reactions were conducted in 0.5 mL of ($^2H_{11}$)-Tris-$^2$HCl (100 mM, $p^2$H 8.0) containing 5 mM cinnamaldehyde, 2 vol. % DMSO, 0.5 mM NAD$^+$, and 500 μg of (A) alcohol dehydrogenase (JM, ADH 105), and (B-C) ene reductase (JM, ENE101). The mixture was presaturated with $H_2$ gas prior to addition of the heterogeneous biocatalytic system at a loading of 400 μg. The reactions were shaken at 500 rpm under a steady flow of $H_2$ for 16 hours. In the case of reaction C, the initial step was allowed to proceed for 24 hours before addition of a further 200 μg of the heterogeneous biocatalytic system and 500 μg of alcohol dehydrogenase (JM, ADH 105).

GC-FID: Following the reactions, an aliquot of the solution was extracted with a 2×volume of $C^2HCl_3$, and then centrifuged at 18,800×g for 5 minutes before being transferred to glass vials for analysis by GC-FID according to the method below. Column: DB-1701 (Agilent), 30 m length, 0.25 mm diameter, 0.25 μm film thickness; Carrier: He (CP grade), 0.5 mL minute (constant flow); Inlet temperature: 230° C.; Injection conditions: Splitless with split flow 60 mL/min, splitless time 0.8 mins, purge 5 mL/min; Injection volume: 0.5 μL; Detection: FID; Detector temperature: 150° C.; Detection gases: $H_2$ (35 mL/min), air (350 mL/min), makeup $N_2$ (40 mL/min); Oven heating profile:

| Time (minutes) | Temperature |
| --- | --- |
| 0 → 5 | Hold at 50° C. |
| 5 → 25 | Ramp to 250° C. at 10° C./min |
| 25 → 35 | Hold at 250° C. for 10 mins |

GC-MS: Following extraction and analysis by GC-FID (above) the reaction solutions were analysed by GC-MS according to the method below. Column: DB-1701 (agilent), 30 m length, 0.25 mm diameter, 0.25 μm (film thickness); Carrier: He (CP grade), 100 kPa (constant pressure); Inlet temperature: 250° C.; Injection conditions: Split (25:1) with split flow 30 mL/min, splitless time 0.7 mins, purge 5 mL/min; Detection: Mass Spec, EI (70 eV), source temperature 230° C. Scan range 50-650 amu with a scan rate of 5 Hz; Transfer line 300° C.; Oven heating profile:

| Time (minutes) | Temperature |
| --- | --- |
| 0 → 5 | Hold at 50° C. |
| 5 → 16.3 | Ramp to 275° C. at 20° C./min |
| 16.3 → 18.8 | Hold at 275° C. for 2.5 mins |

$^1$H NMR spectroscopy: After removal of the catalyst, the unmodified reaction solutions were analysed by $^1$H NMR spectroscopy at 500 MHz and 298 K. In the case of reactions A and C, it was necessary to acquire additional spectra under non-aqueous conditions by extracting the product into an equal volume of $C^2HCl_3$ and re-analysing it.

The results for reactions A, B, and C are shown in FIGS. 23, 24 and 25, respectively.

A: [1-$^2$H]-Cinnamyl Alcohol

Analysis by GC-FID, FIG. 23(a), shows a broad peak for the cinnamyl alcohol product (RT=19.9 mins) and one for unreacted cinnamaldehyde (RT=19.4 mins), with no additional products being detected (including hydrocinnamaldehyde and 3-phenyl-1-propanol, which are common side products in the hydrogenation of cinnamaldehyde). Integration of the peak areas compared to a set of standard solutions indicated a conversion of 90%, which could be confirmed by comparison of clearly resolved peaks in the $^1$H NMR spectrum of the crude reaction mixture (see FIG. 23(b)). The site and extent of $^2$H labelling in the cinnamyl alcohol product was determined through $^1$H NMR spectroscopy, FIG. 23(b). The intensity of the doublet at δ=4.30 ppm (J=5.5 Hz) in the unlabelled cinnamyl alcohol standard (corresponding to the α-protons) halves in intensity in the spectrum of the biocatalytic reaction product. Overlapping peaks from the ribose ring of the cofactor make a precise integration of the peak from the α-proton difficult, though extracting the product into C$^2$HCl$_3$ and re-acquiring the spectrum enabled the measurement to be conducted unambiguously. Hence, it was confirmed that the α-site had been labelled with a single $^2$H nucleus.

Accordingly, the peak corresponding to the neighbouring C2 proton is also found to change from a doublet of triplets in the unlabelled standard (δ=6.47 ppm, dt, J=16.1 Hz, J=5.8 Hz), to a doublet of doublets in the deuterated product (δ=6.47 ppm, dd, J=16.1 Hz, J=5.8 Hz). Unfortunately, mass spectroscopic analysis could not be used to unambiguously evaluate the extent of %$^2$H labelling, as such compounds are known to re-arrange upon ionization, causing large differences in the fragmentation pattern of different isotopomers. However, the spectra were still acquired, and are shown in FIG. 24(c) for completeness. Here, the molecular ion peak in the commercial cinnamyl alcohol standard ([C$_9$H$_{10}$O$^{+\bullet}$], m/z 134.1) is seen to increase by +1.0 for the product of the biocatalytic hydrogenation, consistent with the addition of a $^2$H nucleus ([$^2$H$_1$—C$_9$H$_9$O$^{+\bullet}$], m/z 135.1).

B: [2, 3-$^2$H$_2$]-hydrocinnamaldehyde

The near quantitative conversion of cinnamaldehyde to hydrocinnamaldehyde could was demonstrated by GC-FID analysis, see FIG. 24(a). Here, the cinnamaldehyde substrate (RT=19.4 minutes) was absent from the reaction solution, which showed a peak only for hydrocinnamaldehyde (RT=17.5 mins), without the formation of other possible side products (namely cinnamyl alcohol and/or 3-phenyl-1-propanol). This result was further confirmed by $^1$H NMR analysis of the crude reaction mixture. (see FIG. 24(b)). The site and extent of $^2$H labelling in the hydrocinnamaldehyde product could also be determined through $^1$H NMR spectroscopy, FIG. 24(b), though the interpretation is complicated by the speciation of the molecule under aqueous conditions. As such, each of the aliphatic proton environments on the molecule (denoted a, b, and c in FIG. 24(b) give rise to three separate peaks in the corresponding $^1$H spectrum, which must be summed together in order to determine the extent of $^2$H incorporation at each site. Accordingly, signals corresponding to sites a and b lose half of their intensity when the molecule is prepared by biocatalytic deuteration, whilst proton c (and the aromatic protons) remain unchanged. The extent of the collapse in coupling across all of the peaks is also commensurate with the addition of single deuterons at positions a and b. Unfortunately, mass spectroscopic analysis could not be used unambiguously to evaluate the extent of % $^2$H labelling as such compounds are known to re-arrange upon ionization, thereby causing large differences in the fragmentation pattern of different isotopomers. However, the spectra were still acquired, and are shown in FIG. 24(c) for completeness. Here, the molecular ion peak in the commercial standard of hydrocinnamaldehyde ([C$_9$H$_{10}$O$^{+\bullet}$], m/z 134.1) is seen to increase by +2.0 for the product of the biocatalytic hydrogenation, consistent with the addition of two $^2$H nuclei ([$^2$H$_2$—C$_9$H$_8$O$^{+\bullet}$], m/z 136.1).

C: [1,2,3-$^2$H$_{3.5}$]-3-phenyl-1-propanol

The conversion of cinnamaldehyde to hydrocinnamaldehyde by the action of the heterogeneous biocatalytic system and an ene reductase was shown to proceed quantitatively. The second half of Reaction C, in which the hydrocinnamaldehyde was reduced further to 3-phenyl-1-propanol by the introduction of an alcohol dehydrogenase, was shown to proceed to a similarly high degree by GC-FID analysis (see FIG. 25(a)). Here, signals corresponding to the substrate (RT=19.4 mins) and intermediate (RT=17.5 mins) compounds were replaced in the chromatogram of the reaction mixture by the product peak (RT=18.7 mins). Similarly, analysis of the $^1$H NMR spectrum of the crude reaction mixture indicated that the reaction had proceeded to ≥98% conversion. Recovery of the product was not, however, quantitative, with around 30% having been lost to evaporation over the course of the reaction. The site and extent of $^2$H labelling in the 3-phenyl-1-propanol product was determined through $^1$H NMR spectroscopy, FIG. 25(b). Analysis of the crude reaction mixture is complicated by the coincidence of the diagnostic peaks with those from other sources (such as the co-solvent and buffer, see FIG. 25(b)(i)). As such, the product is better analysed by extracting into C$^2$HCl$_3$ and re-acquiring the spectrum (see FIG. 25(b)(ii)). Here the intensity of signals corresponding to protons in position b (δ=2.72 ppm) and d (δ=3.68 ppm) are reduced by 50% following the deuteration reaction (compared to a standard sample of natural isotopic abundance), consistent with the addition of a single deuteron at each of these sites. The signal for the proton at position c (δ=1.90 ppm) was found to decrease by 75% however, indicating that 1.5 $^2$H units had been installed at this site. The additional $^2$H incorporation in this latter case most likely occurred through tautomeric solvent exchange following the reduction of the C=C double bond. Upon deuteration, the clear splitting patterns for peaks b (a pseudo-triplet), c (a pseudo-quintet), and d (a pseudo-quartet), are replaced by broad, poorly defined signals, consistent with the influence of much weaker proton-deuteron coupling. Mass spectroscopy was also used to study the isotopic substitution pattern along the 3-phenyl-1-propanol product (see FIG. 25(c). Here the molecular ion peak was found to be diagnostic, with the m/z 136.1 representing the unfragmented molecule. Accordingly, peaks at m/z 137.1, 138.1, and 139.1, in the analysis of the reaction mixture could be attributed to the inclusion of two, three, and four $^2$H nuclei, respectively, consistent with the various levels of labelling on C2 described above.

Example 9.4

In this reaction carvones were selectively reduced to [1,2-$^2$H$_2$]-dihydrocarvones using ene reductase Reactions were conducted in 0.5 mL of ($^2$H$_5$)-Tris-$^2$HCl (100 mM, p$^2$H 8.0) containing 5 mM (4R)-carvone (Reaction A) or (4S)-carvone (Reaction B), 4 vol. % [$^2$H$_6$]-DMSO, 0.5 mM NAD$^+$, and 500 μg of ene reductase (JM, ENE101). The mixture was presaturated with H$_2$ gas prior to addition of the heterogeneous bio-system at a loading of 400 μg. The reactions were shaken at 500 rpm under a steady flow of $H_2$ for 16 hours. Evaporation of the product dihydrocarvones proved to more problematic than in other cases so alternative reaction setups were trialed, including a pressure vessel (Büchi Tinyclave) sealed under 2 bar $H_2$ (50 mL headspace), and a reaction in a 1.5 mL glass GC-vial sealed under $H_2$ balloon pressure. Whilst a commercial standard of mixed of (1R,4R)- and (1S,4R)-dihydrocarvone was commercially available, the 4S-epimer was unavailable. Instead, this was synthesised by reduction of (4S)-carvone by Zn metal. Here, Zn metal (625 mg, 9.6 mmol) and KOH (250 mg, 4.5 mmol) were combined in 3.5 mL of $MeOH/H_2O$ (95/5 v/v) and the slurry bought to reflux under stirring. (4S)-carvone (500 mg, 3.3 mmol) was dissolved in 1 mL of $MeOH/H_2O$ (95/5 v/v) and added dropwise to the Zn-solution over 6 hours. Following the reaction, the solution was filtered through a syringe filter, extracted into pentane (3×1 mL) and dried over $Na_2SO_4$. The solvent was removed in vacuo to give (4S)-dihydrocarvone (400 mg, 80%) as a mixture of cis-1,4 and trans-1,4 epimers in the ratio 83:17 (by GC). In order to assist in the assignment of the $^1H$ NMR spectra of the deuterated samples, (1R,4R)- and (1R,4S)-dihydrocarvones of natural isotopic abundance were also prepared at high de from their parent (4R)- and (4S)-carvones by reaction with an ene reductase. Here, the relevant carvone (5 mM) was shaken with 500 μg of ene reductase (JM, ENE101) in 500 μL of non-deuterated Tris buffer (100 mM, pH 8.0) containing 2 vol. % DMSO and 10 mM NADH for 6 hours at room temperature. $^2H_2O$ (100 μL) was added to the sample for field locking purposes, and the reaction mixture was analysed immediately by $^1H$ NMR spectroscopy.

GC-FID: Following the reactions, an aliquot of the solution was extracted with a 2×volume of $C^2HCl_3$, and then centrifuged at 18,800×g for 5 minutes before being transferred to glass vials for analysis by GC-FID according to the method below. Column: DB-1701 (Agilent), 30 m length, 0.25 mm diameter, 0.25 μm film thickness; Carrier: He (CP grade), 0.5 mL minute (constant flow); Inlet temperature: 230° C.; Injection conditions: Splitless with split flow 60 mL/min, splitless time 0.8 mins, purge 5 mL/min.; Injection volume: 0.5 μL; Detection: FID; Detector temperature: 150° C.; Detection gases: $H_2$ (35 mL/min), air (350 mL/min), makeup $N_2$ (40 mL/min); Oven heating profile:

| Time (minutes) | Temperature |
|---|---|
| 0 → 5 | Hold at 50° C. |
| 5 →25 | Ramp to 250° C. at 10° C./min |
| 25 → 35 | Hold at 250° C. for 10 mins |

GC-MS: Following extraction and analysis by GC-FID (above) the reaction solutions were analysed by GC-MS according to the method below. Column: DB-1701 (agilent), 30 m length, 0.25 mm diameter, 0.25 μm (film thickness); Carrier: He (CP grade), 100 kPa (constant pressure); Inlet temperature: 250° C.; Injection conditions: Split (10:1) with split flow 12 mL/min, splitless time 0.7 mins, purge 5 mL/min; Detection: Mass Spec, EI (70 eV), source temperature 230° C. Scan range 50-650 amu with a scan rate of 5 Hz. Transfer line 300° C.; Oven heating profile:

| Time (minutes) | Temperature |
|---|---|
| 0 → 5 | Hold at 50° C. |
| 5 → 16.3 | Ramp to 275° C. at 20° C./min |
| 16.3 → 18.8 | Hold at 275° C. for 2.5 mins |

$^1H$ NMR spectroscopy: After removal of the catalyst, the unmodified reaction solutions were analysed by $^1H$ NMR spectroscopy at 500 MHz and 298 K. In order to confirm assignments, $^1H$-$^1H$ correlation spectroscopy (COSY) was also conducted on the samples as required.

Results are shown in FIG. 26 (reaction A) and FIG. 27 (reaction B).

A: [1, 2-$^2H_2$]-(1R,4R)-dihydrocarvone

Analysis by GC-FID confirmed the high conversion of substrate to product, and the high selectivity for the trans-1,4 diastereomer (see FIG. 26(a)). The slightly reduced diastereomeric excess (97%) is most likely a consequence of the racemisation of the dihydrocarvone product, which occurs slowly in aqueous solutions. Quantitative analysis revealed that there was a considerable loss of product from the reaction mixture when $H_2$ was flowed across the headspace, and so a mass balance was not achieved in this case. Sealing the reaction under 2 bar $H_2$ reduced the product losses, but still only yielded a recovery of about 30% of the theoretical quantity. The site and extent of $^2H$ labelling was demonstrated by $^1H$ NMR spectroscopy (see FIG. 26(b)), the assignment of which correlated well with those of previous authors. Changes to the spectrum following the deuteration reaction confirmed both the highly specific $^2H$ incorporation, and high diastereoselectivity that was achieved. Disappearance of the multiplet at δ=2.61 ppm (labelled b in the diagram) and collapse of the coupling on the doublet at δ=0.99 ppm with J=6.4 Hz, were clear evidence of the $^2H$ installation on CL. Similarly, loss of the pseudo-quartet peak at δ=1.41 ppm (labelled e in the diagram), with simultaneous loss of coupling on signals representing neighbouring protons ($d_a$ and $d_b$ at δ=1.94 ppm and δ=1.72 ppm, respectively), provided evidence of a $^2H$ nucleus at C2. The preservation of the peak at δ=2.18 ppm (labelled a in the diagram), which collapses from a multiplet to a broad singlet, is evidence that only a single $^2H$ nucleus is installed on C2. It is likely therefore, that the two $^2H$ nuclei are added in a trans-1,2 relationship, which is in accordance with previous mechanistic studies of similar ene reductase enzymes. In this case, the $^2H$ on C2 gives rise to an additional stereocentre, such that the product may be tentatively assigned as [1R, 2R-$^2H_2$]-(4R)-dihydrocarvoneansstereospecificity. Finally, GC-MS analysis of the reaction solution further confirms the addition of two $^2H$ nuclei across the molecule, with the molecular ion being seen to shift from m/z=152.1 for $[C_{10}H_{16}O^{+\bullet}]$, to 154.1 for $[^2H_2—C_{10}H_{14}O^{+\bullet}]$, as shown in FIG. 26(c).

B: [1, 2-$^2H_2$]-(1R,4S)-dihydrocarvone

Analysis by GC-FID yielded results that were similar to those for Reaction A described above. Again, conversion from (4S)-carvone to (1R,4S)-dihydrocarvone was found to be virtually quantitative (see FIG. 27(a)), though evaporation meant that recovery of the product was quite poor. Conducting the reaction in a sealed vial under a balloon pressure of $H_2$ (as opposed to a dynamic flow of $H_2$ across the headspace) helped to improve the product yield to around 30% of the theoretical quantity. Unlike reaction A, the cis-(1R,4S)-isomer if formed, which represents the least stable of the two possible diastereomeric products (with racemisation giving rise to a slightly diminished de of 96%). $^1H$ NMR spectroscopic analysis of the reaction solution provided insight into the extent and location of $^2$H incorporation into the product. Here, the dihydrocarvone standard prepared by a conventional Zn reduction was not found to be useful, as it contained mostly the thermodynamically favoured trans-1,4 dihydrocarvone isomer (see FIG. 27(a)). Instead, a standard prepared by supplying the ene reductase with (4S)-carvone and a super-stoichiometric quantity of NADH in non-deuterated buffer was found to generate a suitable sample of (1R,4S)-dihydrocarvone of natural isotopic abundance for comparison. The $^1$H NMR spectrum of the deuterated product is less well resolved than in Reaction A, but the disappearance of signals at δ=2.56 ppm and δ=1.58 ppm (labelled b and $c_b$ respectively) along the collapse of coupling on the doublet at δ=1.05 ppm can be clearly seen (FIG. 27(b)). The convoluted peak at δ=1.93 ppm retains a relative integration of 3H on going from the standard to the deuterated reaction, confirming that the area of signal Ca is not diminished. All of these factors provide evidence for two $^2$H nuclei being installed across the double bond, although the likely trans-1,2 arrangement cannot be confirmed unambiguously. Finally, GC-MS analysis of the reaction solution further indicates the addition of two $^2$H nuclei across the molecule, with the molecular ion being seen to shift from m/z=152.1 for $[C_{10}H_{16}O^{+\bullet}]$, to 154.1 for $[^2H_2-C_{10}H_4O^{+\bullet}]$, as shown in FIG. 27(c).

Example 10

This Example demonstrates the method of the invention in selective tritaration, wherein x=3 for the source of the isotopic label $^xH_2O$ (i.e. $^3H_2O$).

$^3H_2O$ from PerkinElmer® (500 μL, pH 8.0, diluted with $^1H_2O$ to an activity of 18.5 MBq; i.e. around 0.3 ppm $^3H$ in the $^3H_2O/^1H_2O$ mixture) containing Tris.HCl (100 mM) and NAD$^+$ (5 mM) was sealed in a conical glass flask with a Suba-Seal, and sparged with gaseous $N_2$ and then gaseous $H_2$ for 30 minutes each. 5 μL of R. eutropha soluble hydrogenase (SEQ ID NOs: 1, 2, 3, 30, 31) was added, and the reaction mixture was allowed to stand at room temperature under a balloon pressure of $H_2$ gas for 16 hours. A UV torch (λ=360 nm) was used to confirm that NADH was been formed under these conditions.

To confirm that the formed NADH was labelled with $^3H$ at the 4-position, a subsequent experiment was setup with the same $^3H_2O$ solution and 0.5 mM NAD$^+$. To this second solution was added 10 mM acetophenone, 2 vol. % of DMSO and 0.5 mg of R-selective alcohol dehydrogenase (ADH101). 5 μL of R. eutropha soluble hydrogenase (SEQ ID NOs: 1, 2, 3, 30, 31) was added, and the reaction mixture was allowed to stand at room temperature under a balloon pressure of H2 gas for 16 hours. The (R)-phenylethanol product was extracted into 1 mL of $C^2HCl_3$, and dried with 150 mg of anhydrous $P_2O_5$ to remove residual $H_2O$.

Product analysis was conducted by $^1H$ NMR spectroscopy in the manner detailed above, and confirmed a conversion of >80% to the 1-phenylethanol product (see FIG. 28A). The absolute concentration of extracted 1-phenylethanol was determined by reference to the residual CHCl$_3$ signal (δ=7.26 ppm). The $^1H$ NMR spectra shown in FIG. 28A were generated with the following parameters: 500 MHz, 256 scans, LB=0.3 Hz, $C^2HCl_3$, 298 K.

To establish the extent of $^3H$ radiolabelling on the product, liquid scintillation counting (LSC) of the $C^2HCl_3$ extract was conducted as follows: LSC was carried out on a Beckman LS6500 machine, using 500 μL of analyte solution and 5 mL of PerkinElmer® Ultima Gold LLT scintillant. A calibration was conducted to establish the LSC response for a known quantity of $^3H$ using measured amounts of $[^3H]$-toluene (PerkinElmer® LSC standard, 43.3 kBq/g) dissolved in 500 uL of $C^2HCl_3$. A counting time of 1 minute was used at each concentration, and an exemplar plot is shown in FIG. 28B. From the LSC calibration, the radioactivity of the extracted product sample was determined to be 12 Bq. From the $^1H$ NMR spectrum it was possible to determine the quantity of $H_2O$ (and hence, $^3H_2O$) carried over from the aqueous phase, and so subtract this from the calculated radioactivity of the product. Hence, it was determined that the product (R)-phenylethanol had an activity of 32 MBq/mol, indicating a $^3H$ incorporation of around 30 ppb.

This experiment thus confirms that $H_2$-driven NADH recycling may be driven in $^3H_2O$ to deliver a $[^3H]$-labelled product.

ASPECTS OF THE INVENTION

1. A method of producing a reduced labelled cofactor comprising one or more $^xH$ atom, wherein x is 2 or 3, wherein said method comprises:
   i) providing a composition comprising (i) $^xH^+$ ions and (ii) an oxidised cofactor;
   ii) transferring electrons from an electron source to a first polypeptide which is an NADH:acceptor oxidoreductase or an NADPH:acceptor oxidoreductase or a functional derivative or fragment thereof; and
   iii) contacting the $^xH^+$ ions and the oxidised cofactor with the first polypeptide thereby reducing the oxidised cofactor to form a reduced labelled cofactor comprising one or more $^xH$ atoms.

2. A method according to aspect 1, wherein said method is a method of producing a reduced labelled reaction product comprising one or more $^xH$ atom, wherein x is 2 or 3, wherein said method comprises producing a reduced labelled cofactor according to aspect 1; and
   iv) contacting the reduced labelled cofactor and an oxidised reactant with at least one enzyme that is an NADH-dependent oxidoreductase or an NADPH-dependent oxidoreductase or a functional derivative or fragment thereof such that the enzyme selectively transfers an $^xH$ atom from the reduced labelled cofactor to the oxidised reactant thereby producing a reduced labelled reaction product and an oxidised cofactor.

3. A method according to aspect 2 which further comprises reducing the oxidised cofactor produced in step (iv) of aspect 2 in a method according to aspect 1.

4. A method according to aspect 2 which comprises producing a reduced labelled reaction product according to steps (i) to (iv) of aspects 1 and 2, and repeating steps (ii) to (iv) multiple times, thereby recycling the cofactor.

5. A method according to any one of the preceding aspects wherein the $^xH^+$ ions are provided as $^2H_2O$ or $^3H_2O$.

6. A method according to any one of the preceding aspects wherein:
   (i) the oxidised cofactor is NAD$^+$, NADP$^+$, or a labelled version of NAD$^+$ or NADP$^+$ comprising at least one $^xH$ atom, wherein preferably reducing the oxidised cofactor to form a reduced labelled cofactor comprises adding an $^xH$ atom at the 4-position of the nicotinamide ring of the oxidised cofactor; and/or
   (ii) the $^xH^+$ ions are transferred directly from the composition comprising $^xH^+$ ions to the first polypeptide.

7. A method according to any one of the preceding aspects wherein the first polypeptide transfers an $^xH^-$ anion to the oxidised cofactor thereby forming the reduced labelled cofactor, wherein preferably:
   A. the first polypeptide comprises a flavin group; and/or
   B. the first polypeptide has a structure comprising a Rossmann fold; and/or
   C. the first polypeptide comprises or consists of a diaphorase moiety; and/or
   D. the first polypeptide consists or comprises of one or more than one of:
   i) the amino acid sequence of *Ralstonia eutropha* diaphorase HoxF (SEQ ID NO: 1) or an amino acid sequence having at least 60% homology therewith;
   ii) the amino acid sequence of *Ralstonia eutropha* diaphorase HoxU (SEQ ID NO: 2) or an amino acid sequence having at least 60% homology therewith;
   iii) the amino acid sequence of *Ralstonia eutropha* diaphorase HoxI (SEQ ID NO: 3) or an amino acid sequence having at least 60% homology therewith;
   iv) the amino acid sequence of the 51 kDa protein of the flavoprotein (Fp) subcomplex of Complex I of *Bos taurus* (SEQ ID NO: 4) or an amino acid sequence having at least 60% homology therewith;
   v) the amino acid sequence of the 24 kDa subcomplex of Complex I of *Bos taurus* (SEQ ID NO: 5) or an amino acid sequence having at least 60% homology therewith;
   vi) the amino acid sequence of *Ralstonia eutropha* $NAD^+$-dependent formate dehydrogenase diaphorase moiety FdsB (SEQ ID NO: 6) or an amino acid sequence having at least 60% homology therewith;
   vii) the amino acid sequence of *Ralstonia eutropha* $NAD^+$-dependent formate dehydrogenase diaphorase moiety FdsG (SEQ ID NO: 7) or an amino acid sequence having at least 60% homology therewith;
   viii) the amino acid sequence of *Rhodobacter capsulatus* $NAD^+$-dependent formate dehydrogenase, diaphorase moiety FdsB (SEQ ID NO: 8) or an amino acid sequence having at least 60% homology therewith;
   ix) the amino acid sequence of *Rhodobacter capsulatus* $NAD^+$-dependent formate dehydrogenase, diaphorase moiety FdsG (SEQ ID NO: 9) or an amino acid sequence having at least 60% homology therewith;
   x) the amino acid sequence of the NADPH oxidoreductase moiety from *Pyrococcus furiosus* soluble hydrogenase I gamma subunit (SEQ ID NO: 10) or an amino acid sequence having at least 60% homology therewith;
   xi) the amino acid sequence of the NADPH oxidoreductase moiety from *Pyrococcus furiosus* soluble hydrogenase I beta subunit (SEQ ID NO: 11) or an amino acid sequence having at least 60% homology therewith;
   xii) the amino acid sequence of the NADPH oxidoreductase moiety from *Pyrococcus furiosus* soluble hydrogenase II gamma subunit (SEQ ID NO: 12) or an amino acid sequence having at least 60% homology therewith;
   xiii) the amino acid sequence of the amino acid sequence of the NADPH oxidoreductase moiety from *Pyrococcus furiosus* soluble hydrogenase II beta subunit (SEQ ID NO: 13) or an amino acid sequence having at least 60% homology therewith;
   xiv) the amino acid sequence of the diaphorase moiety of *Rhodococcus opacus* soluble hydrogenase HoxF (SEQ ID NO: 14) or an amino acid sequence having at least 60% homology therewith;
   xv) the amino acid sequence of the diaphorase moiety of *Rhodococcus opacus* soluble hydrogenase HoxU (SEQ ID NO: 15) or an amino acid sequence having at least 60% homology therewith;
   xvi) the amino acid sequence of the diaphorase moiety of *Allochromatium vinosum* soluble hydrogenase HoxF (SEQ ID NO: 16) or an amino acid sequence having at least 60% homology therewith;
   xvii) the amino acid sequence of the diaphorase moiety of *Allochromatium vinosum* soluble hydrogenase HoxU (SEQ ID NO: 17) or an amino acid sequence having at least 60% homology therewith;
   xviii) the amino acid sequence of the diaphorase moiety of *Thiocapsa roseopersicina* Hox1F (SEQ ID NO: 18) or an amino acid sequence having at least 60% homology therewith;
   xix) the amino acid sequence of the diaphorase moiety of *Thiocapsa roseopersicina* soluble hydrogenase Hox1U (SEQ ID NO: 19) or an amino acid sequence having at least 60% homology therewith;
   xx) the amino acid sequence of the diaphorase moiety of *Thiocapsa roseopersicina* Hox2F (SEQ ID NO: 20) or an amino acid sequence having at least 60% homology therewith;
   xxi) the amino acid sequence of the diaphorase moiety of *Thiocapsa roseopersicina* soluble hydrogenase Hox2U (SEQ ID NO: 21) or an amino acid sequence having at least 60% homology therewith;
   xxii) the amino acid sequence of the diaphorase moiety of *Synechocystis* sp. PCC 6803 HoxF (SEQ ID NO: 22) or an amino acid sequence having at least 60% homology therewith;
   xxiii) the amino acid sequence of the diaphorase moiety of *Synechocystis* sp. PCC 6803 HoxU (SEQ ID NO: 23) or an amino acid sequence having at least 60% homology therewith;
   xxiv) the amino acid sequence of the diaphorase moiety of *Synechococcus elongatus* PCC 6301 HoxF (SEQ ID NO: 24) or an amino acid sequence having at least 60% homology therewith;
   xxv) the amino acid sequence of the diaphorase moiety of *Synechococcus elongatus* PCC 6301 HoxU (SEQ ID NO: 25) or an amino acid sequence having at least 60% homology therewith;
   xxvi) the amino acid sequence of *Hydrogenophilus thermoluteolus* diaphorase HoxF (SEQ ID NO: 26) or an amino acid sequence having at least 60% homology therewith;
   xxvii) the amino acid sequence of *Hydrogenophilus thermoluteolus* diaphorase HoxU (SEQ ID NO: 27) or an amino acid sequence having at least 60% homology therewith;
   xxviii) the amino acid sequence of *Chlamydomonas reinhardtii* Ferredoxin-NADP+ reductase (SEQ ID NO: 28) or an amino acid sequence having at least 60% homology therewith;
   xxix) the amino acid sequence of *Anabaena* Ferredoxin-NADP+ reductase (SEQ ID NO: 29) or an amino acid sequence having at least 60% homology therewith;
   xxx) the amino acid sequence of *Ralstonia eutropha* diaphorase HoxF (SEQ ID NO: 70) or an amino acid sequence having at least 60% homology therewith;

xxxi) the amino acid sequence of *Ralstonia eutropha* diaphorase with inactive hydrogenase (SEQ ID NO: 1 and/or 2 and/or 69 and/or 31) or an amino acid sequence having at least 60% homology therewith or a functional fragment, derivative or variant thereof; wherein more preferably the first polypeptide consists or comprises of the *Ralstonia eutropha* NAD$^+$-reducing soluble hydrogenase or a functional fragment, derivative or variant thereof.

8. A method according to any one of the preceding aspects wherein the electron source comprises a second polypeptide which is an oxidising enzyme or functional derivative or fragment thereof capable of oxidising a reductant to extract electrons, wherein the second polypeptide transfers electrons from the reductant to the first polypeptide via an electronically-conducting pathway, wherein preferably (i) electrons are directly transferred along the electronically-conducting pathway or (ii) electron transfer along the electronically-conducting pathway is mediated by one or more electron mediators; wherein more preferably:
   A. the first polypeptide and the second polypeptide constitute component parts of a modular, multidomain or multicomponent protein or protein complex; and/or
   B. the second polypeptide is selected or modified to oxidise $H_2$ or $^xH_2$ under the conditions of the method; and/or
   C. the second polypeptide is a hydrogenase enzyme or a functional derivative or fragment thereof, wherein preferably the hydrogenase is selected from
   i) the amino acid sequence of *Ralstonia eutropha* soluble hydrogenase moiety (SEQ ID NOs: 30 and/or 31) or an amino acid sequence having at least 60% homology therewith;
   ii) the amino acid sequence of *Ralstonia eutropha* membrane-bound hydrogenase moiety (SEQ ID NOs: 32 and/or 33 and/or 34) or an amino acid sequence having at least 60% homology therewith;
   iii) the amino acid sequence of *Ralstonia eutropha* regulatory hydrogenase moiety (SEQ ID NOs: 35 and/or 36) or an amino acid sequence having at least 60% homology therewith;
   iv) the amino acid sequence of *Escherichia coli* hydrogenase 1 (SEQ ID NOs:37 and/or 38) or an amino acid sequence having at least 60% homology therewith;
   v) the amino acid sequence of *Escherichia coli* hydrogenase 2 (SEQ ID NOs:39 and/or 40) or an amino acid sequence having at least 60% homology therewith;
   vi) the amino acid sequence of *Aquifex aeolicus* hydrogenase 1 (SEQ ID NO:41 and/or 42) or an amino acid sequence having at least 60% homology therewith;
   vii) the amino acid sequence of *Hydrogenovibrio marinus* hydrogenase (SEQ ID NOs: 43 and/or 44) or an amino acid sequence having at least 60% homology therewith;
   viii) the amino acid sequence of *Thiocapsa roseopersicina* hydrogenase (SEQ ID NOs: 45 and 46) or an amino acid sequence having at least 60% homology therewith;
   ix) the amino acid sequence of *Alteromonas macleodii* hydrogenase (SEQ ID NOs: 47 and/or 48) or an amino acid sequence having at least 60% homology therewith;
   x) the amino acid sequence of *Rhodococcus opacus* soluble hydrogenase moiety (SEQ ID NOs: 49 and/or 50) or an amino acid sequence having at least 60% homology therewith;
   xi) the amino acid sequence of *Allochromatium vinosum* membrane bound hydrogenase (SEQ ID NOs: 51 and/or 52) or an amino acid sequence having at least 60% homology therewith;
   xii) the amino acid sequence of *Desulfovibrio fructosovorans* membrane bound hydrogenase (SEQ ID NOs: 53 and/or 54) or an amino acid sequence having at least 60% homology therewith;
   xiii) the amino acid sequence of *Clostridium pasteurianum* iron-iron hydrogenase (SEQ ID NOs: 55) or an amino acid sequence having at least 60% homology therewith;
   xiv) the amino acid sequence of *Clostridium acetobutylicum* iron-iron hydrogenase (SEQ ID NOs: 56) or an amino acid sequence having at least 60% homology therewith;
   xv) the amino acid sequence of *Chlamydomonas reinhardtii* iron-iron hydrogenase (SEQ ID NOs: 57) or an amino acid sequence having at least 60% homology therewith;
   xvi) the amino acid sequence of *Desulfomicrobium baculatum* nickel-iron selenium hydrogenase (SEQ ID NOs: 58 and/or 59) or an amino acid sequence having at least 60% homology therewith;
   xvii) the amino acid sequence of *Hydrogenophilus thermoluteolus* soluble hydrogenase moiety (SEQ ID NOs: 60 and/or 61) or an amino acid sequence having at least 60% homology therewith;
   xviii) the amino acid sequence of *Desulfovibrio vulgaris* Nickel Iron hydrogenase (pdb 1H$_2$A) (SEQ ID NOs: 62 and/or 63) or an amino acid sequence having at least 60% homology therewith;
   xix) the amino acid sequence of *Desulfovibrio gigas* Periplasmic [NiFe] hydrogenase (SEQ ID NOs: 64 and/or 65) or an amino acid sequence having at least 60% homology therewith;
   xx) the amino acid sequence of *Salmonella enterica* serovar *Typhimurium* LT2 nickel-iron hydrogenase 5 (SEQ ID NO: 66 and/or 67) or an amino acid sequence having at least 60% homology therewith.
   xxi) the amino acid sequence of *Pyrococcus furiosus* soluble alpha subunit (SEQ ID NOs: 68) or an amino acid sequence having at least 60% homology therewith;

or a functional fragment, derivative or variant thereof.

9. A method according to any one of aspects 1 to 7 wherein
   i) the electron source comprises a synthetic organic, inorganic or metallic oxidation catalyst capable of oxidising a reductant to extract electrons, wherein the oxidation catalyst transfers electrons from the reductant to the first polypeptide via an electronically-conducting pathway; wherein preferably the oxidation catalyst comprises platinum, palladium, iridium nickel, rhodium and/or ruthenium; or
   ii) the electron source comprises an electrode connected to an electrode controller, wherein the electrode is connected to the first polypeptide via an electronically-conducting pathway.

10. A method according to aspects 8 or 9 wherein the reductant oxidised by the second polypeptide or the oxidation catalyst is $H_2$ or $^xH_2$, preferably $H_2$.

11. A method according to any one of aspects 8 to 10 wherein the electron source comprises a second polypeptide as defined in aspect 8 or an oxidation catalyst as defined in aspect 9, and wherein the electron source and the first polypeptide are each in electronic contact with an electronically conducting support, wherein preferably:
   a. the electron source and the first polypeptide are each in electronic contact with the same electronically conducting support, wherein preferably the support is an electronically conducting particle; or
   b. the electron source is in electronic contact with an electronically conducting first support and the first polypeptide is in electronic contact with an electronically conducting second support; and the first support is in electronic contact with the second support.
12. A method according to aspect 11 wherein the support comprises a material comprising carbon, a metal or metal alloy, a metal oxide or mixed metal oxide, a metal hydroxide, a metal chalcogenide, a semi-conducting material, or an electronically-conductive polymer, or mixtures thereof; or according to aspect 9 wherein the electron source comprises an electrode connected to an electrode controller and the electrode comprises a material comprising carbon, a metal or metal alloy, a metal oxide or mixed metal oxide, a metal hydroxide, a metal chalcogenide, or an electronically-conductive polymer, or mixtures thereof;
   wherein preferably the material comprises:
   i) Carbon, preferably graphite, carbon nanotube(s), carbon black, activated carbon, carbon nanopowder, vitreous carbon, carbon fibre(s), carbon cloth, carbon felt, carbon paper, graphene, highly oriented pyrolytic graphite, pyrolytic graphite, or doped diamond; and/or
   ii) a metal or metal alloy selected from gold, silver, tungsten, iridium, platinum, palladium, copper, titanium, brass, and steel; and/or
   iii) a material selected from titanium oxide, indium oxide, tin oxide and indium tin oxide;
13. A method according to any one of aspects 2 to 12 wherein the at least one enzyme that is an NADH-dependent oxidoreductase or NADPH-dependent oxidoreductase is at least one of an NAD(P)H-dependent alcohol dehydrogenase, an NAD(P)H-dependent ene reductase, an NAD(P)H-dependent imine reductase or an NAD(P)H-dependent amino-acid dehydrogenase, wherein preferably the at least one enzyme that is an NADH-dependent oxidoreductase or NADPH-dependent oxidoreductase is at least one of an alcohol dehydrogenase or an amino acid dehydrogenase.
14. A system for performing a method according to any one of aspects 1 to 13, the system comprising:
   i) a composition comprising (i) $^xH^+$ ions wherein x is 2 or 3 and (ii) an oxidised cofactor, wherein preferably the composition is as defined in aspect 5 and/or the oxidised cofactor is as defined in aspect 6;
   ii) an electron source, wherein preferably the electron source is as defined in any one of aspects 8 to 12; and
   iii) a first polypeptide which is an NADH:acceptor oxidoreductase or an NADPH:acceptor oxidoreductase or a functional derivative or fragment thereof, wherein preferably the first polypeptide is as defined in any one of aspects 7;
   wherein the system is configured such that, in use, (a) electrons are transferred from the electron source to the first polypeptide and (b) $^xH^+$ ions and the oxidised cofactor are contacted with the first polypeptide so as to reduce the oxidised cofactor to form a reduced labelled cofactor comprising one or more $^xH$ atoms.
15. A method for producing an oxidised labelled cofactor comprising one or more $^xH$ atom, wherein x is 2 or 3, comprising producing a reduced labelled cofactor comprising one or more $^xH$ atom according to any one of aspects 1 to 13; and oxidising the reduced labelled cofactor.

The invention claimed is:

1. A method of producing a reduced labelled cofactor comprising one or more $^xH$ atoms, wherein x is 2 or 3, wherein said method comprises:
   (i) providing a composition comprising $^xH^+$ ions and an oxidised cofactor;
   (ii) transferring electrons from an electron source to a first polypeptide, which is an NADH:acceptor oxidoreductase or an NADPH:acceptor oxidoreductase; and
   (iii) contacting the $^xH^+$ ions and the oxidised cofactor with the first polypeptide, thereby reducing the oxidised cofactor to form a reduced labelled cofactor comprising one or more $^xH^+$ atoms.

2. The method according to claim 1, wherein the $^xH^+$ ions are provided as $^2H_2O$ or $^3H_2O$.

3. The method according to claim 1, wherein the oxidised cofactor is NAD$^+$, NADP$^+$, or a labelled version of NAD$^+$ or NADP$^+$ comprising at least one $^xH$ atom.

4. The method according to claim 1, wherein the $^xH^+$ ions are transferred directly from the composition comprising $^xH^+$ ions to the first polypeptide.

5. The method according to claim 1, wherein the first polypeptide transfers an $^xH^-$ anion to the oxidised cofactor, thereby forming the reduced labelled cofactor.

6. The method according to claim 1, wherein:
   a) the first polypeptide comprises a flavin group;
   b) the first polypeptide has a structure comprising a Rossmann fold; and/or
   c) the first polypeptide comprises or consists of a diaphorase moiety.

7. The method according to claim 1, wherein the first polypeptide comprises or consists of one or more of:
   i) an amino acid sequence of *Ralstonia eutropha* diaphorase HoxF comprising SEQ ID NO: 1, or an amino acid sequence having at least 99% identity therewith;
   ii) an amino acid sequence of *Ralstonia eutropha* diaphorase HoxU comprising SEQ ID NO: 2, or an amino acid sequence having at least 99% identity therewith;
   iii) an amino acid sequence of *Ralstonia eutropha* diaphorase HoxI comprising SEQ ID NO: 3, or an amino acid sequence having at least 99% identity therewith;
   iv) an amino acid sequence of the 51 kDa protein of the flavoprotein (Fp) subcomplex of Complex I of *Bos taurus* comprising SEQ ID NO: 4, or an amino acid sequence having at least 99% identity therewith;
   v) an amino acid sequence of the 24 kDa subcomplex of Complex I of *Bos taurus* comprising SEQ ID NO: 5, or an amino acid sequence having at least 99% identity therewith;
   vi) an amino acid sequence of *Ralstonia eutropha* NAD$^+$-dependent formate dehydrogenase diaphorase moiety FdsB comprising SEQ ID NO: 6, or an amino acid sequence having at least 99% identity therewith;
   vii) an amino acid sequence of *Ralstonia eutropha* NAD$^+$-dependent formate dehydrogenase diaphorase moiety FdsG comprising SEQ ID NO: 7, or an amino acid sequence having at least 99% identity therewith;
   viii) an amino acid sequence of *Rhodobacter capsulatus* NAD$^+$-dependent formate dehydrogenase diaphorase moiety FdsB comprising SEQ ID NO: 8, or an amino acid sequence having at least 99% identity therewith;
   ix) an amino acid sequence of *Rhodobacter capsulatus* NAD$^+$-dependent formate dehydrogenase diaphorase moiety FdsG comprising SEQ ID NO: 9, or an amino acid sequence having at least 99% identity therewith;
   x) an amino acid sequence of the NADPH oxidoreductase moiety from *Pyrococcus furiosus* soluble hydrogenase I gamma subunit comprising SEQ ID NO: 10, or an amino acid sequence having at least 99% identity therewith;
   xi) an amino acid sequence of the NADPH oxidoreductase moiety from *Pyrococcus furiosus* soluble hydrogenase I beta subunit comprising SEQ ID NO: 11, or an amino acid sequence having at least 99% identity therewith;
   xii) an amino acid sequence of the NADPH oxidoreductase moiety from *Pyrococcus furiosus* soluble hydrogenase II gamma subunit comprising SEQ ID NO: 12, or an amino acid sequence having at least 99% identity therewith;
   xiii) an amino acid sequence of the amino acid sequence of the NADPH oxidoreductase moiety from *Pyrococcus furiosus* soluble hydrogenase II beta subunit comprising SEQ ID NO: 13, or an amino acid sequence having at least 99% identity therewith;
   xiv) an amino acid sequence of the diaphorase moiety of *Rhodococcus opacus* soluble hydrogenase HoxF comprising SEQ ID NO: 14, or an amino acid sequence having at least 99% identity therewith;
   xv) an amino acid sequence of the diaphorase moiety of *Rhodococcus opacus* soluble hydrogenase HoxU comprising SEQ ID NO: 15, or an amino acid sequence having at least 99% identity therewith;
   xvi) an amino acid sequence of the diaphorase moiety of *Allochromatium vinosum* soluble hydrogenase HoxF comprising SEQ ID NO: 16, or an amino acid sequence having at least 99% identity therewith;
   xvii) an amino acid sequence of the diaphorase moiety of *Allochromatium vinosum* soluble hydrogenase HoxU comprising SEQ ID NO: 17, or an amino acid sequence having at least 99% identity therewith;
   xviii) an amino acid sequence of the diaphorase moiety of *Thiocapsa roseopersicina* Hox1F comprising SEQ ID NO: 18, or an amino acid sequence having at least 99% identity therewith;
   xix) an amino acid sequence of the diaphorase moiety of *Thiocapsa roseopersicina* soluble hydrogenase Hox1U comprising SEQ ID NO: 19, or an amino acid sequence having at least 99% identity therewith;
   xx) an amino acid sequence of the diaphorase moiety of *Thiocapsa roseopersicina* Hox2F comprising SEQ ID NO: 20, or an amino acid sequence having at least 99% identity therewith;
   xxi) an amino acid sequence of the diaphorase moiety of *Thiocapsa roseopersicina* soluble hydrogenase Hox2U comprising SEQ ID NO: 21, or an amino acid sequence having at least 99% identity therewith;
   xxii) an amino acid sequence of the diaphorase moiety of *Synechocystis* sp. PCC 6803 HoxF comprising SEQ ID NO: 22, or an amino acid sequence having at least 99% identity therewith;
   xxiii) an amino acid sequence of the diaphorase moiety of *Synechocystis* sp. PCC6803 HoxU comprising SEQ ID NO: 23, or an amino acid sequence having at least 99% identity therewith;
   xxiv) an amino acid sequence of the diaphorase moiety of *Synechococcus elongatus* PCC 6301 HoxF comprising SEQ ID NO: 24, or an amino acid sequence having at least 99% identity therewith;
   xxv) an amino acid sequence of the diaphorase moiety of *Synechococcus elongatus* PCC 6301 HoxU comprising SEQ ID NO: 25, or an amino acid sequence having at least 99% identity therewith;

xxvi) an amino acid sequence of *Hydrogenophilus thermoluteolus* diaphorase HoxF comprising SEQ ID NO: 26, or an amino acid sequence having at least 99% identity therewith;

xxvii) an amino acid sequence of *Hydrogenophilus thermoluteolus* diaphorase HoxU comprising SEQ ID NO: 27, or an amino acid sequence having at least 99% identity therewith;

xxviii) an amino acid sequence of *Chlamydomonas reinhardtii* Ferredoxin-NADP+ reductase comprising SEQ ID NO: 28, or an amino acid sequence having at least 99% identity therewith;

xxix) an amino acid sequence of *Anabaena* Ferredoxin-NADP+ reductase comprising SEQ ID NO: 29, or an amino acid sequence having at least 99% identity therewith;

xxx) an amino acid sequence of *Ralstonia eutropha* diaphorase HoxF comprising SEQ ID NO: 70, or an amino acid sequence having at least 99% identity therewith; and xxxi) an amino acid sequence of *Ralstonia eutropha* diaphorase with inactive hydrogenase comprising SEQ ID NOs: 1 and/or 2 and/or 69 and/or 31, or an amino acid sequence having at least 99% identity therewith.

8. The method according to claim 1, wherein the electron source comprises a second polypeptide, which is an oxidising enzyme, capable of oxidising a reductant to extract electrons, wherein the second polypeptide transfers electrons from the reductant to the first polypeptide.

9. The method according to claim 1, wherein the electron source comprises a second polypeptide, which is a hydrogenase selected from:

i) an amino acid sequence of *Ralstonia eutropha* soluble hydrogenase moiety comprising SEQ ID NOs: 30 and/or 31, or an amino acid sequence having at least 99% identity therewith;

ii) an amino acid sequence of *Ralstonia eutropha* membrane-bound hydrogenase moiety comprising SEQ ID NOs: 32 and/or 33 and/or 34, or an amino acid sequence having at least 99% identity therewith;

iii) an amino acid sequence of *Ralstonia eutropha* regulatory hydrogenase moiety comprising SEQ ID NOs: 35 and/or 36, or an amino acid sequence having at least 99% identity therewith;

iv) an amino acid sequence of *Escherichia coli* hydrogenase 1 comprising SEQ ID NOS: 37 and/or 38, or an amino acid sequence having at least 99% identity therewith;

v) an amino acid sequence of *Escherichia coli* hydrogenase 2 comprising SEQ ID NOS: 39 and/or 40, or an amino acid sequence having at least 99% identity therewith;

vi) an amino acid sequence of *Aquifex aeolicus* hydrogenase 1 comprising SEQ ID NOs: 41 and/or 42, or an amino acid sequence having at least 99% identity therewith;

vii) an amino acid sequence of *Hydrogenovibrio marinus* hydrogenase comprising SEQ ID NOs: 43 and/or 44, or an amino acid sequence having at least 99% identity therewith;

viii) an amino acid sequence of *Thiocapsa roseopersicina* hydrogenase comprising SEQ ID NOs: 45 and 46, or an amino acid sequence having at least 99% identity therewith;

ix) an amino acid sequence of *Alteromonas macleodii* hydrogenase comprising SEQ ID NOs: 47 and/or 48, or an amino acid sequence having at least 99% identity therewith;

x) an amino acid sequence of *Rhodococcus opacus* soluble hydrogenase moiety comprising SEQ ID NOs: 49 and/or 50, or an amino acid sequence having at least 99% identity therewith;

xi) an amino acid sequence of *Allochromatium vinosum* membrane bound hydrogenase comprising SEQ ID NOs: 51 and/or 52, or an amino acid sequence having at least 99% identity therewith;

xii) an amino acid sequence of *Desulfovibrio* fructosovorans membrane bound hydrogenase comprising SEQ ID NOs: 53 and/or 54, or an amino acid sequence having at least 99% identity therewith;

xiii) an amino acid sequence of *Clostridium pasteurianum* iron-iron hydrogenase comprising SEQ ID NO: 55, or an amino acid sequence having at least 99% identity therewith;

xiv) an amino acid sequence of *Clostridium acetobutylicum* iron-iron hydrogenase comprising SEQ ID NO: 56, or an amino acid sequence having at least 99% identity therewith;

xv) an amino acid sequence of *Chlamydomonas reinhardtii* iron-iron hydrogenase comprising SEQ ID NO: 57, or an amino acid sequence having at least 99% identity therewith;

xvi) an amino acid sequence of *Desulfomicrobium baculatum* nickel-iron selenium hydrogenase comprising SEQ ID NOs: 58 and/or 59, or an amino acid sequence having at least 99% identity therewith;

xvii) an amino acid sequence of *Hydrogenophilus thermoluteolus* soluble hydrogenase moiety comprising SEQ ID NOs: 60 and/or 61, or an amino acid sequence having at least 99% identity therewith;

xviii) an amino acid sequence of *Desulfovibrio vulgaris* nickel-iron hydrogenase (pdb 1H2A) comprising SEQ ID NOs: 62 and/or 63, or an amino acid sequence having at least 99% identity therewith;

xix) an amino acid sequence of *Desulfovibrio gigas* periplasmic [NiFe] nickel-iron hydrogenase comprising SEQ ID NOs: 64 and/or 65, or an amino acid sequence having at least 99% identity therewith;

xx) an amino acid sequence of *Salmonella enterica* serovar *Typhimurium* LT2 nickel-iron hydrogenase 5 comprising SEQ ID NOs: 66 and/or 67, or an amino acid sequence having at least 99% identity therewith; and xxi) an amino acid sequence of *Pyrococcus furiosus* soluble alpha subunit comprising SEQ ID NO: 68, or an amino acid sequence having at least 99% identity therewith.

10. The method according to claim 1, wherein the electron source comprises a synthetic organic, inorganic, or metallic oxidation catalyst capable of oxidising a reductant to extract electrons, wherein the synthetic organic, inorganic, or metallic oxidation catalyst transfers electrons from the reductant to the first polypeptide via an electronically conducting pathway.

11. The method according to claim 1, wherein the electron source comprises: (i) a second polypeptide, which is an oxidising enzyme, capable of oxidising a reductant to extract electrons; or (ii) a synthetic organic, inorganic, or metallic oxidation catalyst capable of oxidising a reductant to extract electrons; and the reductant oxidised by the second polypeptide or the synthetic organic, inorganic, or metallic oxidation catalyst is H2 or $^xH_2$.

12. The method according to claim 1, wherein the electron source comprises: (i) a second polypeptide, which is an oxidising enzyme, capable of oxidising a reductant to extract electrons; or (ii) a synthetic organic, inorganic, or metallic oxidation catalyst capable of oxidising a reductant to extract electrons; and the electron source and the first polypeptide are each in electronic contact with a support.

13. The method according to claim 12, wherein:
a) the electron source and the first polypeptide are each in electronic contact with the same support; or
b) the electron source is in electronic contact with a first support and the first polypeptide is in electronic contact with an a second support, and the first support is in electronic contact with the second support.

14. The method according to claim 13, wherein:
a) the electron source and the first polypeptide are each in electronic contact with the same support, and the support is an electronically-conducting particle;
b) the electron source and the first polypeptide are each in electronic contact with the same support, and the support comprises a material comprising: carbon, a metal or metal alloy, a metal oxide or mixed metal oxide, a metal hydroxide, a metal chalcogenide, a semi-conducting material, an electronically-conductive polymer, or mixtures thereof; or
c) the electron source is in electronic contact with a first support and the first polypeptide is in electronic contact with a second support; and the first support is in electronic contact with the second support; and the first support and the second support each comprise a material comprising: carbon, a metal or metal alloy, a metal oxide or mixed metal oxide, a metal hydroxide, a metal chalcogenide, a semi-conducting material, an electronically-conductive polymer, or mixtures thereof.

15. The method according to claim 1, wherein the electron source comprises an electrode connected to an electrode controller, wherein the electrode is connected to the first polypeptide.

16. The method according to claim 15, wherein the electrode comprises a material comprising: carbon, a metal or metal alloy, a metal oxide or mixed metal oxide, a metal hydroxide, a metal chalcogenide, an electronically-conducting polymer, or mixtures thereof.

17. A method of producing a reduced labelled reaction product comprising one or more $^xH$ atoms, wherein x is 2 or 3, wherein said method comprises producing a reduced labelled cofactor according to claim 1; and
iv) contacting the reduced labelled cofactor and an oxidised reactant with at least one enzyme that is an NADH-dependent oxidoreductase or an NADPH-dependent oxidoreductase, such that the at least one enzyme selectively transfers an $^xH$ atom from the reduced labelled cofactor to the oxidised reactant, thereby producing a reduced labelled reaction product and an oxidised cofactor.

18. A method of producing a reduced labelled reaction product comprising one or more $^xH$ atoms, wherein x is 2 or 3, wherein said method comprises producing a reduced labelled cofactor according to claim 1; and
iv) contacting the reduced labelled cofactor and an oxidised reactant with at least one enzyme that is an NADH-dependent oxidoreductase or an NADPH-dependent oxidoreductase, such that the at least one enzyme selectively transfers an $^xH$ atom from the reduced labelled cofactor to the oxidised reactant, thereby producing a reduced labelled reaction product and an oxidised cofactor;
and wherein said method further comprises reducing the oxidised cofactor produced in step (iv) in the method according to claim 1.

19. A method of producing a reduced labelled reaction product comprising one or more $^xH$ atoms, wherein x is 2 or 3, wherein said method comprises producing a reduced labelled cofactor according to claim 1; and
iv) contacting the reduced labelled cofactor and an oxidised reactant with at least one enzyme that is an NADH-dependent oxidoreductase or an NADPH-dependent oxidoreductase, such that the at least one enzyme selectively transfers an $^xH$ atom from the reduced labelled cofactor to the oxidised reactant, thereby producing a reduced labelled reaction product and an oxidised cofactor;
and wherein said method further comprises repeating steps (ii) to (iv) multiple times, thereby recycling the cofactor.

20. A method of producing a reduced labelled reaction product comprising one or more $^xH$ atoms, wherein x is 2 or 3, wherein said method comprises producing a reduced labelled cofactor according to claim 1; and
iv) contacting the reduced labelled cofactor and an oxidised reactant with at least one enzyme that is an NADH-dependent oxidoreductase or an NADPH-dependent oxidoreductase, such that the at least one enzyme selectively transfers an $^xH$ atom from the reduced labelled cofactor to the oxidised reactant, thereby producing a reduced labelled reaction product and an oxidised cofactor;
and wherein the at least one enzyme that is an NADH-dependent oxidoreductase or NADPH-dependent oxidoreductase is at least one of: an NAD(P)H-dependent alcohol dehydrogenase, an NAD(P)H-dependent ene reductase, an NAD(P)H-dependent imine reductase, or an NAD(P)H-dependent amino-acid dehydrogenase.

21. The method according to claim 20, wherein the at least one enzyme that is an NADH-dependent oxidoreductase or NADPH-dependent oxidoreductase is alcohol dehydrogenase or an amino acid dehydrogenase.

22. A method for producing an oxidised labelled cofactor comprising one or more $^xH$ atoms, wherein x is 2 or 3, comprising producing a reduced labelled cofactor comprising one or more $^xH$ atoms according to claim 1; and oxidising the reduced labelled cofactor.

23. A system for performing a method according to claim 1, the system comprising:
i) a composition comprising $^xH^+$ ions, wherein x is 2 or 3, and an oxidised cofactor;
ii) an electron source; and
iii) a first polypeptide, which is an NADH: acceptor oxidoreductase or an NADPH:acceptor oxidoreductase;
wherein the system is configured such that electrons are transferred from the electron source to the first polypeptide and $^xH^+$ ions and the oxidised cofactor are contacted with the first polypeptide, so as to reduce the oxidised cofactor to form a reduced labelled cofactor comprising one or more $^xH$ atoms.

24. The method of claim 8, wherein:
a) the first polypeptide and the second polypeptide constitute parts of a modular, multidomain, or multicomponent protein or protein complex;
b) the second polypeptide oxidises $H_2$ or $^xH_2$ under the conditions of the method; and/or
c) the second polypeptide is a hydrogenase.

25. The method of claim 10, wherein the synthetic organic, inorganic, or metallic oxidation catalyst comprises: platinum, palladium, iridium nickel, rhodium, and/or ruthenium.

26. The method of claim 13, wherein:
   the support in a), or the first support and second support in b) each comprises a material comprising:
   i) graphite, carbon nanotube(s), carbon black, activated carbon, carbon nanopowder, vitreous carbon, carbon fibre(s), carbon cloth, carbon felt, carbon paper, graphene, highly oriented pyrolytic graphite, pyrolytic graphite, or doped diamond;
   ii) a metal or metal alloy selected from: gold, silver, tungsten, iridium, platinum, palladium, copper, titanium, brass, and steel; and/or
   iii) a material selected from: titanium oxide, indium oxide, tin oxide, and indium tin oxide.

27. The method of claim 16, wherein the material comprises;
   i) graphite, carbon nanotube(s), carbon black, activated carbon, carbon nano powder, vitreous carbon, carbon fibre(s), carbon cloth, carbon felt, carbon paper, graphene, highly oriented pyrolytic graphite, pyrolytic graphite, or doped diamond;
   ii) a metal or metal alloy selected from gold, silver, tungsten, iridium, platinum, palladium, copper, titanium, brass, and steel; and/or
   iii) a material selected from titanium oxide, indium oxide, tin oxide, and indium tin oxide.

28. The method of claim 8, wherein the second polypeptide is a hydrogenase.

\* \* \* \* \*